US006912230B1

(12) United States Patent
Salkini et al.

(10) Patent No.: US 6,912,230 B1
(45) Date of Patent: Jun. 28, 2005

(54) MULTI-PROTOCOL WIRELESS COMMUNICATION APPARATUS AND METHOD

(75) Inventors: Jay Salkini, Clarksville, MD (US); Thomas V. Joseph, III, Garland, TX (US)

(73) Assignee: TECORE, Columbia, MD (US)

(*) Notice: Subject to any disclaimer, the term of this patent is extended or adjusted under 35 U.S.C. 154(b) by 0 days.

(21) Appl. No.: 09/245,292

(22) Filed: Feb. 5, 1999

(51) Int. Cl.[7] .................................................. H04J 3/16
(52) U.S. Cl. ....................................... 370/466; 455/560
(58) Field of Search ................................ 370/318, 320, 370/321, 328, 329, 331, 465, 466, 395, 352, 355, 357, 358, 360, 467, 335–338, 342–347, 401; 455/560, 433, 524, 436, 507, 449; 361/683

(56) References Cited

U.S. PATENT DOCUMENTS 5,227,957 A * 7/1993 Deters ........................ 361/683
5,276,906 A * 1/1994 Felix .......................... 455/414
5,278,890 A * 1/1994 Beeson, Jr. et al. ........... 379/57

(Continued)

FOREIGN PATENT DOCUMENTS

WO WO 97/42783 11/1997
WO WO 98/16054 4/1998

OTHER PUBLICATIONS

Supplemental Search Report issued on Jan. 28, 2004 in counterpart foreign application in EPO under application No. 00908461.7.

*Primary Examiner*—Andy Lee
(74) *Attorney, Agent, or Firm*—Andrews Kurth LLP

(57) ABSTRACT

A scalable, multi-protocol mobile switching center in a wireless communications network provides communications control for digital and analog wireless communications devices including devices that operate according to GSM and IS-41 standards. The hardware and software architecture of the switching center is designed so that processing that is unique to a particular protocol is performed at the lowest possible level, and remaining processing can use generic procedures. The switching center incorporates a home location register and visitor location register that are used in conjunction with software applications to determine the protocol of mobile communications devices using the wireless communications network. The mobile switching center can be used to provide a large scale distributed wireless network or a small scale wireless network. The switching center can also be used as an adjunct to a private branch exchange to provide in-building wireless services and call control. Graphical user interfaces make the wireless communications network easy to maintain.

74 Claims, 106 Drawing Sheets

U.S. PATENT DOCUMENTS

| | | | | | |
|---|---|---|---|---|---|
| 5,285,494 | A | | 2/1994 | Sprecher et al. | |
| 5,289,179 | A | | 2/1994 | Beeson, Jr. et al. | |
| 5,345,498 | A | | 9/1994 | Mauger | |
| 5,414,750 | A | | 5/1995 | Bhagat et al. | |
| 5,414,806 | A | * | 5/1995 | Richards | 395/135 |
| 5,420,863 | A | | 5/1995 | Taketsugu et al. | |
| 5,440,613 | A | | 8/1995 | Fuentes | |
| 5,440,759 | A | | 8/1995 | Barnes et al. | |
| 5,465,386 | A | | 11/1995 | Barnes et al. | |
| 5,490,285 | A | | 2/1996 | Ahlenius et al. | |
| 5,519,760 | A | | 5/1996 | Borkowski et al. | |
| 5,539,730 | A | | 7/1996 | Dent | |
| 5,548,802 | A | | 8/1996 | Barnest et al. | |
| 5,561,841 | A | | 10/1996 | Markus | |
| 5,572,579 | A | | 11/1996 | Orriss et al. | |
| 5,574,788 | A | | 11/1996 | Childress et al. | |
| 5,577,198 | A | | 11/1996 | Willrett et al. | |
| 5,581,596 | A | * | 12/1996 | Hogan | 455/435 |
| 5,590,398 | A | | 12/1996 | Matthews | |
| 5,592,480 | A | * | 1/1997 | Carney et al. | 370/347 |
| 5,608,854 | A | | 3/1997 | Labedz | |
| 5,610,969 | A | | 3/1997 | McHenry et al. | |
| 5,613,196 | A | | 3/1997 | Barnes et al. | |
| 5,629,978 | A | | 5/1997 | Blumhardt et al. | |
| 5,655,001 | A | | 8/1997 | Cline et al. | |
| 5,666,356 | A | | 9/1997 | Fleming et al. | |
| 5,711,006 | A | | 1/1998 | Brochu et al. | |
| 5,729,536 | A | * | 3/1998 | Doshi et al. | 370/398 |
| 5,752,186 | A | * | 5/1998 | Malackowski et al. | 455/414 |
| 5,845,211 | A | | 12/1998 | Roach, Jr. | |
| 5,878,036 | A | * | 3/1999 | Spartz et al. | 370/335 |
| 5,920,822 | A | * | 7/1999 | Houde et al. | 455/466 |
| 5,946,634 | A | * | 8/1999 | Korpela | 455/552 |
| 5,953,331 | A | * | 9/1999 | Duncan et al. | 370/465 |
| H1921 | H | * | 11/2000 | Fletcher et al. | 455/433 |
| 6,188,898 | B1 | * | 2/2001 | Phillips | 455/433 |
| 6,278,697 | B1 | * | 8/2001 | Brody et al. | 370/310 |

* cited by examiner 3105 3151

3106 3161

3502

MULTI-PROTOCOL WIRELESS COMMUNICATION APPARATUS AND METHOD

FIELD OF THE INVENTION

The invention is directed to a wireless communications apparatus and method. In particular, the invention is directed to a multi-protocol, scaleable wireless switching platform and method.

BACKGROUND

Wireless communications in the United States were initially conducted solely through analog systems and protocols. The most prevalent analog protocol remains the Advanced Mobile Telephone System (AMPS) protocol. To handle wireless communications and to allow interconnection with traditional wired land-lines, switching systems and base stations were required. The analog switching systems are large and are designed to cover large markets and handle large volumes of calls.

In the 1990's digital systems and protocols began to be used for wireless communications. Examples of digital protocols are the Global System for Mobile Communication (GSM) code division multiple access (CDMA), and time division multiple access (TDMA). When wireless networks began to switch to digital protocols, they could not simply upgrade their analog base stations to digital. New equipment for the digital facilities was required. However, the networks continued to use large switching systems designed to cover their large spread markets. Examples of large switching systems are AT&T's 5ESS® system and the AXE system made by Ericsson. The 5ESS® switch is described in detail in the AT&T Technical Journal, Vol. 64, No. 6, part 2, July/August 1985, pages 1305–1564.

Large switching systems are designed to cover large markets and to handle many thousands of customers. The larger systems have the advantage of being able to provide a wide range of call options, such as call forwarding, caller identification and call waiting. The switching systems are expensive, however and, therefore, may not be appropriate for small markets and wireless providers. Additionally, large switching systems can be inefficient because of the added additional cost for increased back hauls of calls.

Typical switching systems employ proprietary architectures that use hardware components for switching, external interfaces, operating system, and control.

SUMMARY OF THE INVENTION

A multi-protocol mobile switching center (MSC) provides wireless communications for mobile devices operating on a local wireless network according to any standard protocol including those of the Global Systems for Mobile Communications (GSM) standards and IS-41 standards (including time division multiple access (TDMA), code division multiple access (CDMA), and Advanced Mobile Telephone System (AMPS)). The MSC may be incorporated onto a single platform having a home location register (HLR) and an authentication center (AC or AuC), as well as a visitor location register (VLR) and an equipment identity register (EIR).

The multi-protocol MSC is scalable so that it may be used for a small number of customers, such as in a rural setting to provide telephone access, or as part of an in-building communications network. The scalable, multi-protocol MSC may also be used to construct a large, distributed wireless network. Thus, the scalable, multi-protocol MSC provides the flexibility to be used with a wide range of customer bases, and within a variety of different typographies.

Because the MSC can process wired and wireless calls according to any protocol, a single switching center may serve customers who operate mobile and fixed communications devices, regardless of protocol. This true multi-protocol functionality makes this switching solution extremely efficient and cost effective, and eliminates the need for separate, protocol-specific components.

The multi-protocol MSC can be housed in a standard chassis. The multi-protocol MSC can use standard, off the shelf hardware for most data storage and processing functions. The multi-protocol MSC can be easily updated to take advantage of industry advances by simply replacing select components in the chassis.

The multi-protocol MSC provides full-featured telephone and data services, including wired and wireless analog and digital telephony, conference calling, prepaid calling, emergency call routing and long-distance resale. The multi-protocol MSC also provides pocket switching applications such as asynchronous transfer mode (ATM).

The multi-protocol MSC incorporates advanced graphical user interfaces (GUIs) that display system data in a convenient, easy to access format. A system operator can quickly select data for display, and can easily modify selected data entries. The system operator can control operation of the multi-protocol MSC using the intuitively structured GUIs.

The multi-protocol MSC may incorporate a number of sophisticated features in addition to the HLR, VLR, EIR and the authentication center. These features include an operations and maintenance center, wire line and tandeming services, and hot (real-time) billing and prepaid services.

When used for distributed switching, the multi-protocol MSC may reduce build out and operational costs associated with large switching centers. This architecture also eliminates needless back hauling by switching local calls locally. Finally, the architecture allows for add on as a wireless customer base expands.

The multi-protocol MSC includes a first interface that receives digital and analog communication according to a first protocol and a second interface that receives digital communication according to a second protocol. The first and the second interfaces include inter system (system-to-system) message handlers and intra system (within system) message handlers.

The hardware and software architecture of the MSC is designed to use generic signaling as much as possible to provide call connection and other functions. Protocol-specific communications are handled at a device handler (lower) level, and higher level processing uses generic messaging. A table may be used to map messages of the different protocols to the generic messages used by the MSC. The hardware of the aircore system is based on off-the-shelf industry standard components for each of the four areas typically found as proprietary in current systems. The use of off-the-shelf standardized switching components, interface boards, operating system and control processing provide a unique evolution path for the aircore system.

The HLR and VLR are structured so that data that does not depend on a specific protocol is stored in a common memory portion while protocol-specific data is stored in protocol specific portions of the HLR and VLR. This logical arrangement of the HLR and VLR provides for quick access to data by components of the MSC and allows for easier updating by a system operator.

An advanced intelligent message (AIM) handler interfaces with the VLR and the HLR to determine the current location and identification of mobile units homed on the HLR or roaming in the local wireless network. The AIM also determines the protocol applicable for the mobile unit. For calls received at the MSC from a local wireless network base station, the protocol determination may be made by reference to the protocol of the base station. For multi-protocol base stations, the determination includes decoding information provided in the service request or similar message sent by the base station. For other mobile units, the MSC may communicate with external wireless components such as other HLRs, VLRs, and MSCs.

The MSC includes an authentication and registration system that controls registration of mobile communications devices operating on the system controlled by the MSC. The authentication and registration system also provides encryption and ciphering of voice and data communications.

The MSC can also be used as an adjunct to a private branch exchange (PBX) to create an in-building wireless network. Used as such, the MSC and HLR can be used to route calls preferentially among mobile units and fixed telephones and other communications devices.

BRIEF DESCRIPTION OF THE DRAWINGS

The invention will be described in conjunction with the following figures, in which like numbers refer to like features, and wherein.

DETAILED DESCRIPTION OF THE INVENTION

Figure 1A:
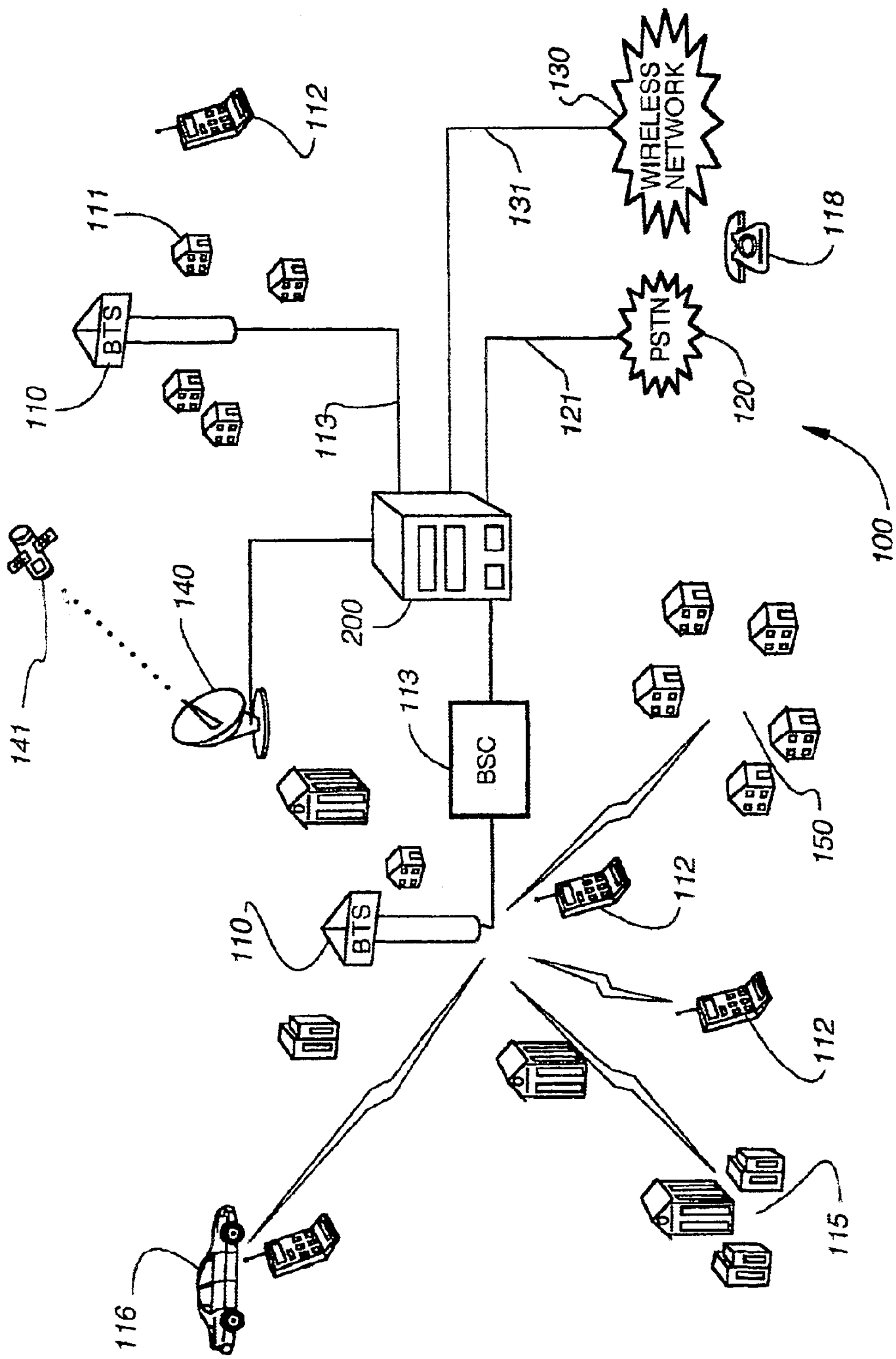
FIG. 1*a*–1*d* show wireless communication environments according to the invention.

Mobile telecommunications (radio) systems that permit customer calling from mobile stations such as automobiles, or small light weight hand held personal communications units are becoming increasingly prevalent. These systems use the principles of cellular technology to allow the same frequencies of a common allocating radio bandwidth to be reused in separated local areas or cells of a broader region. Each cell is served by a base transceiver station comprising a group of local transceivers connected to a common antenna. Base station systems, each including a controller and one or more transceiver stations, are interconnected via a switching system, called a mobile switching center (MSC), which is also connected to the public switched telephone network (PSTN), and the Public Land Mobile Telephone Network (PLMN). These mobile telecommunications systems are now entering a second generation characterized by digital radio communications with a different set of standards, such as the European Global System for Mobile Communications (GSM) standard promulgated by the Special Mobile Group (SMG). The GSM standard is also being adapted for use in the United States. In addition, in the United States, CDMA, TDMA, DAMPS, and AMPS are used for digital cellular mobile communications.

The mobile telecommunications systems have many components that need to communicate signaling information for controlling the establishment of connections. Such signaling information is communicated over channels that are separated from the channels carrying actual voice or data communications between the connected customers. Among the components that need to communicate to establish voice and data communication links are the mobile units, the base station system connected by radio to the mobile units, the mobile switching center and the various databases that are consulted for the establishment of mobile calls. These databases include a home location register (HLR) with an authentication center (AC (IS-41) or AuC (GSM)), a visitor location register (VLR), and an equipment identification register (EIR).

Signaling messages among these components are processed by many expensive protocol handlers. In the past, these protocol handlers were too expensive to permit incorporation into a single unit. Modern switching systems typically include expensive MSCs, such as AT&T's 5ESS® switch. These systems only make sense for deployment when there are a large group of mobile customers who will use the system.

This invention uses advanced signal processing, a novel method of structuring signal processing software and an enhanced home location register/visitor location register to provide multi-protocol, scaleable mobile telecommunications capability. The software architecture is specifically designed so that generic processing is used to the maximum extent possible to process signals and data related to different digital and analog protocols including GSM, TDMA, CDMA and AMPS, and proprietary protocols.

FIG. 1*a* shows a general arrangement of a mobile telecommunications environment 100. At the heart of this environment 100 is an aircore platform 200 of the invention. The aircore platform 200 receives messages from, and transmits messages to a variety of fixed and mobile sources, conforming to each of the protocols employed by the sources.

Base transceiver stations (BTSs) 110 receive messages from and transmit messages to the aircore platform 200 over land lines 113. The land lines 113 may be any telecommunications medium that is capable of high speed data transmission, such as fiber optic cable, T-1 and E-1 lines and coaxial cable, for example.

The BTS 110 transmits messages to and receive messages from mobile and fixed sources. In FIG. 1*a*, the BTSs 110 are shown in wireless communication with mobile phones 112, a mobile phone in a car 116 (a roaming mobile phone), a microcell 115, and a wireless local loop 150. The wireless local loop 150 may include several connections. The wireless local loop 150 is described in more detail below. A telephone 118 may operate in conjunction with a private branch exchange (PBX).

The BTSs 110 may operate in conjunction with the fixed and mobile sources, according to one of several wireless protocols as set forth above.

The aircore platform 200 communicates with a public switched telephone network (PSTN) 120 via a wired path 121 and with a wireless network 130 via a signal path 131.

The aircore platform 200 also communicates with a satellite 141 via a satellite receiver 140.

Figure 1B:
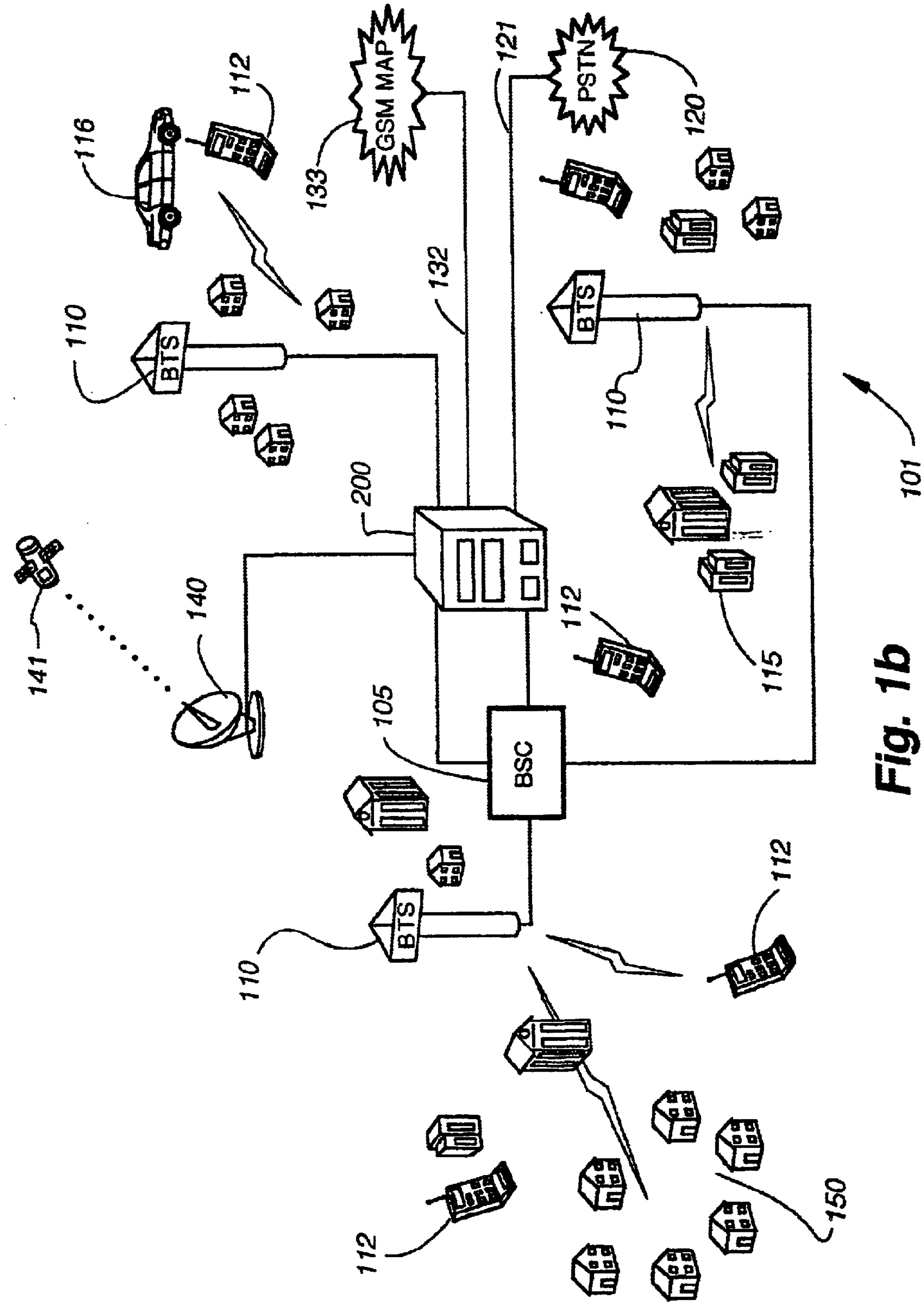

FIG. 1*b* shows a GSM wireless environment 101. The aircore platform 200 connects to the BTS 110 via a base station controller (BSC) 105. Mobile units 112, the roaming mobile phone 116, the wireless local loop 150 and the microcell 115 communicate by way of wireless radio channels with the BTS 110. The aircore platform 200 also connects to a GSM MAP network 133 via landline 132 and to the PSTN 120 via the landline 121. Finally, the aircore platform 200 communicates with the satellite 141 via the antenna 140.

Figure 1C:
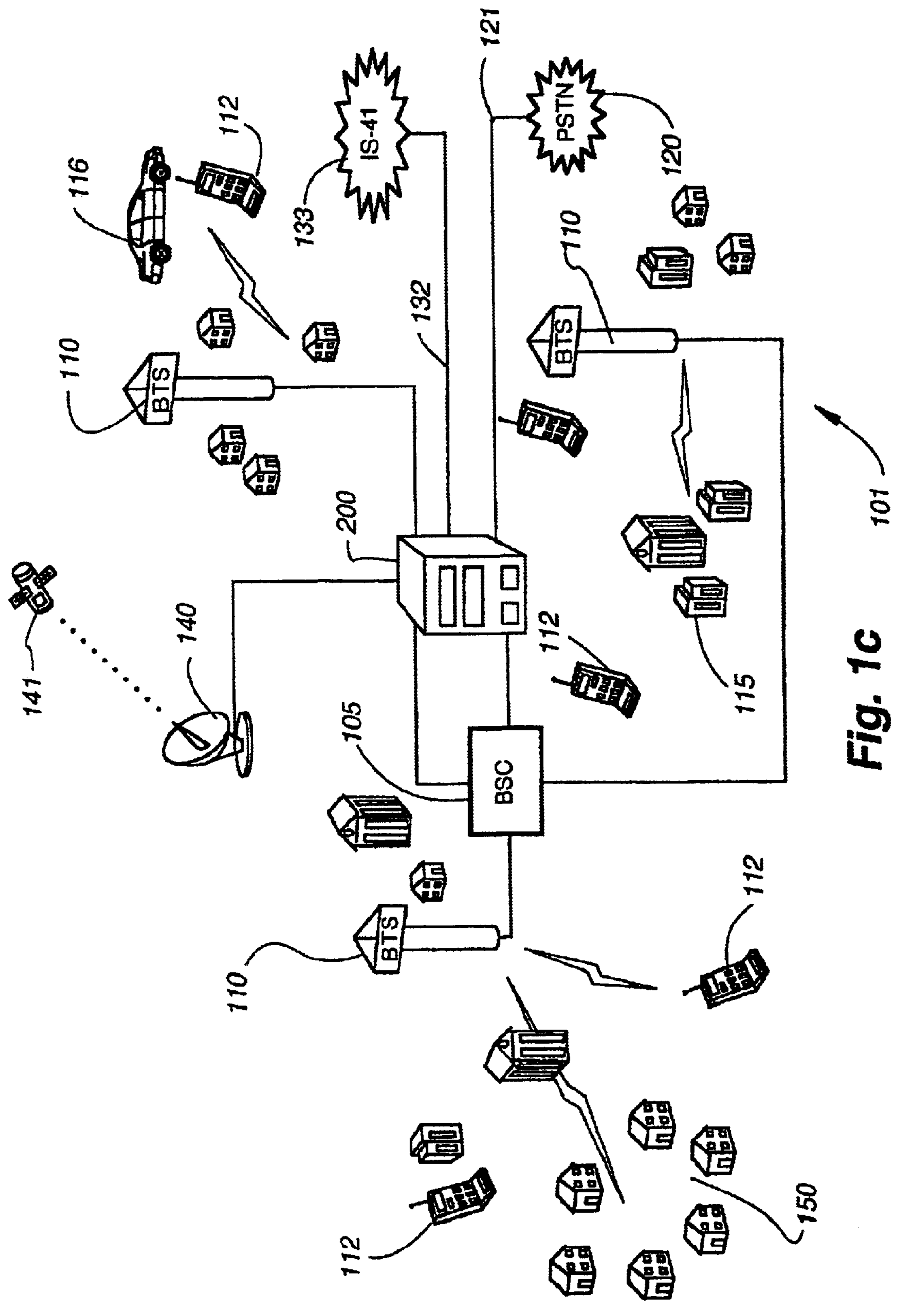
Figure 1D:
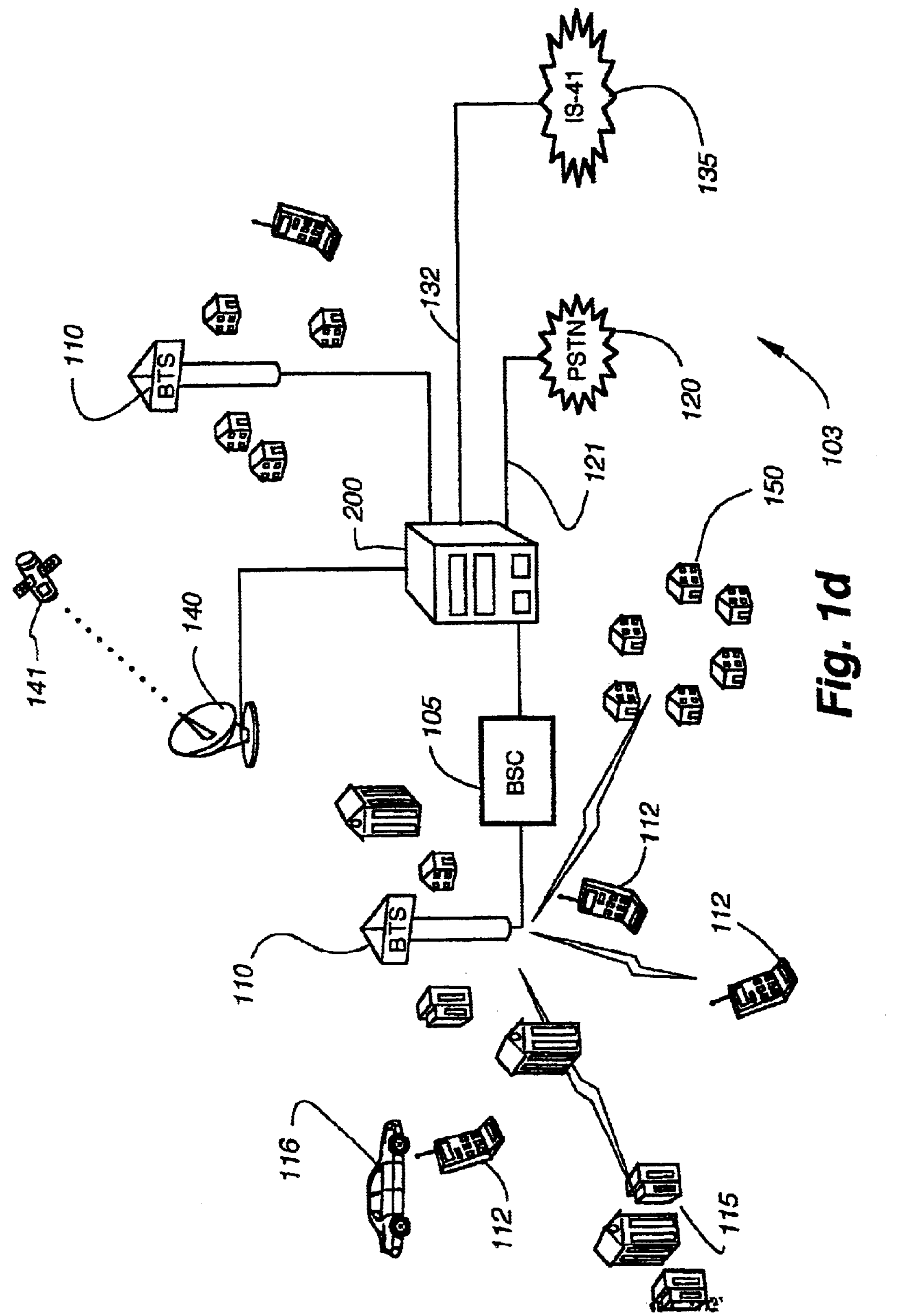

FIGS. 1*c* and 1*d* show wireless environments 102 and 103, respectively. The wireless environment 102 is used with CDMA-protocol mobile units and base stations, and the wireless environment 103 is used with TDMA-protocol wireless units and base stations.

Figure 2:
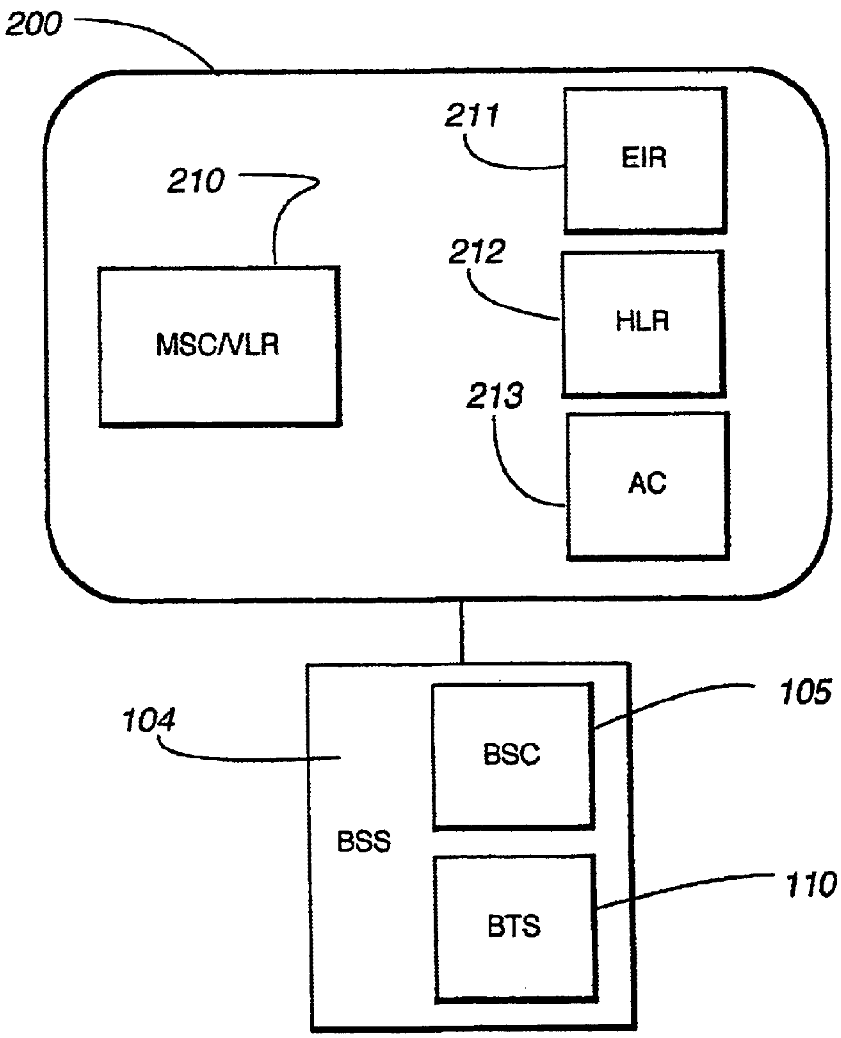
FIG. 2 is a block diagram of an aircore switching platform.

FIG. 2 shows the aircore platform 200 in more detail. In FIG. 2, the aircore platform 200 includes a mobile switching center (MSC) 210. The MSC 210 is configured such that the aircore platform 200 can receive and transmit multiprotocol wireless communications and wired communications with a variety of platforms. The MSC 210 may include a visitor location register (VLR). Alternately, the VLR may be separated from the MSC 210. The aircore platform 200 also includes a home location register (HLR) 212. The HLR 212 includes permanent information about customers who use the local environment serviced by the aircore platform 200. The data stored in the HLR 212 is the permanent data that is independent of the customer's present location, plus temporary data stored such as the address of the system (may be signaling system 7 (SS-7) or other system) where the mobile unit is currently registered and the address of service centers that have short messages for a mobile unit. An example of such a short message is a request to turn on a voice message waiting lamp indicating that a voice message has been stored for the mobile unit's use in a voice messaging system. These addresses are erased after the short messages have been delivered. The signaling system 7 (SS-7) is described in detail in A. R. Modarressi, et al., "Signaling System No. 7: A Tutorial," IEEE Communications Magazine, July 1990, pp. 19–35.

The VLR contains the profile data for the mobile unit and the transient data for each mobile customer, including the mobile unit's present or most recently known location area, the mobile unit's on/off status, and security parameters.

An authentication center 213 is used to ensure that only properly authorized mobile and wired sources communicate through the aircore platform 200. The authentication center 213 provides authentication encryption parameters to ensure that a mobile customer cannot falsely assume the identity of another mobile customer and provides data for encryption of the voice data, and control signals transmitted via the air between the mobile unit and the servicing base station system. Encryption is desirable for the transmission of messages between the mobile unit and the radio transceiver at a base station serving that mobile unit because it is possible to listen in, or tap, the radio channels carrying voice communications.

An equipment identity register (EIR) 211 includes a database of the mobile equipment using the aircore platform 200, including specific protocols and equipment preferences. The EIR 211 retains the ranges of certified equipment identifications and the ranges of, or the individual equipment identifications that are under observation or barred from service. The equipment identification information is received from a mobile unit at the MSC 210. The EIR 211 is used to verify that the equipment number of the mobile unit is certified for use in the public network and is not on the observation or service barred list.

The MSC 210 is connected to other wireless network components and to the PSTN for accessing land-based customer stations and to the integrated services digital network (ISDN) for communicating according to ISDN protocols. A base station system (BSS) 104 may include the BSC 105 and one or more BTSs 110 for communicating with mobile units. The BSS 104 and the mobile units communicate via radio connections. The BSS 104 is also connected via trunks to carry the voice, data, and control messages between the mobile units and the MSC 210. The BSC 105 and the BTS 110 may be in different physical locations (for example, the BSC 105 may be co-located with the MSC 210 in which case a trunk is required to interconnect the two). This is done since the communications between the BTS 110 and the BSC 105 can typically be compressed to optimize the BTS connectivity requirements.

Figure 3:
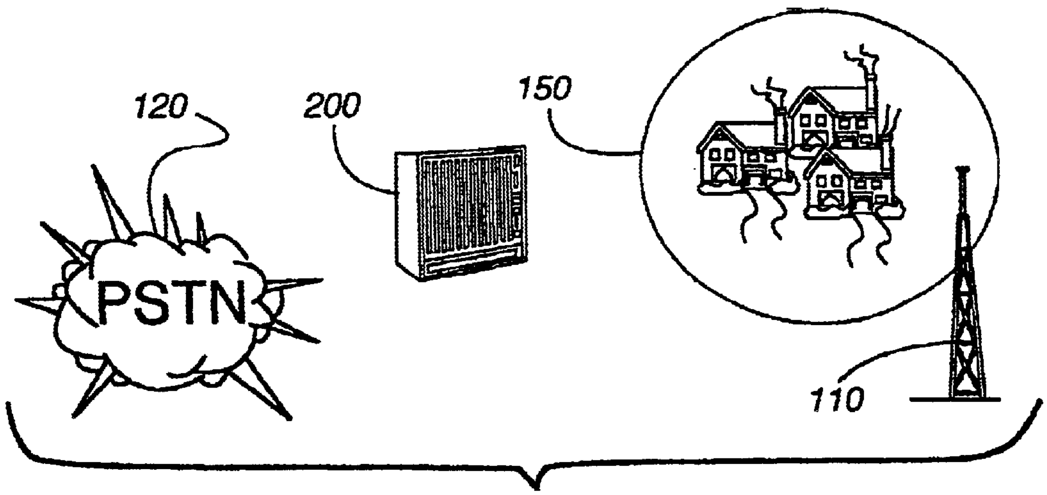
FIG. 3 shows a wireless loop architecture.

FIGS. 3–7 show different mobility architectures that can be used with the aircore platform 200. In FIG. 3, the aircore platform 200 is shown communicating with the BTS 110. The BTS 110 may service the wireless local loop 150. The aircore platform 200 may also connect with the PSTN 120.

Figure 4:
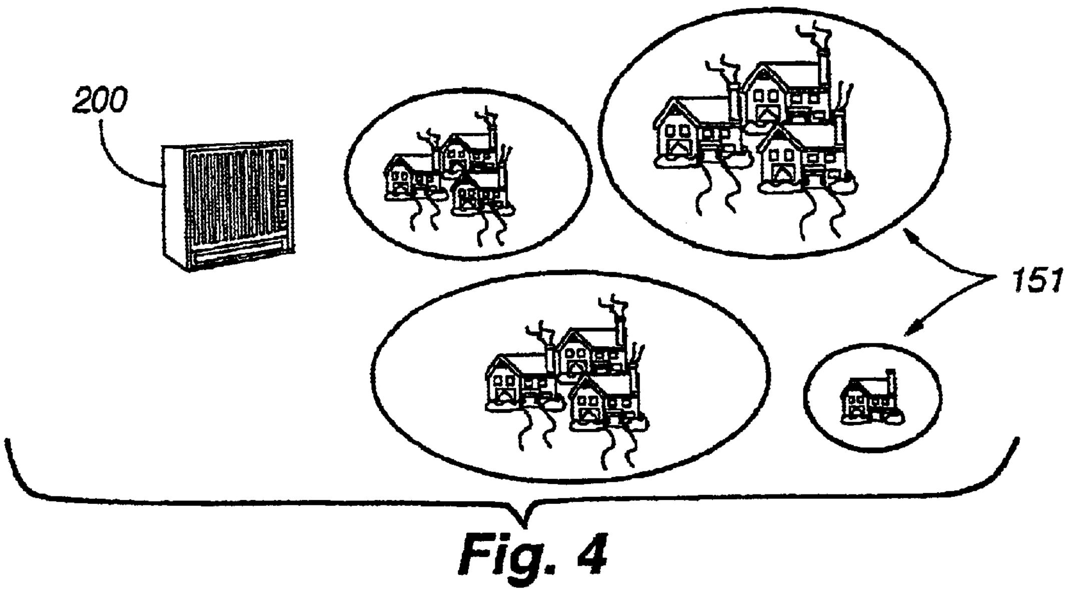
FIG. 4 shows a fixed wireless loop architecture.

FIG. 4 shows the aircore platform 200 used in conjunction with fixed wireless local loop customers. In FIG. 4, the fixed wireless local loops 151 include a number of fixed customers in each of the local loops 151. The local loops 151 provide telephony services to fixed wireless customers in their respective loops. The services are provided via a fixed terminal (not shown) that is attached to a location and typically extends via a standard two-wire or similar connection to an analog telephone within the location. Call processing and feature management are handled by the aircore platform 200 as for a normal wireless customer. The only difference for the aircore platform 200 is that the area of operation for the fixed terminal does not change. Even though the terminal is using a wireless interface for communications, the terminal's location remains fixed. The aircore platform 200 processes the calls to and from the customer in the same manner as with mobile wireless calls because the air interface determines the protocol and the feature set that is to be used to communicate with the customer's fixed terminal. The protocol can be any of the wireless protocols (CDMA, TDMA, AMPS, GSM). To limit the area of communications for a particular fixed terminal, the aircore platform 200 can be configured to only allow service to a particular location area for a particular fixed terminal.

Figure 5:
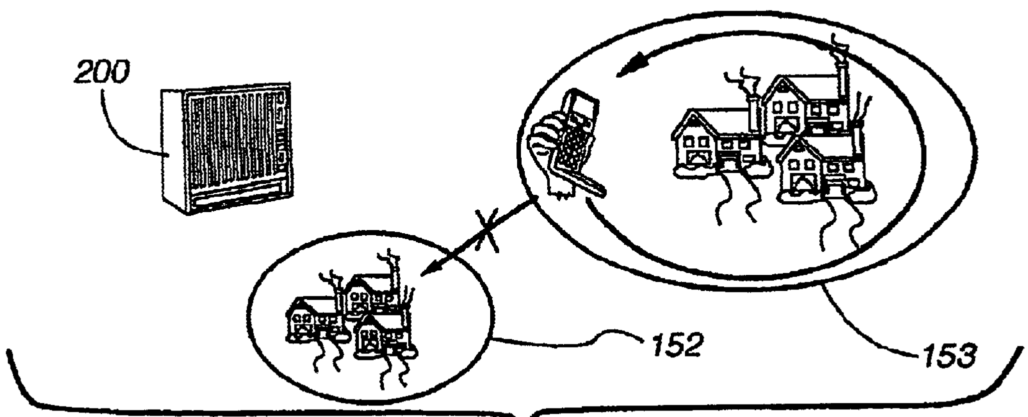
FIG. 5 shows the aircore platform with local area mobility.

The aircore platform 200 provides a full range of mobile services to a wireless local loop, or location area. In FIG. 5, the aircore platform 200 is shown providing mobile services to a wireless local loop 152 and a wireless local loop 153. In this type of mobility situation, customers may move with their wireless terminals in a given wireless local loop or location area. Movement outside of the location area is not supported for these types of terminals. A typical implementation of this type of mobility is provided in a village or town scenario where the coverage is disjointed from other parts of the telecommunications system.

Figure 6:
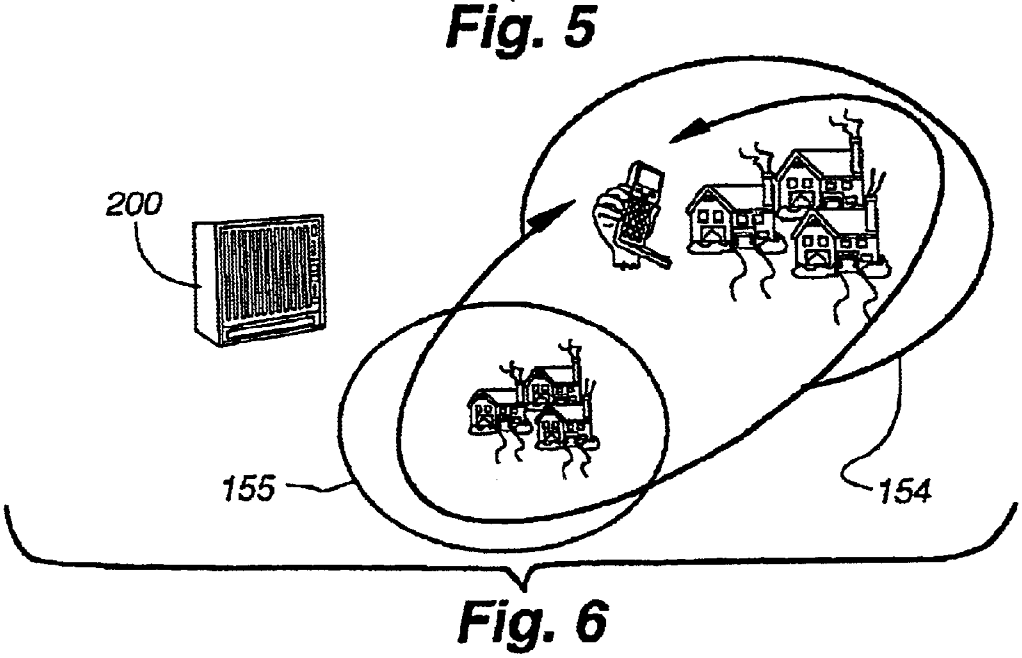
FIG. 6 shows the aircore platform with system level mobility.

FIG. 6 shows a system level mobility scenario that permits mobility for the customer across all location areas under the control of the local aircore platform 200. In FIG. 6, the location area 154 and the location area 155 are both serviced by the aircore platform 200. Moreover, customers in the location area 154 may freely move through the location area 154 and the location area 155 and maintain wireless communications with the aircore platform 200. This type of scenario can be found in multiple towns or villages where a common aircore platform 200 is shared and the coverage is contiguous or there is a considerable amount of allowable travel between the locations covered by the system.

Figure 7:
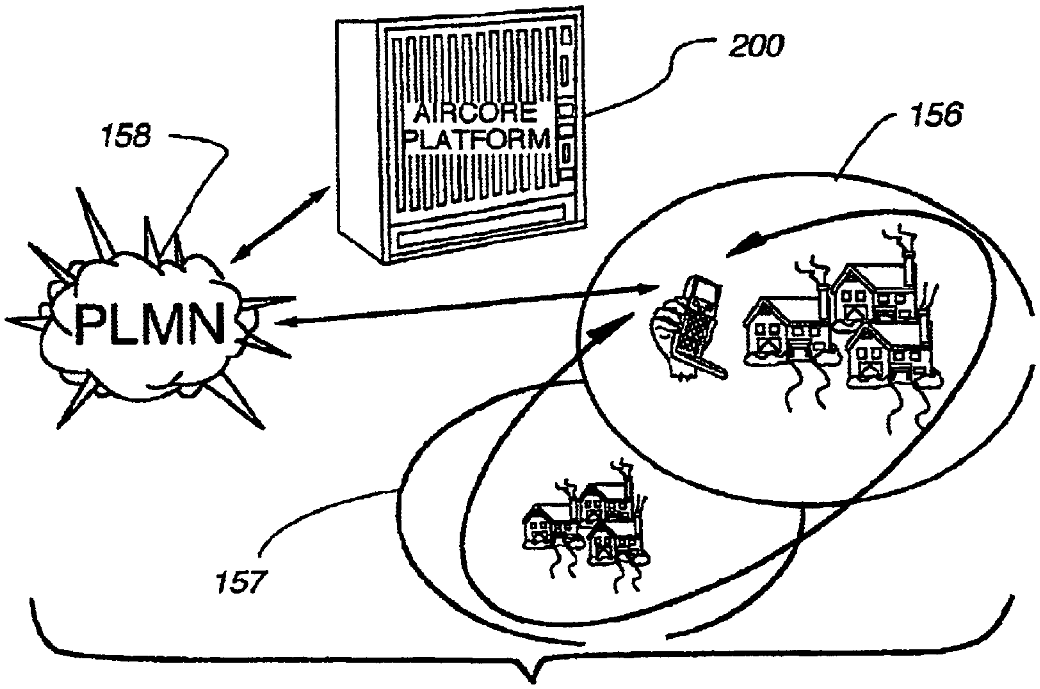
FIG. 7 shows the aircore platform with full scale mobility.

FIG. 7 shows a full scale mobility scenario. In FIG. 7, the aircore platform 200 communicates with a public land mobile network (PLMN) 158 and with local wireless loops 156 and 157. The local wireless loops 156 and 157 also communicate with the PLMN 158. This configuration provides for incoming and outgoing roaming traffic to and from the local aircore platform 200 to other switching centers, which may also be aircore platforms 200.

Figure 8:
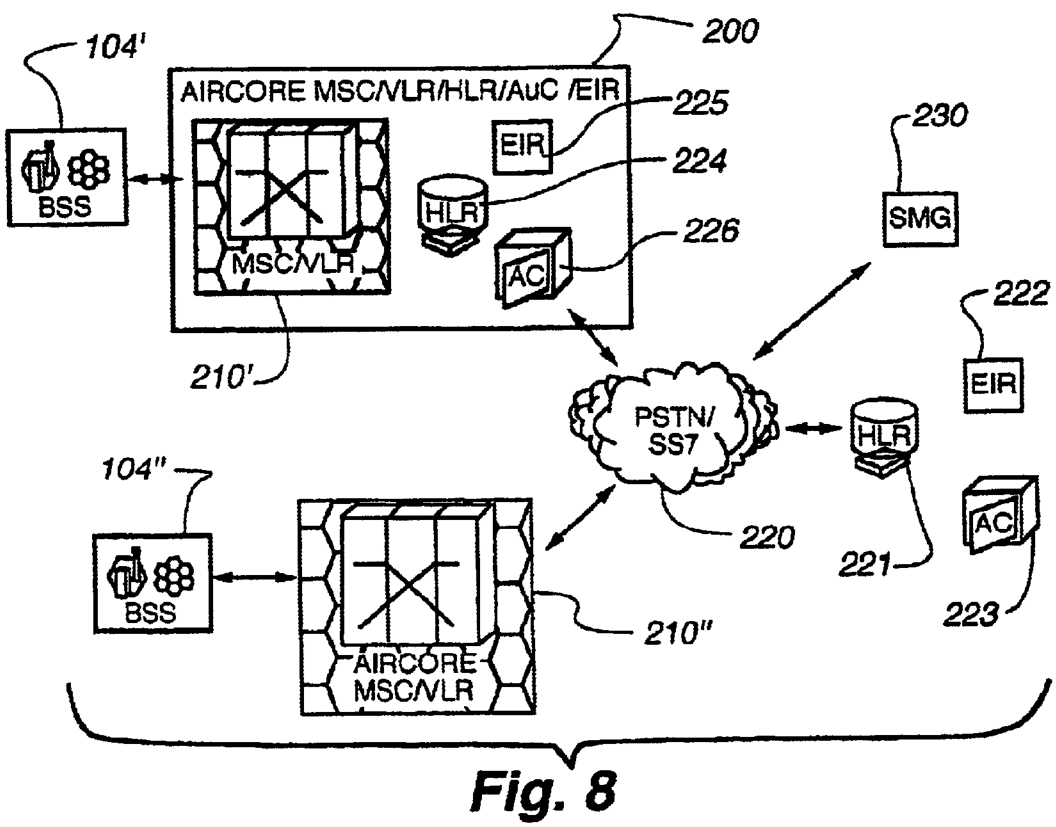
FIG. 8 shows a wireless network architecture.

FIG. 8 is a block diagram of a wireless network architecture according to the invention. In FIG. 8, the aircore platform 200 includes a MSC/VLR 210', a home location register 224, an authentication center 226, and an equipment identification register 225. The aircore platform 200 communicates with the base station system (BSS) 104' using one or more protocols including GSM, CDMA, TDMA, and AMPS. The aircore platform 200 also communicates with the PSTN 220 and other elements of the wireless network. An alternate mobile telecommunications switch is also shown in FIG. 8. A MSC/VLR 210" is coupled to the PSTN 220 and the BSS 104". However, other modular components used in the mobile telecommunications environment are located remotely from the MSC/VLR 210". A system management controller 230, a home location register 221, an equipment identification register 222 and an authentication center 223 may be physically separated from the MSC/VLR 210". However, the functions of these modular components remain the same, whether they are located with or remote from the MSC/VLR 210' and 210", respectively.

Figure 9:
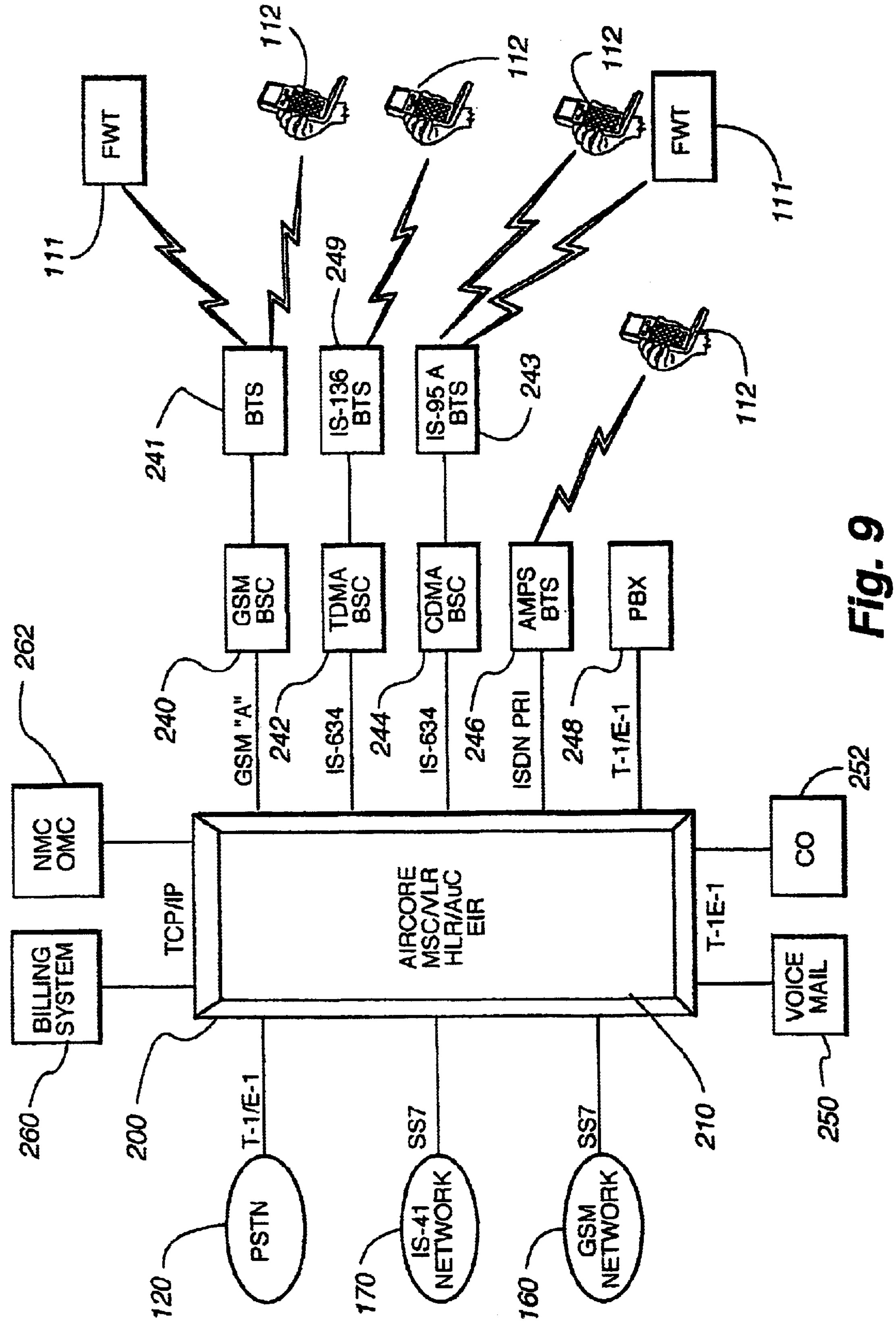
FIG. 9 is a block diagram of aircore functions.

FIG. 9 shows the functions and connections of the aircore platform 200. In FIG. 9, the visitor location register, the home location register, the equipment identification register and the authentication center are shown co-located with the MSC 210. The aircore platform 200 connects to the PSTN 120 via a T-1/E-1 line. The aircore platform 200 is adapted to receive land-line originated telephone messages. The aircore platform 200 can then send a connect message to an appropriate base station system. The aircore platform 200 also allows intersystem connection to an IS-41 wireless network 170 via a SS-7link and a GSM wireless network 160 via a SS-7link. Optionally, these links may be based on other communication carriage mechanisms such as IP, X.25, frame relay, or asynchronous transfer mode (ATM).

The aircore platform 200 provides for intrasystem, or base station, wireless communication using GSM protocols via a GSM BSC 240 and BTS 241. The aircore platform 200 provides wireless communications using CDMA and TDMA via a IS-634 link, an IS-95A BSC 244, a BTS 243 and a IS-136 BSC 242 and BTS 249. The aircore platform 200 communicates with an AMPS BTS 246 using the ISDN PRI+ or the IS-634 protocol. The aircore platform 200 provides communications with a private branch exchange (PBX) 248 via T-1/E-1 lines. The aircore platform 200 also provides for connection to a billing system 260 using TCP/IP protocols, for example, and for voice mail and messaging functions via voicemail module 250.

TABLE A

| TYPE | PROTOCOL | APPLICATION |
|---|---|---|
| Base Station | GSM “A” (Series 4 and 8) | GSM Network |
| | IS-651 & J-STD | US GSM based PCS |
| | IS-634 (IS-136) | DAMPS Network |
| | IS-634 (IS-95A) | CDMA Network |
| | IS-634 (AMPS) | Analog Network |
| | ISDN PRI + (AMPS) | Analog Network |
| Intersystem | GMS 09.02 | GSM Network |
| | IS-652 | US GSM based PCS |
| | ANSI-41 | DAMPS, DCMA, AMPS Network |
| PSTN | T-1 | T-1 Interface (various protocols) to the PSTN |
| | E-1 | E-1 Interface (various protocols to the PSTN |
| Tandem | T-1 | T-1 Interface tandem call traffic between local PBX and the PSTN |
| | E-1 | E-1 Interface tandem call traffic between local PBX and the PSTN |
| Voice Mail | T-1 | T-1 Interface to voice mail system |
| | E-1 | E-1 Interface to voice mail system |
| Billing Center | TCP/IP | Interface for the transfer of Call Detail Records |
| NMC/OMC | TCP/IP | Interface for the exchange of Network Management related information |

Table A shows a list of interfaces from the aircore platform 200 and the functionality each of the interfaces adds. A Network Management Center/Operations and Maintenance Center (NMC/OMC) 262 communicates with the aircore platform 200 using TCP/IP protocols, for example. The billing system 260 and the NMC/OMC 262 may also communicate with the aircore platform 200 using CCITT X.25 protocols.

Figure 10:
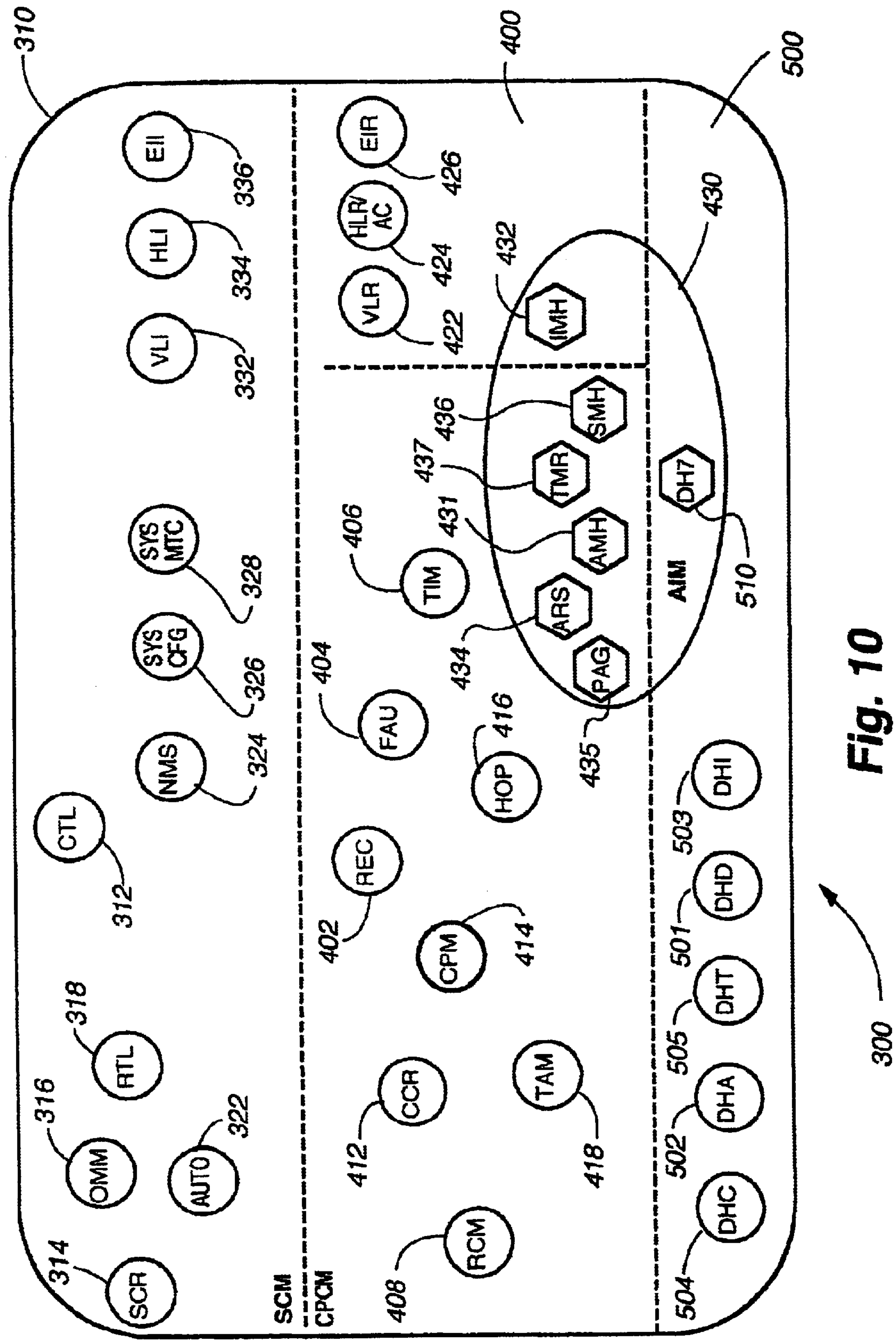
FIG. 10 is a block diagram of the aircore software architecture.

FIG. 10 is a block diagram of the aircore software architecture 300. In FIG. 10, the architecture 300 is shown including a system control module SCM layer 310, a call processing control module handling the real time application layer 400, and a device handler layer 500. The SCM layer 310 maintains responsibility for non-real time related applications, such as report management and configuration. The SCM layer 310 generates and collects various types of report data, system configuration information and system maintenance procedures. The SCM layer 310 may be logically and physically separated from the rest of the aircore software architecture 300.

The call processing control module of the real time application layer 400 handles the application layer tasks that are real-time related. At the real time application layer 400 of software, direct knowledge of specific protocols is not required. Instead, this layer handles functions from a generic standpoint. For example, a call processing state machine processes mobile originated call set up in the same manner regardless of the type of interface used to connect to the base station equipment. The event set and state machine commonality allow lower layers of software to change without effecting the call processing control module of the real time application layer 400.

The device handler layer 500 is the lowest layer of software in the aircore software architecture 300. The device handler layer 500 contains the specific software applications to receive and transmit protocol specific messages.

The SCM layer 310 includes a control panel (CTL) 312, which is the father process of all the other processes in the system. The CTL 312 is responsible for startup and auditing of the overall aircore software architecture 300. Once started, the CTL 312 is only involved in limited auditing functions.

A call record management (SCR) 314 tracks the call report data generated in the system. These records can be used for billing tracking, system tendencies, or prepaid type of access. Call records are archived and the files rotated periodically. For example, the files may be rotated hourly. Real-time output is accessible via standard output options such as a printer or a screen output. Archived output is accessible on screen, or may be accessed over a standard TCP/IP network or dial up.

An operational measurements manager (OMM) 316 is responsible for tracking system counters. A count is defined as the occurrence of a particular situation. Each time the situation occurs, the counter is incremented. Operational measurements are archived and the files rotated periodically. For example, the files may be rotated hourly. Each time a new file is created, each of the counters is reset to zero. This type of data is captured to allow an operator to track system performance and tendencies over time. Operational measurements are archived into files rotated periodically. Real-time output is accessible using standard output options such as a printer or a screen output. Archived output is accessible on-screen or can be accessed over a standard TCP/IP network or dial up.

A real-time log report manager (RTL) 318 tracks system level reports. System level reports are generated to notify an operator of certain tasks or situations occurring on the aircore platform 200. For example, at the top of the hour, the system level audit log reports may be output. Log reports range from reporting normal system maintenance events to system status changes. Log reports are archived into files rotated periodically. Real-time output is accessible using standard output options such as a printer or a screen output. Archived output is accessible on screen or can be accessed over a standard TCP/IP network or dial up.

An auto removal process (AUTO) 322 is responsible for automatic removal of outdated archived report files. Automatic removal may occur on a periodic basis, such as monthly.

A network management database administration (NMS) 324 allows access to databases that provide configuration information for routing, rating and language for mobile devices. A system configuration (SYSCFG) 326 allows access to the configuration of system telephony hardware resources. A system maintenance (SYSMTC) 328 allows access to operator-initiated maintenance procedures.

A visitor location register interface VLI 332 provides the operator access to a visitor location register. A home location register interface (HLI) 334 provides an operator interface to the home location register and authentication center information. An equipment identity register interface (EI) 336 provides an operator interface to the equipment identity register. The VLI 332, HLI 334 and EII 336 may be implemented as a graphical user interface(s) (GUI) or as batch type operations. These interfaces will be described in more detail later.

The call processing control module (CPCM) of the real time application layer 400 includes a recovery and startup (REC) 402, which is the father process of the software subsystems in the real time application layer 400 and at the device handler layer 500. The REC 402 manages the maintenance states for the trunk and signaling facilities in the real time application layer 400. The REC 402 interfaces with each of the device handlers in the device handler layer 500 for maintenance and status as well as with graphical user interface-based applications in the SCM layer 310 to process operator initiated maintenance requests. The REC 402 also initiates an audit of all real time application layer 400 subsystems. The audit may run every two minutes, for example, and provides assurance that all subsystems are running properly.

A fault analysis unit (FAU) 404 is responsible for the collection of all log reports and operational measurement related data created within the CPCM 400. The FAU 404 to real-time layer interface is a singular path for this information to pass. All CPCM 400 subsystems have access to pass events to the FAU 404 for this purpose.

The timer manager (TIM) 406 provides timing facilities to call processing control module subsystems in the aircore platform 200. The TIM 406 is used for application level timers that operate on a one second or greater granularity. Timers are stored in a list and are tracked until they are released or until they expire. Timers requiring finer granularity or those that are specific to a particular subsystem's requirements are controlled locally either in the subsystem or on board in the hardware. The timers associated with the aircore platform 200 will be described later in more detail.

A resource manager (RCM) 408 is used to manage base station resources connected to the aircore platform 200. The RCM 408 has the capability to configure, download, and track the state of individual cell site components as well as the base station as a whole.

A CPCM call record management (CCR) 412 module provides for local collection of call detail record (CDR) information for calls in progress. When calls are completed, the CDR information is transferred from the CCR 412 to the SCR 314 in the SCM 310, where the call record data is processed and stored.

A call processing manager (CPM) 414 provides the processing required for all communication channel establishment, tear down, feature processing and hand off control. The state machines in place in the CPM 414 are based on a half-call model. Each party in a session moves through a defined set of states based on received and sent events, and timers used. Each side of a call steps through its own state. The two sides of the call progress together. For a basic call setup, the state of one side of the call is never more than one step ahead or behind the state of the other side. In the CPM 414, each call placed requires the creation of a session object. This object is created based on an index number created from the board span and channel used by the originator of the call. The session adds and removes call objects as dictated by the progress of the call. The reference number for the session is always based on the originator's board span and channel. However, the session may also be indexed via the index number of the board, span and channel of any of the involved parties.

A hand off processor (HOP) 416 is responsible for the preprocessing required for hand off or hand over (GSM). Based on the technology and the involvement of intersystem border cells, the level of involvement of the HOP 416 varies from one air interface protocol to the next. However, like other modules performing specific functions, the unique aspects of the protocol are handled internally in the HOP 416. The interface to the CPM 414 for hand off processing is made generic. Preprocessing in relation to handoff processing refers to the collection of data and the decision process used to determine the appropriate base station to target for the hand off. This entire process has been formed into a generic procedure within the aircore software architecture 300.

A tone and announcement manager (TAM) 418 is responsible for management of the digital signal processor resources in the system used for playing tones and announcements. The TAM 418 interacts directly with the CPM 414 to provide the necessary digital signal processor allocations. The digital signal processors are controlled by components of the device handler 500. Direct communication to the device handler from the CPM 414 is avoided so that the CPM 414 does not have to maintain direct knowledge of the current digital signal processor configuration and allocations.

A visitor location register (VLR) 422 is responsible for establishing and maintaining a VLR database for the aircore platform 200. As shown in FIG. 10, the VLR 422 is co-located with the aircore platform 200. However, the VLR 422 could be located remotely from the aircore platform 200. The VLR 422 is a collection of customer profiles for users currently active on the system. The VLR 422 is a dynamic database created and maintained while the aircore platform 200 is running. The VLR 422 communicates with threads inside an Advanced Intelligent Message Handler (AIM) 430, which will be described later, for real-time application messaging. Any communications to or from the VLR 422 from the CPCM 400 are received via the AIM 430. Communications with the VLI 332 are limited to those necessary to allow for the display of individual customer profile information, listing the current profiles in the VLR 422 and allowing an operator the ability to update customer profiles from the VLR database.

A home location register/authentication center (HLR) 424 is responsible for establishing and maintaining the HLR database for the aircore platform 200. As shown in FIG. 10, the HLR 424 is co-located with the aircore platform 200. However, the HLR 424 could also be located remotely from the aircore platform 200. In addition, the functions of the HLR 424 could be carried out in separate BLR and AC modules. The HLR 424 includes a collection of permanent customer profiles for users homed on the system. The HLR 424 is a static database that tracks the current location of a customer in addition to the individual profile parameters and status of customer-related features. The HLR 424 communicates with the AIM 430 for real-time application messaging. Any communications to or from the HLR 424 in the CPCM 400 are received via the AIM 430. Communications with the HLI 334 are limited to those necessary to allow for the manipulation of individual customer profiles, listing the current customer profiles in the HLR 424, and allowing an operator to update the customer profiles.

The HLR 424 also contains the functionality to perform the advanced security calculations used in digital air interface protocols. These calculations are based on a piece of secret data combined with a random number to yield a result that only has meaning to the authentication center and the mobile unit. This functionality is included in the HLR database and is integrated as part of the customer profile. The actual comparison of data is done in the AIM 430 or in the HLR 424 itself, depending on the protocol. Since the authentication center is integrated in the HLR 424, communications with the authentication center all funnel through the HLR 424. The authentication process will be explained in more detail later.

An equipment identity register (EIR) 426 is responsible for establishing and maintaining an EIR database for the aircore platform 200. The EIR database is a collection of the serial number information for mobile telephone handsets and other equipment in the system. The EIR 426 normally maintains at least three lists:

White—range listing of valid international mobile equipment identities (International Mobile Equipment Identity (IMEI)) (serial numbers).

Gray—list of individual serial numbers of questionable phones. Usage is operator dependent.

Black—list of individual serial numbers of equipment prohibited from using the system.

The EIR 426 is used with GSM-type systems. However, application to other system protocols may also be accomplished. The EIR 426 communicates with the AIM 430 for real-time application messaging. Any communications to or in the EIR 426 from the CPCM 400 are received via the AIM 430. Communications between the EIR 426 and the EII 336 are limited to those necessary to allow for the manipulation of list information. This includes allowing an operator to add, modify and delete from the information the EIR database.

The device handler 500 includes a portion of the AIM 430. The device handler 500 includes a device handler for digital CAS interface (DHD) 501, a device handler for voice input and output devices (DHA) 502, a device handler for ISDN interfaces (DHI) 503, a device handler for conference (DHC) 504, and a device handler for timers (DHT) 505. The AIM 430 also includes a device handler for SS-7(DH-7) 510.

Figure 11:
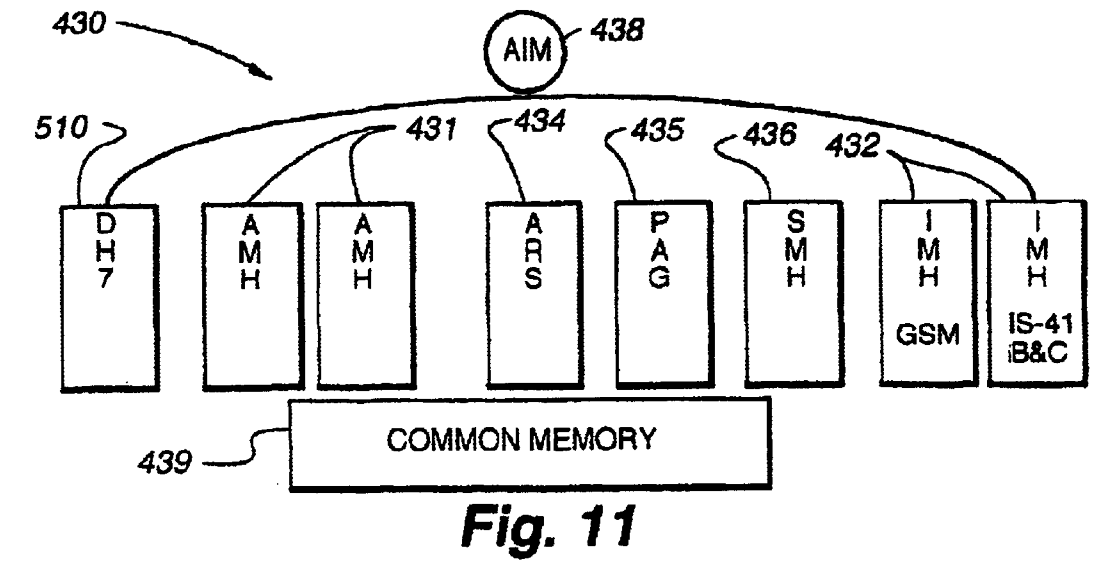
FIG. 11 is a block diagram of the advanced intelligent message handler architecture.

FIG. 11 is a logical diagram of the advanced intelligent message handler (AIM) 430. The AIM 430 provides for advanced protocol processing, message routing and system interfaces for the wireless network. The AIM 430 is built around the steps required to establish call processing, mobility, and servicing in a wireless environment. The basic approach of the AIM 430 is to use a multi-thread system to isolate protocols and functions required for the mobility environment. Each different protocol family supported by the aircore platform 200 is handled by a thread specifically constructed for the message sent and state machine for that protocol.

Communications to various software entities such as the VLR, HLR, and EIR funnel through the AIM 430 subsystem. This approach is taken to remove the knowledge of the low layer message destination from each of those entities. This approach also allows for the isolation of protocol specifics to the AIM 430 layer of software. Finally, this approach allows for the seamless separation of these functions to physically separate entities without effecting the application software. The following is an example of the benefit of this approach: When the CPM 414 needs to request the current location of a subscriber from the HLR 424, the message is sent to the AIM 430 subsystem without the direct knowledge of the HLR location or the protocol used to communicate with the HLR 424. The AIM 430 handles the routing (either internal or external) and the selection and construction of the appropriate message based on the protocol.

In FIG. 11, a main AIM thread 438 is shown along with subordinate threads 431–436. In addition, a common memory 439 is used to share data related to a transaction or connection between the subordinate threads 431–436 and the device handler for SS-7(DH-7) 510. Since each of the procedures followed for call establishment, location updating, etc., involve multiple threads and actions, the common memory 439 optimizes the performance of the AIM 430 by reducing the copying of data between threads while at the same time allowing data sharing across all of the threads by simply passing a pointer.

The A-interface message handler (AMH) 431 provides message decoding and encoding for interface processing between an external base station and the aircore platform 200 event structures and state machines.

Figure 12:
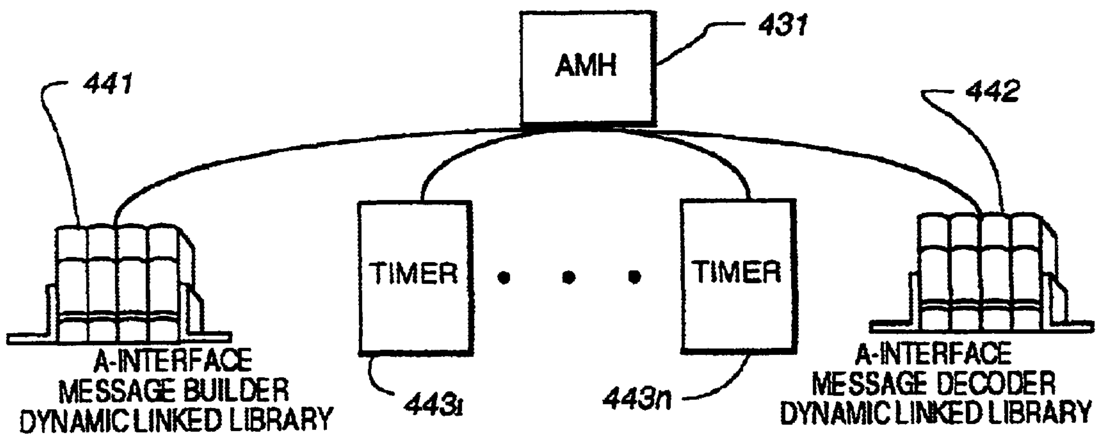
FIG. 12 is a block diagram of the A-interface message handler.

FIG. 12 is a block diagram of the logical architecture of the A-interface message handler AMH 431. Communications received from a base station interface are first interpreted by the AMH 431. The encoding and decoding specification for a particular protocol are contained in dynamic linked libraries 441 and 442 that are linked to the AMH 431. Each variant of the A-interface has its own unique set of builder/decoder dynamic linked libraries. Each type of A-interface utilizes its own instance of the AMH 431. Also shown in FIG. 12 are timers $\mathbf{443}_i$ through $\mathbf{443}_n$. The timers $\mathbf{443}_i$–$\mathbf{443}_n$, which control operations of state machine call processing for a given connection, will be described in more detail later.

Figure 13:
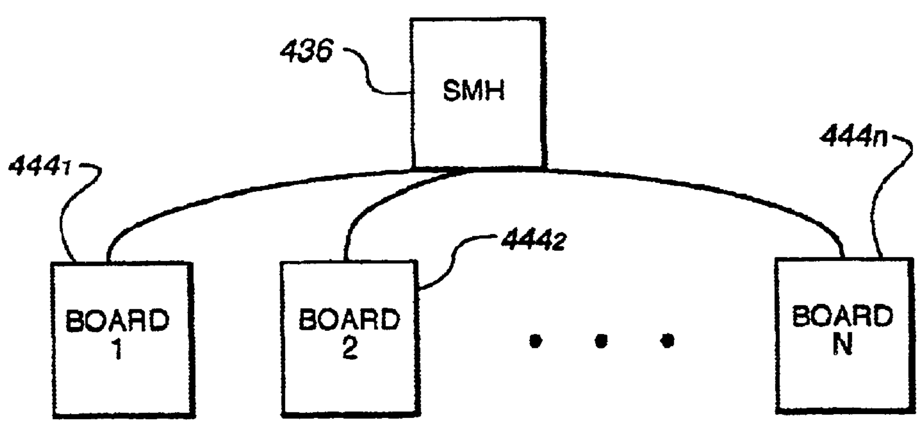
FIG. 13 is a block diagram of the ISDN user part message handler.

FIG. 13 is a logical block diagram of the ISUP message handler (SMH) 436 logical architecture. The SMH 436 provides appropriate message conversion between the application programming interface and the internal aircore subsystem event structures. As shown in FIG. 13, the SMH 436 is logically linked to the board levels at boards $\mathbf{444}_1$–$\mathbf{444}_a$.

Figure 14:
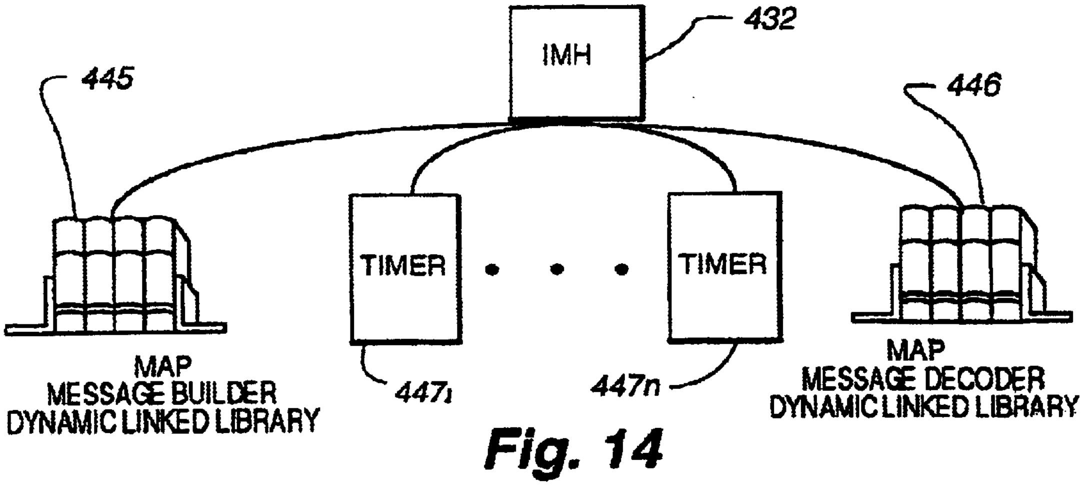
FIG. 14 is a block diagram of a intersystem message handler.

FIG. 14 is a logical block diagram of the intersystem message handler (MMR) 432 architecture. The IMH 432 encodes and decodes protocol messages related to a mobile unit from an external communications system. These messages are called Mobile Application Part. The encoding and decoding specifications for a particular protocol are contained in the dynamic linked libraries 445 and 446 that are linked to the IMH 432. Each variant of the MAP interface has its own unique set of builder/decoder dynamic linked libraries. Each type of MAP interface utilizes its own instance of the IMH thread 432. Also shown linked to the IMH thread are timers $\mathbf{447}_1$–$\mathbf{447}_n$. The function of the timers 447 will be described in more detail later.

An authentication and registration processing (ARS) thread 434 (see FIG. 11) provides appropriate calculations, comparisons and invocations of the required authentication for a given base station interface. A paging processing (PAG) thread 435 (see FIG. 11) provides the processing necessary for paging in the AirCore system. Paging is the mechanism for locating and starting the process of notifying a mobile unit of an incoming call or message.

Figure 15:
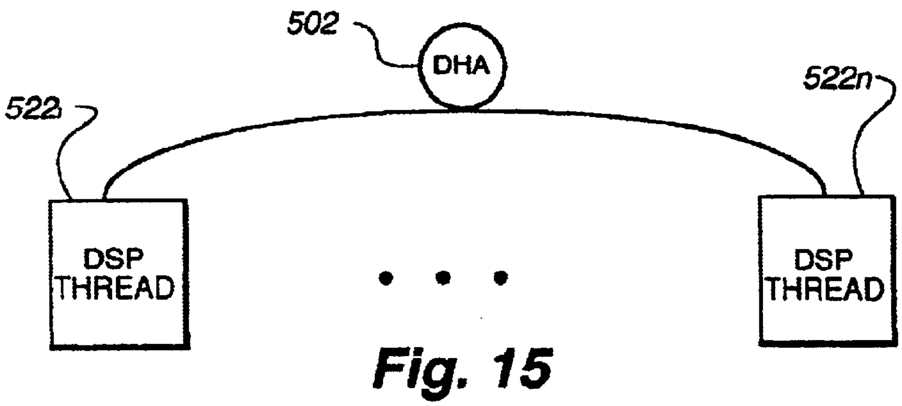
FIG. 15 is a block diagram of a device handler for voice input-output devices.

FIG. 15 is a logical block diagram of the device handler for voice I/O devices (DHA) 502. The DHA 502 provides control of voice I/O resources in the aircore platform 200 that are used for playing tones and announcements. The DHA 502 is a single process that spawns individual threads for each digital signal processor that is accessible. As shown in FIG. 15, the DHA 502 spawns digital signal processor threads $\mathbf{522}_1$ through $\mathbf{522}_n$. The aircore platform 200 uses the first five digital signal processors in the system to play standard tones. These tones are accessible to all ports on the system. This approach satisfies the requirements of playing ring-back or busy tones to all ports simultaneously. After the first five digital signal processors, the remaining digital signal processors are allocated to a pool that may be used in real-time call processing to play tones or announcements for call progressing. The five digital signal processors are used for the standard tones of ring back, busy, fast busy, dial tone and confirmation beep. To play announcements for call progressing, the DHA 502 works with the tone and announcement manager (TAM) 418 (not shown, see FIG. 10), which receives its commands from the CPM 414.

Figure 16:
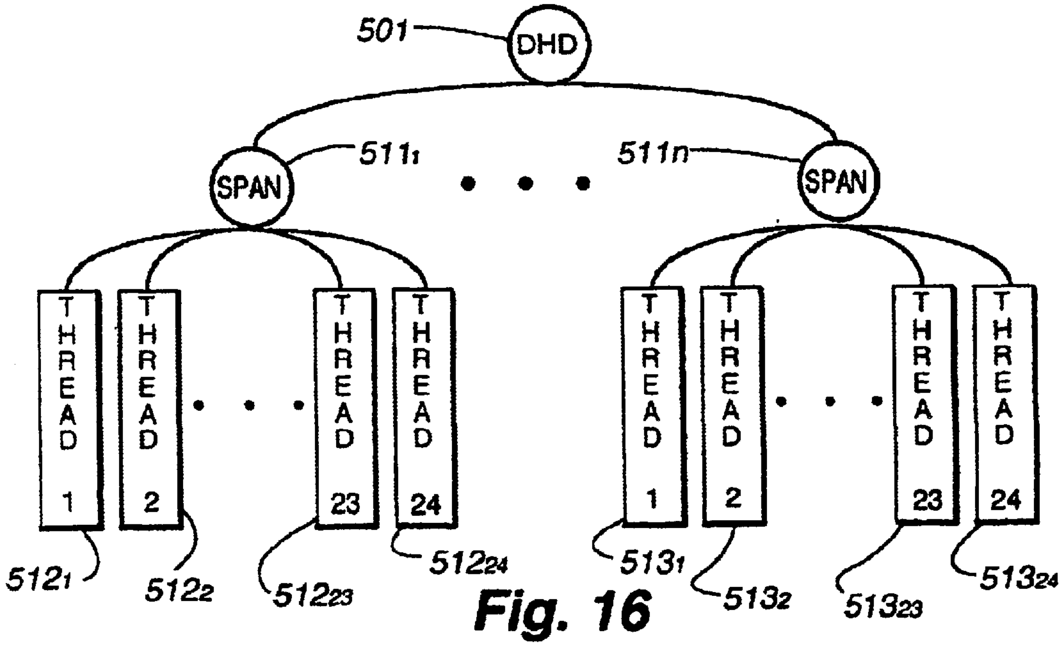
FIG. 16 is a block diagram of a device handler for digital interfaces.

FIG. 16 shows the device handler for digital channel associated signaling (CAS) interface (DHD) 501 in more detail. Channel associated signaling is a method of signaling in telecommunications where a portion of each channel between two entities is allocated for the carriage of the signaling and supervision in formations. The DHD 501 is a multi-thread, multi-process subsystem that provides for CAS processing.

Each channel in the DHD 501 is allocated a thread for processing the low layer protocol state machine. As shown in FIG. 16, spans 511$_1$–511$_n$ are associated with processing threads 512$_1$–512$_{24/32}$ and 513$_1$–513$_{24/32}$. The top layer process in the DHD 501 architecture is responsible for the interworking between the thread output in the real time application layer 400.

Figure 17:
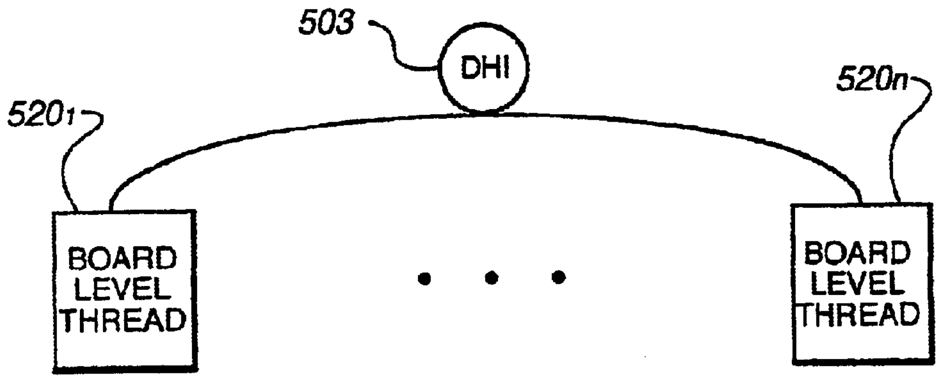
FIG. 17 is a block diagram of a device handler for ISDN interfaces.

FIG. 17 shows the device handler for ISDN interfaces (DHI) 503. The DHI 503 is a multi-threaded, single process subsystem that provides processing for common channel signaling interfaces. The DHI 503 is used internally in the aircore platform 200 to handle facilities (T-1or E-1) that use common channel signaling methods. Common channel signaling provides a single signaling channel for the control of signaling and supervision information for many channels of resources (e.g., a single channel is used to pass the appropriate signaling for all of the associated traffic channels). Typically the signaling channel is based on an industry signaling method such as SS-7, LAPD, or TCP/IP. In the DHI 503, a top layer process is responsible for communications to the internal aircore platform 200 subsystems. Linked to the DM 503 are board level threads 520$_1$–520$_n$. The board level threads 520$_1$–520$_n$ are used to handle individual boards in the aircore platform 200.

Figure 18:
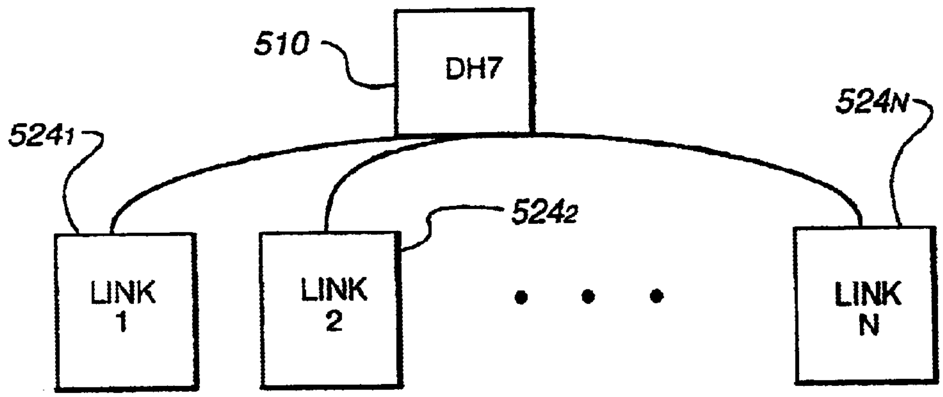
FIG. 18 is a block diagram of a device handler for signaling system 7 communication.

FIG. 18 is a logical block diagram of a device handler for SS-7(DH-7) 510. The DH-7 510 exists for the purpose of handling the board level API for the SS-7links in the system. The main tasks of the DH-7 510 are the basic assignment of threads to the SS-7links and assuring proper message routing for inbound messages to the internal aircore subsystems and threads. Each SS-7 link established in the system has its own link level thread that exists as a subordinate thread to the main DH-7 510 thread.

Figure 19:
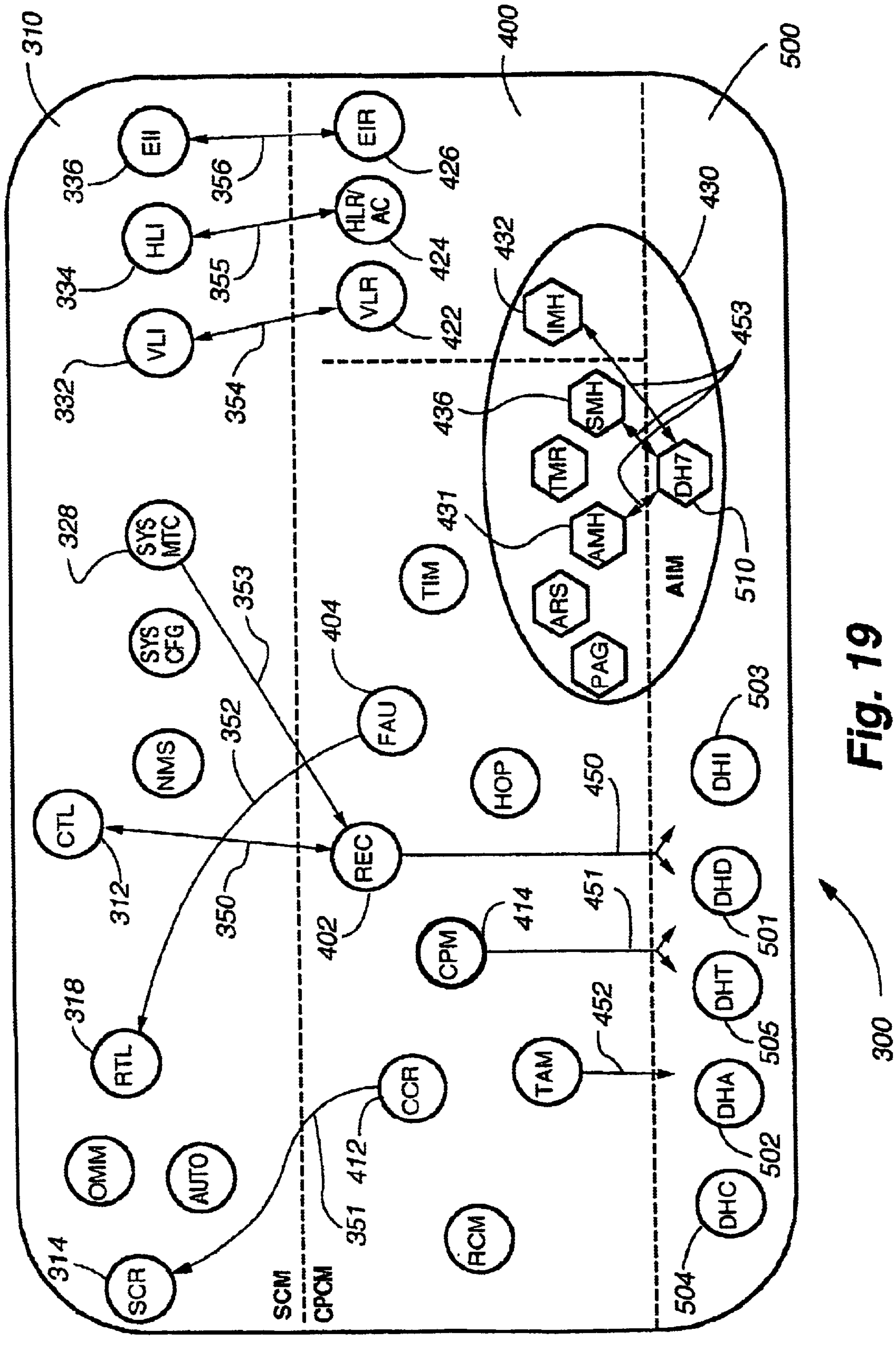
FIG. 19 is a block diagram showing software interlayer communications.

FIG. 19 is a logical block diagram showing interlayer communications among the SCM layer 310, the real time application layer 400 and the device handler layer 500. In FIG. 19, a two-way communications path 350 between the CTL 312 and the REC 402 is used to start the real time application layer 400 and report the appropriate status information. One-way path 351 is used to transfer CDRs from the real time application layer 400 to the SCM layer 310. One-way path 352 between the FAU 404 and the RTL 318 is used to transfer report and operational measurement pegs from the real time application layer 400 to the SCM layer 310. One-way path 353 between the SYSMTC 328 and the REC 402 is used to pass maintenance related commands to the real time application layer 400 from the SCM layer 310. Two-way path 354 from the VLI 332 to the VLR 422 is used to exchange information between the VLR 422 and the VLR graphical user interface 332. Two-way path 355 between the HLI 334 and the ITR 424 is used to exchange information between the HLR 424 and the HLR graphical user interface 334. Two-way path 356 between the EII 336 and the EIR 426 is used to exchange information between the EIR 426 and the EIR graphical user interface 336.

Path 450 between the REC 402 and subsystem at the device handler layer 500 is defined for startup, status and maintenance communications used to interact with the telephony board level hardware. The REC 402 communicates directly with all device handler level subsystems with the exception of the DH-7 510, which is handled via communications with the AIM 430. Two-way path 451 between the CPM 414 and the device handler layer 500 is established for the exchange of messages for call processing related activities in the aircore platform 200. The CPM 410 communicates directly with all device handler 500 level subsystems with the exception of the DHA 502 and the DH-7 510. Communications path 452 between the TAM 418 and the DHA 502 provides for the allocation and deallocation of voice I/O resources for tones and announcements. Much like trunk groups that abstract the physical location of trunks, this level of communication abstracts the physical location of the digital signal processors used for playing the tones and announcements. Communications path 453 between the AMH 431, SMH 436, IMH 432 and the DH-7 510 provides for communications between the SS-7links and the builder/decoder threads in the AIM 430.

Figure 20:
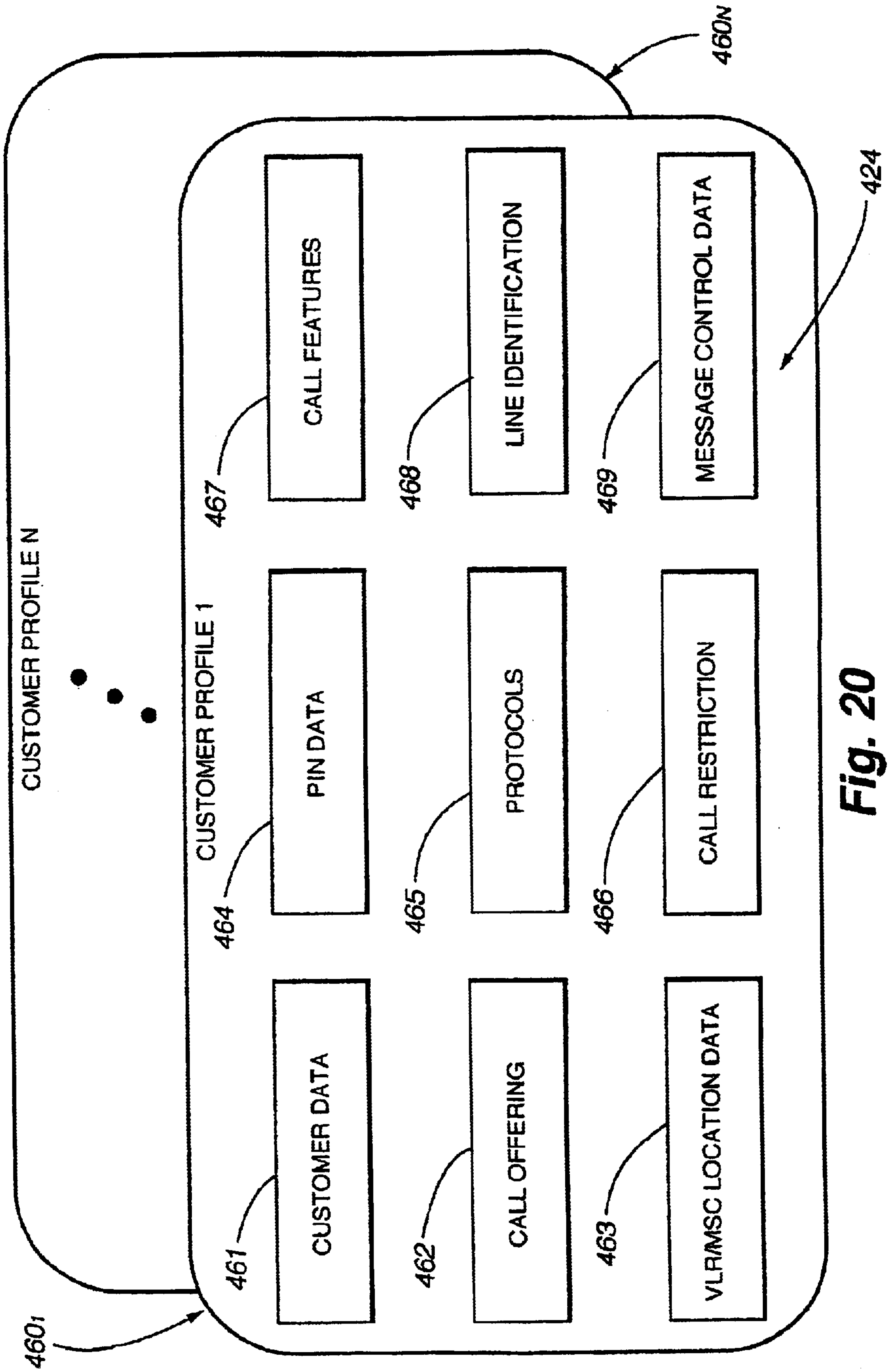
FIG. 20 is a logical representation of the home location register.

FIG. 20 is a logical representation of the HLR 424. The HLR 424 contains permanent data that is independent of the customer's present location, plus temporary data such as the current location of the system where the mobile unit is registered and the addresses of service centers that have stored short messages for mobile stations. An example of such a message is a request to turn on a voice message waiting lamp indicating that a voice message has been stored for the mobile station user in a voice messaging system. These addresses are erased after the short messages have been delivered.

As shown in FIG. 20, the HLR 424 includes customer profiles 460, for each mobile customer. The customer profile 460, includes a customer data module 461. The customer data module 461 includes a customer group identification, which is a four digit number specifying the routing translations index for the customer. The number must be previously configured in a routing translations data base via a routing administration window. The customer data module 461 also includes the International Mobile Customer Identity (IMSI), the International Mobile Equipment Identity (IMEI) or Electronic Serial Number (ESN), which is the serial number of the handset hardware, and the $K_i$, or A-key which is the key used for authentication calculations. The customer data module 461 also includes the name of the customer, the language for customer announcements, a three to five digit carrier ID identifier for long distance carrier code associated with the customer, a check box for calling card features and a prepaid feature. A call offering module 462 includes an indication of current features such as call forwarding unconditional (CFU), call forward busy (CFB), call forwarding no reply (CFNRy), and call forwarding not reachable (CFNRc), and call forwarding default (CFD).

A VLR/MSC data module 463 indicates the VLR in and the MSC associated with the current area of operation of the customer. A personal identification number (PIN) data module 464 indicates if the customer uses a PIN when accessing the system for calling card or long distance calls and the four digit PIN number associated with the customer. A protocols module 465 is used for multi-mode customers to determine the capabilities of the customers' units. The protocols may include, but are not limited to, TDMA, CDMA, GSM and AMPS. A call restriction module 466 stores features for restricting the calling capabilities of the customer to and from the network. The call restriction features include baring of all outgoing calls, suspended service (no calls allowed), baring of all outgoing international calls, baring of all incoming calls, baring of all outgoing international calls except those to the home PLMN country and baring incoming calls to a customer when they are roaming to another system.

A call features module 467 indicates the set of features allocated to a customer. The call features include call hold, multi-party calling, 3-way calling, roaming, call waiting and access to sending and receiving short messages. A line identification module 468 identifies features that provide/restrict calling and called number information to various parties in a call. The line identification features include calling line ID presentation, calling number presentation, connected line ID presentation, calling line ID restriction, calling number restriction, and connected ID restriction.

A message center data module 469 provides for storage of short messages pending delivery to a customer's mobile unit.

The HLR 424 may also include an authentication center. The authentication center provides authentication and encryption parameters to insure that a mobile customer cannot falsely assume the identity of another mobile customer. The authentication center also provides data for encrypting the voice or data and control signals transmitted via the air between the mobile station and the serving base station subsystem. A GSM reference model prescribes digital communications over the radio channels. Since it is possible to surreptitiously listen to these channels, encryption becomes desirable for the link between the mobile station and the radio receiver at a base station serving that mobile station. Any public or proprietary encryption algorithm known in the art can be used with the aircore platform 200.

The calculations for the authentication center use the secret key information associated with the subscriber and the protocol specific calculations. The HLR 424 pre-processes these authentication calculations and stores them as part of the subscriber profile. As required, this information is shared with the servicing MSC/VLR to authenticate the mobile unit as it accesses the system.

The VLR 422 contains current data for each active mobile customer, including that customer's mobile station present or most recently known location area, the mobile unit's on/off status, and security parameters. The VLR 422 is logically constructed in the same manner as the HLR 424.

Figure 21:
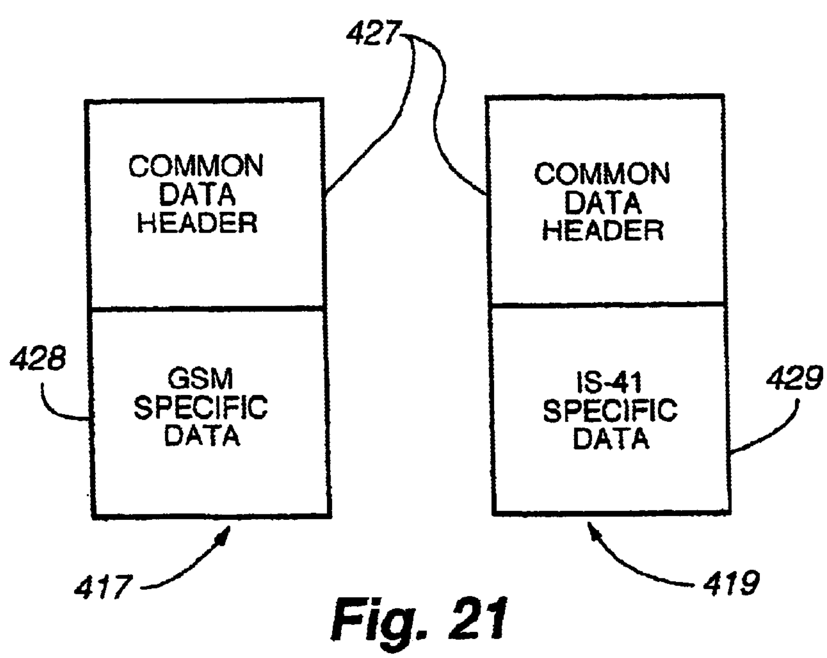
FIG. 21 illustrates the HLR/VLR database structures.

The HLR and VLR databases both simultaneously accommodate customer profiles from any interface protocol. There are two significant classifications of profile types, based on the intersystem protocol used to transmit and receive profile information over the wireless network. Both GSM and IS-41 based networks share common information in the customer profile structures, but each profile type also requires fields and information that are unique to that particular protocol type. The HLR and VLR databases provide for this by an internal structure that uses a common top level header for the common data and then protocol specific attachments. This internal structure is shown in FIG. 21. A GSM side 417 and an IS-41 side 419 are used with the VLR and HLR databases. A common data header 427 is used for both GSM and IS-41 profile information. A GSM specific data area 428 is used for GSM specific data. An IS-41 specific data area 429 is used for IS-41 specific data. The common data header 427 allows the two sides of the database to use common search routines while the specific data areas allows for the storage of data that pertains to a specific protocol alone.

A description of the timers used by the MSC 210 will now be provided. A call proceeds from initiation to connection through a series of steps. The time associated with this call set up and connection is usually short. Nonetheless, one or more voice channels may be reserved at the start of the call set up. If the call will not connect, some mechanism is desirable to release these resources as quickly as possible so that they may be used by other customers. Furthermore, during the time that the mobile unit is held waiting for an incoming call, the mobile unit cannot call out or receive other incoming calls. To free up resources and to release the mobile unit, the TMR 437, in conjunction with the TIM 406 (see FIG. 10) includes a number of timers that may be established at various points in the call set up and connect process. The timers are generally set based on a message from the AMH 431 or similar interface.

A timer may be set when a device handler such as the device handler 510 requests a BSC 105 to assign a channel. In this case, the AMH 431 sends a message to the TMR 437 to set the timer. If an assignment is not completed within the time limit of the timer, the call connection process ends. If the assignment is completed before expiration of the timer, the AMH 431 sends a message to the TMR 437 to release the timer.

A timer may be associated with a connect message sent to the BSC 105 by a device handler. If a connect acknowledgment message is received by the device handler, the AMH 431 will send a timer release message, allowing the call connection to complete. Similarly, a timer may be set to time out a make call command, a paging message for a mobile terminated call, a disconnect message (GSM) or release message IS-634) for PSTN and mobile originated calls, and a clear command to release a channel during a call disconnect sequence. Other timers may be used to ensure resources are returned for assignment to other calls.

Figure 22:
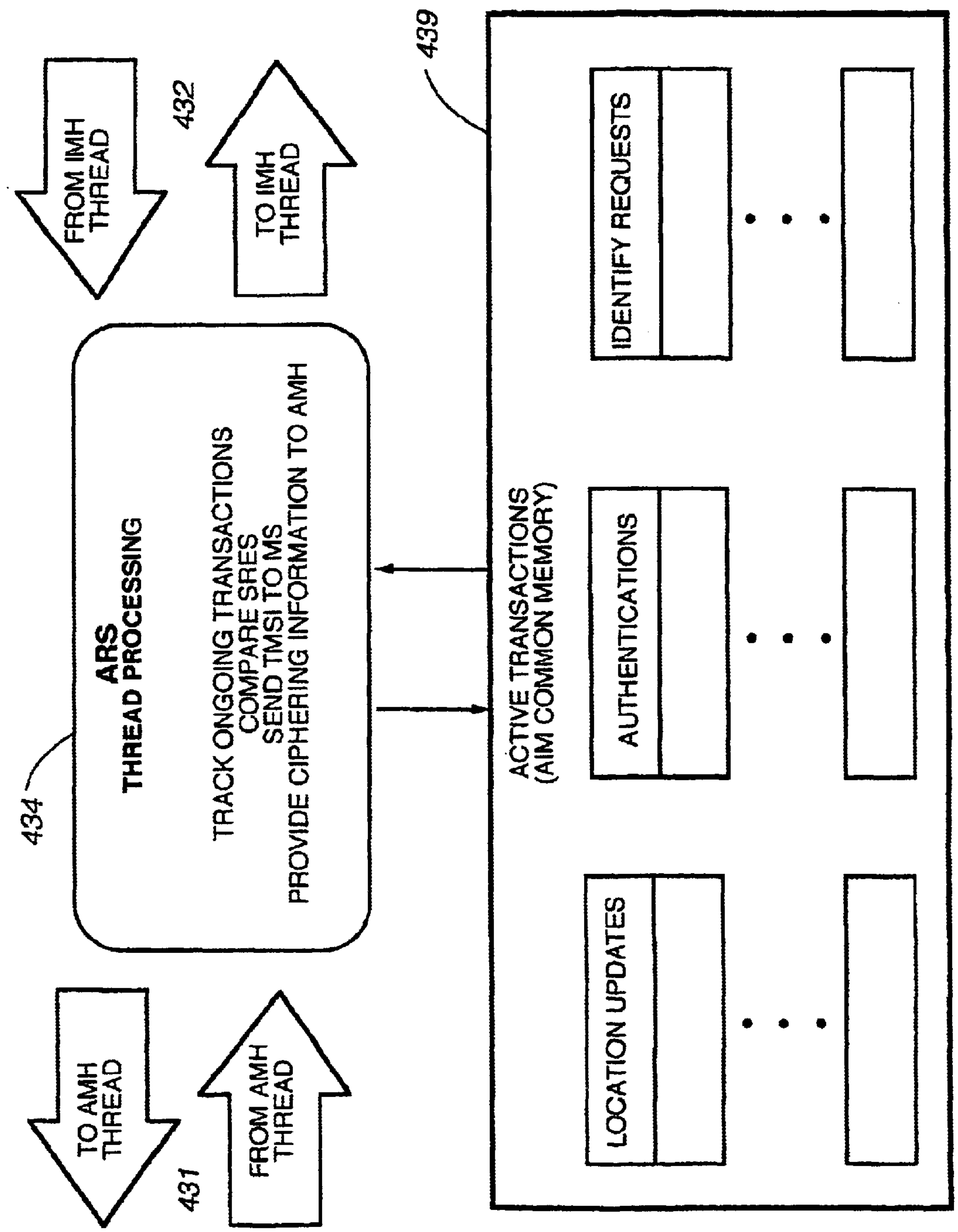
FIG. 22 is a block diagram illustrating the location management feature of the visitor location register.

Managing the location of a customer ensures the proper connection of the customer's mobile unit for both mobile initiated calls and mobile terminated calls. In FIG. 22, the authentication and registration (ARS) 434 thread is shown in communication with the common memory 439. The common memory 439 includes the data relevant to the mobile unit and the state machine relevant to the protocol and the transaction being performed. The ARS 434 maintains communications with the AMH 431 and the IMH 432 to track ongoing transactions, to compare SRES, to send TMSI to the mobile unit and to provide ciphering information to the AMH 431. The IMH 432 provides connections to the VLR 422 and HLR 424 for obtaining customer profile information.

Figure 23:
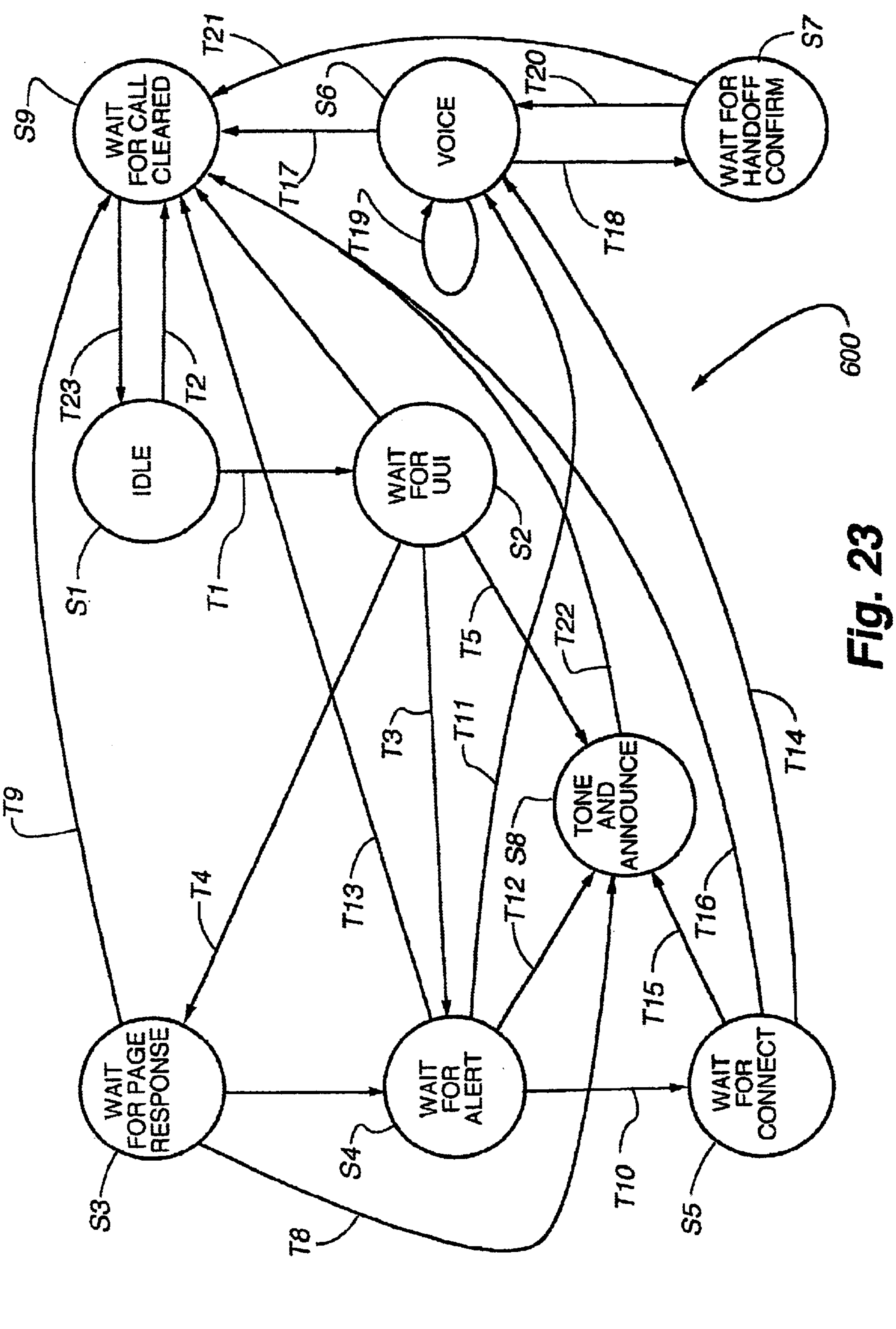
FIG. 23 is a state machine for mobile originated call processing.
Figure 24:
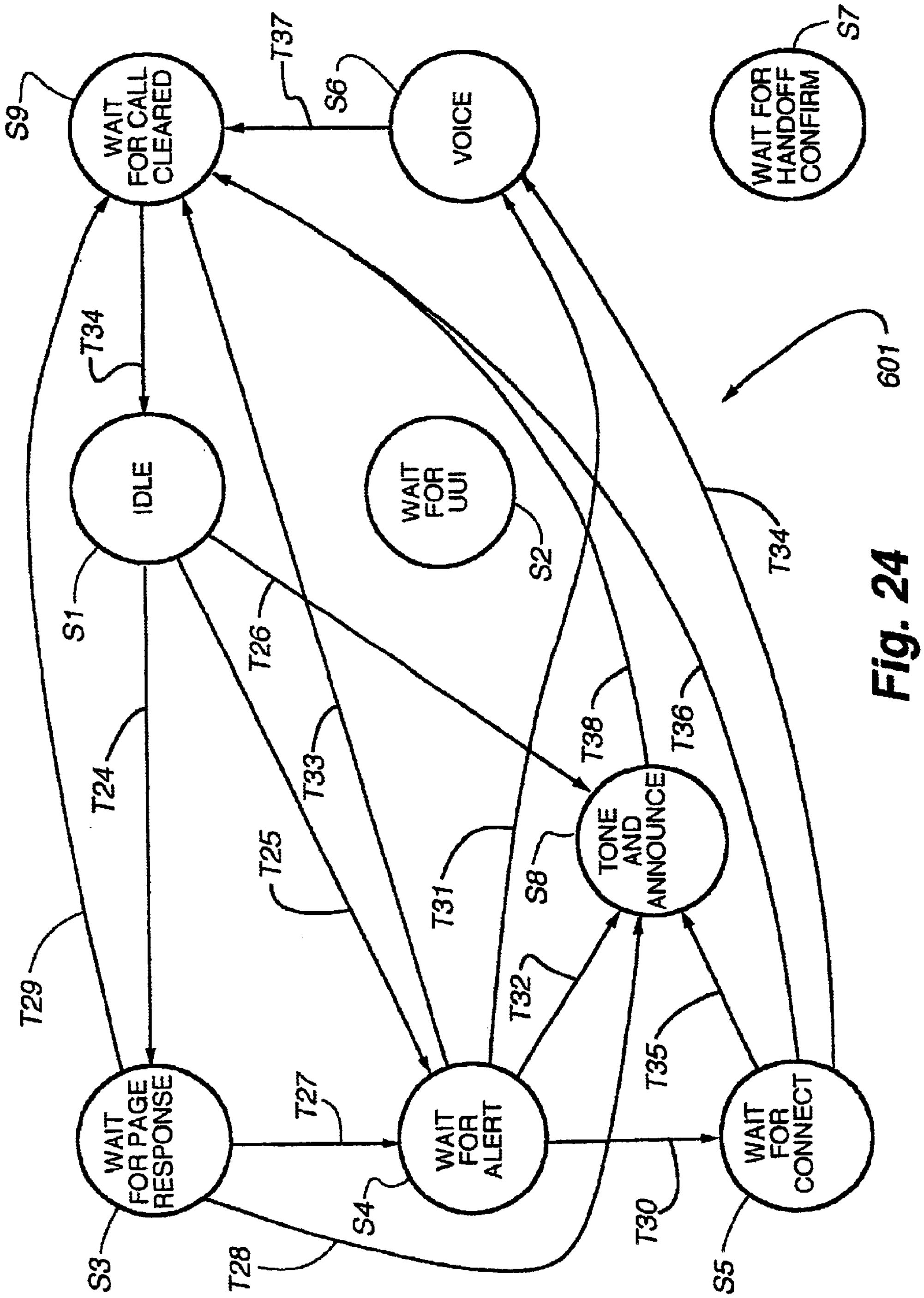
FIG. 24 is a state machine for PSTN originated call processing.
Figure 25:
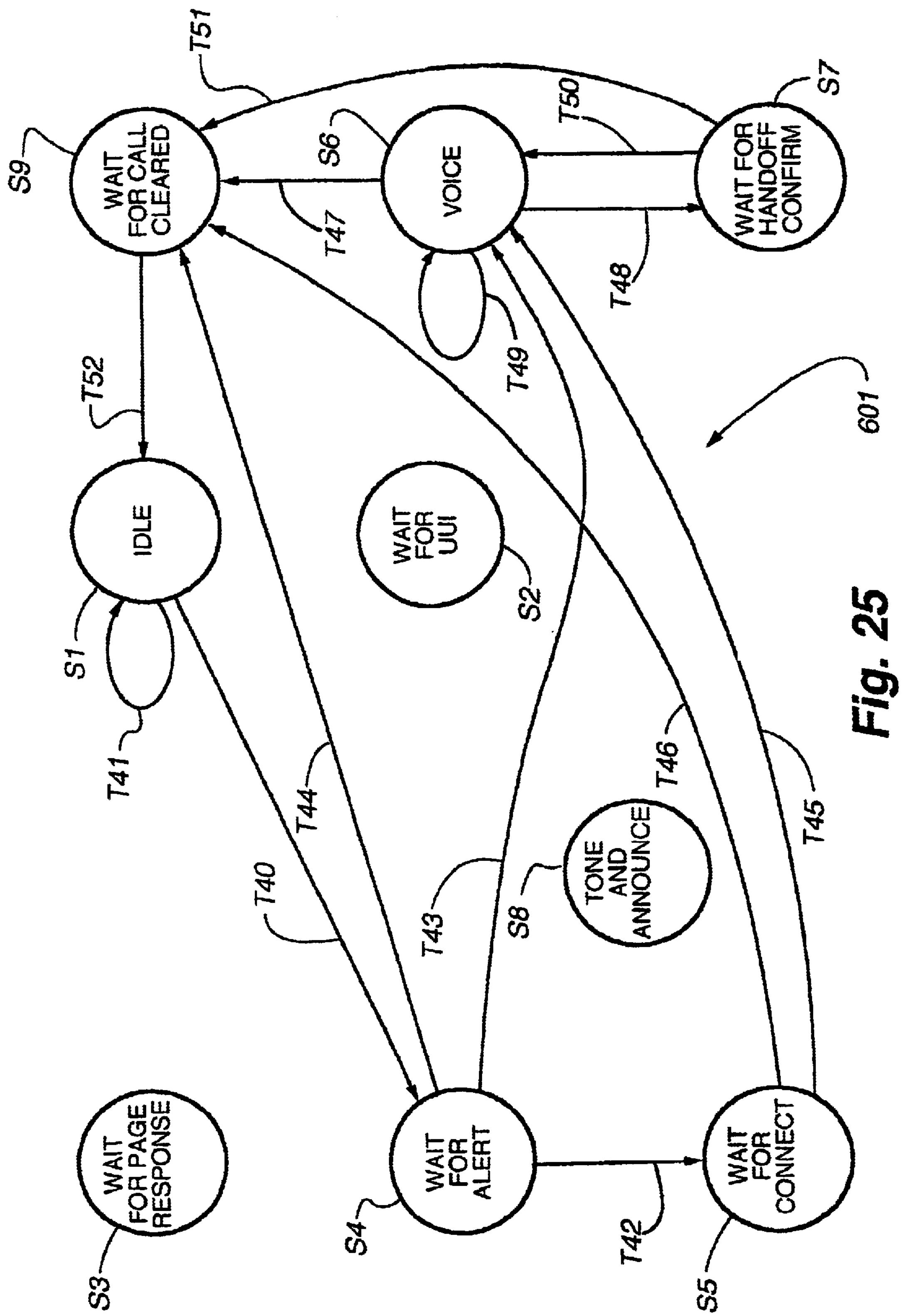
FIG. 25 is a state machine for mobile terminated call processing.

The call processing module (CPM) 414 processes calls according to one of several state machines. A state machine exists for each half of every call processed through the aircore platform 200. A separate state machine exists for mobile originated call processing, PSTN originated call processing and mobile terminated call processing, for example. FIGS. 23–25 are examples of state machines used in processing calls at the aircore platform 200. FIG. 23 is a state machine 600 for mobile originated call processing. In FIG. 23, eight states are possible: idle (S1), wait for UUI (S2), wait for page response (S3), wait for alert (S4), wait for connect (S5), voice (S6), wait for handoff confirm (S7), tone and announce (S8), and wait for call cleared (S9). The state machine 600 shows the allowed transitions between states. Starting in idle S1, the state machine 600 can transition to state wait for UUI S2 or wait for call cleared S9. The state machine 600 transitions to wait for UUI S2 based on reception of the mobile customer's profile when a CALL_RECEIVED message is received. The state machine 600 transitions from idle S1 to wait for call cleared S9 based on the mobile customer profile indicating a particular call restriction or if the call fails before routing. With the authentication previously set up with the A-interface protocol, this transition may not be possible.

In the wait for UUI state S2, the state machine 600 can transition to the wait for alert state S4. This transition is based on receiving the ROUTE_CALL message. The aircore platform 200 proceeds with making the call out to the called party if the call type is direct dial (DD) in the routing translations or when a call delivery to a mobile unit or another system is required. The CPM 414 then sends a MAKE_CALL message. Next, the state machine 600 can transition from the wait for UUI state S2 to the wait for page response S3 based on receiving a ROUTE_CALL message. A PAGE_MOBILE message is sent to the PAG 435. The transition to this state is based on a call type of MOB in the routing translations and finding that the called mobile unit is operating in the aircore system. The state machine 600 transitions from the wait for UUI state S2 to the tone and announce state S8 if the dialed number received from the originating mobile unit fails to translate properly or if there is a restriction on the called mobile unit. The originating mobile unit is then connected to a tone. This transition could also occur by the CPM 414 receiving a PAGE_RESPONSE message with a time out indication. Finally, the wait for UUI state S2 can transition to the wait for call cleared state S9 based on receiving a disconnect from the mobile unit. When the message CALL_DISCONNECTED is received at the CPM 414, a CLEAR_CALL message is sent.

The state machine 600 transitions from the wait for page response S3 to the wait for alert state S4 based on receiving a PAGE_RESPONSE message. A MAKE_CALL message is then sent and the CPM 414 proceeds with an ISDN state machine 600. The wait for page response state S3 transitions to the tone and announce state S8 along transition path T8 based on receiving a time out for a page response. The CPM 414 then provides a time out announcement or tone to the calling party. The state machine 600 transitions from the wait for page response state S3 to the wait for call cleared state S9 along transition path T9 based on receiving a disconnect from the originating mobile unit. A CALL_DISCONNECTED message is received at the CPM 414 and a CLEAR_CALL message is sent. The PAG thread 435 will time out and clear the page request data for the call.

The state machine 600 transitions from the wait for alert state S4 to the wait for connect state S5 along transition path T10 based on receiving an alerting indication from the called party. The alerting indication is passed to the mobile customer's side of the call. The CPM 414 receives the CALL_ALERTING message from the called party and sends an ALERT_CALL to the originating mobile unit. The transition from the wait for alert state S4 to the voice state S6 occurs along transition path T11 based on receiving a connect indication from the called party. The protocol allows a CONNECT message to be received without receiving alerting. The CPM 414 receives a CALL_CONNECTED message from the called party and sends a CONNECT_CALL message to the originating mobile unit. The transition from the wait for alert state S4 to the tone and announce state S8 is along transition path T12. This transition occurs for two possible reasons. First, the transition may be based on a time out waiting for the alerting indication. The called party is cleared from the call and the mobile customer is connected to an announcement or tone. The CPM 414 sends a CLEAR_CALL message to the called party. Second, the transition may be based on receiving a disconnect from the called party with "user busy." The originating mobile unit is sent an announcement and the called party is released from the call. The CPM 414 receives a CALL_DISCONNECTED message from the called party and sends a CLEAR_CALL message to the called party. Finally, the transition from the wait for alert state S4 to the wait for call cleared state S9 occurs along transition path T13 if the originating mobile customer disconnects from the call before the CPM 414 receives the alerting indication from the called party. Clearing both parties is initiated. The CALL_DISCONNECTED message is received from the originating mobile unit. The CPM 414 sends a CLEAR_CALL message to both parties.

The state machine 600 may transition from the wait for connect state S5 to the voice state S6 along transition path T14 based on receiving connect indication from the called party. The connect indication is passed to the mobile customer. The CPM 414 received a CALL_CONNECTED message from the called party and sends a CONNECT_CALL message to the originating mobile unit. Transition from the wait for connect state S5 to the tone and announce state S8 occurs when a time out occurs waiting for the connect. The called party is cleared from the call and the mobile customer is connected to a tone or announcement. The CPM 414 sends a CLEAR_CALL message to the called party. Transition from the wait for connect state S5 to the wait for call cleared state S9 occurs along transition path T16 if the originating mobile subscriber disconnects from the call before the CPM 414 receives the connect indication from the called party. Clearing both parties is initiated. The CPM 414 receives a CALL_DISCONNECT message from the originating mobile unit and sends a CLEAR_CALL message to both parties.

The state machine 600 transitions from the voice state S6 to the wait for called clear state S9 along transition path T17 based on receiving a disconnect indication from either party. Call clearing is initiated for both parties on the call. A CALL_DISCONNECTED message is received from one of the parties. The CPM 414 sends a CLEAR_CALL message to both parties. Transition from the voice state S6 to the wait for hand off confirm state S7 occurs along transition path T18 based on receiving a hand off request from the HOP 416 subsystem and having a B-channel to allocate to the target BTS for the hand off. The CPM 414 receives a HANDOFF request from the HOP 416 and sends a MAKE_CALL message with a hand off indicating to establish the target channel. Finally, the voice state S6 transitions back to the voice state S6 along transition path T19 based on receiving a hand off request and not having a B-channel available to the BTS.

The state machine 600 transitions from the wait for hand off confirm state S7 to the voice state S6 along transition path T20 based on three possible events. First, the CPM 414 receives a hand off confirmation from the serving BTS. This indicates the mobile unit has confirmed the hand off and is in transition to the target BTS. The voice connection is switched to the target BTS at this point. The CPM 414 receives a HAND_OFF_CONFIRM message and sends a CLEAR_CALL to the old serving channel. The voice path in connected to silence until the CALL_CONNECTED message is received on the target channel. Second, the CPM 414 receives a hand off confirmation with a negative indication (failed). This indicates that the mobile unit is not going to the target channel. The CPM 414 starts a disconnect sequence to release the target channel. The CPM 414 then sends a CLEAR_CALL message to the target channel. Third, the CPM 414 receives a failure on the channel setup with the target BTS. The transition to the voice state S6 occurs and the CPM 414 initiates or continues with the disconnect sequence with the target BTS channel. The CPM 414 sends a CLEAR_CALL message to the target channel. Transition from the wait for confirm state S7 to the wait for call cleared state S9 occurs along transition path T21 based on receiving a disconnect from either party while a target BTS channel is being established for the hand off. The CPM 414 initiates clearing all resources and transition. The CPM 414 receives a CALL_DISCONNECTED message and sends a CLEAR_CALL message to the parties.

The state machine 600 transitions from the tone and announce state S8 to the wait for call clear state S9 along transition path T22 based on the originating mobile unit disconnect indication being received from the CPM 414. This can occur as a result of a time out after the tone or an announcement is played and a disconnect is not received. In this case, the CPM 414 initiates the disconnect with the mobile customer. The CPM 414 initiates the disconnect with the mobile customer. The CPM 414 either receives a CALL__DISCONNECTED message and sends a CLEAR__CALL message or the CPM 414 receives a time out and sends a CLEAR__CALL message.

The state machine 600 transitions from the wait for call cleared state S9 to the idle state S1 along transition path T23 based on both parties confirming they are cleared from the call. In cases where there is no other party involved in the call, the confirmation of the clearing of the party is implied by the fact that the cell never existed. This transition takes place when the call is completely cleared. The CPM 414 receives a CALL__CLEARED message from the originating mobile unit.

FIG. 24 is a state machine 601 for PSTN originated call processing. In the state machine 601, the wait for UUI state S2 and the wait for handoff confirm state S7 are not allowed states. The state machine 601 transitions from the idle state S1 to the wait for page response state S3 along transition path T24 based on determining the need to page the mobile customer. The CPM 414 sends a PAGE__MOBILE message to the PAG thread 435. Transition from the idle state S1 to the wait for alert state S4 occurs along transition path T25 based on determining that the mobile customer is located on another system and the aircore platform 200 has received a routing number to call the current serving switch. The CPM 414 sends a MAKE__CALL message using the TLDN (MSRN GSM). The transition from the idle state 51 to the wait for alert state 54 can also occur under a forwarding condition of the original destination number. Transition from the idle state S1 to the tone and announce state S8 occurs along transition path T26 if the called number received from the originating PSTN party fails to translate properly or if there is a restriction on the called mobile unit. In this case the originating PSTN party is connected to a tone or announcement. This transition could also occur by the CPM 414 receiving a PAGE__RESPONSE message with a time out indication.

The state machine 601 transitions from the wait for page response state S3 to the wait for alert state S4 along transition path T27 based on receiving a PAGE__RESPONSE message. The CPM 414 sends a MAKE__CALL message and proceeds with the ISDN state machine. Transition from the page response state S3 to the tone and announce state S8 occurs along transition path T28 based on receiving a time out for a page response (i.e., PAGE__RESPONSE message received by the CPM 414 with a time out indication). The CPM 414 provides a time out announcement or tone to the calling party. Transition from the wait for page response state S3 to the wait for call cleared state S9 occurs along transition path T29 based on receiving a disconnect from the originating PSTN party. The CPM 414 receives a CALL__DISCONNECTED message and sends a CLEAR__CALL message. The PAG thread 435 will time out and clear the page request data for the call.

The state machine 601 transitions from the wait for alert state S4 to the wait for connect state 5S along transition path T30 based on receiving an alerting indication from the called party. The alerting indication is passed to the PSTN side of the call. The CPM 414 received a CALL__ALERTING message from the called party and sends an ALERT__CALL message to the originating PSTN party. Transition from the wait for alert state S4 to the voice state S6 occurs along transition path T31 based on receiving a connect indication from the called party. The protocol allows reception of the connection without receiving alerting. The CPM 414 receives a CALL__CONNECTED message from the called party and sends a CONNECT__CALL to the originating PSTN party. Transition from the wait for alert state S4 to the tone and announce state S8 occurs along transition path T32 for two possible reasons. First, transition may be based on a time out waiting for the alerting indication. The called party is cleared from the call and the PSTN party is connected to an announcement or tone. The CPM 414 sends a CLEAR__CALL message to the called party. Second, transition may be based on receiving a disconnect from the called party with "user busy." The originating PSTN party is sent an announcement and the called party is released from the call. The CPM 414 receives a CALL__DISCONNECTED message from the called party and sends a CLEAR__CALL message to the called party. Transition from the wait for alert state S4 to the wait for call cleared state S9 occurs transition path T33 if the originating PSTN party disconnects from the call before the CPM 414 receives the alerting indication from the called party. Clearing of both parties is initiated. The CPM 414 receives a CALL__DISCONNECTED message from the originating PSTN party and sends a CLEAR__CALL message to both parties.

The state machine 601 transitions from the wait for connect state S5 to the voice state S6 along transition path T34 based on receiving connect indication from the called party. The connect indication is passed to the PSTN party. The CPM 414 receives the call connected message from the called party and sends the CONNECT__CALL message to the originating PSTN party. Transition from the wait for connect state S5 to the tone and announce state S8 occurs along transition path T35 when a time out occurs waiting for the connect. The called party is cleared from the call and the PSTN party is connected to a tone or announcement. The CPM 414 sends a CLEAR__CALL message to the called party. Finally, transition from the wait for connect state S5 to the wait for call cleared state S9 occurs along transition path T36 if the originating PSTN party disconnects from the call before the CPM 414 receives the connect indication from the called party. Clearing both parties is initiated. The CPM 414 receives a CALL__DISCONNECTED message from the originating PSTN party and sends the CLEAR__CALL message to both parties.

The state machine 601 transitions from the voice state S6 to the wait for call cleared state S9 along transition path T37 based on receiving a disconnect indication from either party. Call clearing is initiated for both parties. The CPM 414 receives the CALL__DISCONNECTED message from one of the parties. The CPM 414 then sends the CLEAR__CALL message to both parties.

The state machines 601 transitions from the tone and announce state S8 to the wait for call cleared state S9 along transition path T38 based on the originating mobile unit disconnect indication being received from the CPM 414. This can also occur as a result of a time out after the tone or announcement is played and a disconnect is not received. In this case, the CPM 414 initiates the disconnect with the mobile customer. The CPM 414 either receives a CALL__DISCONNECTED message and sends a CLEAR__CALL message or the CPM 414 receives a time out and sends the CLEAR__CALL message.

The state machine 601 transitions from the wait for call cleared state S9 to the idle state S1 along transition path T39 based on both parties confirming they are cleared from the call. In cases where there is no other party involved in the call the confirmation of the clearing of the party is implied by the fact that it never existed.

Transition takes place when the call is completely cleared. The CPM 414 receives the CALL_CLEARED message from the originating mobile unit.

FIG. 25 shows a state machine 602 for a mobile terminated call processing. As shown in FIG. 25, the states wait for UUI S2, wait for page response S3 and tone and announce S8 are not used in a mobile terminated call processing scenario. The state machine 602 transitions from the idle state S1 to the wait for alert state S4 along transition path T40 based on reception of a valid PAGE_RESPONSE message. The CPM 414 sends a MAKE_CALL message to the terminating mobile unit. The idle state S1 returns to the idle state S1 along transition path T41 based on a page time out, or failure in routing. The calling party is sent to an announcement or the call is forwarded based on the customer's feature profile.

State machine 602 transitions from the wait for alert state S4 to the wait for connect state S5 along transition path T42 based on receiving an alerting indication from the terminating mobile customer. The alerting indication is passed to the calling party's side of the call. The CPM 414 receives a CALL_ALERTING message and sends a ALERT_CALL message to the calling party. Transition from the wait for alert state S4 to the voice state S6 occurs along transition path T43 based on receiving a connect indication from the called mobile unit. The protocol allows receipt of a receive connect message without receiving alerting. The CPM 414 receives a CALL_CONNECTED message from the called party and sends a CONNECT_CALL message to the calling party. Transition from the wait for alert state S4 to the wait for call cleared state S9 occurs along transition path T44 if the calling party disconnects from the call before the CPM 414 receives the alerting indication from the mobile customer. Clearing both parties is initiated. The CPM 414 receives a CALL DISCONNECTED message from the calling party and sends a CLEAR_CALL) message to both parties. In addition, in time out cases where the calling party is sent to an announcement, the called mobile unit will receive a CLEAR_CALL message from the CPM 414 and make the transition.

The state machine 602 transitions from the wait for connect state S5 to the voice state S6 along transition path T45 based on receiving a connect indication from the called mobile customer. The connect indication is passed to the calling party. The CPM 414 receives a CALL_CONNECTED message and sends a CONNECT_CALL message to the calling party. Transition from the wait for connect state S5 to the wait for call clear state S9 occurs along transition path T46 that the calling party disconnects from the call before the CPM 414 receives the connect indication from the mobile customer. Clearing both parties is initiated. The CPM 414 receives a CALL_DISCONNECTED message from the calling party. The CPM 414 then sends a CLEAR_CALL message to both parties. In addition, in time out cases where the calling party is sent to an announcement, the called mobile unit will receive a CLEAR_CALL message from the CPM 414 and make the transition.

The state machine 602 transitions from the voice state S6 to the wait for call cleared state S9 along transition path T47 based on receiving a disconnect indication from either party. Call clearing is initiated for both parties in the call. The CPM 414 receives a CALL_DISCONNECTED message from one of the parties and sends a CLEAR_CALL message to both parties. Transition from the voice state S6 to the wait for hand off confirm state S7 occurs along transition path T48 based on receiving a hand off request from the HOP subsystem 416 and having a B-channel to allocate to the target BTS for the hand off. The CPM 414 receives a hand off request message from the HOP 416 and sends a MAKE-CALL message with a hand off indication to establish the target channel. Transition from the voice state S6 back to the voice state S6 occurs along transition path T49 based on receiving a hand off request and not having a B-channel available to the BTS.

The state machine 602 transitions from the wait for hand off confirm state S7 to the voice state S6 along transition path T50 in one of three situations. First, the CPM 414 receives a hand off confirmation from the serving BTS. This indicates the mobile unit has confirmed the hand off and is transitioning to the target BTS. Voice connection is switched to the target BTS at this point. The CPM 414 receives the HANDOFF CONFIRM message and sends the CLEAR_CALL message to the old serving channel. The voice path is connected to silence until the CALL_CONNECTED message is received on the target channel. Second, the CPM 414 receives a hand off confirmation with a negative indication (failed). This indicates that the mobile unit is not going to the target channel. A disconnect sequence to release the target channel is started and the CPM 414 sends a CLEAR-CALL message to the target channel. Third, the CPM 414 receives a failure of the channel set up with the target BTS. Transition to the voice state S6 in initiation or continuation of the disconnect sequence with the target BTS channel begins. The CPM 414 sends a CLEAR_CALL message to the target channel. Transition from the hand off confirm state S7 to the wait for call cleared state S9 occurs along transition path T51 based on receiving a disconnect from either party while a target BTS channel is being established for the hand off. The CPM 414 initiates clearing all resources and transition. The CPM 414 receives a CALL_DISCONNECTED message and sends a CLEAR_CALL message to all parties.

The state machine 602 transitions from the wait for call cleared state S9 to the idle state S1 along transition path T52 based on both parties confiring they are cleared from the call. In cases where there is no other party involved in the call, the confirmation of the clearing of this party is implied by the fact that a call never existed. This transition takes place when the call is completely cleared. The CPM 414 receives a CALL_CLEARED message from the originating mobile unit.

The aircore platform 200 uses a common facility state machine for tracking the states and conditions of external connections or trunks. Two portions of the state are tracked. Each facility has a near end and a far end state. The near end state represents the internal aircore state for the facility. The far end state represents the state of the facility as reported by the connected system. This state machine tracking applies to all aircore interfaces including traffic channels and signaling channels. Like call processing, these maintenance procedures are generic in the aircore platform 200 regardless of the interface.

Figure 26:
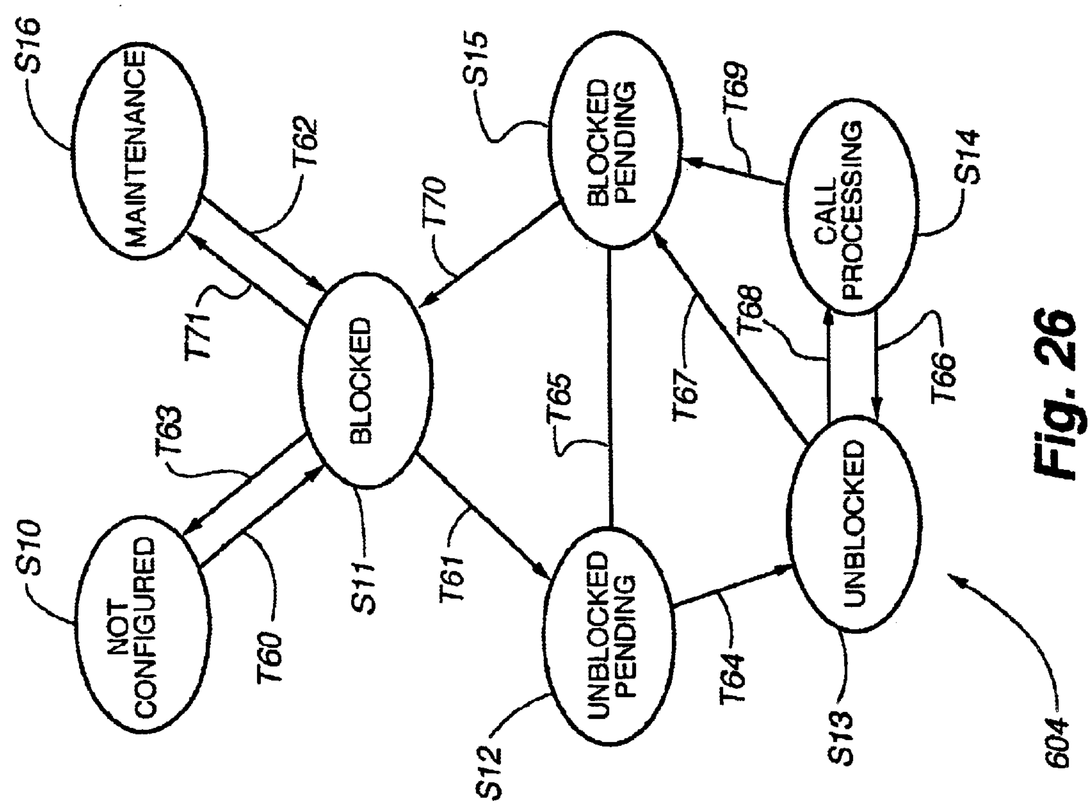
FIG. 26 is a diagram of a near end facility state machine.

FIG. 26 is a aircore near end facility maintenance state machine 604. The state machine 604 includes the states not configured (S10), blocked (S11), unblocked pending (S12), unblocked (S13), call processing (S14), blocked pending (S15), and maintenance (S16).

FIG. 26 also shows the transitions between the states of the state machine 604. The state machine 604 transitions from the state not configured S10 to the blocked state S11 along transition path T60 when a facility is added to the configuration and is enabled.

The state machine 604 transitions from the blocked state S11 to the unblocked pending state S12 over transition path T61 when either operator initiated or automatic recovery occurs which requests that the destination device handler bring the requested facility to an unblocked (in service) state. Transition from the blocked state S11 to the maintenance state S16 occurs along transition T62 when the facility is taken to a maintenance state to perform a maintenance or test operation. This transition is based on an operator action. Transition from the blocked state S11 to the not configured state S10 occurs along transition path T63 when the facility is disabled and/or removed from the system configuration.

The state machine 604 transitions from the unblocked pending state S12 to the unblocked state S13 over transition path T64 when a maintenance action is confirmed by the device handler. The facility is now in service. Transition from the unblocked pending state S12 to the blocked pending state S15 occurs over transition path T65 when a maintenance action is denied by the device handler or aborted by an operator action.

The state machine 604 transitions from the unblocked state S13 to the call processing state S14 along transition path T66 when the facility is allocated and will be used for call processing. Transition from the unblocked state S13 to the blocked pending state S15 occurs along transition path T67 when either operator initiated or automatic maintenance action from the device handler. Transition also occurs based on other internal action requests that the destination device handler bring the requested facility to a blocked (off-line) state.

The state machine 604 transitions from the call processing state S14 to the unblocked state S13 over transition path T66 when the facility is released from being used in call processing. Transition from the call processing state S14 to the blocked pending state S15 occurs over transition path T69 when a maintenance action is either operator initiated or automatic from the device handler or other internal action requests that the device destination handler bring the requested facility to a blocked (off-line) state.

The state machine 604 transitions from the blocked pending state S15 to the blocked state S11 over transition path T70 when a maintenance action to take facility off-line is confirmed by the device handler. In a case where the device handler does not respond, the state may be reached by default of no response.

The state machine 604 transitions from the maintenance state S16 to the blocked state S11 over transition path T71 when the maintenance action on the facility is completed. Operator action is required to transition the state back to the blocked state S11.

In addition to monitoring the near end state of the system facilities, the aircore platform 200 also maintains the far end state of facilities where applicable. The far end state represents the status of a facility at the connected system side. The far end state and near end state are used together to determine the overall operational state.

Figure 27:
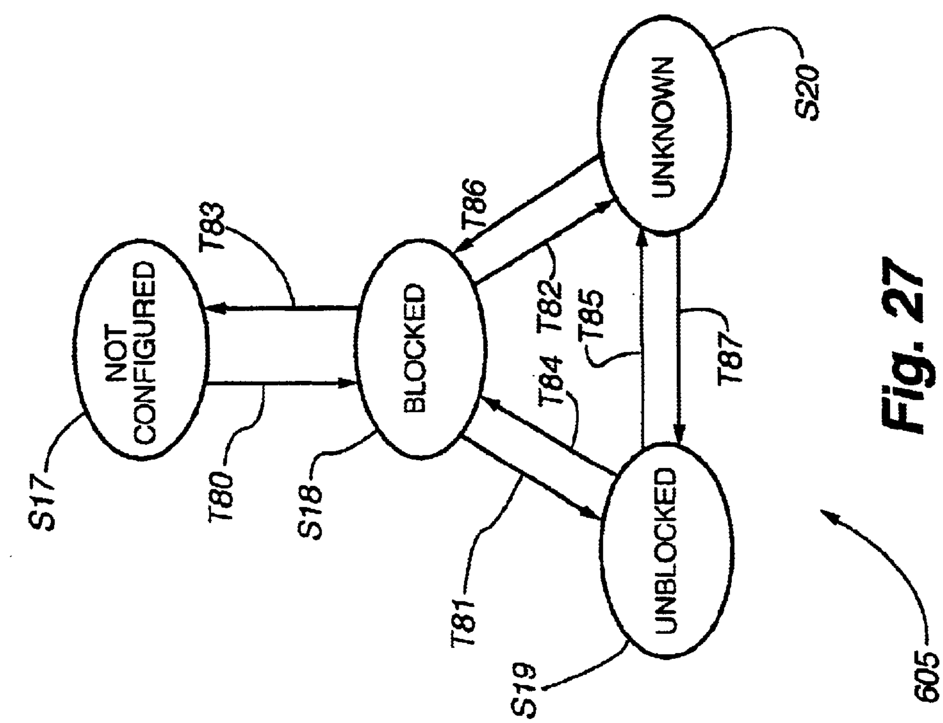
FIG. 27 is a diagram of a far end facility state machine.

FIG. 27 shows the aircore far end facility maintenance state machine 605. In FIG. 27, the states are not configured (S17), blocked (S18), unblocked (S19), and unknown (S20).

The state machine 605 transitions from the not configured state S17 to the blocked state S18 along transition path T80 when a facility is added to the configuration and enabled.

The state machine 605 transitions from the blocked state S18 to the unblocked state S19 over transition path T81 when an unblocking request is received from the far end. Confirmation is then sent back with an unblocking acknowledgment message. Transition from the blocked state S18 to the unknown state S20 occurs over transition path T82 when a discrepancy has been detected between the state reported by the far end and the stored far end state for the facility in aircore platform 200. The blocked state S18 transitions to the not configured state S17 over transition path T83 when the facility is disabled and/or removed from the system configuration.

The state machine 605 transitions from the unblocked state S19 to the blocked state S18 over transition path T84 when a blocking request message is received from the far end. Confirmation is sent back with the blocking acknowledgment message. Transition from the unblocked state S19 to the unknown state S20 occurs over transition path T85 when a discrepancy has been detected between the state reported by the far end and the stored far end state for the facility in the aircore platform 200.

The state machine 605 transitions from the unknown state S20 to the blocked state S18 over transition path T86 when the far end reports the state of the facility is blocked. Transition from the unknown state S20 to the unblocked state S19 occurs over transition path T87 when the far end reports the state of the facility is unblocked.

Hand off processing occurs when an active mobile unit transitions from a wireless region supported by one base station to a wireless region supported by a second base station. Hand off processing may also occur as a mobile unit transitions from one cell site within a wireless region to another sell site.

Figure 28:
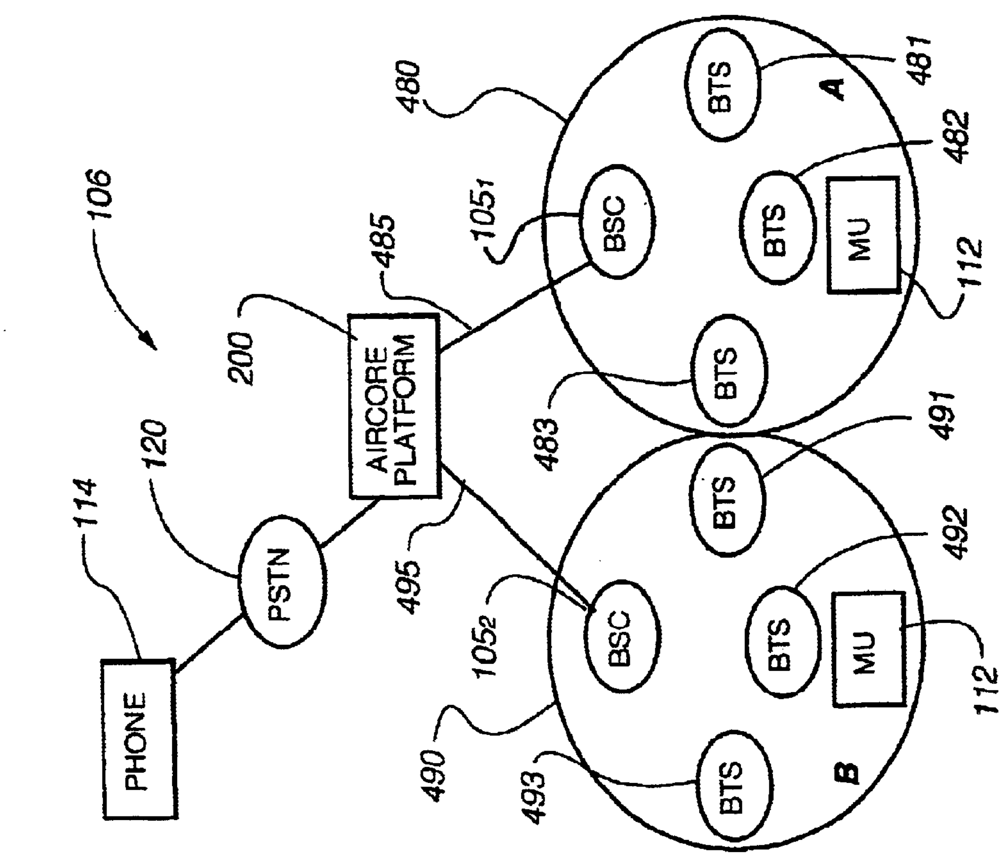
FIG. 28 is a diagram illustrating mobile unit hand off.

FIG. 28 shows an aircore wireless environment 106 in which the aircore platform 200 functions as a mobile switching center (MSC). There are many different protocol scenarios that are possible for hand off processing in the aircore environment 106, including ISDN PRI+with an AMPS base station, DHD-based (AMPS) base station, IS-634 AMPS, IS-634 TDMA, IS-634 CDMA, GSM, IS-41 Revision B, IS-41 Revision C and GSM mobile application part (MAP). In addition, the processing design of the aircore platform 200 retains the flexibility to easily adapt to other hand off protocols. Finally, the aircore platform 200 may receive hand off requests from multi-protocol mobile units.

In FIG. 28, base station controllers (BSCs) $\mathbf{105}_1$, and $\mathbf{105}_2$ and base transceiver stations (BTSs), are shown connected to the aircore platform 200 via signal lines 485 and 495, respectively. The BSC $\mathbf{105}_1$ has an associated wireless region 480 that includes BTSs 481, 482 and 483. The BSC $\mathbf{105}_2$ has an associated wireless region 490 with BTSs 491, 492 and 493. The mobile unit 112 is active in the wireless region 480 at point A and communicates with a land-line phone 114 via PSTN 120, the aircore platform 200, the BSC $\mathbf{105}_1$ and the BTS 481.

In the above description, the BTS receives a call from a mobile unit. The mobile unit may be a mobile telephone or a computer with a wireless modem, for example. In addition, the BSC/BTS may be replaced in some scenarios with a BSS or any other base station configuration.

During the course of a call, the mobile unit 112 transitions from point A in wireless region 480 to point B in wireless region 490. As a result of this transition, the BTS $\mathbf{105}_1$ detects that the signal level of the cell has dropped below the minimum to continue the call on the current channel. The BSC $\mathbf{105}_1$ notifies the aircore platform 200, which begins hand off processing to establish a new cell site using the BSC $\mathbf{105}_2$. When the new cell site is established, the aircore platform 200 tears down the previous link, thereby freeing up resources for other wireless customers.

In the scenario described above, the BSC $\mathbf{105}_1$ and $\mathbf{105}_2$ are both associated with the aircore platform 200 and certain hand off processing functions such as strength measurements are performed by the aircore platform 200. In a scenario involving a base transceiver station coupled to another mobile switching center, the base transceiver stations may perform these hand off processing functions.

As with other processing functions, the software architecture 300 of the aircore platform 200 is designed to use, as much as possible, generic processing for mobile unit hand offs. Thus, communications from the mobile units operating according to different protocols, e.g., GSM, TDMA, CDMA and AMPS are handled in a generic fashion, except where specific differences are required. The message flows associated with these protocols will be described later.

Referring to FIG. 10, once a base station detects that the signal level has either dropped below the minimum, or exceeded the maximum, to continue the call on the current channel, hand off processing begins. Measurements are taken of bordering systems to determine the best candidate system, or target base station. The HOP 416 is involved in this for analog protocols and some inter-system hand offs. Otherwise, the step may be handled directly between the base station and the mobile unit. For digital protocols, the base station sends the target information to the HOP 416 for transmission to the CPM 414. For ISDN PRI+ and DHD based analog protocols, the HOP 416 determines the appropriate target for the hand off. Next, the CPM 414 is notified via the HOP 416 of the required hand off and begins establishing a voice circuit to the target system. Once confirmed, the CPM 414 sends the hand off command to the current serving base station. This information is passed to the mobile unit. The mobile unit confirms the reception of the target information and switches to the new frequence and voice path. Upon arrival at the new frequency, the new serving base station passes the confirmation to the CPM 414. The CPM 414 switches the voice path during this process to the new channel and tears down the voice path to the old serving system.

As noted above, the HOP 416 preprocess is limited. After the hand off is in progress, the HOP 416 is no longer involved. Call processing uses the information provided by the HOP 416 to establish appropriate resources to complete the hand off. Call processing is responsible for the control of the remaining portion of the hand off.

For ISDN PRI+protocol hand offs, a message is sent to the aircore platform 200 from a base station to indicate that a mobile unit requires a hand off. The message specifies a protocol discriminator, a call reference (whose value is assigned in a SETUP message), a message type and a user identification. The aircore platform 200 in turn sends a hand off message request to the base station to request the base station measure a specific frequency. Finally, the base station sends a message to the aircore platform 200 to report the measured strength of the signal recorded on the base station.

ISDN PRI+processing requires that the HOP 416 accept a hand off request from the DHI 503. Appropriate hand off related information, including call reference and RF channel, for example, is stored in the air core platform 200. The call reference is a number that is retrieved from the device handler thread data that is initially stored when call setup takes place. The RF channel is also retrieved from the device handler thread data. The air core platform 200 then sends measurement requests to appropriate boarder cells, sets a measurement request timer, and processes responses from the base station.

For DHD based protocol hand offs, the HOP 416 accepts a hand off request from one of the device handlers in the aircore platform 200. The appropriate hand off related information, including the call reference and RF channel, for example, are stored. The aircore platform 200 allocates a voice channel and sends measurement requests (SCANs) to the appropriate border cells, sets a measurement timer, and processes responses received from the base stations. For base stations not chosen for hand off, the aircore platform 200 initiates a channel release. If a suitable target cell is determined, the HOP 416 send the information to the CPM 414 for hand off.

For DHD based protocol hand off processing, a voice channel is assigned to each base station when the measurement process takes place. For example, if three base stations border the current wireless system and a measurement is to be taken, a voice channel is explicitly reserved in each base station. When the target base station is chosen, the voice channels in the other base stations must be released. To accomplish this release, the device handlers will allocate and release the appropriate channels for the measurements in accordance with commands sent by the HOP 416. If an allocation fails or there are no channels available in a base station, the device handlers send allocation failure events to the HOP 416, and the HOP 416 removes the base station from the candidate list for the current hand off.

IS-634 analog hand off processing requires the HOP 416 to send a measurement request to the AIM 430. The measurement request is then sent to appropriate border cells. The measurement requests are sent back to the requesting base station, and the information is forwarded to the HOP 416, for determination of the target cell.

The strength measurement message is transferred to cells that are listed in a Cell Identifier List parameter that is sent in the message. The HOP 416 stores the reference number against the requesting base station so the return messages find the correct base station. The reference number is timed in accordance with a base station timer for measurement collection. Responses received after timer expiration are discarded.

IS-634 TDMA hand off processing requires that the HOP 416 determine, based on information received from the base station in a hand off required message, the appropriate candidate cell. The HOP 416 then sends the appropriate information to the CPM 414. If the HOP 416 does not find a suitable target cell, the hand off is aborted.

IS-634 CDMA hand off processing requires the that HOP 416 determine an appropriate target cell, based on information received by the HOP 416 from the base station. The HOP 416 aborts the hand off if a suitable target cell is not determined.

GSM hand off processing requires that the HOP 416 use information received from the base station in the hand off required message to determine appropriate target cells. Once again, the HOP 416 aborts the hand off if a suitable target cell is not located.

For hand off processing from a multiple protocol base station, the message flows to the HOP 416 indicate the appropriate protocol of the mobile unit. For intersystem hand offs, messages related to the intersystem hand off preprocessing are sent from the HOP 416 to the IMH 432 and from the IMH 432. The border cell for measurement may be reached in the same manner as sending a message to multiple cell sites, except that the messages are intersystem. Therefore, the messages are sent to the IMH 432, or are received from the IMH 432 instead of the AIM 430 base station threads, DHI 503 or DHD 501.

Each cell supporting hand off in the aircore system 106 must have an associated list of border cells that are contacted in the event of a hand off attempt. These cells may have an identity that ties the cells to a link. These cells also have a protocol that the HOP 416 and the CPM 414 can use for determining message destination, supported protocols, and associated trunk groups, all of which may be used for new voice circuit allocations.

Because the aircore platform 200 is capable of processing a number of different protocol messages, some mechanism must be provided to determine the correct protocol. For messages received from a single-protocol BSS, the aircore platform 200 determines the correct protocol by reference to the protocol established for that particular BSS. The BSS is then associated with a signaling link mechanism that connects the BSS to the MSC 210. The link may be a SS-7base, TCP/IP, LAPD, CAS and ATM, for example. The MSC 210 associates the type of protocol supplied by the BSS to any incoming messages received from the BSS. The actual protocol for the base station is determined when the link to the BTS or BSS is brought into service. One example is when the DH-7 510 spawns a thread connecting the BSS to the MSC 210.

To ensure signaling messages used with the aircore platform 200 perform the same generic function across protocols, tables of messages may be used for different aircore platform functions. The table that follows shows some of the messages used for call processing in the aircore platform 200, and the accompanying messages according to specific protocols.

profile is included as well as the selected traffic channel. The CALL_RECEIVED message is sent based on proper profile retrieval, authentication and channel selection. A ROUTE_CALL message is sent to the CPM 414 as an indication that the call may be routed to the network since the traffic channel allocation to the originating mobile unit was successful. The ROUTE_CALL message is sent based on proper channel assignment for the call. An ALERT_CALL event is received from the CPM 414 as an indication that the far end of the call is in the alerting state. When this event is received, an alert message is sent to the mobile unit. A CONNECT_CALL event is received as an indication that the far end has connected the call. This indication is passed on to the mobile station in the connect message. The above four events are used between the CPM 414 and all other subsystems for call originations in the system.

Mobile termination also uses a set of generic events and/or messages. However, mobile termination is more of a challenge than mobile origination, since the current operating mode of a subscriber is not known prior to querying the relative databases. Similar to the mobile origination procedure and the location updating procedure, mobile termination is generic for all base station-type interfaces regardless of the protocol. The first query is to the HLR 424 via the IMH 432. Call processing sends an event to the IMH 432 requesting the current location of the customer and how to reach the customer. This request is sent without indication of

| Internal AireCore Call Processing Event | GSM (Euro and US) | IS-634 CDMA | IS-634 TDMA | IS-634 AMPS |
|---|---|---|---|---|
| CPM_PAG_PAGE_MOBILE | Page Request | Page Request | Page Request | Page Request |
| PAG_CPM_PAGE_RESPONSE | Page Response | Page Response | Page Response | Page Response |
| MAKE_CALL | Setup | Setup | Setup | Setup |
| CALL_RECEIVED | Setup | Setup | Setup | Setup |
| ROUTE_CALL | Assignment Complete | Assignment Complete | Assignment Complete | Assignment Complete |
| ALERT_CALL | Alerting | Alerting | Alerting | Alerting |
| CALL_ALERTING | Alerting | Alerting | Alerting | Alerting |
| CONNECT_CALL | Connect | Connect | Connect | Connect |
| CALL_CONNECTED | Connect | Connect | Connect | Connect |
| CLEAR_CALL | Disconnect | Disconnect | Disconnect | Disconnect |
| CALL_DISCONNECTED | Disconnect | Release | Release | Release |
| CLEAR_CALL | Release | Release/Release Complete | Release/Release Complete | Release/Release Complete |
| CALL_CLEARED | Release Complete | Release Complete | Release Complete | Release Complete |

Calls may fall into one of several scenarios, including mobile originated (a mobile unit originates the call), mobile terminated (a call to a mobile unit) and PSTN originated, for example. Mobile originated calls may be received at the MSC and may be originated at another wireless system (intersystem). Mobile originated calls may also be received at a BTS and may then be passed to the MSC.

The aircore platform 200 initiates a location update sequence to register a mobile unit with the aircore platform 200. A customer profile is retrieved from the VLR 422 or HLR 424 as necessary. Once a customer profile is retrieved, the procedures for call setup across the protocols is generic. The use of a standard internal set of procedures allows the call processing of the aircore platform 200 to be independent of the type of interface used when establishing the call. The events that are specific to a particular protocol are handled by individual components of the AIM 430. A CALL_RECEIVED message announces arrival of an incoming call to the CPM 414. When this message is sent, the customer the intrasystem protocol to use. The IMH 432 utilizes the MIN/MSISDN to HLR mapping table to determine a protocol and location of the HLR in the network.

For an internal HLR, the event is built and sent to the HLR 424 for processing. The protocol indicator is set based on the mapping table and a search is performed to locate the customer profile in the HLR database. If the customer profile is not found, the HLR 424 can optionally query the opposite side of the database in the case where the phone supports multiple modes and protocols. Once found, the VLR 422 is contacted (if not local) via standard procedures, such as ROUTE_REQUEST or PROVIDE_ROAMING_NUMBER.

For call tear down, the aircore platform 200 is based on the ISDN model for call release. This scenario is a three message sequence beginning with the requesting interface presenting notification of a disconnect. The notification is followed with a two event exchange with all involved subsystems for the call to command the release of the call and a return message to confirm the release. Low level processing in the aircore platform 200 ranges from changing the state of supervision bits to a two or three message exchange.

Figure 29A:
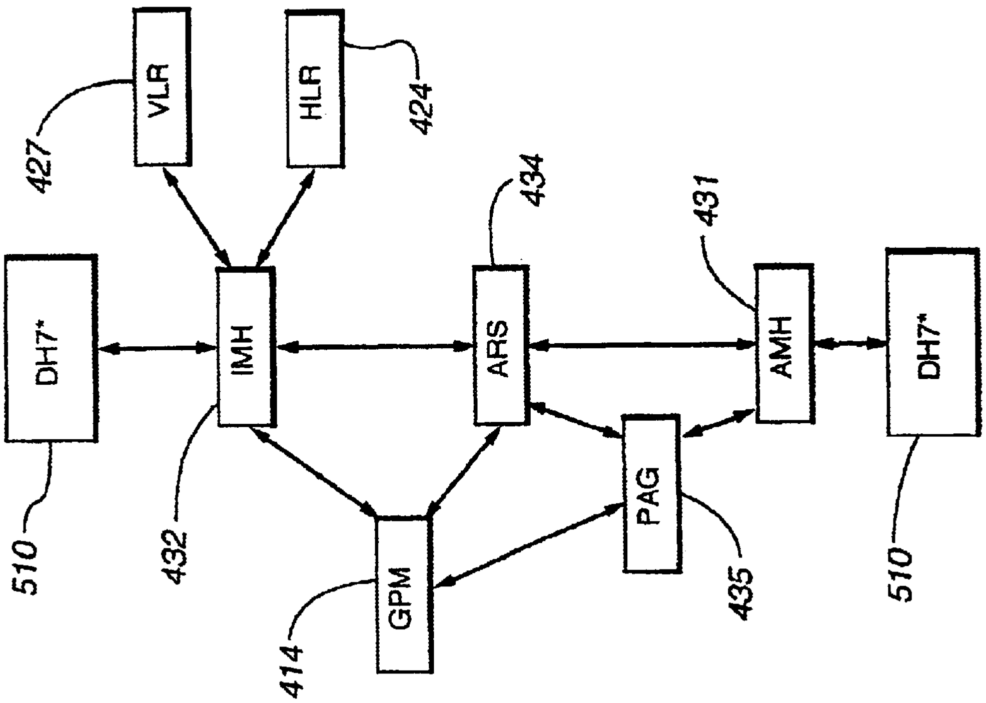
FIG. 29*a* shows the software components used for call processing.

FIG. 29*a* shows the basic components of the aircore platform 200 that are involved in call processing in the above scenarios. As shown in FIG. 29*a*, calls to the aircore platform 200 may be received at a device handler such as the DH-7 510. The device handler DH-7 510 may communicate with the IMH 432 and the AMH 431. The VLR 422 and the HLR 424 and AC/AuC (not shown) may be addressed by the IMH 432 to retrieve customer-specific data and to perform other functions, including customer location, for example. The CPM 414 communicates with the ARS 434, the IMH 432 and the PAG 435.

The components shown in FIG. 29*a* communicate via a set of generic messages. These messages indicate receipt of a call, authentication, call routing and call connection, for example.

To ensure proper tracking of a call and the call's processing, whenever a call comes into the aircore platform 200, the AMH 431 receives a notification from the DH-7 510. The AMH 431 accesses the decoder thread to decode the incoming message and to determine the appropriate action. If the message is the first message associated with a call, the AMH 431 allocates an area in the common memory 439, with an index to that area. For the duration of the call processing and the call, the designated area will be used as needed during the transaction processing. For example, the designated area includes the customer identification number and the base station identification.

The AMH 431 can spawn threads unique to base station protocols such as GSM or RDMA, TDMA, or AMPS. The AMH 431 may also spawn different threads depending on the manufacturer of a mobile unit.

The IMH 432 works in a fashion similar to that of the AMH 431 in that the IMH 432 spawns different threads, depending on the protocol required for the system (GSM or IS-41). When the IMH 432 deals with internal events, it shares the index and memory space used by the associated AMH 431. The IMH 432 pulls the message from the memory space of the common memory 439 created by the AMH 431, using the index created by the AMH 431.

The IMH 432 also processes events without the involvement of an AMH 431 thread. For these situations, the index and memory area are allocated by the IMH 432 thread. Memory and index allocation are coordinated within the AIM 430 subsystem.

The ARS 434 communicates with the VLR 422 via the IMH 432 thread to retrieve the requisite information to authenticate the subscriber and determine the validity of the transaction. The processing of the ARS 434 thread is made generic.

The PAG 435 thread tracks the outstanding page requests that are in process for the system. The PAG 435 thread receives incoming PAGE_MOBILE events from the CPM 414 when a mobile unit is to be paged on the aircore system. The PAG 435 thread determines the appropriate base station resources that should be sent the PAGE message. The PAGE_REQUEST message is then communicated to the appropriate AMH 431 threads for processing. In a multi-protocol environment, the decision on the base stations that receive the PAGE_REQUEST event is based on the last known technology that the mobile unit was operating on. If a mobile unit has GSM and CDMA capabilities, and the last activity for the mobile unit was on the GSM portion of the system, the PAG 435 thread will process this as a GSM based paging. If however, there is not a last known technology for the mobile unit, all technologies within the mobile unit's capabilities are paged. If the mobile unit referenced above did not have a last known technology, both the CDMA and the GSM based paging would take place. Once the PAGE_RESPONSE message is received, the AMH 431 thread decodes the message and sends the decoded data, via the common memory 439 to the PAG 435 thread where an association is made between the incoming PAGE_RESPONSE and the previous outgoing PAGE_REQUEST messages. Based on the responding base station, the appropriate technology can be determined. The determination of the proper protocol at this point is much like the determination used for mobile originated actions. The responding base station determines the protocol based on its capabilities that were known when the interface to the base station was brought into service.

Figure 29B:
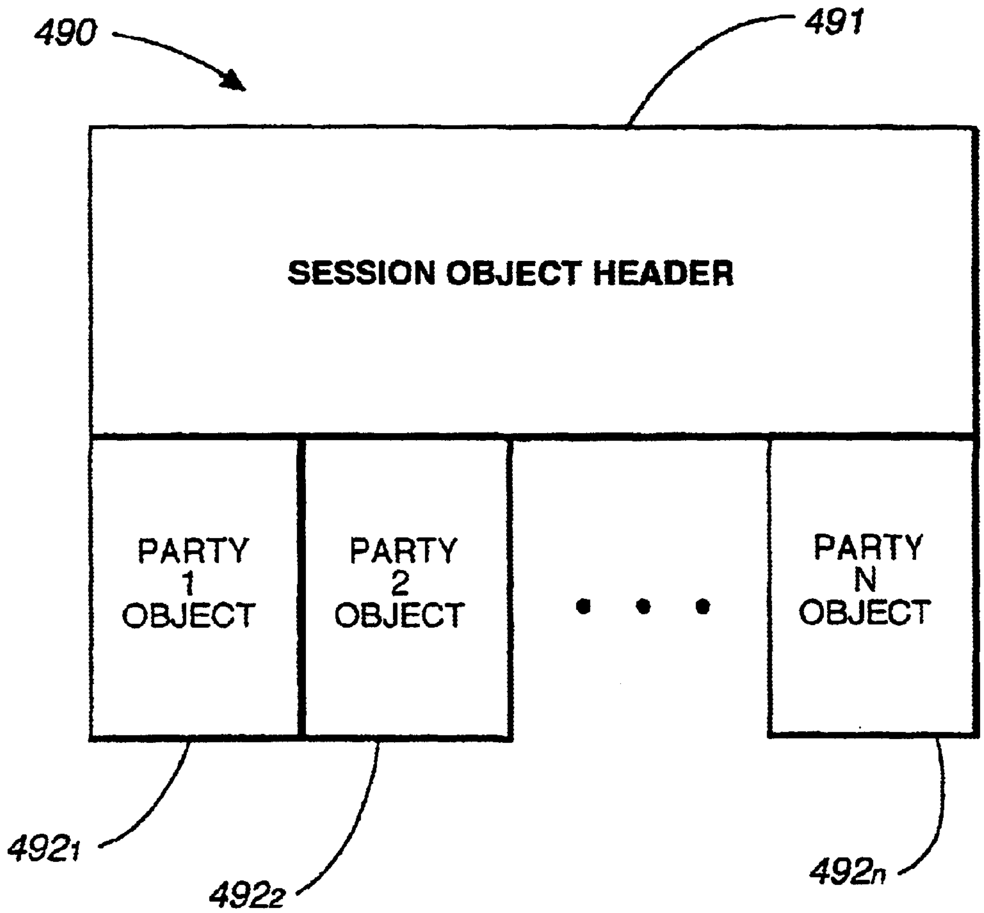
FIG. 29*b* shows the object structure for the aircore call processing.

Call processing also uses a common reference scheme to track all events associated with a call. This scheme is illustrated in FIG. 29*b*. Each call placed with the aircore platform 200 leads to creation of a session 490 with a session object header 491. The session object header 491 is created based on an index number generated from the board, span, and channel used for the first party involved in the call. Board, span and channel is a reference created relative to the physical interface used for system access. The session 490 adds and removes call objects 492, as dictated by the progression of the call. Each session 490 has a reference number for the session that is based on the originator's board span and channel. However, the session may also be indexed by an index number of the board, span and channel of any of the parties involved in the session. As shown in FIG. 29*b*, each party object has its own data related to the customer or the interface to which it is related. The authentication process may be initiated as a result of either a service request by a mobile unit or following the successful page of a mobile unit, but is performed primarily under the control of the VLR. The authentication process may be set up to be performed every time a mobile unit originates a call or when a call terminates at a mobile unit. Authentication may also take place whenever a location is updated for the mobile unit that is in a power on or an idle state. Finally, authentication may occur when a mobile unit registers by turning power on.

When a mobile unit originates a request for service, the mobile unit sends a message to the MSC, including the IMSI, a mobile identification number (MEN), or a temporary mobile subscriber identification (TMSI). The MSC may use the IMSI, the MIN, or the TMSI as the primary identification for the mobile unit. The IMSI is a permanent number that is assigned to every mobile unit. The MIN is a permanent number assigned to a mobile unit in the case where an IMSI is not used. (MIN is used in older AMPS based mobile units). The TMSI is assigned to a mobile unit only after an authentication, and has only local significance. If the TMSI is not recognized from the mobile unit, then a request is made to use the IMSI to continue the authentication. Upon successful authentication, a new TMSI (if used) is assigned to the mobile unit for future system access.

The authentication center is the source of data used in authentication. The authentication center does not store data for the customers. Instead, the authentication performs calculations using random numbers that are used in conjunction with data in the HLR to generate authentication data. When a customer first subscribes for service, the customer is assigned a secret key ($K_i$ for GSM, A-key for CDMA, TDMA). The key and a random number supplied by the authentication are used by the authentication center to generate a result. The data calculations also yield values used for encryption keys. Depending on the protocol (GSM or IS-41 based), the authentication process can occur at different times during the establishment of communications between the mobile unit and the MSC 210. The similarities between the authentication procedures are found in the fact that they produce results that are used for both access verification and encryption. Although the security calculations the responsibility of the authentication center, the initiation of the actual collection/transmission of data and the comparison to determine the validity of the access is the responsibility of the ARS 434 thread.

When authentication is requested, the MSC sends the random number of the mobile unit. The mobile unit retrieves the $K_i$ from its initialization memory and calculates a signed response (SRES) and an encryption key $K_c$. The mobile unit then stores the $K_c$ and sends the SRES to the MSC. The ARS 434 identifies that the SRES sent by the mobile unit matches the SRES calculated by the ARS 434. If the values match, the value of $K_c$ stored in the mobile unit is assumed to be correct. This authentication process does not require that the encryption key $K_c$ or the initial key $K_i$ be transmitted over the air, thereby ensuring security for the encryption process.

Figure 29C:
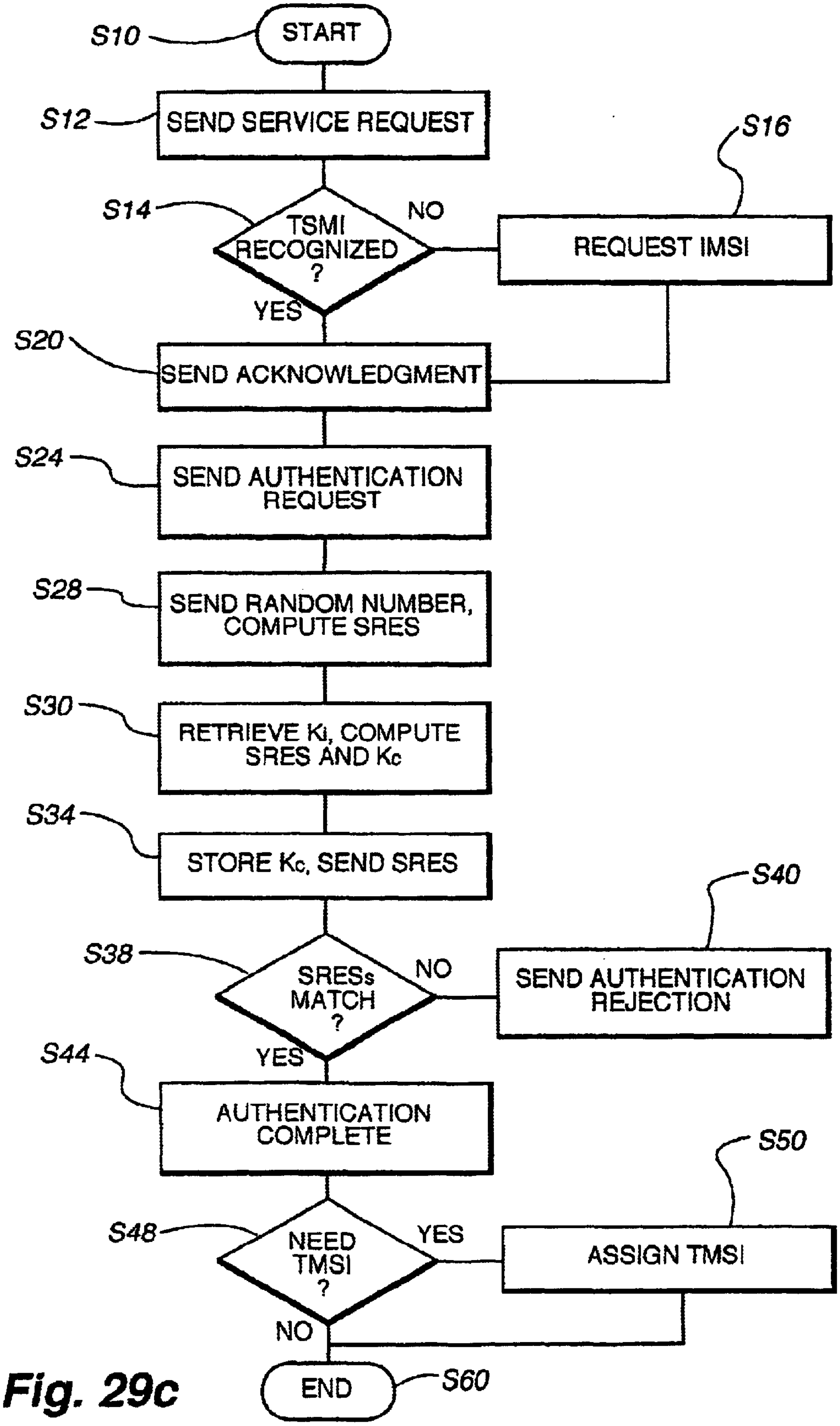
FIG. 29*c* is a flow chart illustrating an authentication process.

An example of the GSM authentication process is described with reference to FIG. 29*c*. The authentication process starts with step S10. The process then moves to step S12 where a mobile unit sends a service request message to the aircore platform 200. The message includes the temporary mobile subscriber identification (TMSI). The process them moves to step S14. In step S14, the ARS 434 compares the TMSI sent from the mobile unit to the TMSI recorded in the VLR 422. If the ARS 434 recognizes the TMSI, the process moves to step S20. Otherwise the process moves to step S16.

In step S16, the ARS 434 requests the IMSI for the mobile unit from the VLR 422. The process then proceeds to step S20. In step S20, the aircore platform 200 sends a message to the mobile unit indicating that the mobile unit is recognized. The process then moves to step S24.

In step S24, the mobile unit sends an authentication request message to the aircore platform 200. The process then moves to step S28. In step S28, the aircore platform 200 sends a random number to the mobile unit and the authentication center platform 200 sends a random number to the mobile unit and the authentication center calculates a signed response (SRES) based on the random number. The process then moves to step S30.

In step S30, the mobile unit, after receiving the random number, retrieves the case $K_i$ from its initialization memory and calculates the SRES and the encryption key $K_c$. The process then moves to step S34. In step S34, the mobile unit stores the encryption key $K_c$ and sends the SRES to the aircore platform 200. The process then moves to step S38. In step S38, the ARS 434 compares the SRES calculated by the mobile unit with that calculated authentication center 200. If the two SRESs match, the process moves to step S44. Otherwise the process moves to step S40. In step S40, the aircore platform 200 sends a message to the mobile unit indicating that the authentication failed.

Figure 58:
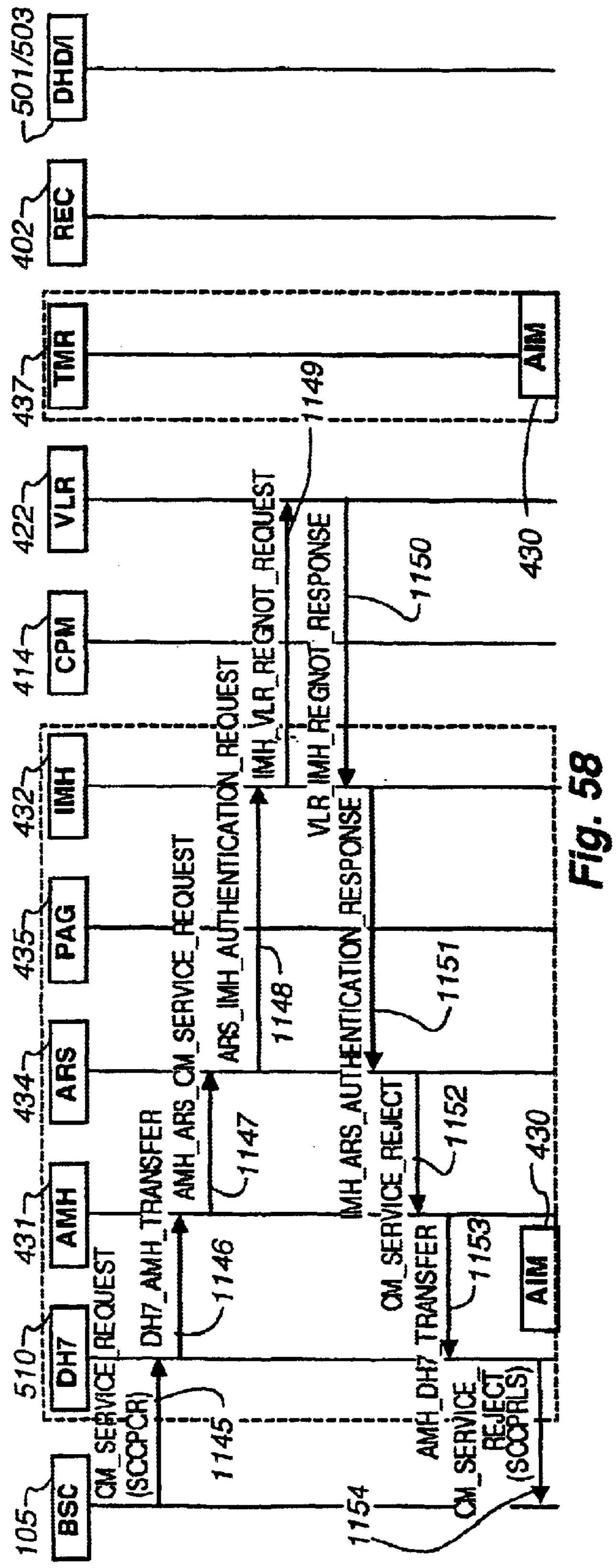

In step S44, the ARS 434 completes the authentication process. The process then moves to step S48. In step S48, the ARS 434 determines if the mobile unit needs a TMSI. If the mobile unit needs a TMSI the process moves to step S50. In step S50, the ARS 434 assigns a TMSI to the mobile unit and stores the value of the TMSI in the VLR 422. The process then moves to step S60. In step S60, the authentication process ends and call processing continues. The message flows associated with a failed authentication are shown in FIG. 58.

The above-described authentication process is the GSM authentication procedure, which is one of several authentication procedures available to the MSC. Other authentication processes may vary according to the call processing protocol, for example.

The operation of the aircore platform 200 in a multi-protocol wireless environment is explained below with reference to FIGS. 30–72.

Figure 30:
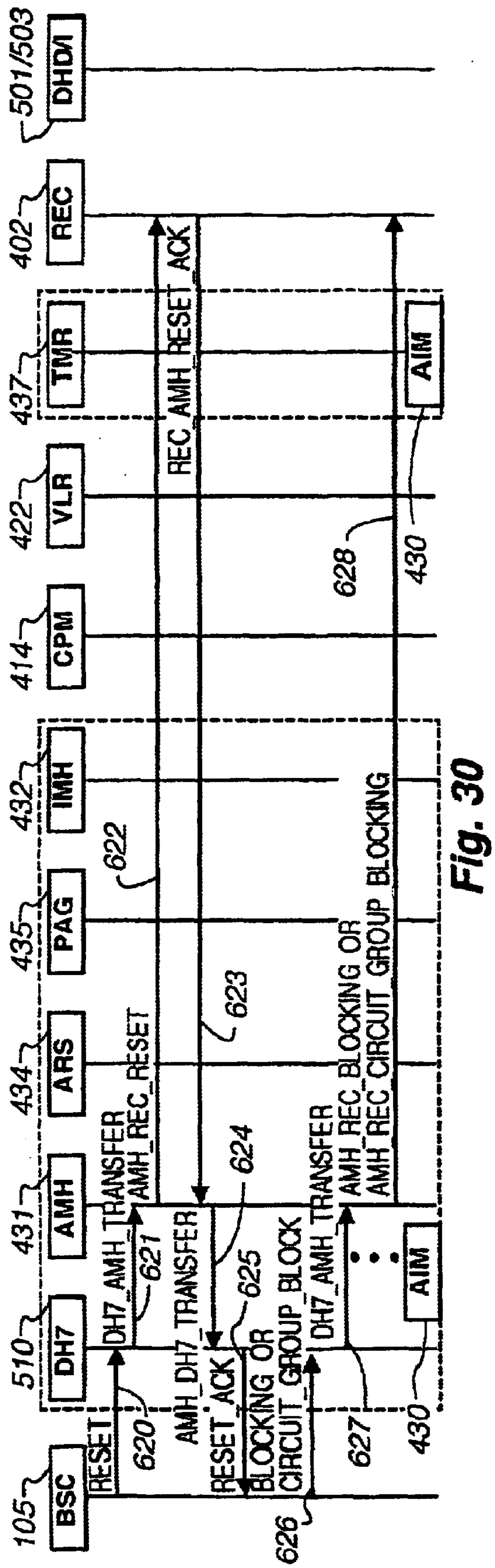
FIGS. 30–34 are flow charts showing message signaling associated with interface maintenance.

When the aircore platform 200 and base station controllers are first brought on line, they exchange messages to ensure that all circuits are properly aligned. FIG. 30 shows the reset and reset acknowledgment function when the base station controller is started. In FIG. 30 base station controller (BSC) 105 sends a reset message 620 to the device handler DH-7 510 to initiate the message sequence. The DH-7 510 transfers the message to the AMH 431 using DH-7AMHTRANSFER 621. The AMH 431 then sends an AMH REC RESET 622 to the REC 402 to initiate the reset. The REC 402 returns a reset acknowledge to the BSC 105 using the REC_AMH_RESET_ACK 623, which is sent to the AMH 431. The AMH 431 transfers the reset acknowledgment to the DH-7510 using AMH_DH-7_TRANSFER 624. The DH-7 510 then sends a RESET_ACK 625 to the BSC 105. The BSC 105 then sends a BLOCKING or CIRCUIT_GROUP_BLOCK 626 to the DH-7 510. The DH-7 510 sends a DH-7_AMH_TRANSFER 627 to the AMH 431, which in turn sends an AHM_REC_BLOCKING or AMH_REC_CIRCUIT_GROUP_BLOCKING 628 to the REC 402. This process then continues until all the circuits are in the appropriate state on the side of the aircore platform 200.

Figure 31:
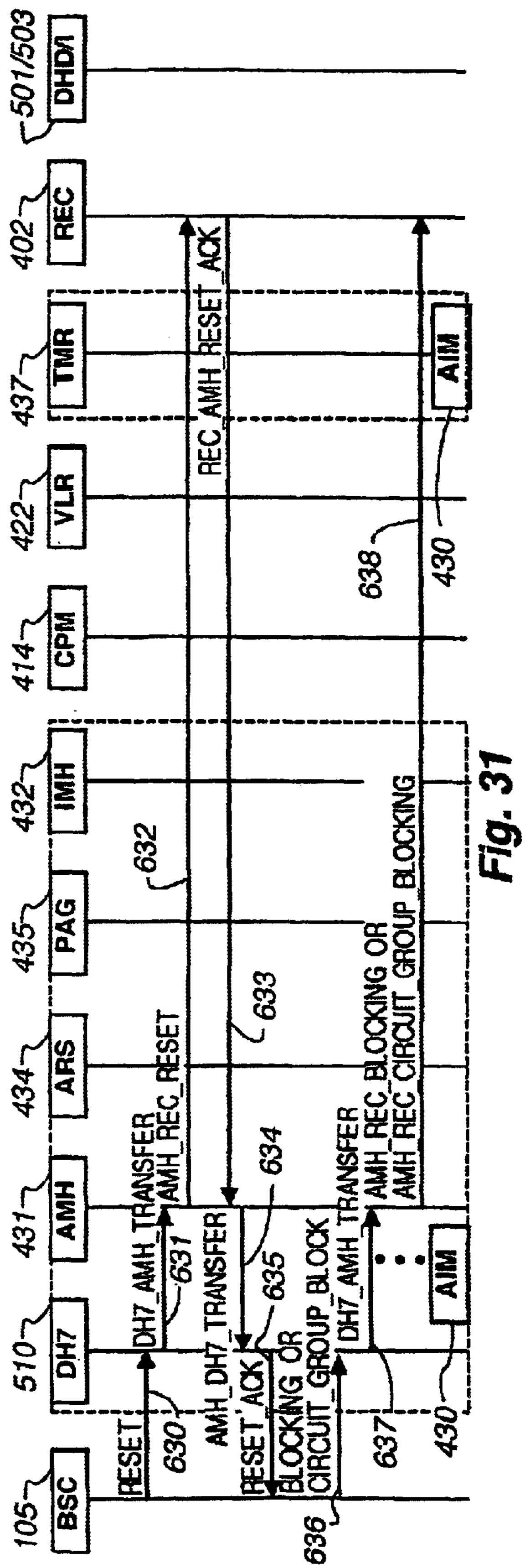

FIG. 31 shows the reset and reset acknowledgment message flows for a base controller failure. The message flows are similar to those shown in FIG. 30.

Figure 32:
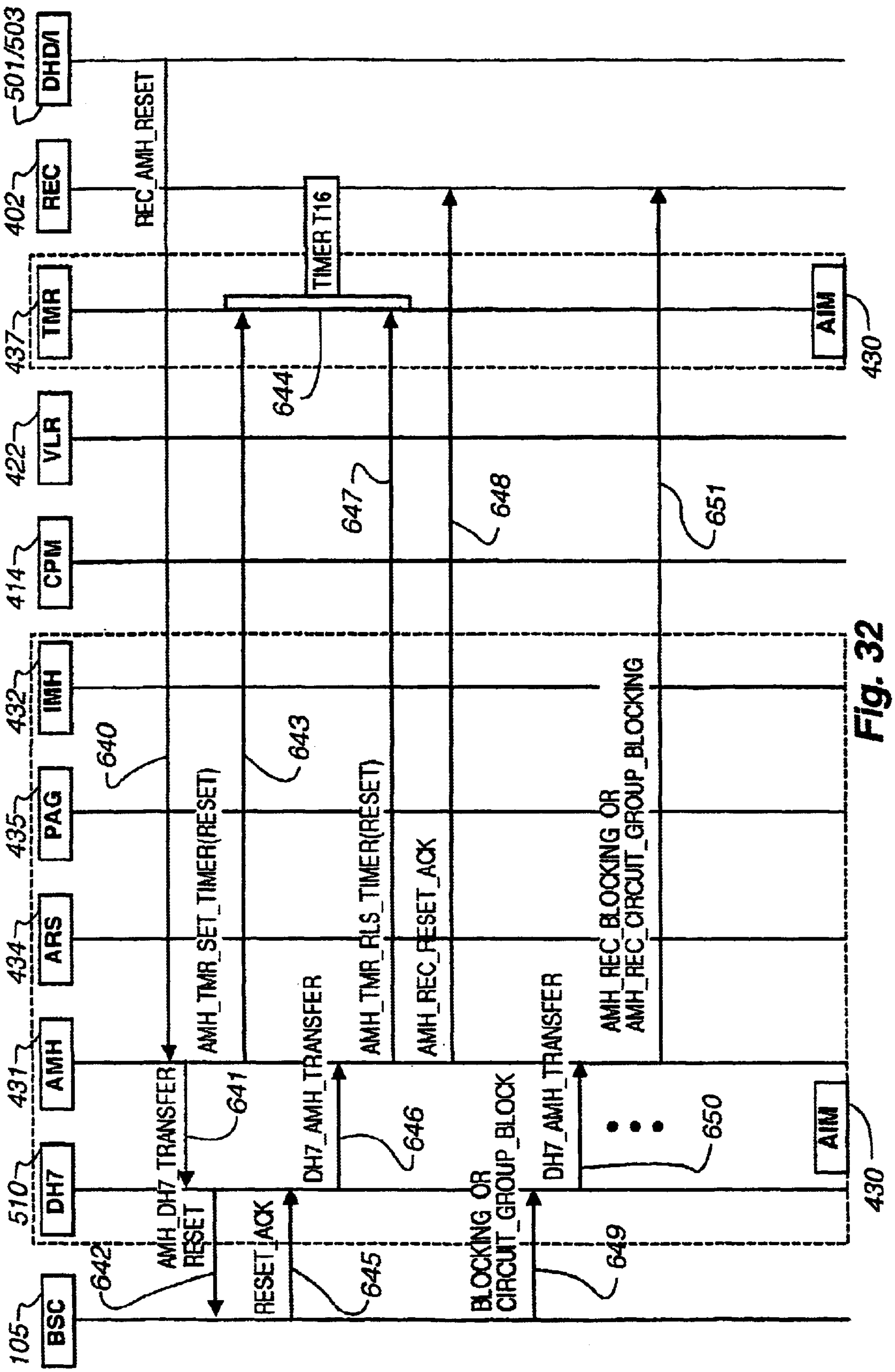

FIG. 32 shows the message flows for the start up of the aircore platform 200. Upon startup, the REC 402 sends a REC_AMH_RESET 640 to the AMH 431. The AMH 431 transfers the reset message to the DH-7 510, using an AMH_DH7_TRANSFER 641, and starts a T16 timer 644 using AMH_TMR SET_TIMER (RESET) 643. The reset signal (RESET 642) is then sent to the BSC 105. The BSC 105 returns a RESET_ACK 645 to the aircore platform 200 and the AMH 431 releases the T16 timer 644 using AMH_TMR_RLS_TIMER (RESET) 647. The AMH 431 then passes the reset acknowledgment to the REC 402 using AMH_REC_RESET_ACK 648. Finally, the BSC 105 indicates blocking or circuit group blocking by sending an appropriate message to the aircore platform 200. This process continues until all the circuits are in the appropriate state on the side of the aircore platform 200.

Figure 33:
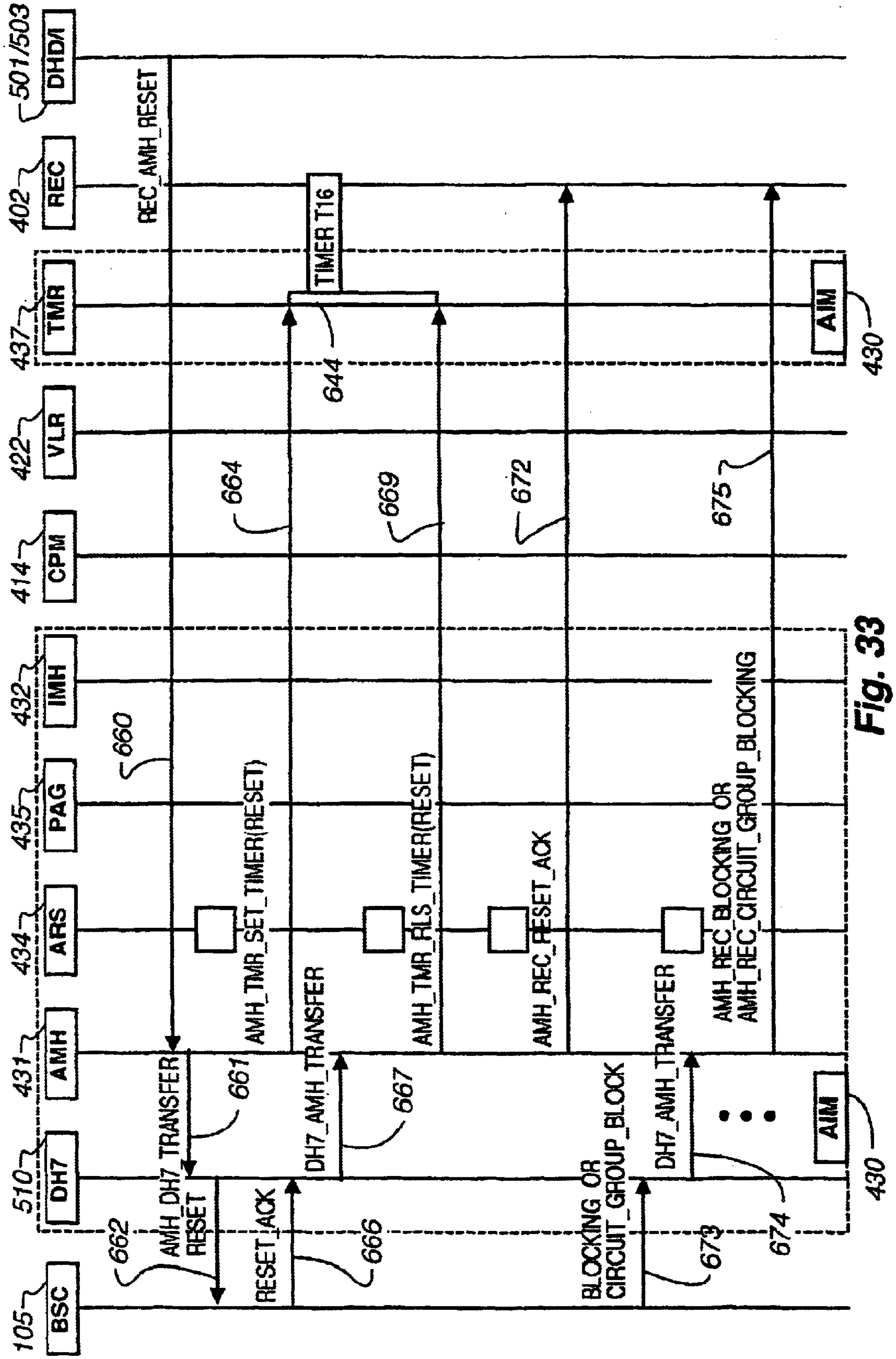

FIG. 33 shows the message flows for startup of the aircore platform 200 in the event of a circuit failure.

Figure 34:
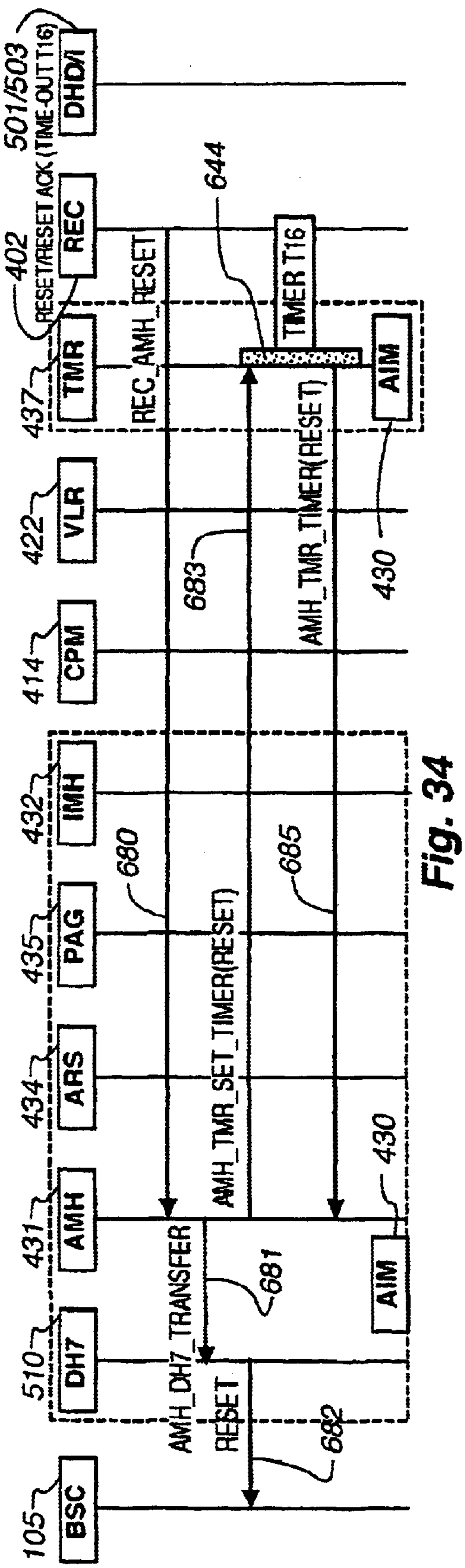

FIG. 34 shows the message flows for startup of the aircore platform 200 in the event the T16 timer 644 times out before the BSC 105 returns a reset acknowledgment message to the aircore platform 200.

Figure 35:
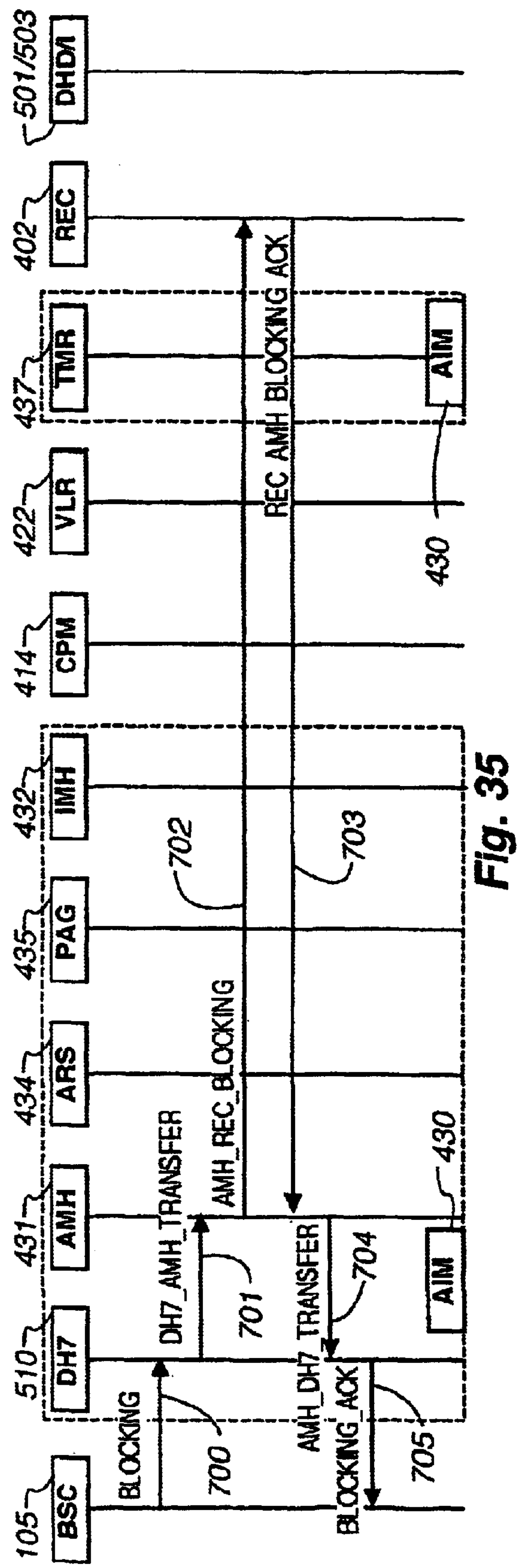
FIGS. 35–40 are flow charts showing message signaling associated with trunk management.

The aircore platform 200 may interface with other wireless systems. To set up a call, trunks are established between the two systems. FIGS. 35–40 are flow charts that show the message traffic used to establish and reset the trunks. FIG. 35 shows the message flows when a far end system sends a blocking request to the aircore platform 200. A blocking 700 is received from the BSC 105 and transferred to the REC 402. The REC 402 returns a REC_AMH_BLOCKING_ACK 703 to the BSC 105. The state of the trunk circuit established could move to blocked or to blocked pending depending on whether a call is currently on the channel. The REC 402 assures the appropriate state changes occur.

Figure 36:
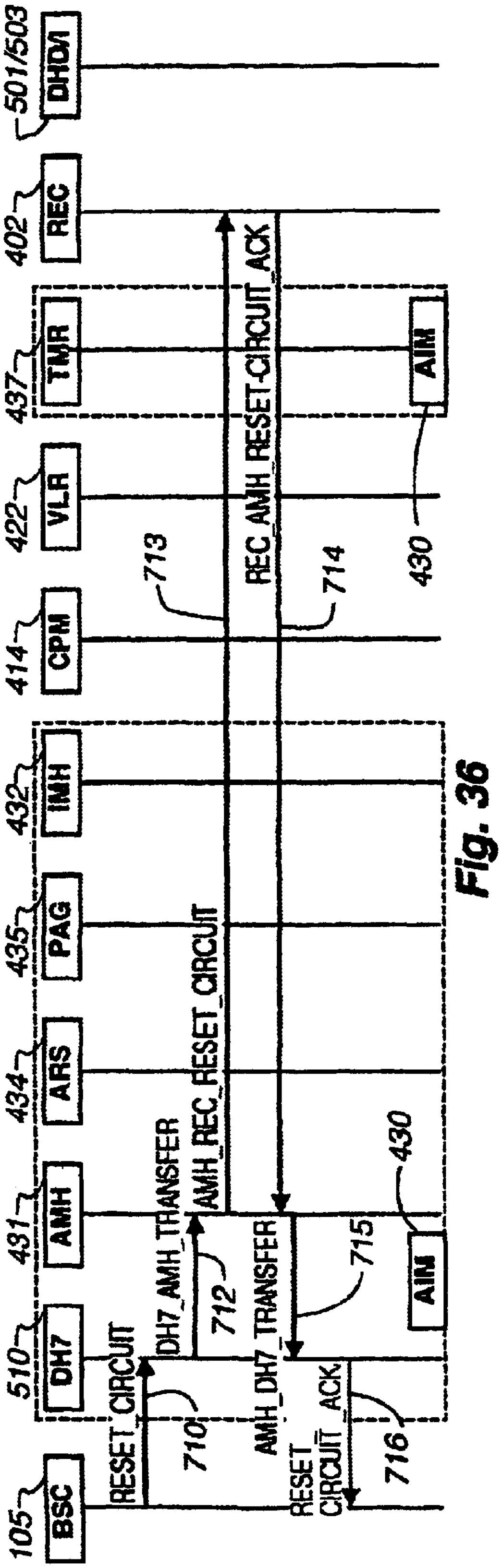

FIG. 36 shows the message flows for resetting a trunk circuit when no call is in progress. The BSC 105 sends a RESET_CIRCUIT 710 which is received at the REC 402. The REC 402 returns a REC_AMH_RESET_CIRCUIT_ACK 714 to the BSC 105 and the circuit is reset.

Figure 37:
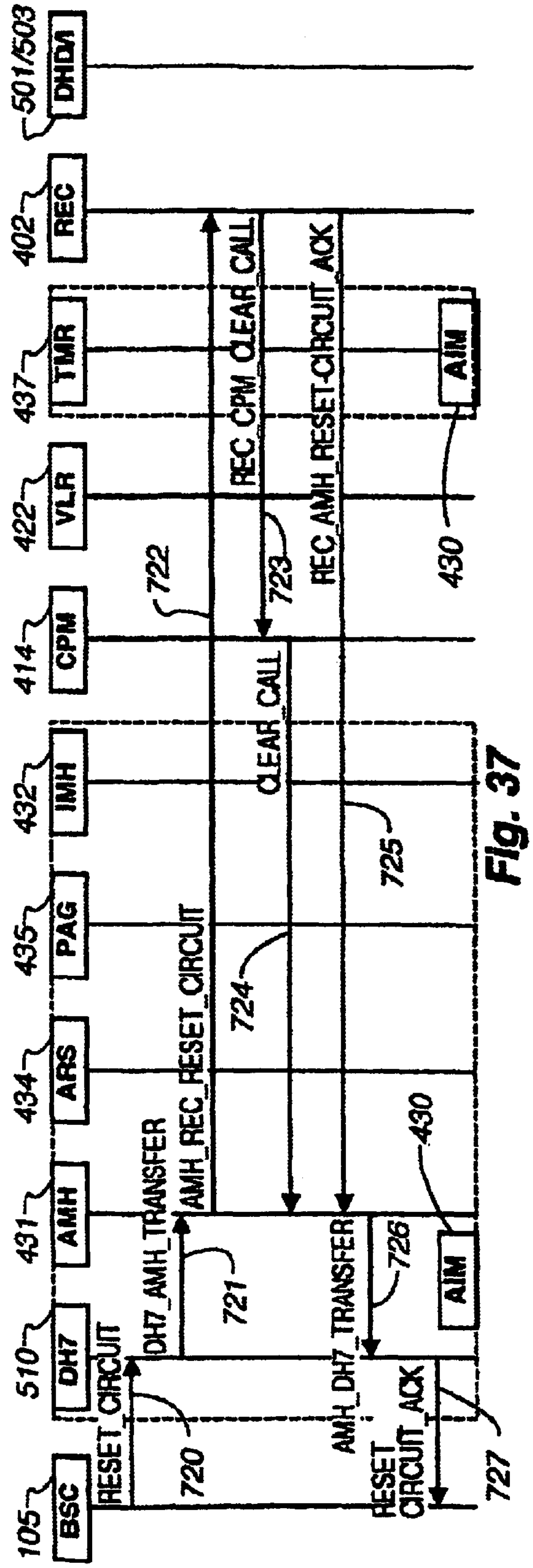

If a call existed on the trunk circuit, the message flows vary from that shown in FIG. 36. FIG. 37 shows the message flows in this situation. In FIG. 37, the BSC 105 sends a RESET_CIRCUIT 720, which is transferred to the REC 402. The REC 402 sends a REC_CPM_CLEAR_CALL 723 to the CPM 414. The CPM 414 sends a CLEAR_CALL 724 to the AMH 431. The AMH 431 then clears the call. In parallel, the REC 402 sends a REC_AMH_RESET_CIRCUIT_ACK 725, which is transferred (726, 727) to the BSC 105.

Figure 38:
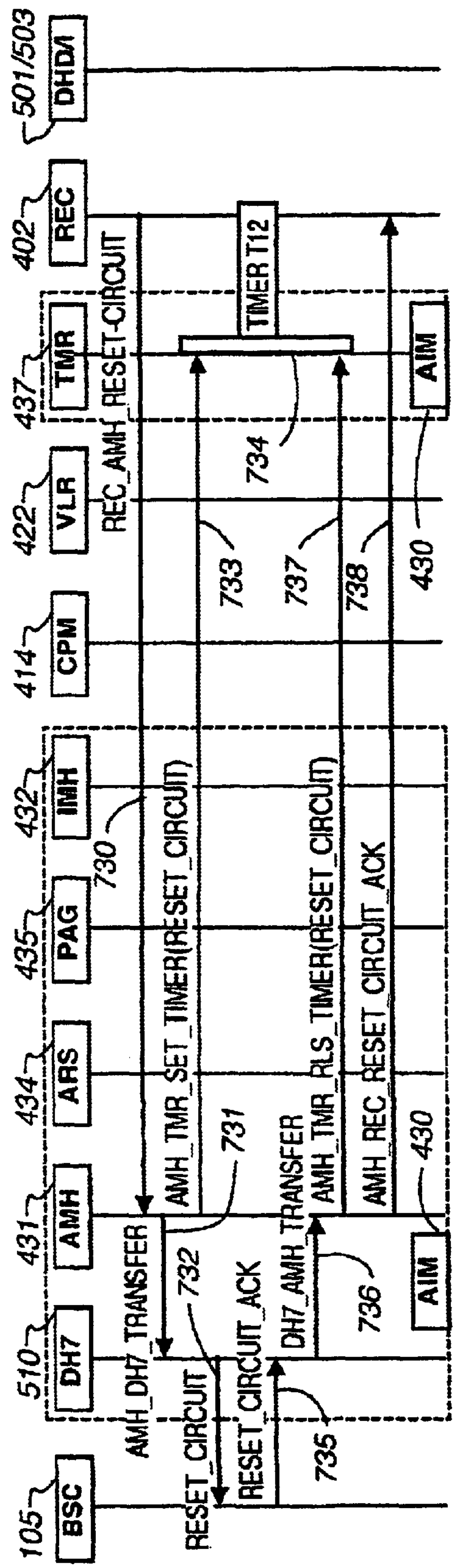

The trunk circuit may also be reset by action taken by the aircore platform 200. FIG. 38 shows the message flows in this situation. The REC 402 initiates a REC_AMH_RESET_CIRCUIT 730, which is transferred (736, 738) to the BSC 105. The AMH 431 sets the T12 timer 734 using an AMH_TMR_SET_TIMER (RESET_CIRCUIT) 733. The BSC 105 returns a reset circuit acknowledgment using RESET_CIRCUIT_ACK 735, which is transferred (736, 738) to the REC 402. Because the REC 402 received the reset circuit acknowledgment before expiration of the T12 timer 734, the AMH 431 sends (737) a timer release message to the TMR 437 releasing the T12 timer 734.

Figure 39:
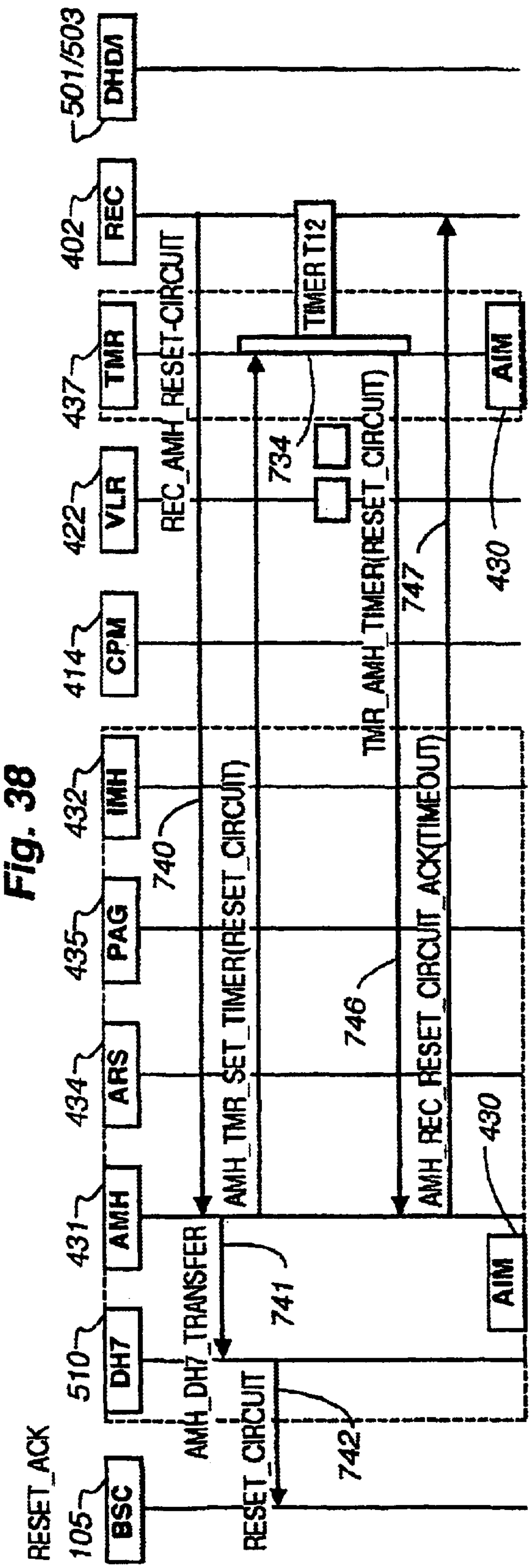

In some cases, the BSC 105 will not return a reset circuit acknowledgment message before expiration of the T12 timer 734. Message flows in this situation are shown in FIG. 39. When the T12 timer 734 times out, AMH 431 (747) sends a time out message to the REC 402. The REC 402 then repeats the reset circuit procedure n number of times, where n is a setable parameter. When the nth attempt to reset the trunk circuit fails, an alarm is raised at the Operations and Maintenance system. The far end state of the circuit remains in an unknown state.

Figure 40:
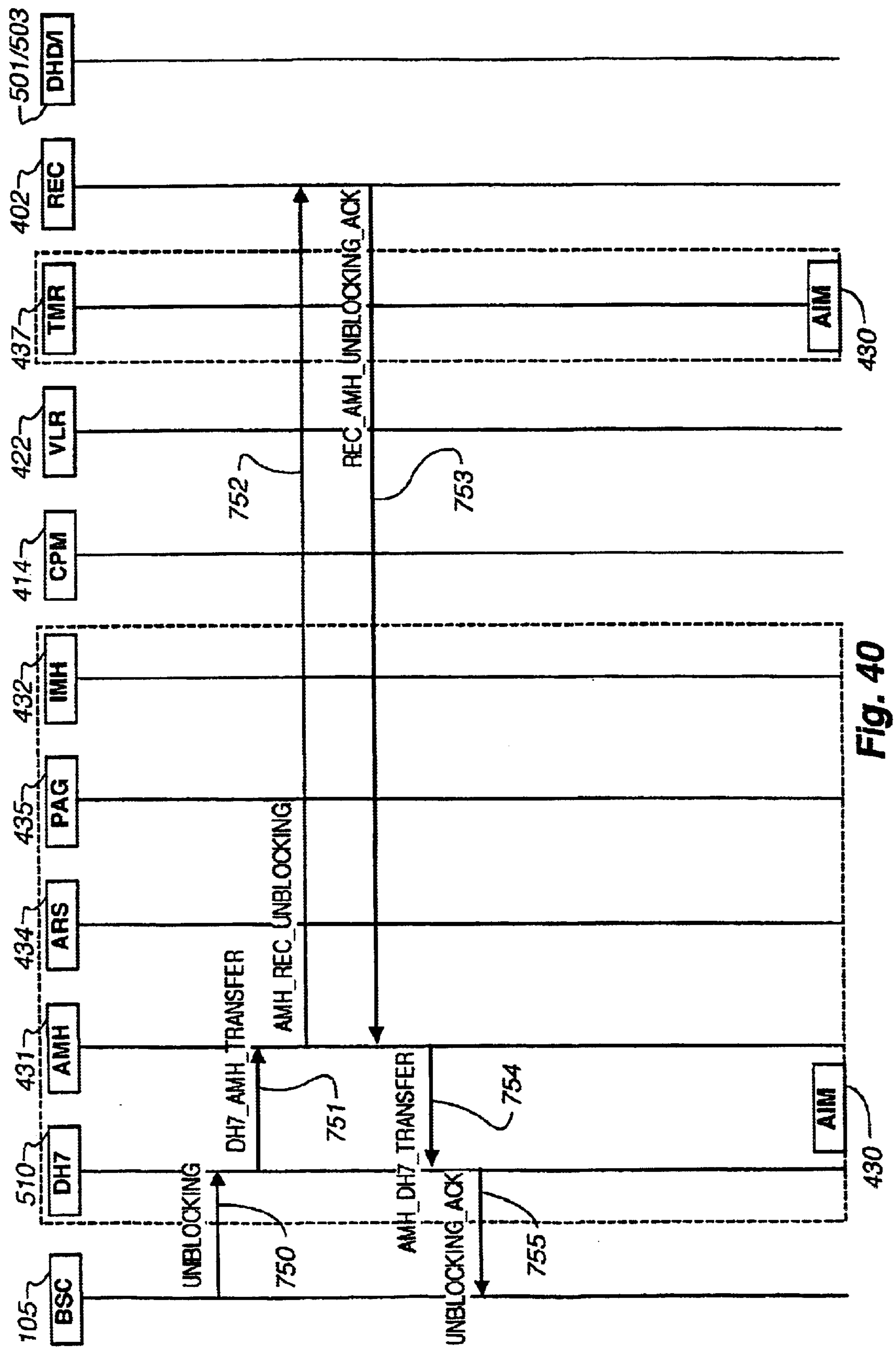

FIG. 40 shows the message flows associated with opening a trunk circuit. The message flows are similar to those in FIG. 35.

The aircore platform 200 maintains the current location of mobile customers using the VLR 422 and HLR 424. When a mobile customer enters the region serviced by the aircore platform 200, the mobile customer's mobile unit 112 will register with the aircore platform 200. FIGS. 41 through 47 show the message flows associated with this registration process.

Figure 41:
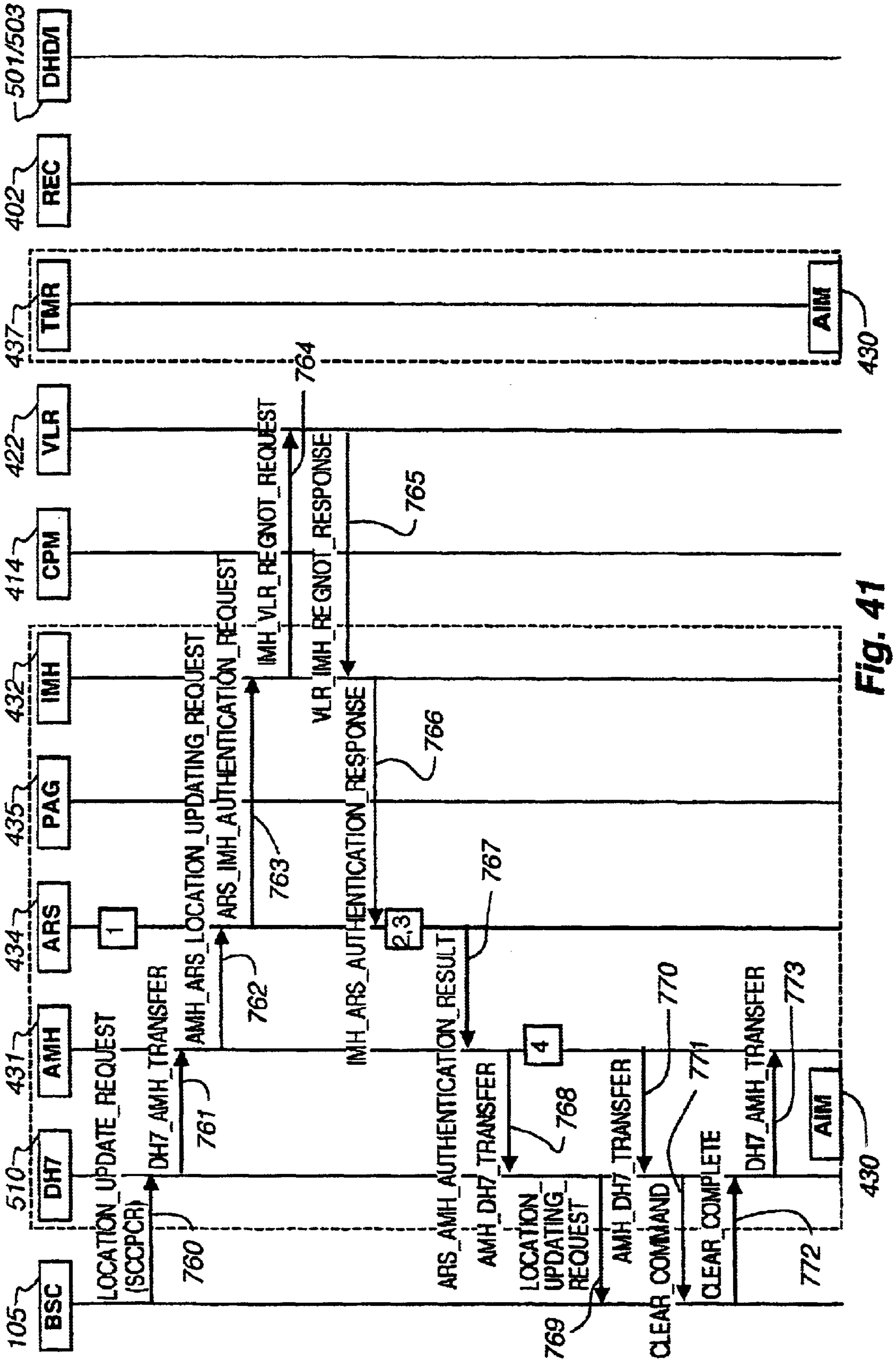
FIGS. 41–47 are flow charts showing message signaling associated with mobility management.

FIG. 41 shows the message flows associated with the successful updating by location of a mobile unit 112. The flow assumes the mobile unit's profile has been previously retrieved and is stored in the VLR 422, and therefore no interaction is shown with the HLR 424. The BSC 105 sends (760) a location update request to the aircore platform 200. The request is received at the DH-7510, which transfers (761) the update request.

At the ARS 434, the update request triggers authentication processing if the mobile unit 112 operates according to IS-41 protocols. The update request is then passed (763, 764) to the VLR 422. The VLR 422 updates the active file for the mobile unit 112 and returns a VLR registration notification response to the BSC 105. When the VLR registration notification response reaches the ARS 434, GSM authentication and ciphering are completed, if the mobile unit 112 operates according to GSM protocols. The BSC 105 receives a LOCATION_UPDATING_ACCEPT 769 message from the DH-7 510. The DH-7 510 also provides a CLEAR_COMMAND 771 to the BSC 105. At this time, GSM TMSI reallocation occurs. The BSC 105 sends a CLEAR_COMPLETE 772 to the DH-7 510, which in turn sends a DH-7_AMH_TRANSFER 773 to the AMH 431.

Figure 42:
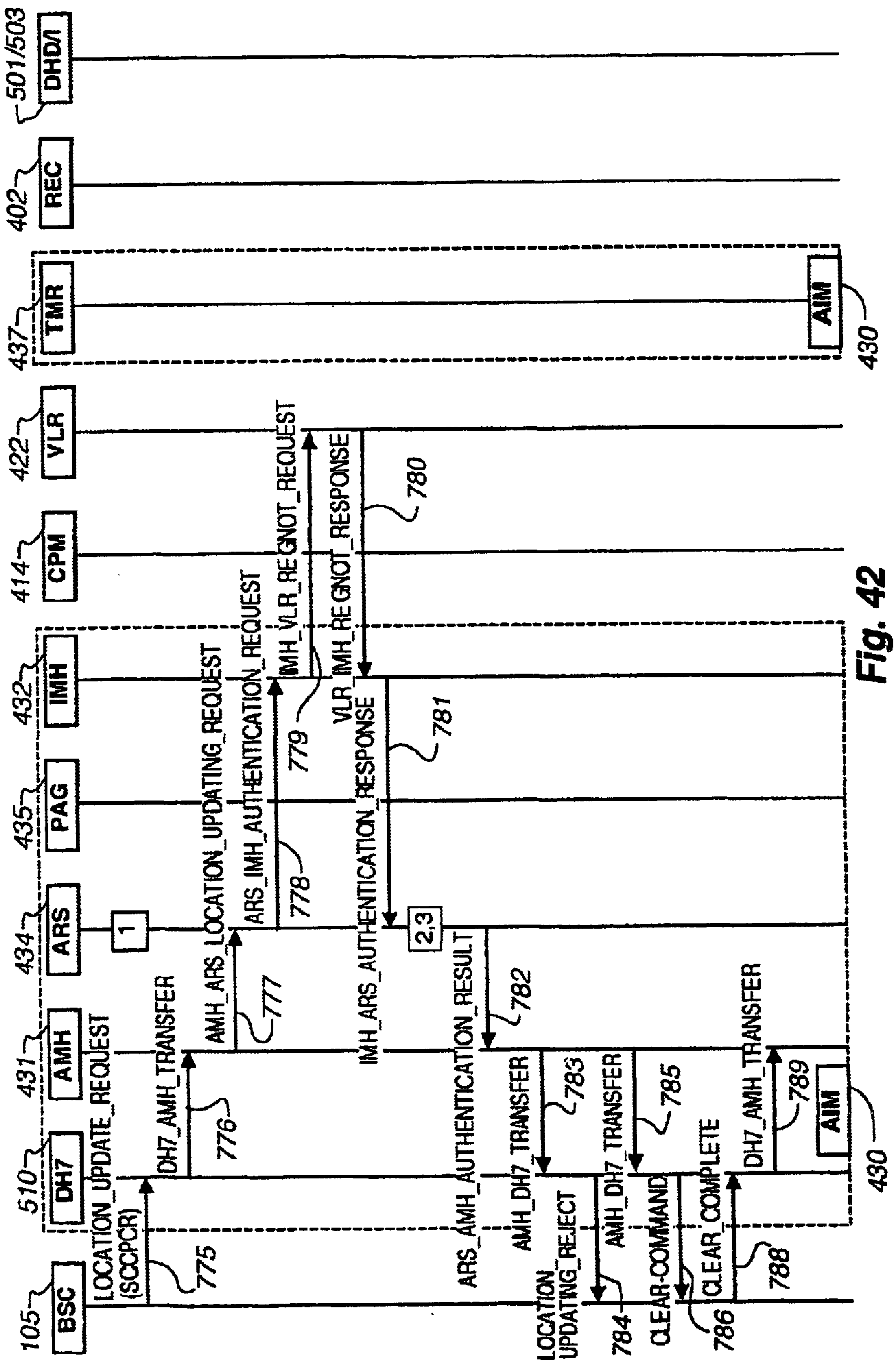
Figure 43:
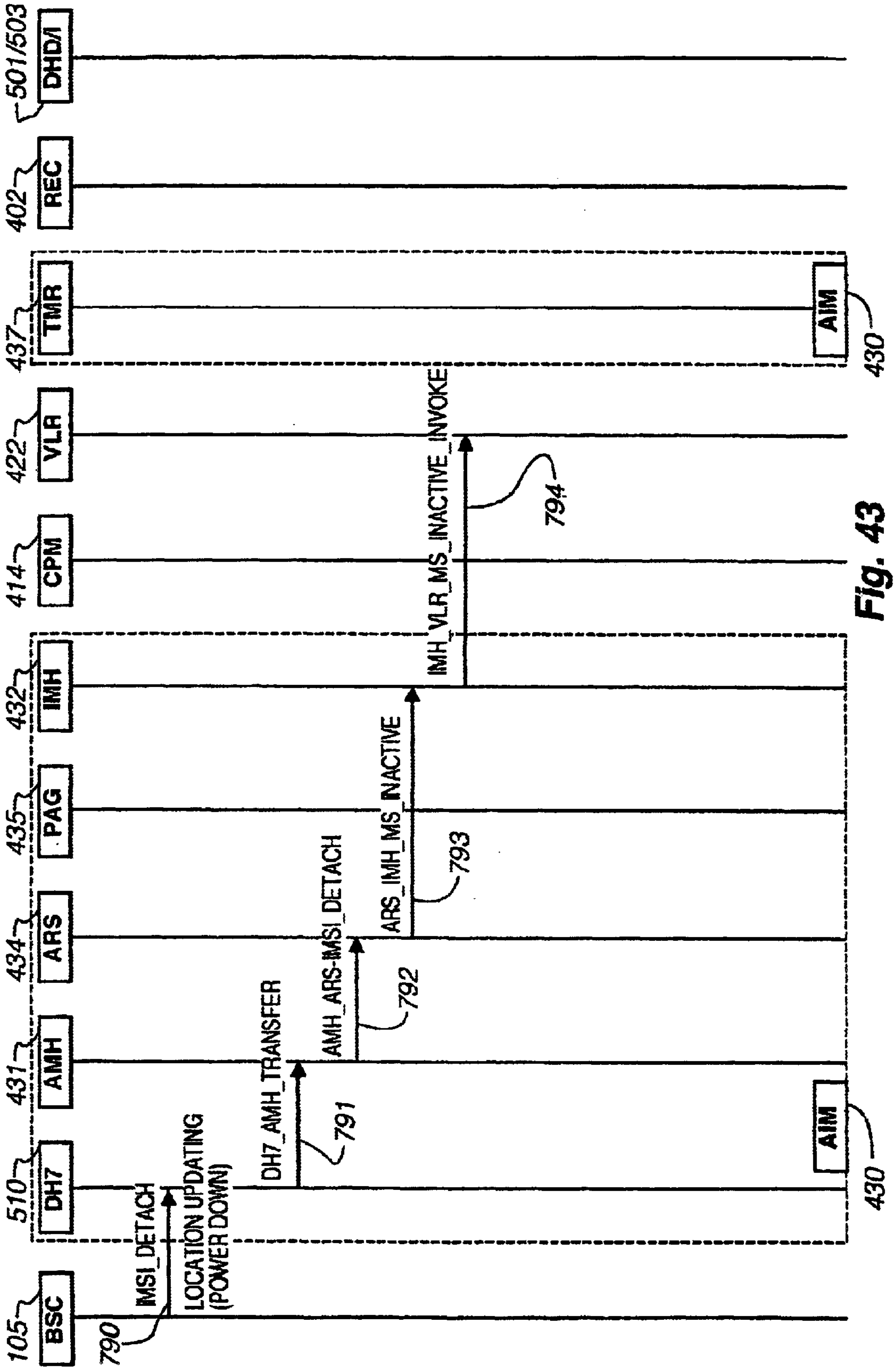

FIG. 42 shows the message flows associated with location updating in the event the registration notification request is rejected. FIG. 43 shows the message flows if the mobile unit 112 powers down while operating in the vicinity of the aircore platform 200.

Figure 44:
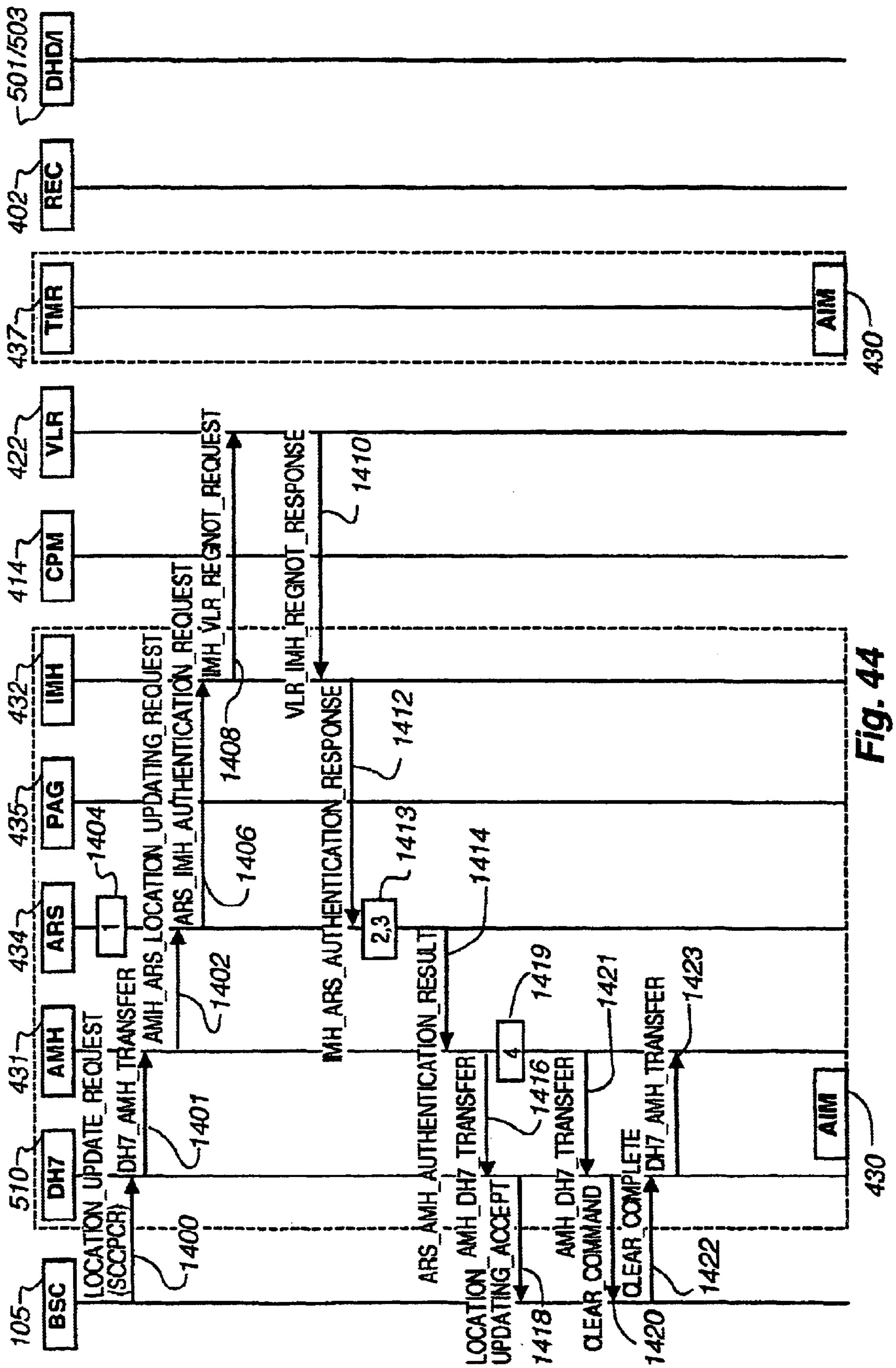

FIG. 44 shows the message flows associated with a periodic update in which the mobile unit 112 is already registered in the local VLR with the subscriber profile already having been retrieved from the HLR. The BSC 105 sends a LOCATION_UPDATE_REQUEST 1400, which is transferred (1401) to the AMH 431. The AMH 431 sends an AMH_ARS_LOCATION_UPDATING_REQUEST 1402 to the ARS 434. At this point, authentication may be performed (1404) for IS-41 protocol equipment. The ARS 1406 then sends an ARS_IMH_AUTHENTICATION_REQUEST 1406 to the IMH 432. The IMH 432 then sends an IMH_VLR_REGNOT_REQUEST 1408 to the VLR 422.

The mobile unit 112 was previously registered in the VLR 422. Therefore, the mobile unit's location is simply updated, and a VLR_IMH_REGNOT_RESPONSE 1410 is returned to the IMH 432. The IMH 432 sends an IMH_ARS_AUTHENTICATION_RESPONSE 1412 to the ARS 434, which in turn sends (1414) and authentication result to the AMH 431. The AMH 431 then sends (1416) a LOCATION_UPDATING_ACCEPT 1418 to the BSC 105. The aircore platform 200 may also perform GSM authentication and ciphering (1413) and TMSI reallocation (1419).

The AMH 431 sends (1421) a CLEAR_COMMAND 1420 to the BSC 105. The BSC 105 returns a CLEAR_COMPLETE 1422 to the DH-7 510, which sends a DH7_AMH_TRANSFER 1423 to the AMH 431.

Figure 45:
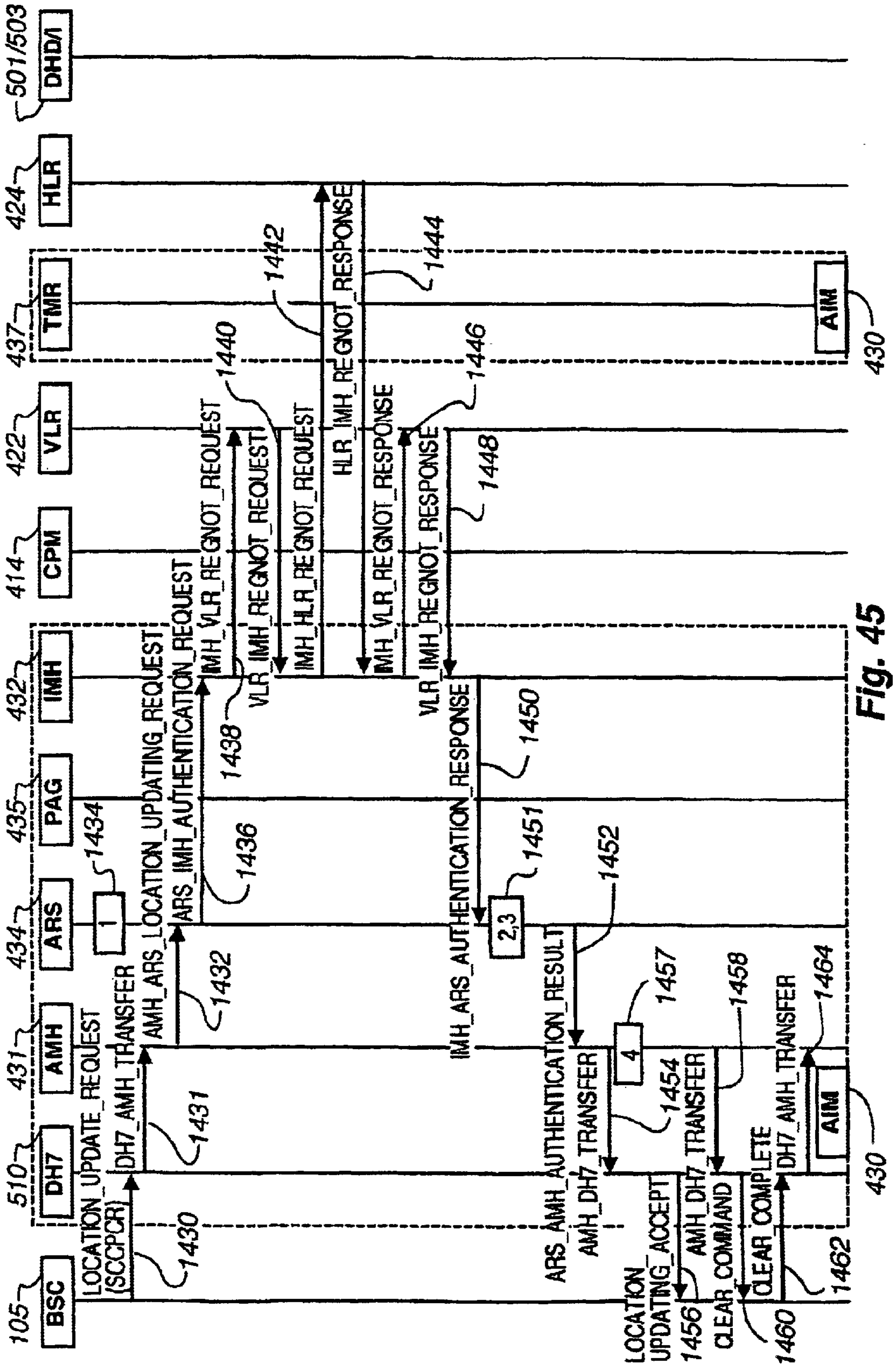

FIG. 45 shows the message flows associated with location updating in which the mobile unit is not currently listed in the local VLR, but is listed in the local HLR. The initial message flows 1430–1438 are the same as shown in FIG. 44 (1400–1408), including authentication (1434) for IS-43 protocol systems. However, the mobile unit 112 is not listed in the VLR 422. The VLR 422 returns a VLR_IMH_REGNOT_RESPONSE 1440 that indicates the mobile unit 112 is not registered in the VLR 422. In response, the IMH 432 sends an IMH_HLR_REGNOT_REQUEST 1442 to the HLR 424. The mobile unit 112 is registered in the HLR 424, and the HLR 424 returns an HLR_IMH_REGNOT_RESPONSE 1444 to the IMH 432. The IMH 432 then sends an IMH_VLR_REGNOT_RESPONSE 1446 to the VLR 422 to register the mobile unit 112 in the VLR 422. In response, the VLR 422 returns a VLR_IMH_REGNOT_RESPONSE 1448 to the IMH 432 to indicate that the mobile unit 112 is registered in the VLR 422. The remaining message flows (1450–1464) are similar to those (1412–1422) shown in FIG. 44.

Figure 46:
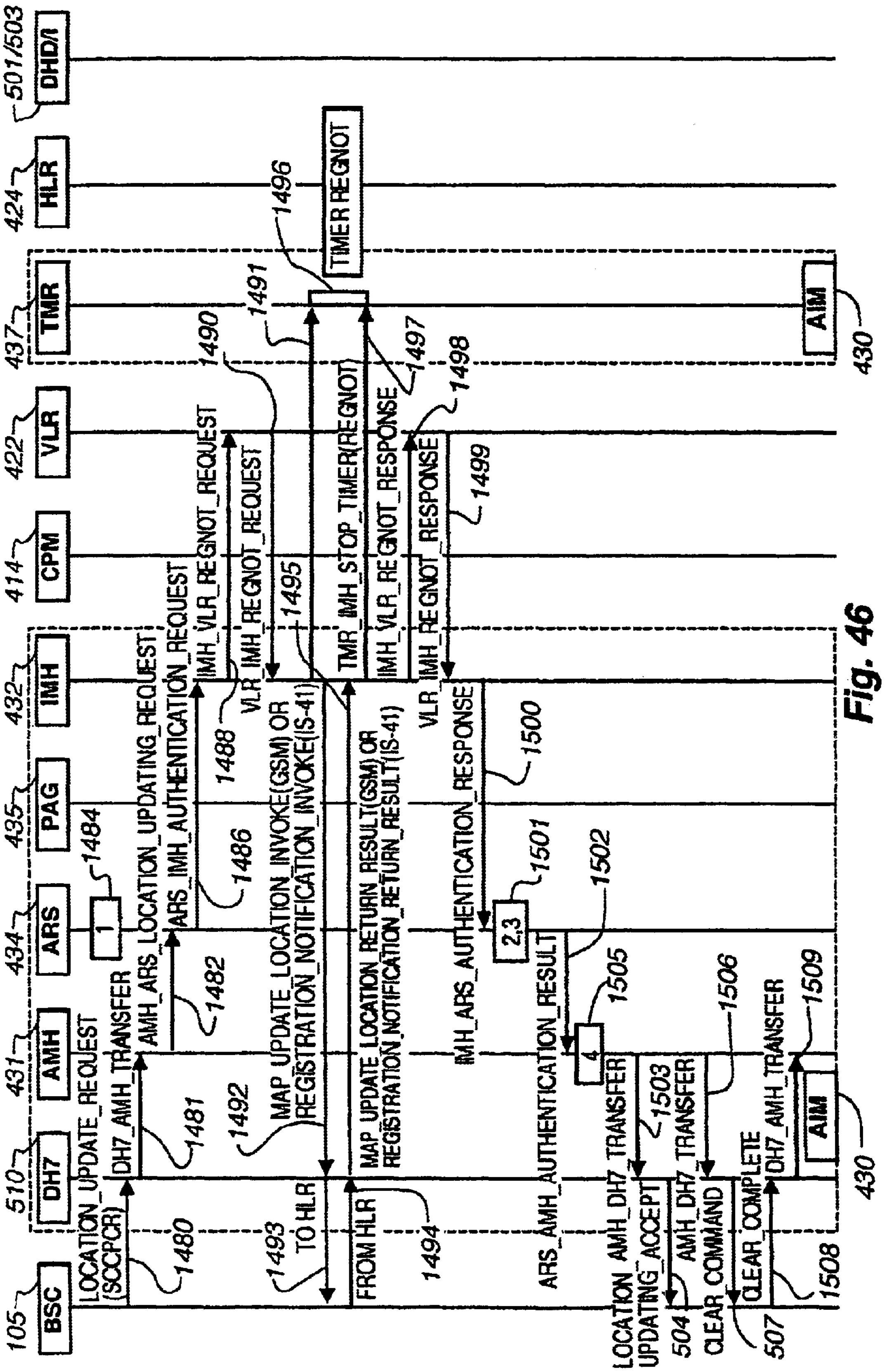

FIG. 46 shows the message flows when the IMH 432 determines that the mobile unit 112 is homed to an external HLR. The IMH 432 makes this determination based on an identification of the mobile unit 112 that is provided with the initial location update request messages. In FIG. 46, the initial message flows (1480–1488) are similar to those shown in FIG. 44. The VLR 422 notifies the IMH 432 that the mobile unit 112 is not registered in the VLR 422. Based on the identification of the mobile unit 112, the IMH 432 then determines that the mobile unit 112 is registered in an external HLR. The identification is used to locate the external HLR. The IMH 432 sends a MAP_UPDATE_LOCATION_INVOKE (GSM) or a REGISTRATION_NOTIFICATION_INVOKE (IS-41) 1492, 1493 to the external HLR. The IMH 432 also sets a REGNOT timer 1496. The external HLR returns (1494) a MAP_UPDATE_LOCATION_RESULT (GSM) or a REGISTRATION_NOTIFICATION_RETURN_RESULTS (IS-41) 1495 to the MSC 210. The IMH 432 releases the REGNOT timer 1496 and sends an IMH_VLR_REGNOT_RESPONSE 1498 to the VLR 422, causing the mobile unit 112 to be registered in the VLR 422. The VLR 422 then returns a VLR_IMH_REGNOT_RESPONSE 1499 to the IMH 432. The remaining message flows (1500–1509) are similar to those shown in FIG. 44.

Figure 47:
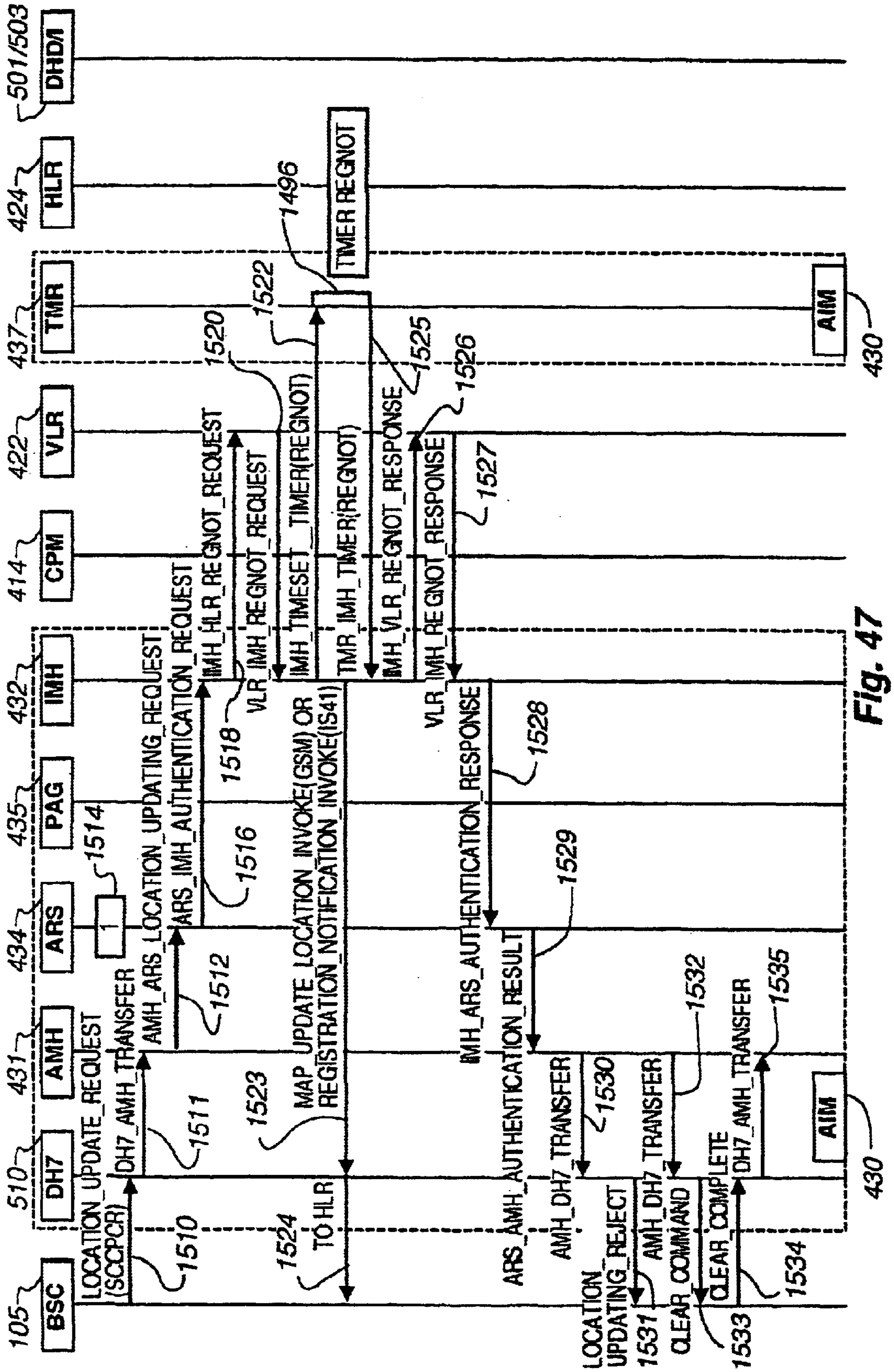

FIG. 47 shows the message flows when the IMF 432 determines that the mobile unit 112 is homed to an external HLR, but the REGNOT timer 1496 times out before the external HLR returns a response. The IMH 432 makes this determination based on an identification of the mobile unit 112 that is provided with the initial location update request messages. In FIG. 47, the initial message flows (1510–1524) are similar to those shown in FIG. 46. When the REGNOT timer 1496 times out, the TMR 437 sends a TMR_IMH_TIMRR(REGNOT) 1525 to the IMH 432. The channel is cleared (1526–1535) in a manner similar to that in FIG. 47.

Figure 48A:
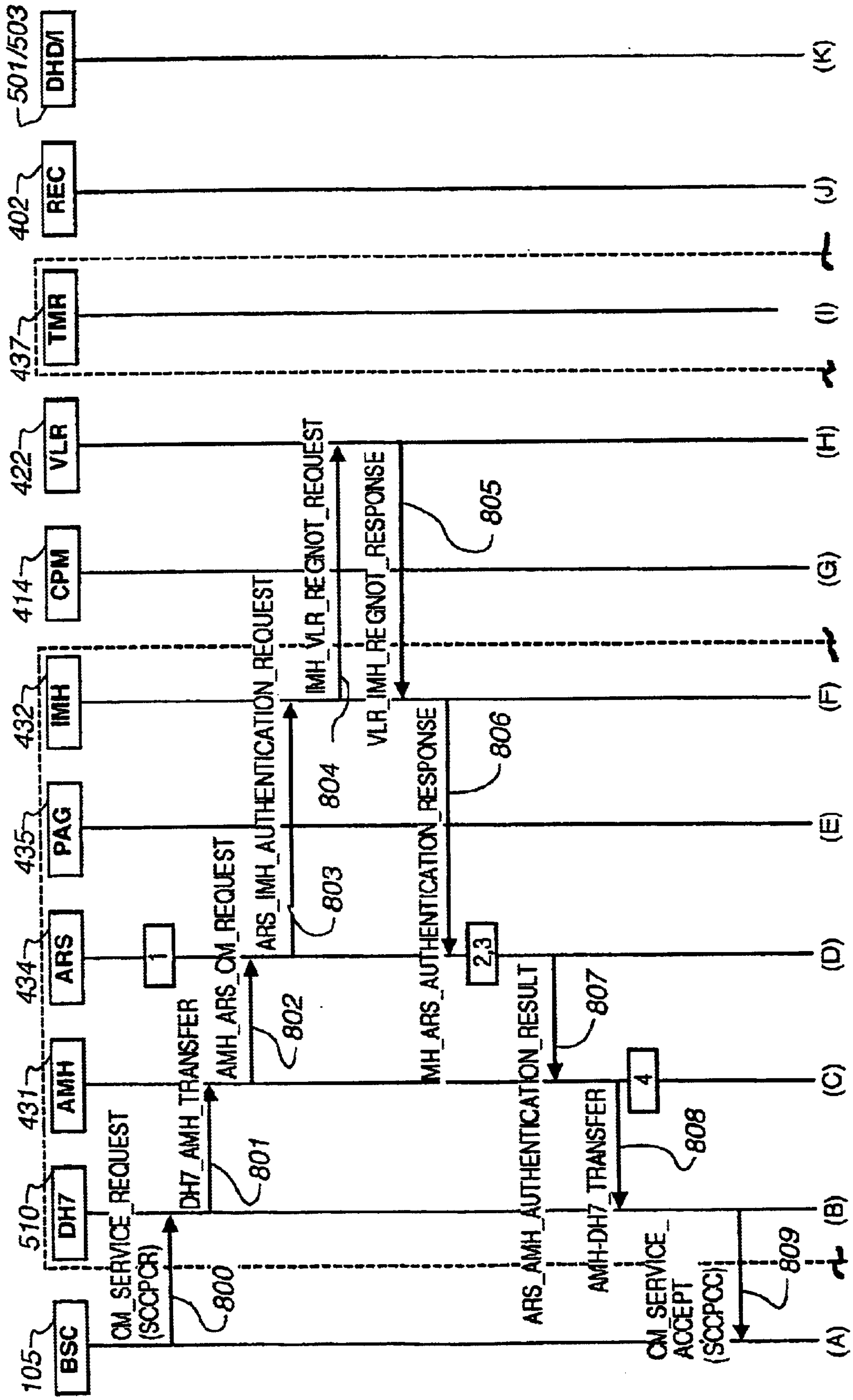
FIGS. 48A–66 are flow charts showing message signaling for call processing.
Figure 48B:
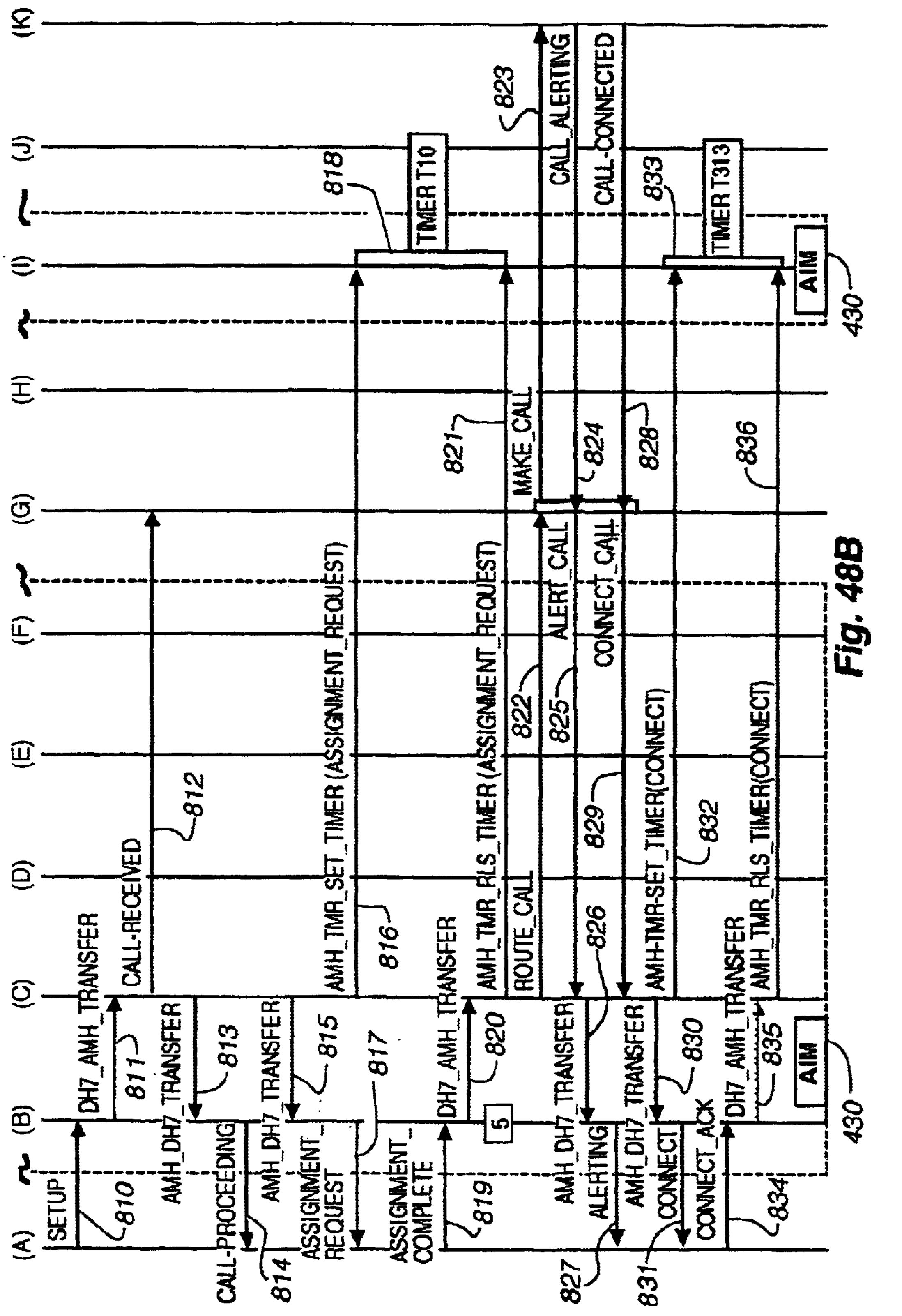

FIGS. 48A–71B show the message flows associated with call processing. FIGS. 48A–B are a flow chart for a mobile originated call. The mobile originated call begins when the BSC 105 receives an indication from the mobile unit 112 that the mobile unit 112 will originate a call. The BSC 105 may receive the number of the called party that was dialed at the mobile unit 112.

The BSC 105 transmits a CM_SERVICE_REQUEST 800 to the aircore platform 200 where the message is received and processed by the DH-7 510. The DH-7 510 establishes the SS-7 link and ensures proper message routing for the inbound message. The DH-7 510 sends a DH-7_AMH_TRANSFER 801 to the appropriate AMH 431 (either the GSM or the IS 634 thread). The AMH 431 sends an AMH_ARS_CM_SERVICE_REQUEST 802 to the ARS 434.

The ARS 434 provides the appropriate calculations and processing to authenticate the given base station interface. The ARS 434 then sends an ARS_IMH_AUTHENTICATION_REQUEST 803 to the appropriate IMH 432. The IMH 432 sends an IMH_VLR_REGNOT_REQUEST 804 to the VLR 422 to notify the VLR 422 of the incoming call. The VLR 422 registers the mobile unit 112 as an active unit and then sends a VLR_IMH_REGNOT_RESPONSE 805 to the appropriate IMH 432. The IMH 432 sends an IMH_ARS_AUTHENTICATION_RESPONSE 806 to the ARS 434. If the mobile unit 112 uses a GSM protocol, GSM authentication and ciphering are completed at this point.

The ARS 434 sends an ARS_AMH_AUTHENTICATION_RESULT 807 to the AMR 431 and the appropriate AMH 431 sends an AMH_DH-7_TRANSFER 808 to the DH-7 510. The DH-7 510 sends a CM_SERVICE_ACCEPT 809 to the BSC 105 indicating to the BSC 105 that the mobile unit 112 is allowed to proceed with the call processing using the aircore platform 200.

During the above-described processing for a GSM protocol mobile unit, the ARS assigns the call a temporary mobile subscriber identity (TMSI). The TMSI is calculated based on an index in the VLR 422, the time of day, and the identity (IMSI) of the mobile unit 112. The TMSI provides additional security so that if the mobile call is tapped, the identity of the calling mobile party cannot be determined.

In FIGS. 48A–B, the mobile call process then proceeds to the call setup stage and the BSC 105 transmits a SETUP 810 to the DH-7 510. The SETUP 810 includes the call number and an identity of the mobile customer. The DH-7 510 transfers the information to the appropriate AMH 431 by sending a DH-7_AMH_TRANSFER 811. The AMH 431 then notifies the CPM 414 that a mobile originated call has been received by sending a CALL_RECEIVED 812. When the CPM 414 is notified that the mobile call has been received, the CPM 414 allocates a voice channel for a mobile call to carry the voice between the aircore platform 200 and the BSC 105. The mobile call is assigned a session number and each party of the mobile call is assigned an object of the mobile call.

The AMH 431, the DH-7 510 and the BSC 105 communicate through a series of messages 813–821 that the call assignment request has been made and completed. During this processing, a T10 timer 818 is used to time out the call in the event a voice channel cannot be readily assigned. Once the channel assignment is complete and the radio and voice channels are assigned, the AMH 431 sends a ROUTE_CALL 822 to the CPM 414, informing the CPM 414 to proceed with the call because all of the incoming wireless communication requirements have been established. The CPM 414 determines, based on the number that is to be dialed out, what facility the call should go to and in what format. The CPM 414 sends a MAKE_CALL 823 to the appropriate device handler (DHD 501, DHI 503 or DH-7 510) for a land-based or wired call. If the number to be dialed is for a mobile unit, the CPM 414 sends a location request (not shown) through the IMH 432 to the HLR 424 to find out where the called mobile customer is.

As shown in FIGS. 48A–B, the device handler returns a CALL_ALERTING 824 to the CPM 414 indicating an attempt to connect to the called party. The alerting message is then passed to the BSC 105 using an ALERT_CALL 825, AMH_DH-7_TRANSFER 826 and an ALERTING 827.

After the MAKE_CALL 823 is transmitted, the called party should return a signal to the appropriate device handler, which then sends a CALL_CONNECTED 828 to the CPM 414. The CPM 414 sends a CONNECT_CALL 829 to the AMH 431, which propagates as a CONNECT 831 to the BSC 105. At the same time, the AMH 431 sets a T313 timer 833 using a AMH_TMR_SET_TIMER (CONNECT) 832 to the TMR 437. The TMR 437 then waits for a connection acknowledgment that indicates the called party and the calling party are connected. In particular, the BSC 105 sends a CONNECT_ACK 834 to the DH-7 510, and the connect acknowledgment is propagated (835) to the AMH 431. The AMH 431 then releases the T313 timer 833 by sending an AMH_TMR_RECS_TIMER (CONNECT) 836 to the TMR 437. At this point, the mobile originated call is connected.

Figure 49A:
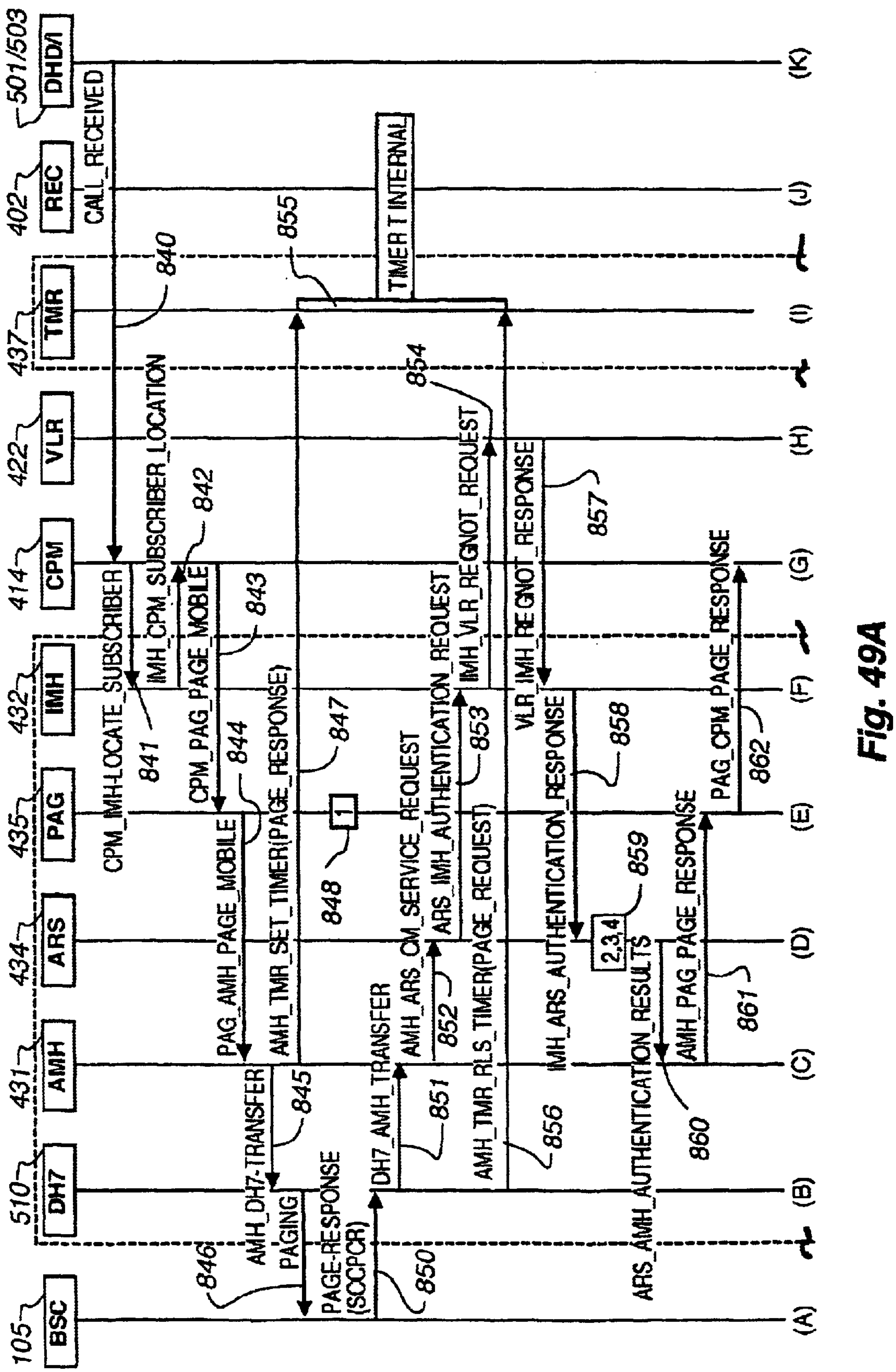
Figure 49B:
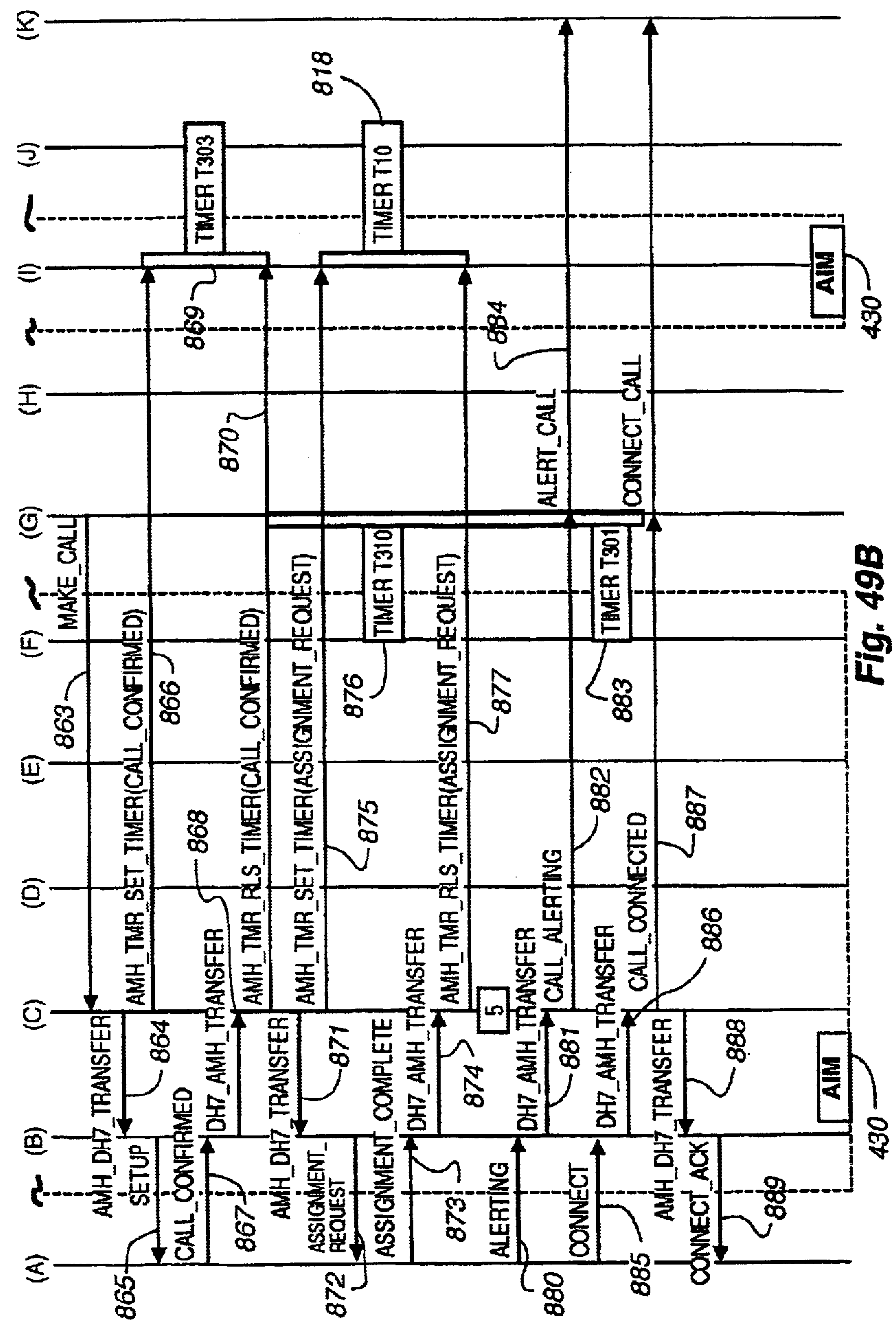

FIG. 49 shows call processing for normal mobile termination. The aircore platform 200 receives a call at a device handler 501 or 503. The device handler sends a CALL_RECEIVED 840 to the CPM 414. The CPM 414 forwards a CPM_IMH LOCATE_SUBSCRIBER 841 to the IMH 432 initiating a subscriber location action (not shown) in which the HLR 424 (not shown) is queried to determine the location of the called mobile unit 112. The IMH 432 returns an IMN_CPM_SUBSCRIBER LOCATION 842 to the CPM 414 indicating the location of the mobile 112 unit within the wireless area served by the aircore platform 200.

The CPM 414 then initiates a CPM_PAG_PAGE_MOBILE 843 to the PAG 435 to page the called mobile unit 112. The called mobile unit 112 is then paged (845, 846) and returns a response (850–852). At the same time, the AMH 431 initiates a timer 855 that will timeout the page request if a page response from the mobile unit 112 is not received within a set time period.

As shown in FIG. 49, once the page response is received, the ARS 434 initiates an ARS_IMH_AUTHENTICATION_REQUEST 853 to the IMH 432. The IMH 432 sends an IMH_VLR_REGNOT_REQUEST 854 to the VLR 422 to retrieve the profile information from the VLR 422 for the mobile unit 112. The VLR 422 returns a VLR_IMH_REGNOT_RESPONSE 857 containing the requested data for the mobile unit 112 in the VLR 422.

During the time period that the mobile unit 112 is being paged and the authentication and registration notification messages are being passed, authentication and ciphering, may occur. In particular, for IS-41 protocol systems, authentication may occur at block 848. For GSM protocol systems, GSM authentication, ciphering and TSMI reallocation may occur at block 859.

As shown in FIG. 49, when the AMF 431 receives the authentication result, the AMH 431 initiates an AMH_PAG_PAGE_RESPONSE 861 which is passed (862) to the CPM 414. The CPM 414 then initiates a MAKE_CALL 863. The aircore platform 200 then proceeds to call setup, channel assignment, alerting, call connection and call connection acknowledgment (864–889).

Figure 50:
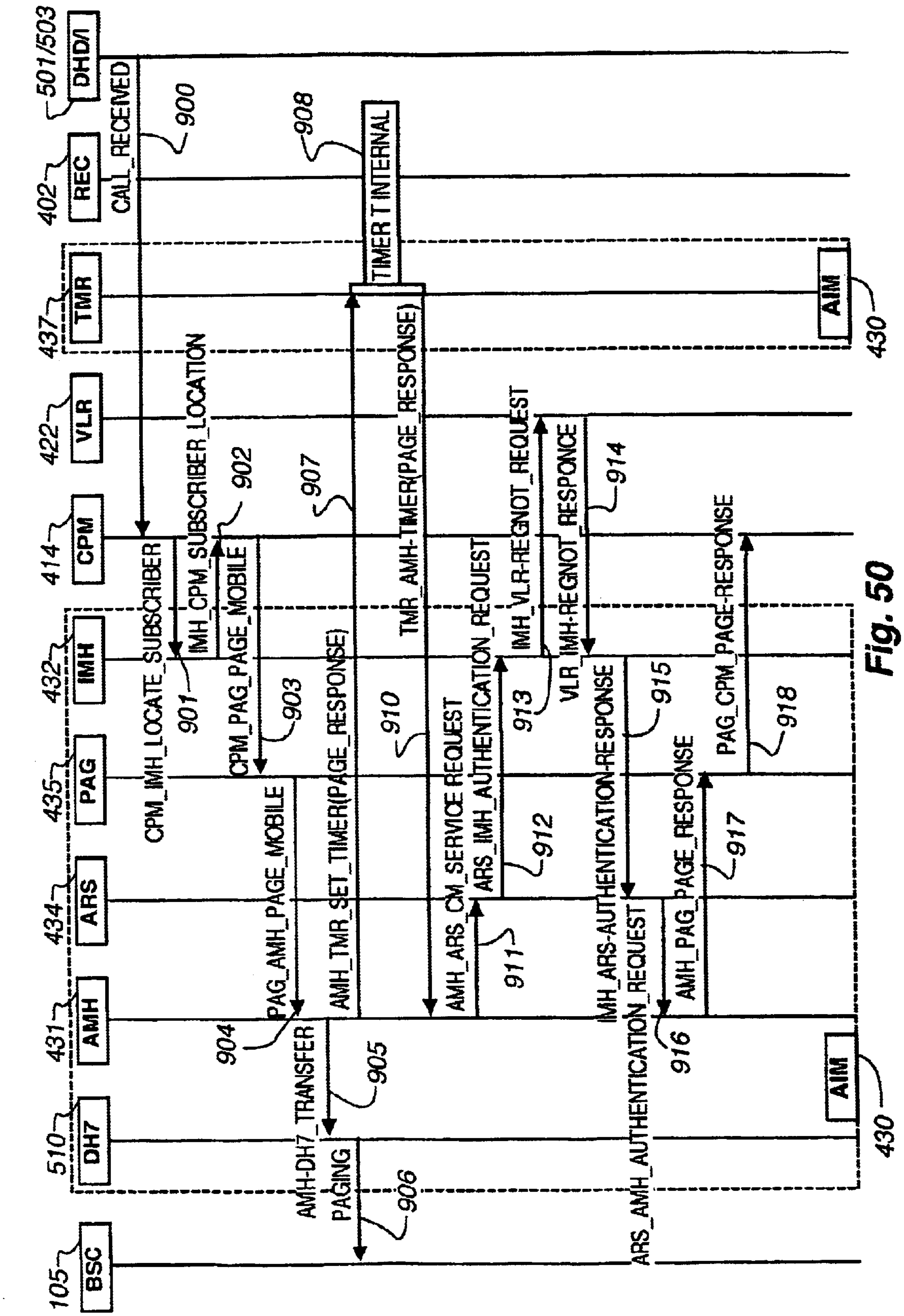

FIG. 50 shows a mobile terminated call in which no response is received to the PAGE_MOBILE message, and the page timer times out. In FIG. 50, the messages 900–906 are similar to messages 840–846 of FIG. 49. An AMH_TMR_SET_TIMER (PAGE_RESPONSE) 907 is sent by the AMH 431 to the TMR 437. When the AMH 431 fails to receive a response to the page request, the timer 908 times out in the TMR 437, and the TMR 437 sends a TMR_AMH_TIMER (PAGE_RESPONSE) 910 to the AMH 431. The AMH 431 then initiates a series of messages 911 to 916 to update the VLR 422. The CPM 414 receives a PAGE_CPM_PAGE_RESPONSE 918 indicating no response to the mobile page, and as a result the CPM 414 does not issue a MAKE_CALL message.

Figure 51:
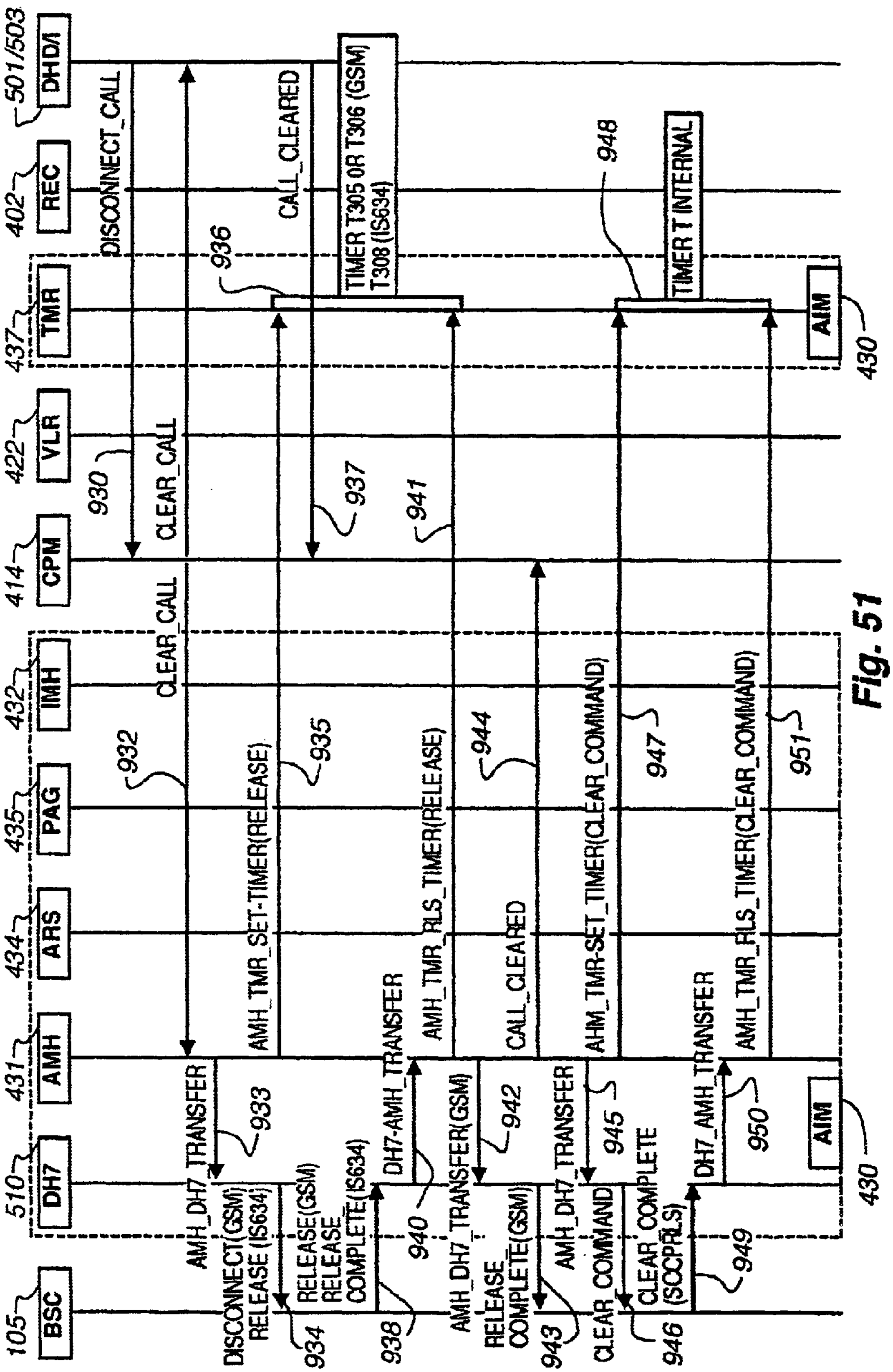

FIG. 51 shows the message flows associated with a PSTN initiated disconnect. The device handler (DHD 501 or DHI 503) receives a disconnect signal from a telephone or other device connected to the PSTN. The device handler sends a DISCONNECT_CALL 930 to the CPM 414, which returns a CLEAR_CALL 932 to the device handler and issues the CLEAR_CALL to the AMH 932. As a result, a DISCONNECT (GSM) or RELEASE (IS-634) 934 is sent to the BSC 105, which returns a RELEASE (GSM) or RELEASE_COMPLETE (IS-634) 938. A T305 or T306 (GSM) or T308 (IS-634) timer 936 is also set in the TMR 437, and if the RELEASE or RELEASE_COMPLETE 938 is not received before expiration of the timer 936, the channel is released.

Once the RELEASE or RELEASE_COMPLETE 938 is received, the AMH 431 sends a CALL_CLEARED 944 to the CPM 414, and a RELEASE_COMPLETE 943 is sent to the BSC 105. The DH-7510 then sends a CLEAR_COMMAND 946 to the BSC 105, and an internal timer 948 is set in the TMR 437. The BSC 105 returns a CLEAR_COMPLETE 949, and the internal timer 948 is released.

Figure 52:
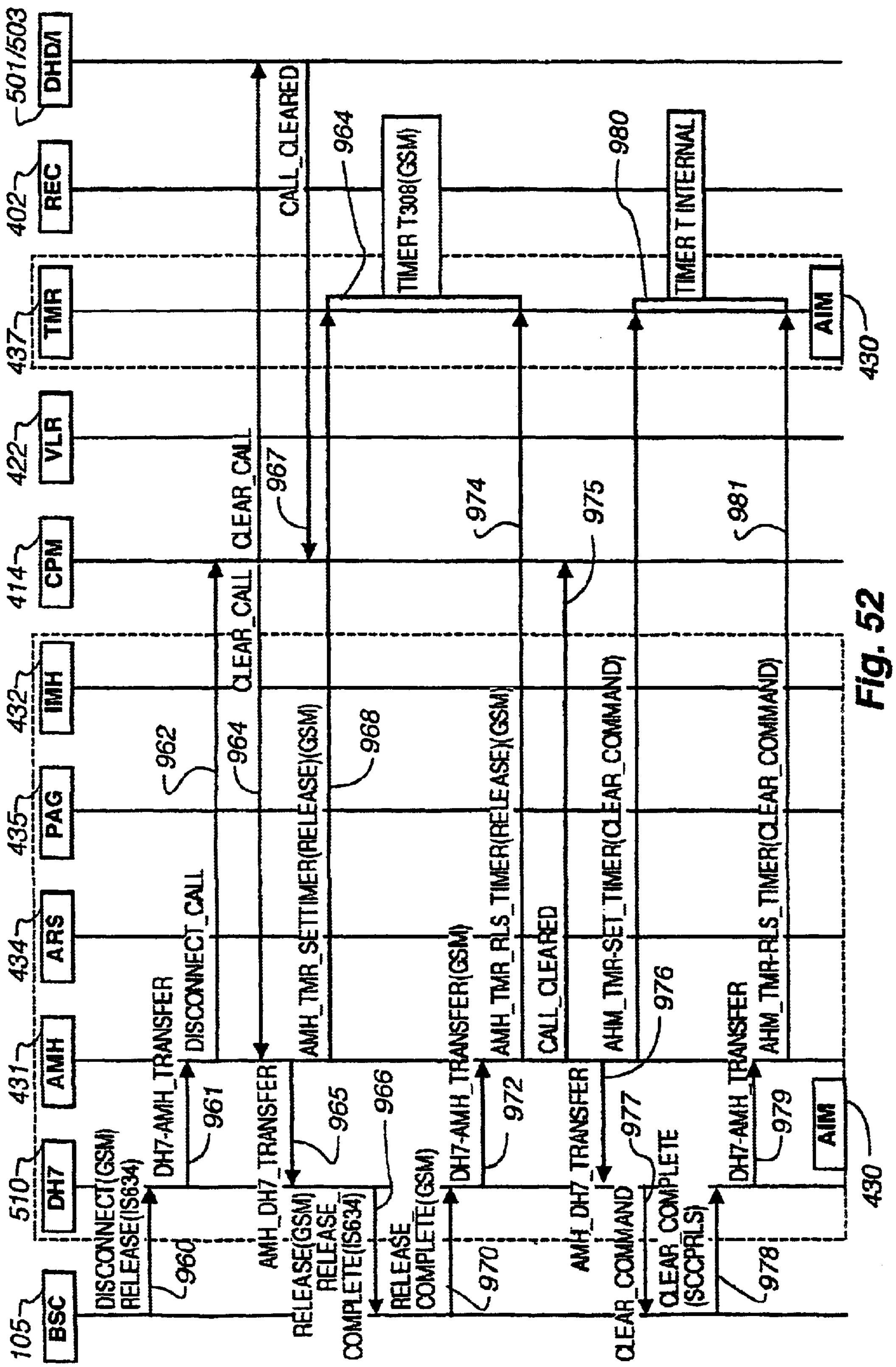

FIG. 52 shows a mobile originated disconnect. A DISCONNECT (GSM) or RELEASE (IS-634) 960 is received at the DH-7 510 from the BSC 105. The DH-7 510 transfers the message to the AMH 431, which initiates a DISCONNECT CALL 962 to the CPM 414. The CPM 414 initiates a CLEAR_CALL 964 to the AMH 431 and the device handler 501 or 503. The AMH 431 transfers (965) the CLEAR_CALL 964 command to the DH-7 510, which initiates a release (GSM) or RELEASE COMPLETE(IS-634) 966. The device handler 501 or 503 sends a CALL_CLEARED 967 to the CPM 414. The AMH 431 also initiates a T308 timer 964 (GSM) to clear the channel in case a RELEASE_COMPLETE message is not received from the mobile unit 112 within the time period set by the T308 timer 964. The BSC 105 returns a RELEASE_COMPLETE (GSM) 970 to indicate that the mobile unit 112 has completed disconnect, and the AMH 431 releases the T308 timer 964 and sends a CALL_CLEARED 975 to the CPM 414. The AMH 431 sends an AMH_DH-7_TRANSFER 967 to the DH-7 510, which initiates a CLEAR_COMMAND 977 to the BSC 105. The AMH 431 also sets an internal timer 980 to clear the channel in the event that a CLEAR_COMPLETE message is not received from the BSC 105. The BSC 105 then initiates a CLEAR_COMPLETE 978 and the AMH 431 releases (981) the internal timer 980.

Figure 53:
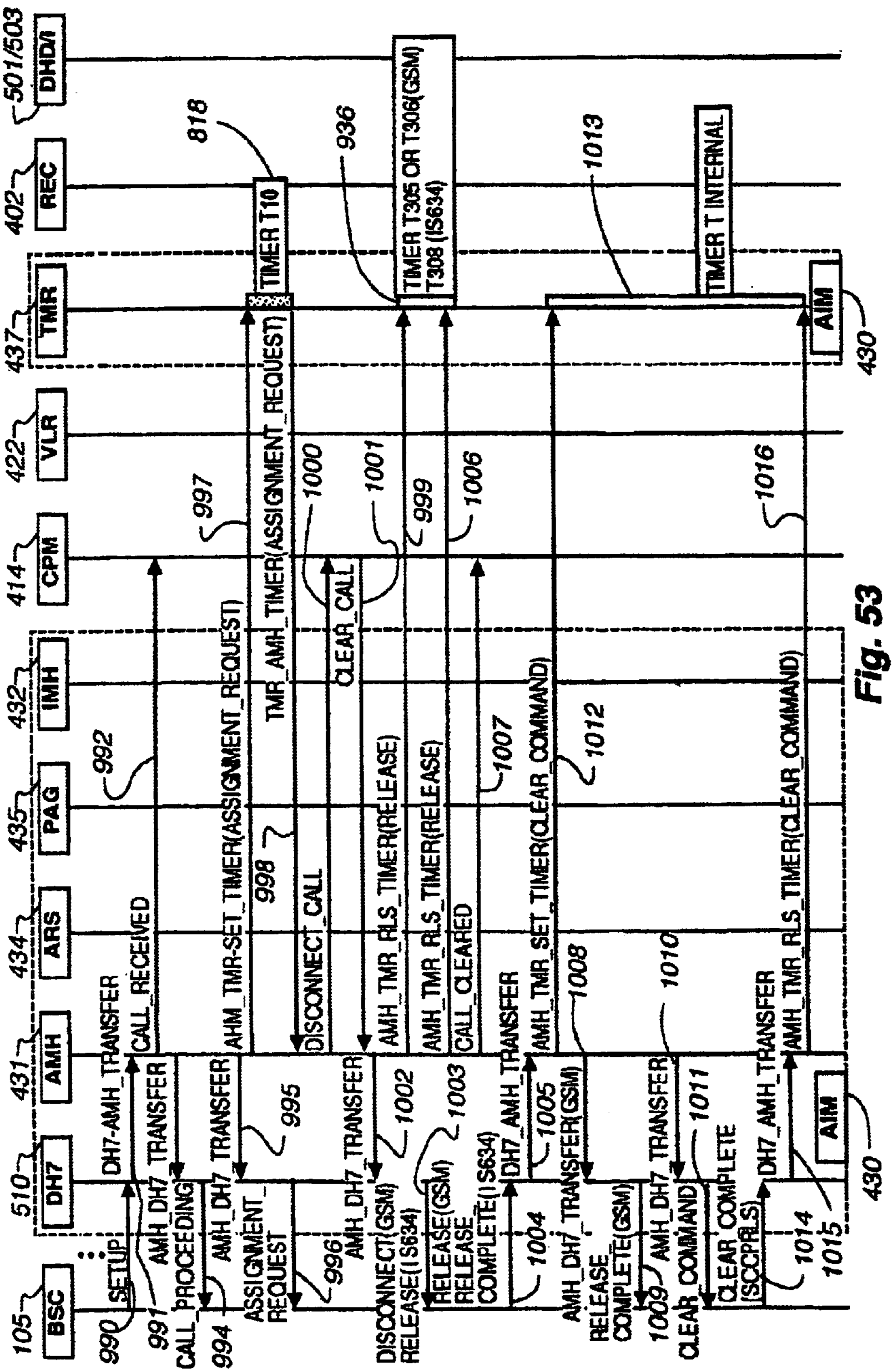

Occasionally, a base station may not return a response to the MSC 210 within the timeout specified. The message flows for this situation is shown in FIG. 53. The message flow begins after the service request message flows shown in FIGS. 48A–B (messages 800–809) are completed. A SETUP 960 is sent from the BSC 105 and in response, the AMH 431 sends a CALL_RECEIVED 991 to the CPM 414 and sets the T10 timer 818. Because the BSC 105 does not return a response to the ASSIGNMENT_REQUEST 996, the T10 timer 818 times out and the AMH 431 sends a DISCONNECT_CALL 1000 to the CPM 414 to initiate a clear call sequence. The CPM 414 sends a CLEAR_CALL 1001 to the AMH 431, which is passed (1002) to the BSC 105 as a DISCONNECT (GSM) or RELEASE (IS-634) 1003. The AMH 431 also sets (999) a channel release timer 936 in order to release the channel if the BSC 105 does not respond to the DISCONNECT 1003.

The BSC 105 then sends a RELEASE (GSM) or RELEASE_COMPLETE (IS-634) 1004, which is transferred (1005) to the AMH 431. The AMH 431 releases (1006) the timer 936, sends a CALL_CLEARED 1007 to the CPM 414, and sends (1008) a RELEASE_COMPLETE 1009 (GSM) to the BSC 105. The AMH 431 then sends (1010) a CLEAR_COMMAND 1011 to the BSC 105 and sets (1012) an internal timer 1013. The BSC 105 returns a CLEAR_COMPLETE 1014, which is transferred (1015) to the AMH 431, which then releases (1016) the internal timer 1013.

Figure 54A:
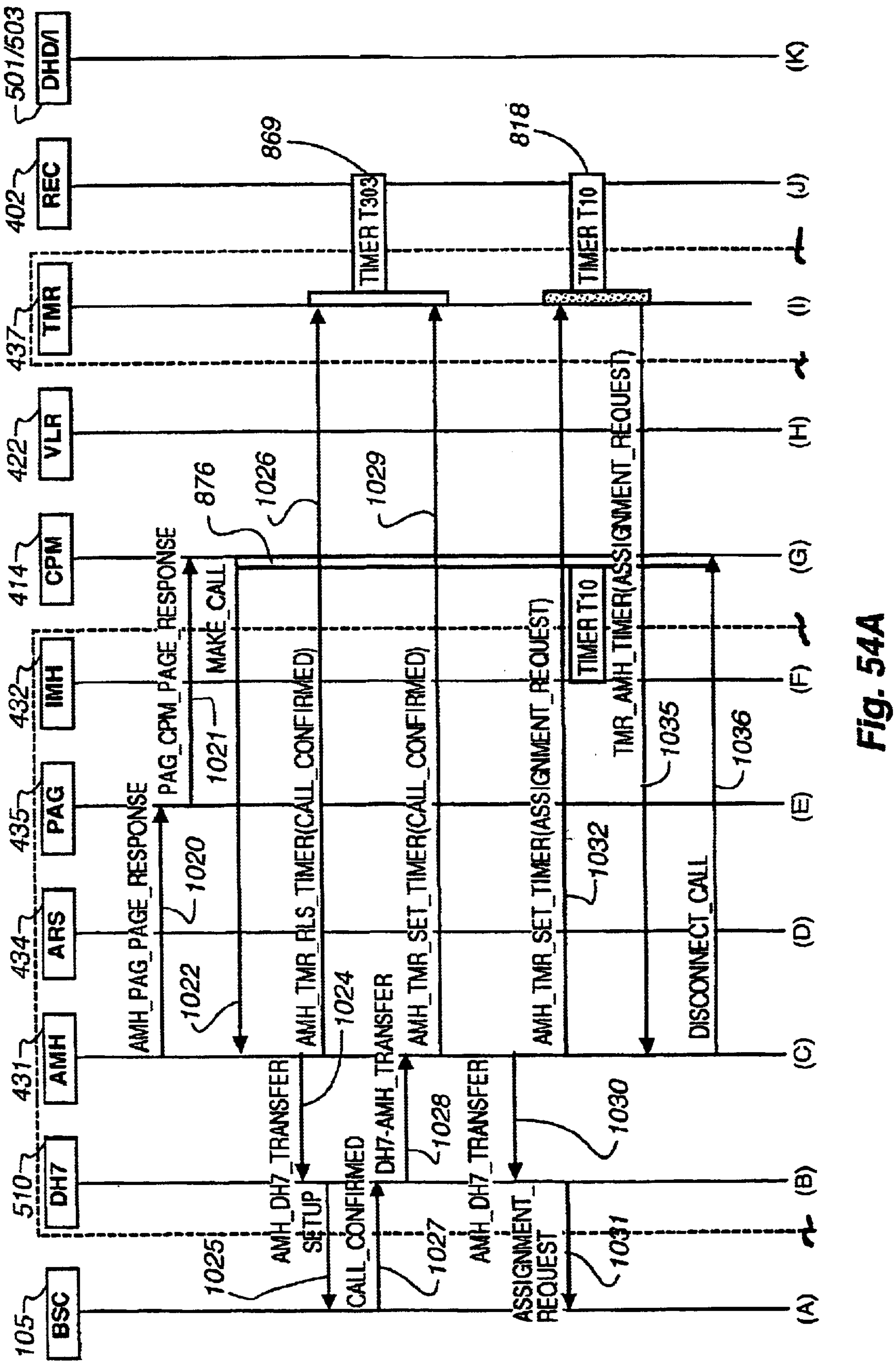
Figure 54B:
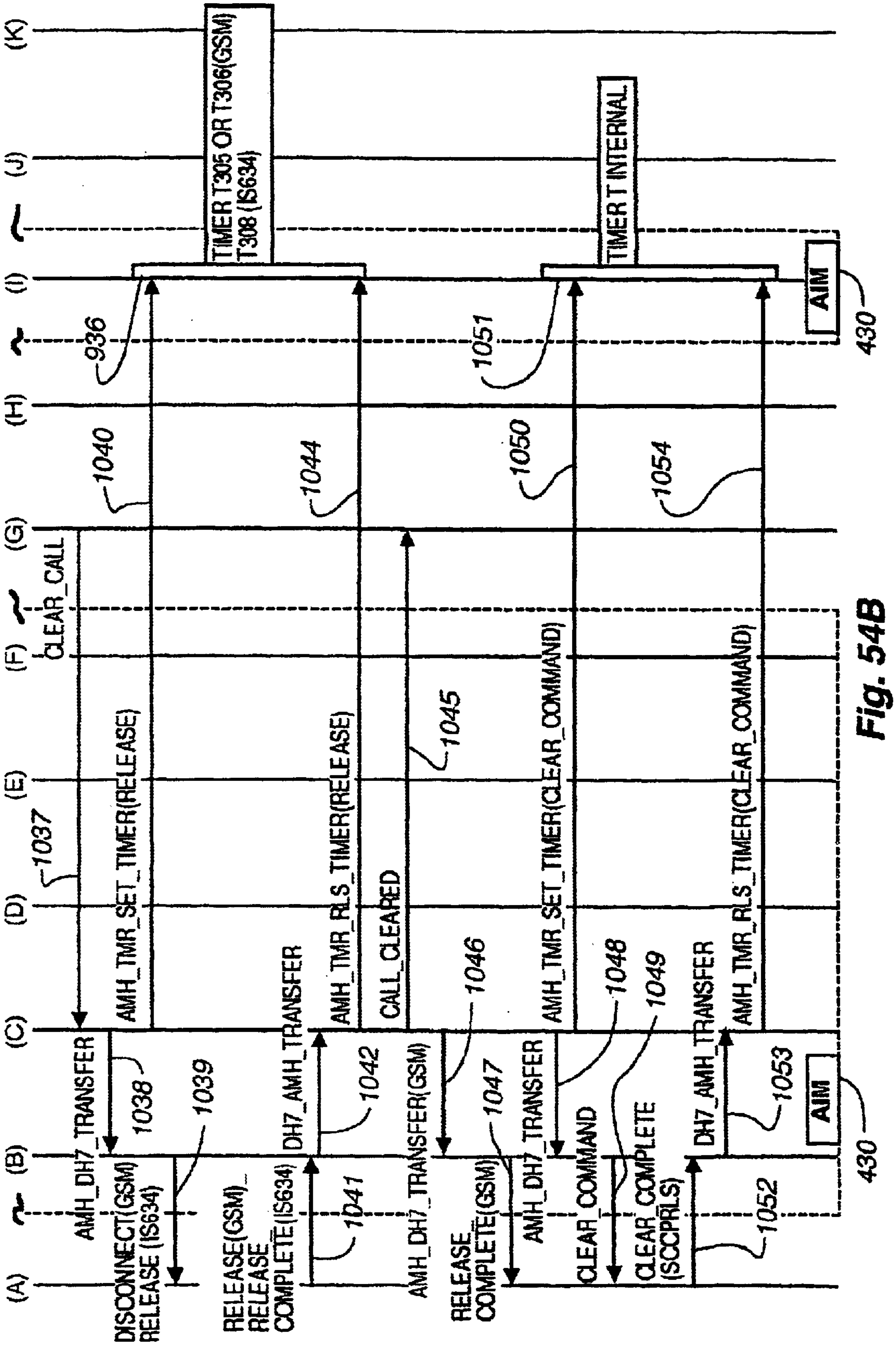

FIG. 54 shows the sequence of a time out of the T10 timer 818 for a mobile terminated call. The initial message flows are the same as messages 840–860 shown in FIG. 49 and are not repeated in FIG. 54. The AMH 431 sends a AMH_PAG_PAGE_RESPONSE 1020 to the PAG 435, which is passed (1021) to the CPM 414. The CPM 414 sends a MAKE_CALL 1022, which is passed as a SETUP 1025 to the BSC 105. The BSC 105 returns a CALL_CONFIRMED 1027. The T303 timer 869 is set (1026) and released (1028, 1029). The BSC 105 receives an ASSIGNENT_REQUEST 1031, and the AMH 431 sends an AMH_TMR_SET_TIMER (ASSIGNMENT_REQUEST) 1032 to set the T10 timer 818. However, the BSC 105 does not send a response to the ASSIGNMENT_REQUEST 1031, and the T10 timer 818 times out. As a result, the AMH 414 sends a DISCONNECT_CALL 1036 to initiate tear down of the channel. The CPM 414 then sends a CLEAR_CALL 1037, and the channel teardown proceeds through several message sequences to release the channel and to report that the call is cleared (1038–1054) in the same manner as shown in FIG. 53. Coincident with the CLEAR_CALL 1037, the CPM 414 may send the calling party an announcement to inform the calling party that the call cannot be completed to the mobile unit 112.

Figure 55A:
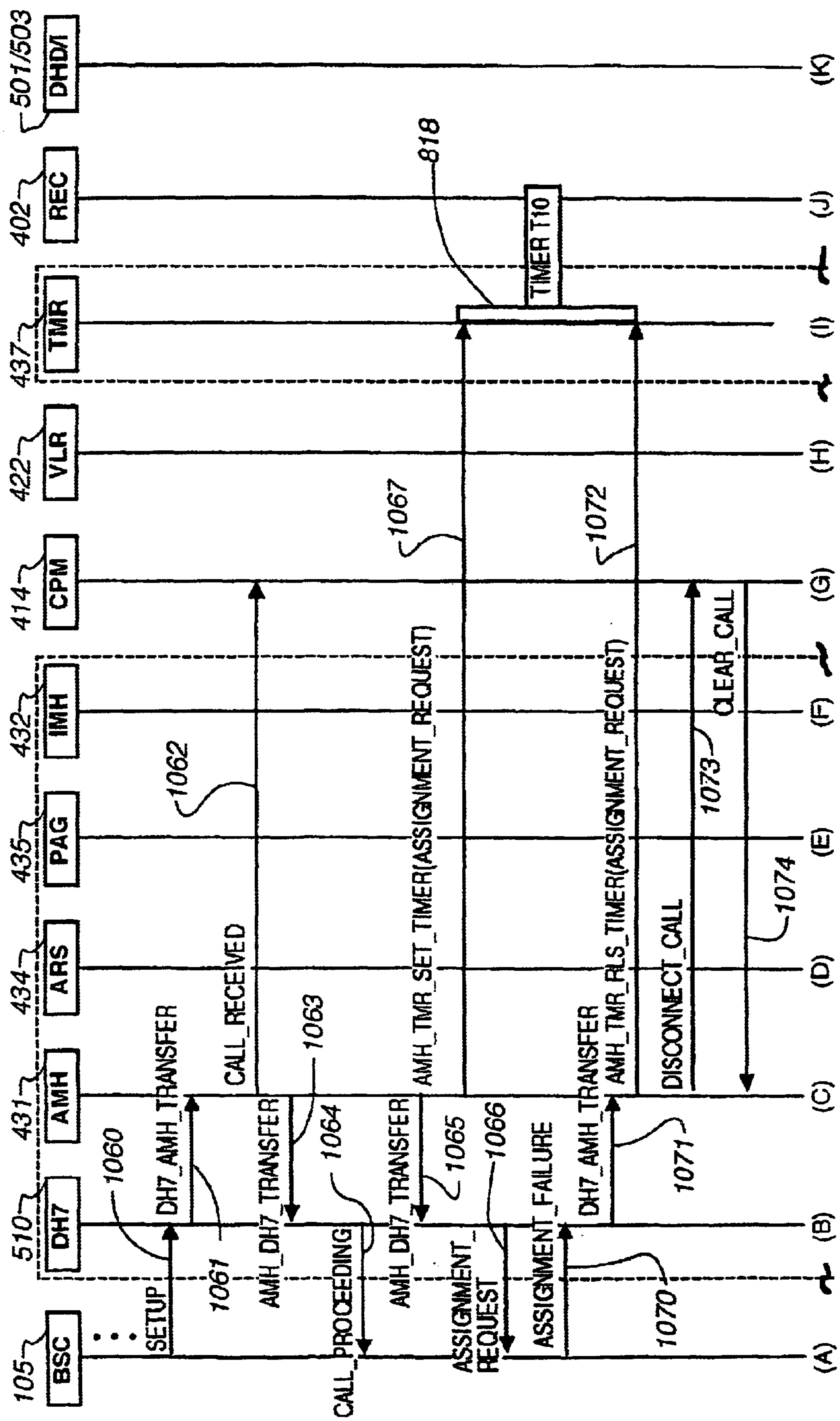
Figure 55B:
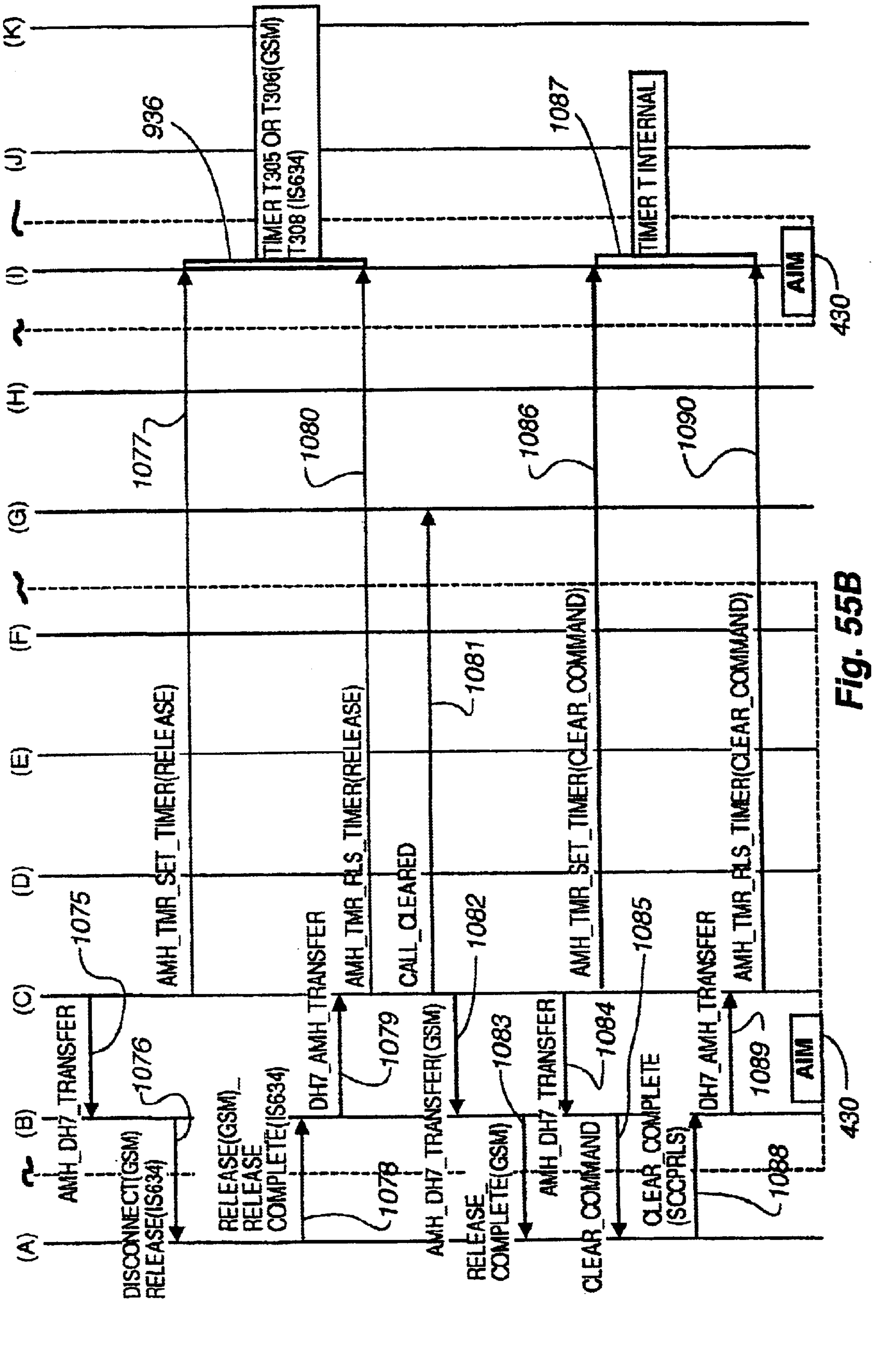

FIG. 55 shows the message flows associated with a mobile originated call when the channel assignment fails. Channel assignment failure can occur for a variety of reasons including when the BSC 105 and the MSC 210 do not agree on the state of the channel, for example. The BSC 105 and the MSC 210 will not agree on the state of the channel if the BSC 105 indicates the channel is blocked and the MSC 210 indicates the channel is unblocked, for example. The BSC 105 also may incur a failure in the establishment of the radio portion of the connection.

In FIG. 55, a service request is initiated using the same message sequence (800–809) as shown in FIGS. 48A–B. The BSC 105 then sends a SETUP 1060, which is received at the DH-7 510. The message is transferred (1061) to the AMH 431, which sends a CALL_RECEIVED 1062 to the CPM 414. The call proceeds through call setup (1063–1065) until an ASSIGNMENT_REQUEST 1066 is sent to the BSC 105. In this case, however, the BSC 105 returns an ASSIGNMENT_FAILURE 1070. As a result, the MSC 210 proceeds with call tear down (1071–1090) in the same manner as shown in FIG. 53 (1002–1016).

Figure 56A:
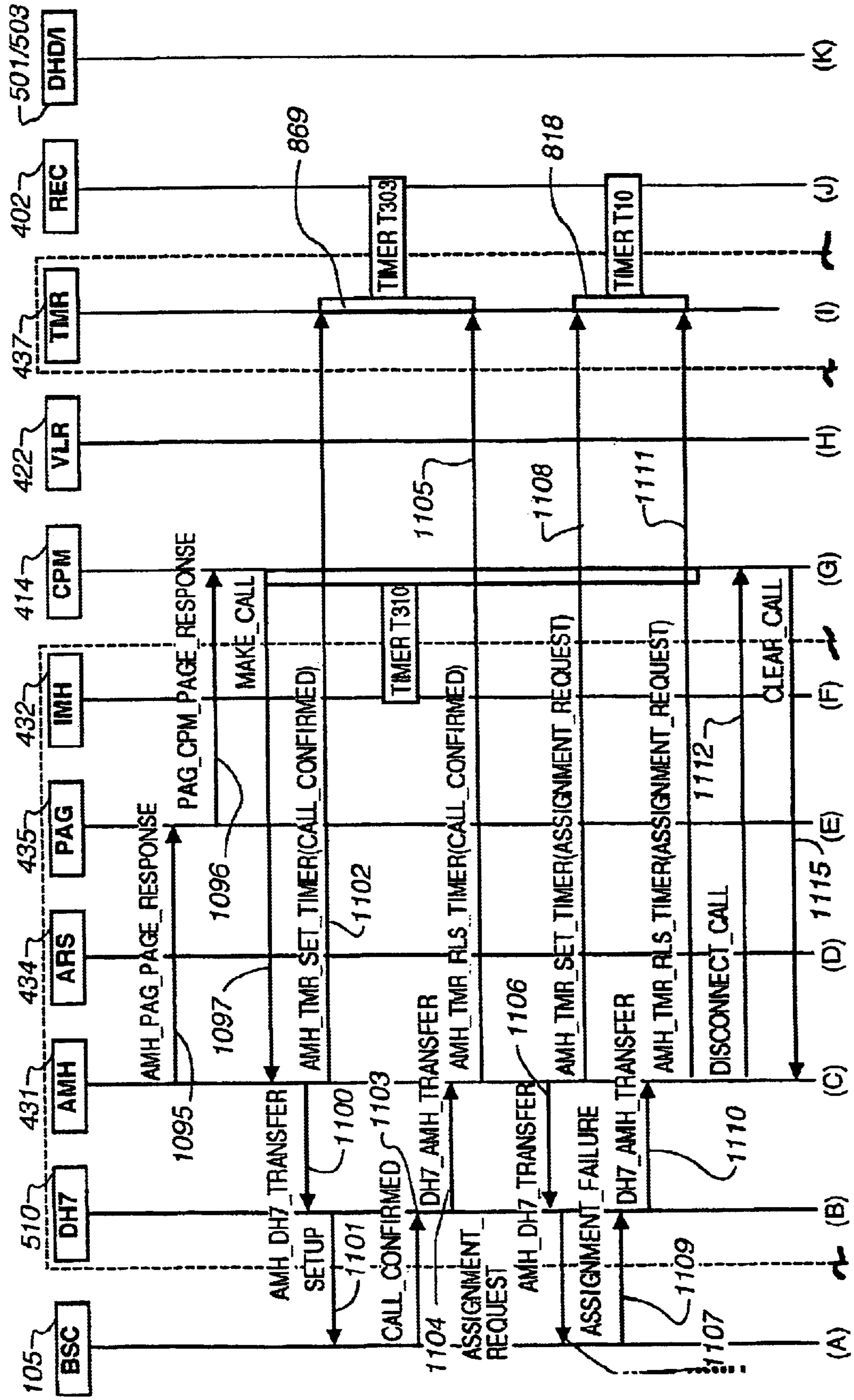
Figure 56B:
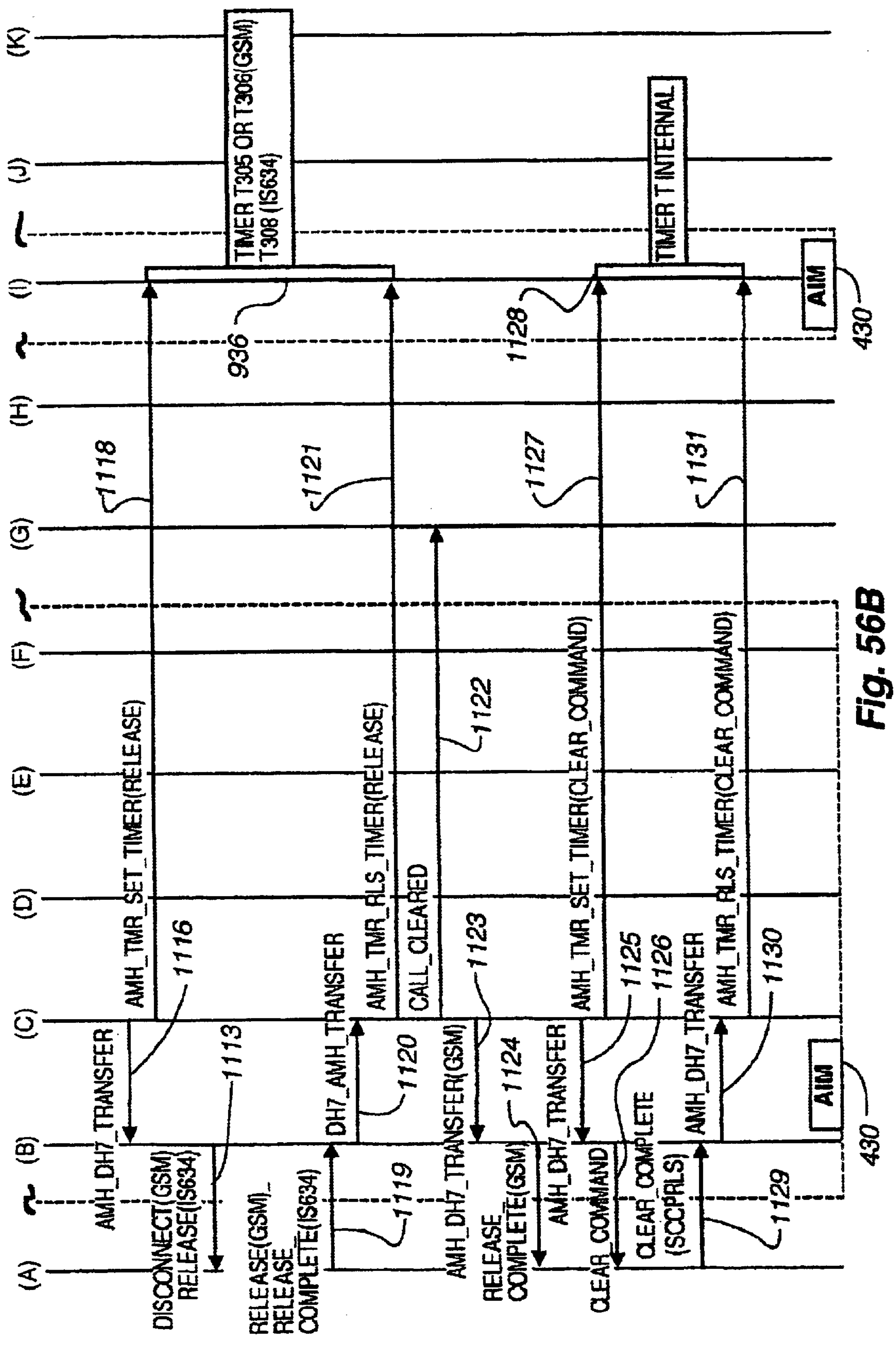

FIG. 56 shows the message flow associated with a mobile terminated call when the channel assignment fails. In FIG. 56, the initial messages (840–860) shown in FIG. 49 have already been completed. The AMH 431 then sends an AMH_PAG_PAGE_RESPONSE 1095 to the PAG 435, which passes the message (1096) to the CPM 414. The call setup phase begins with a MAKE_CALL 1097, a SETUP 1101, a CALL_CONFIRMED 1103 and an ASSIGNMENT_REQUEST 1107.

The BSC 105 returns an ASSIGNMENT_FAILURE 1109, indicating, for example, that the BSC 105 and the MSC 210 do not agree as to the state of the channel allocated between the BTS and the MSC 210. The AMH 431 sends a DISCONNECT_CALL 1112 to the CPM 414, which returns a CLEAR_CALL 1115. Call tear down then proceeds in the same manner as shown in FIG. 53.

Figure 57:
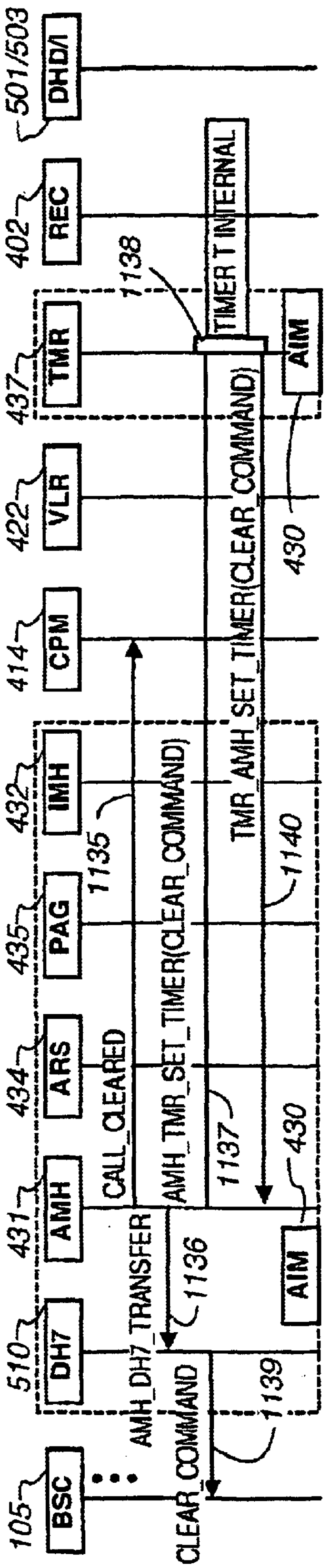

FIG. 57 shows the message flows associated with a call disconnect when the CLEAR_COMMAND internal timer times out. For the PSTN initiated disconnect and the mobile originated disconnect, the message flows are the same once the CALL_CLEARED 1135 is sent by the AMH 431 to the CPM 414. The AMH 431 sends (1136) a CLEAR_COMMAND 1139 to the BSC 105 and sets (1137) a CLEAR_COMMAND internal timer 1138. The BSC 105 does not respond with a CLEAR_COMPLETE message, and the internal timer 1138 times out (1140) releasing the channel.

FIG. 58 shows the message flows when the MSC 210 rejects a CM service request. The BSC 105 sends a CM_SERVICE_REQUEST 1145 to the MSC 210. The DH-7 510 determines the protocol of the sending mobile unit 112 and spawns an appropriate thread and forwards (1146) the CM_SERVICE_REQUEST 1145 to the AMH 431. The AMH 431 sends an AMH_ARS_CM_SERVICE_REQUEST 1147 to the ARS 434, which forwards an ARS_IMH_AUTHENTICATION_REQUEST 1148 to the IMH 432. The ARS in turn sends a registration notification (IMH_VLR_REGNOT_REQUEST 1149) to the VLR 422. The VLR 422 returns a response (1150) that rejects the service request. This response is passed (1151) to the ARS 434, which sends a CM_SERVICE_REQUEST 1152 to the AMH 431. The AMH 431 transfers (1153) the rejection to the BSC 105 as a CM_SERVICE_REJECT 1154.

Figure 59A:
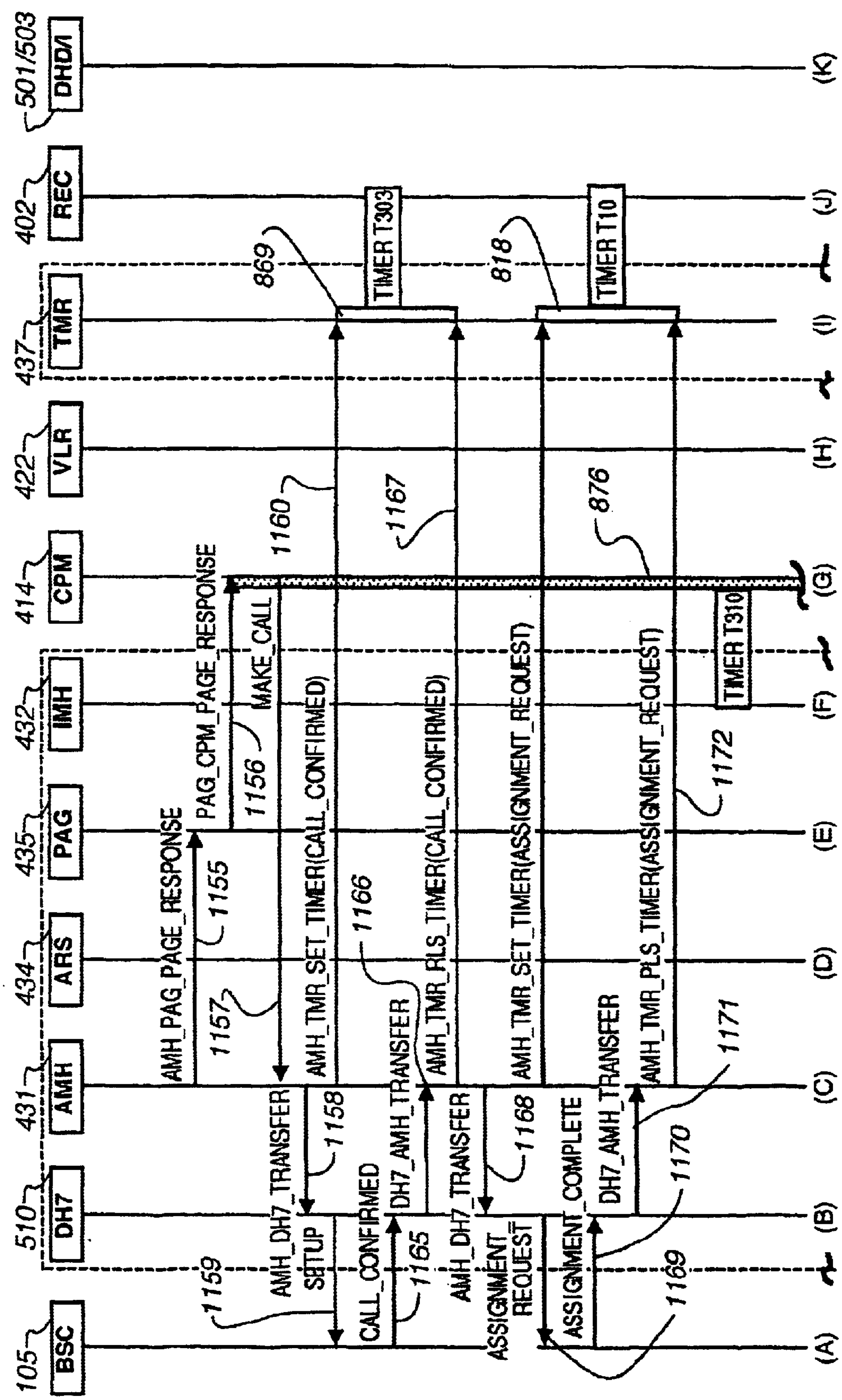
Figure 59B:
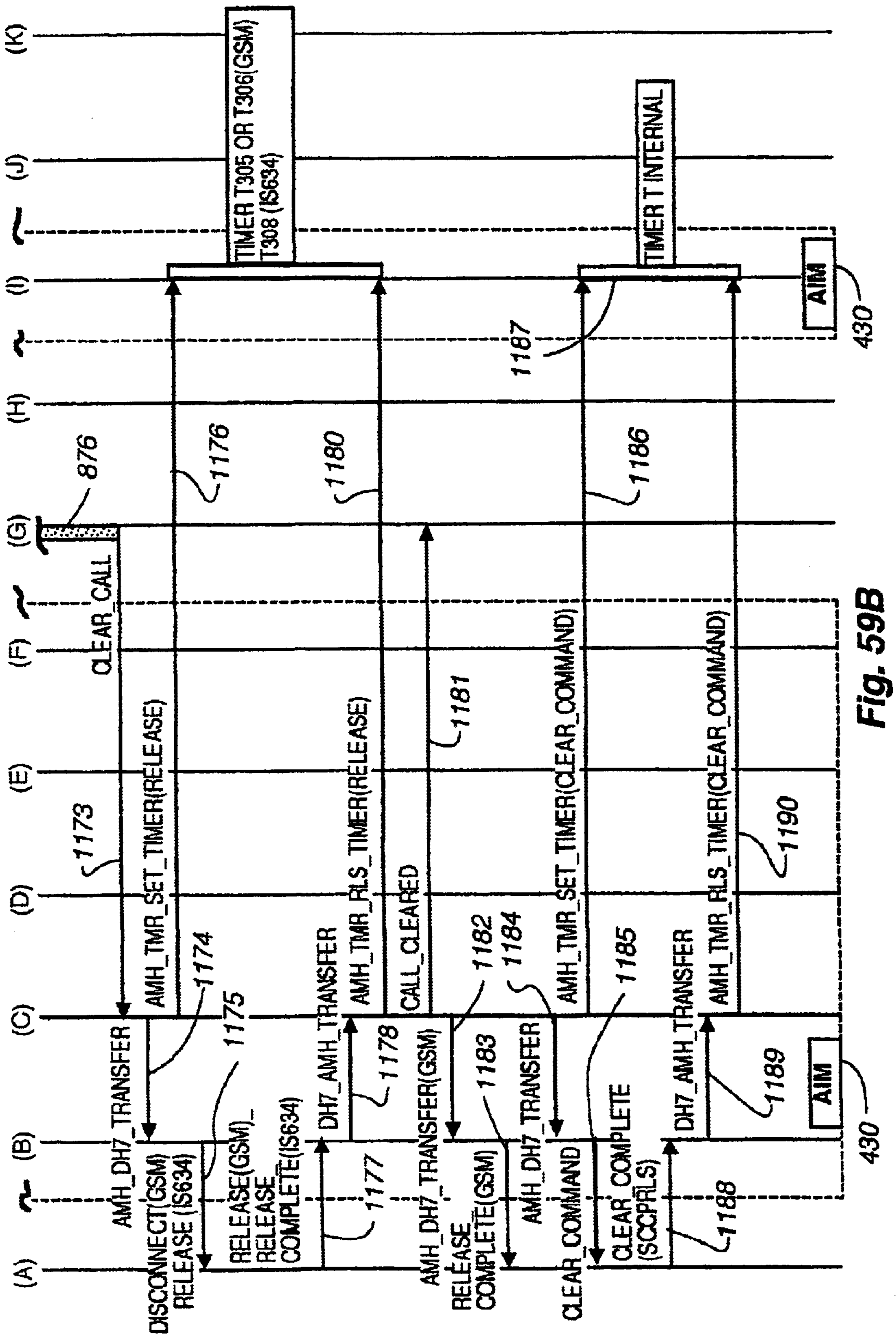

FIG. 59 shows the message flows associated with a mobile terminated call in which the CPM 414 times out waiting for an alerting message from the AMH 431. The initial message flows are the same as shown in FIG. 49 (i.e., 840–860). The AMH 431 sends (1155) a page response to the PAG 435, which forwards (1156) the page response to the CPM 414. The CPM 414 sends a MAKE_CALL 1157 to the AMH 431, which transfers (1158) the message as a SETUP 1159 to the BSC 105. The CPM 414 also sets the T310 timer 876, waiting on receipt of an alerting message. The BSC 105 returns a CALL_CONFIRMED 1165, which is passed (1166) to the AMH 431. A channel assignment is then completed (1168–1172). However, the BSC 105 does not send an alerting message to the MSC 210, and the T310 timer 876 times out in the CPM 414. As a result, the CPM 414 sends a CLEAR_CALL 1173 to the AMH 431, which is passed (1174) to the BSC 105 as a DISCONNECT (GSM) or a RELEASE (IS-634) 1175. The call tear down then proceeds (1210–1226) in the same manner as shown in FIG. 53 (1002–1016).

Figure 60A:
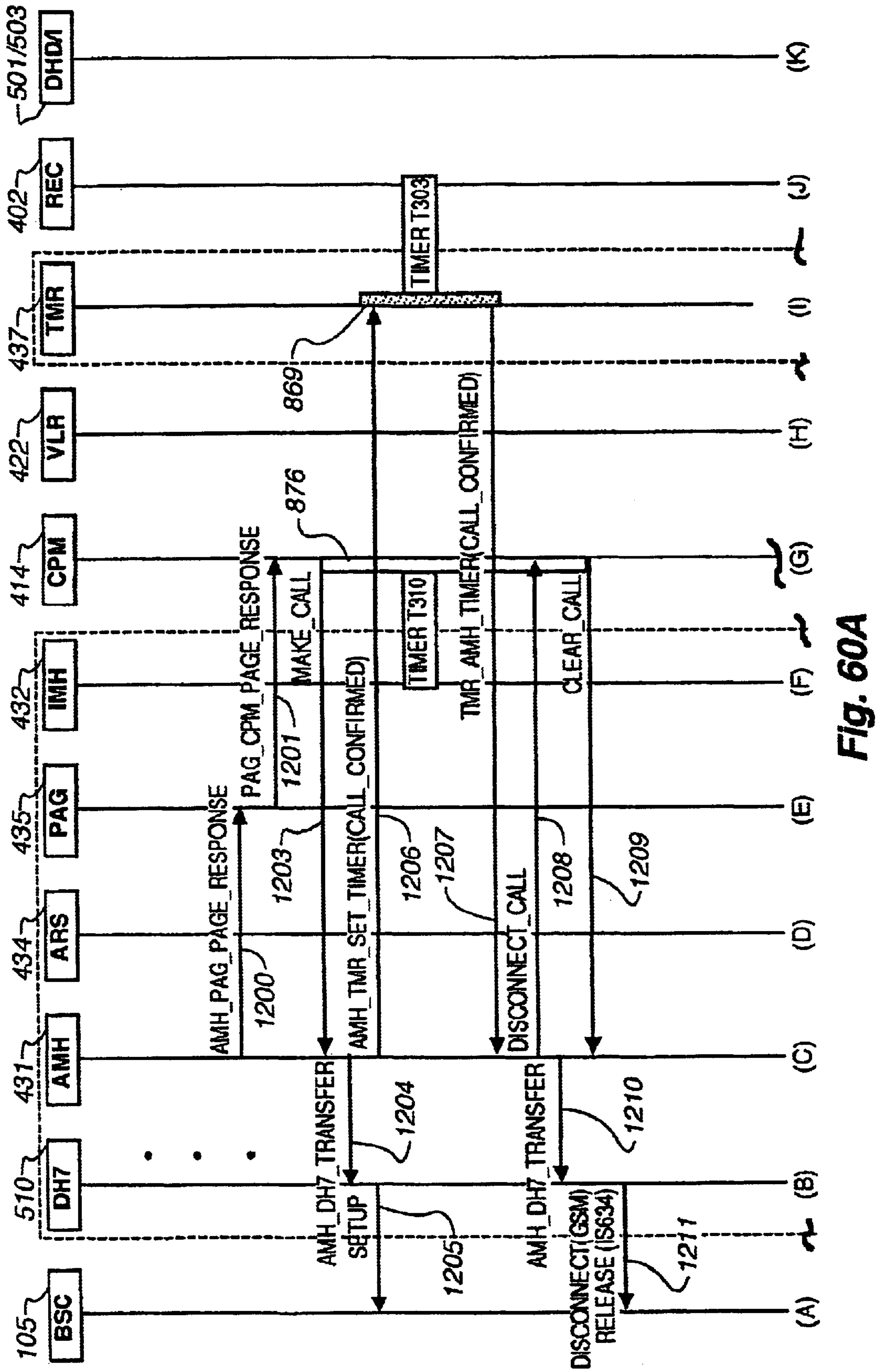
Figure 60B:
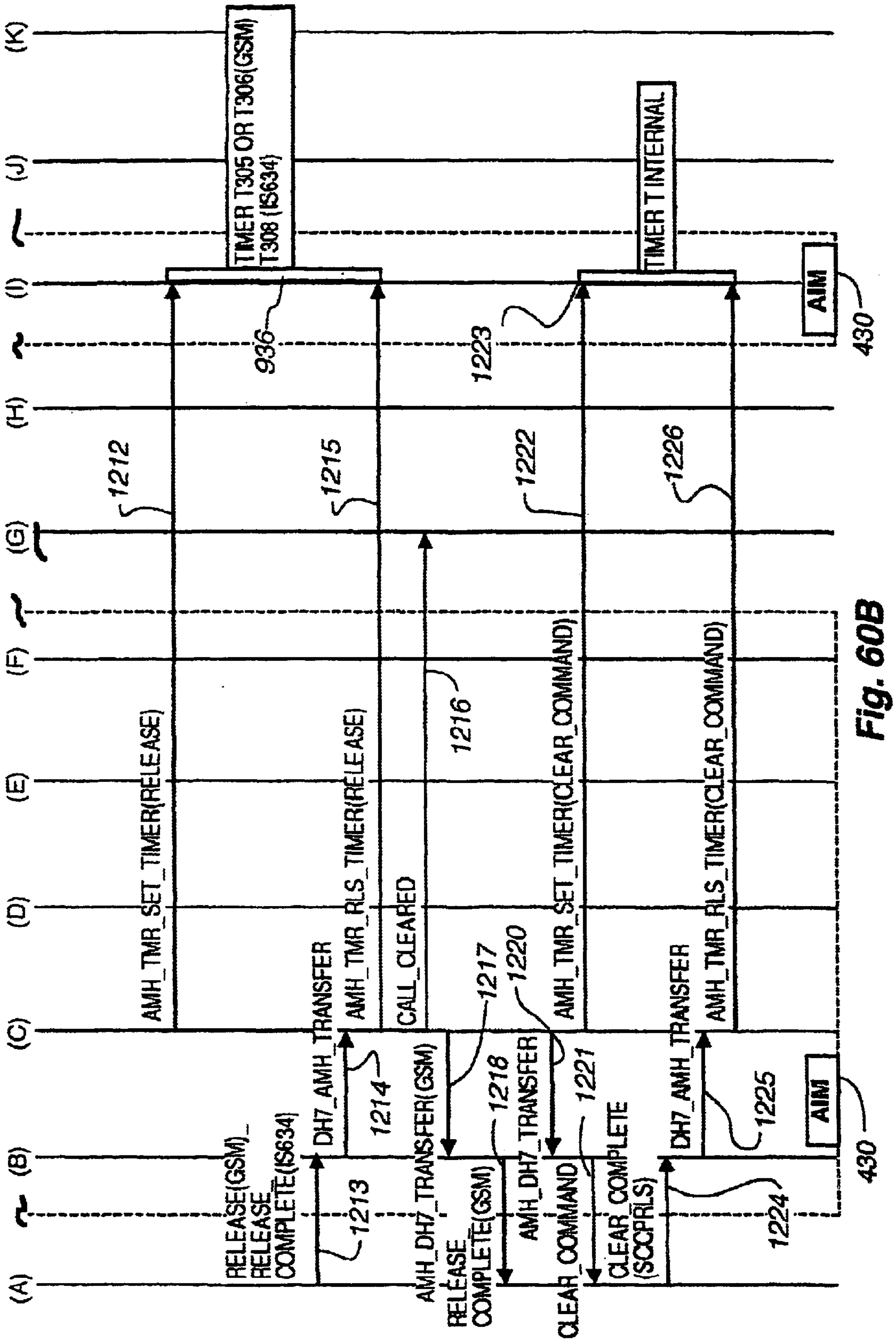

FIG. 60 shows the message flows associated with a mobile terminated call in which the call confirmed timer times out in the TMR 437. The initial message flows are the same as those shown in FIG. 49 (840–860). The AMH 431 sends an AMH_PAGPAGE_RESPONSE 1200 to the PAG 435, which forwards (1201) it to the CPM 414. The CPM 414 sends a MAKE_CALL 1203 to the AMH 431 and sets the T310 timer 876. The AMH 431 transfers (1204) the MAKE_CALL 1203 to the BSC 105 as a SETUP 1205 and sets (1206) the T303 call confirmed timer 869 in the TMR 437. However, the BSC 105 does not return a call confirmed message to the MSC 210, and the T303 timer 869 times out (1207). The AMH 431 sends a DISCONNECT_CALL 1208 to the CPM 414 and the CPM 414 responds with a CLEAR_CALL 1209. The call tear down then proceeds (1210–1226) in the same manner as shown in FIG. 53 (1002–1016).

Figure 61A:
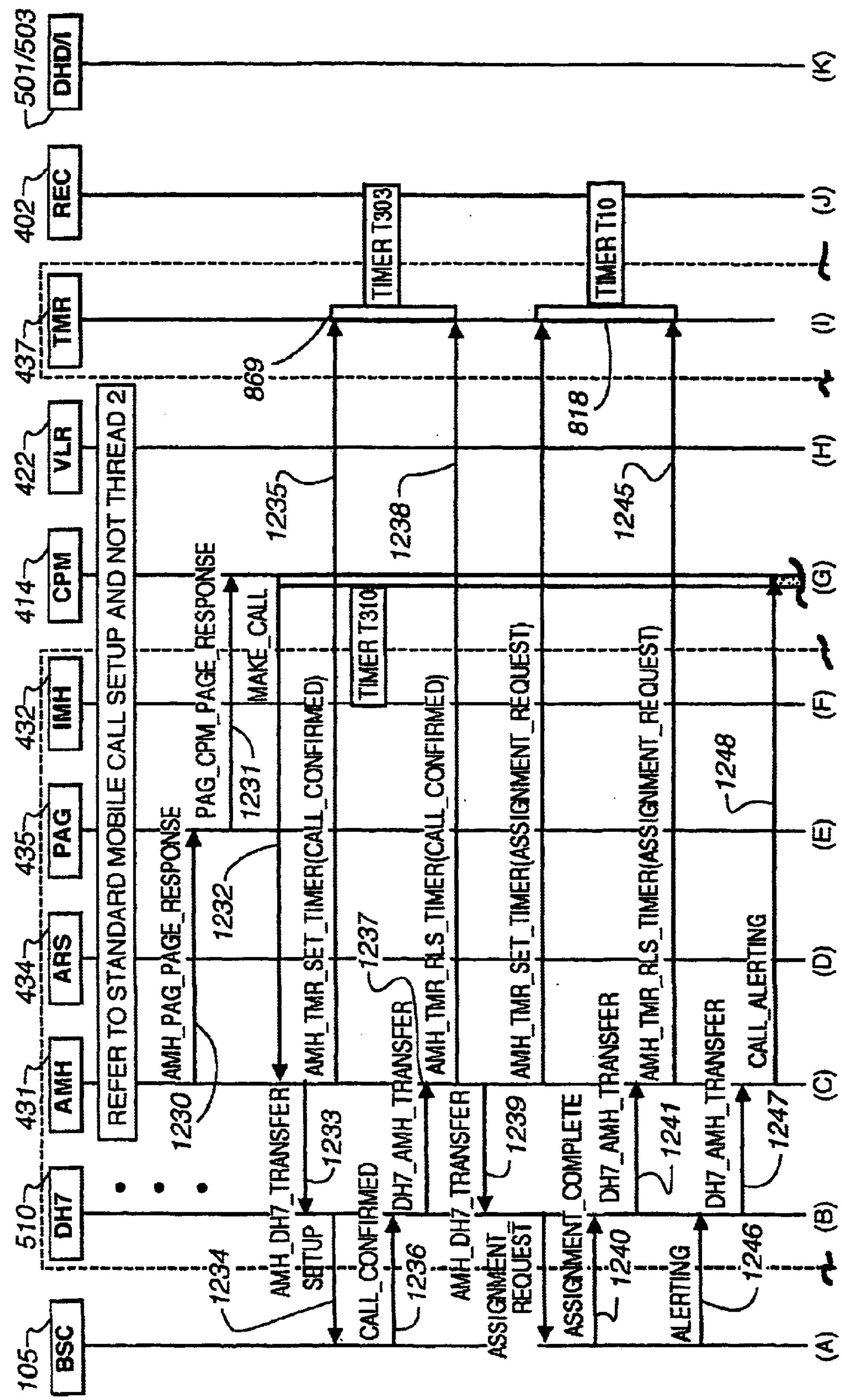
Figure 61B:
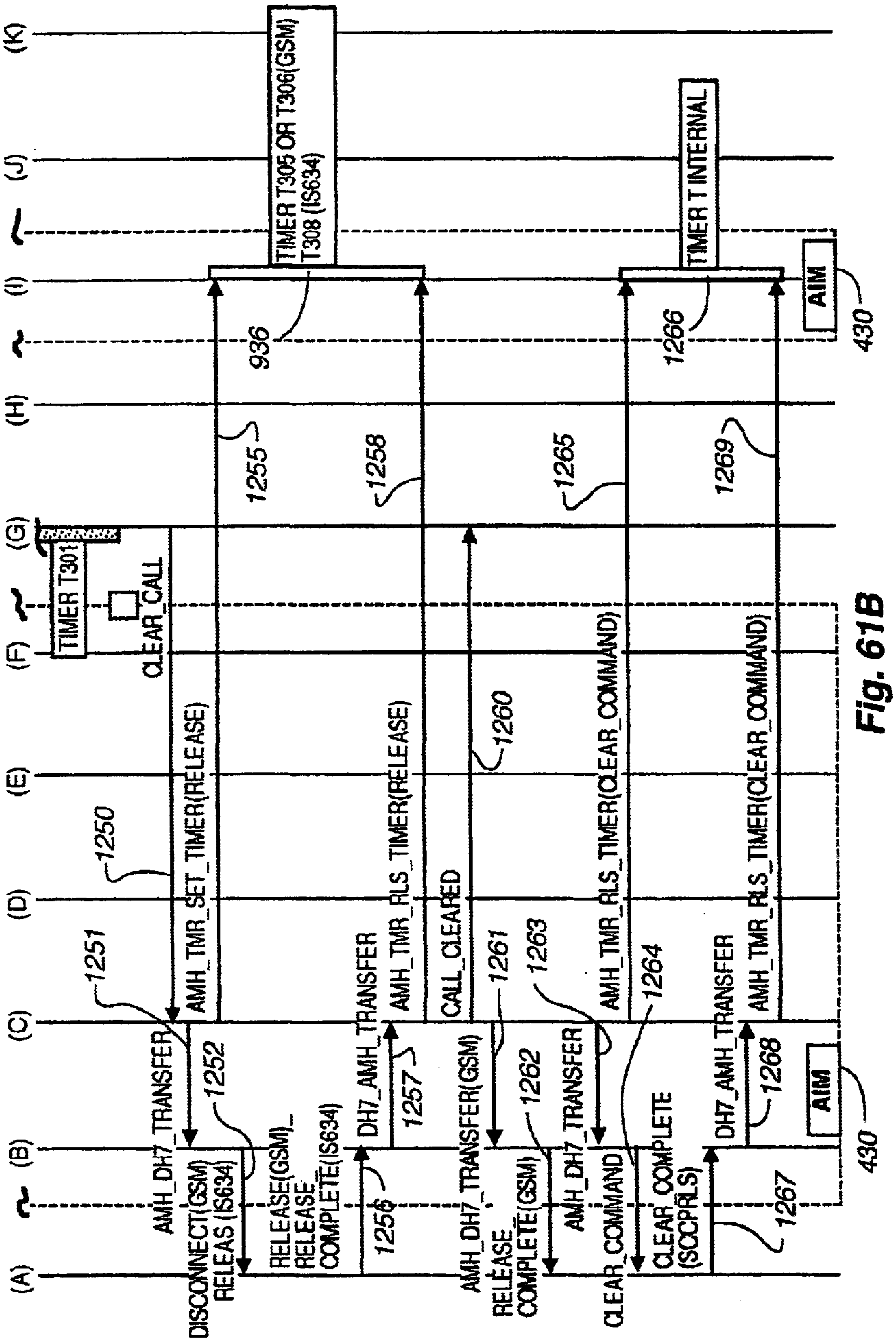

FIG. 61 shows the message flows associated with a mobile terminated call in which the call connect timer times in the CPM 414. The initial message flows are the same as those shown in FIG. 49 (840–860). The AMH 431 sends an AMH_PAG_PAGE_RESPONSE 1230 to the PAG 435 and call set up proceeds through make call, call confirmed and channel assignment (1231–1245). The BSC 105 then sends an ALERTING 1246, which is transferred (1247) to the AMH 431. The AMH 431 sets (1248) a T301 call connected timer 883 in the CPM 414. However, the BSC 105 does not return a connect message, and the T301 timer 883 times out. The CPM 414 sends a CLEAR_CALL 1250 to the AMH 431, and call tear down proceeds in the same manner as shown in FIG. 53 (1002–1016).

Figure 62:
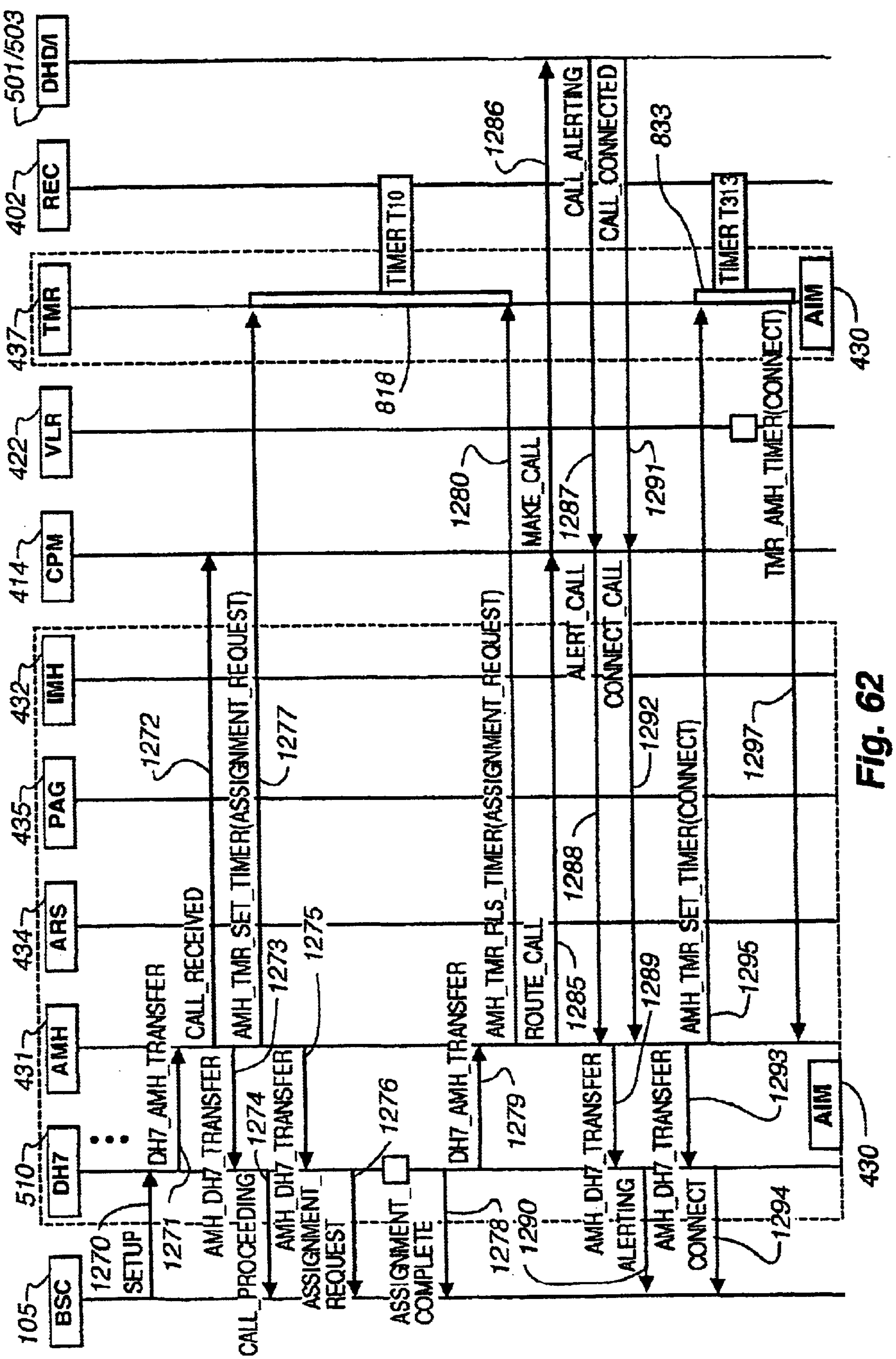

FIG. 62 shows the message flows associated with a mobile originated call in which the BSC 105 does not send a connect acknowledge message to the MSC 210 and the T313 connect acknowledge timer 833 times out. The initial message flows are the same as shown in FIGS. 48A–B (800–809). The call proceeds through setup, channel assignment, alerting and call connection (1270–1294). The AMH 431 sets (1293) the T313 connect acknowledge timer 833. However, the BSC 105 does not return a connect acknowledgment, and the T313 timer 833 times out (1297). The MSC 210 then proceeds through call tear down.

Figure 63:
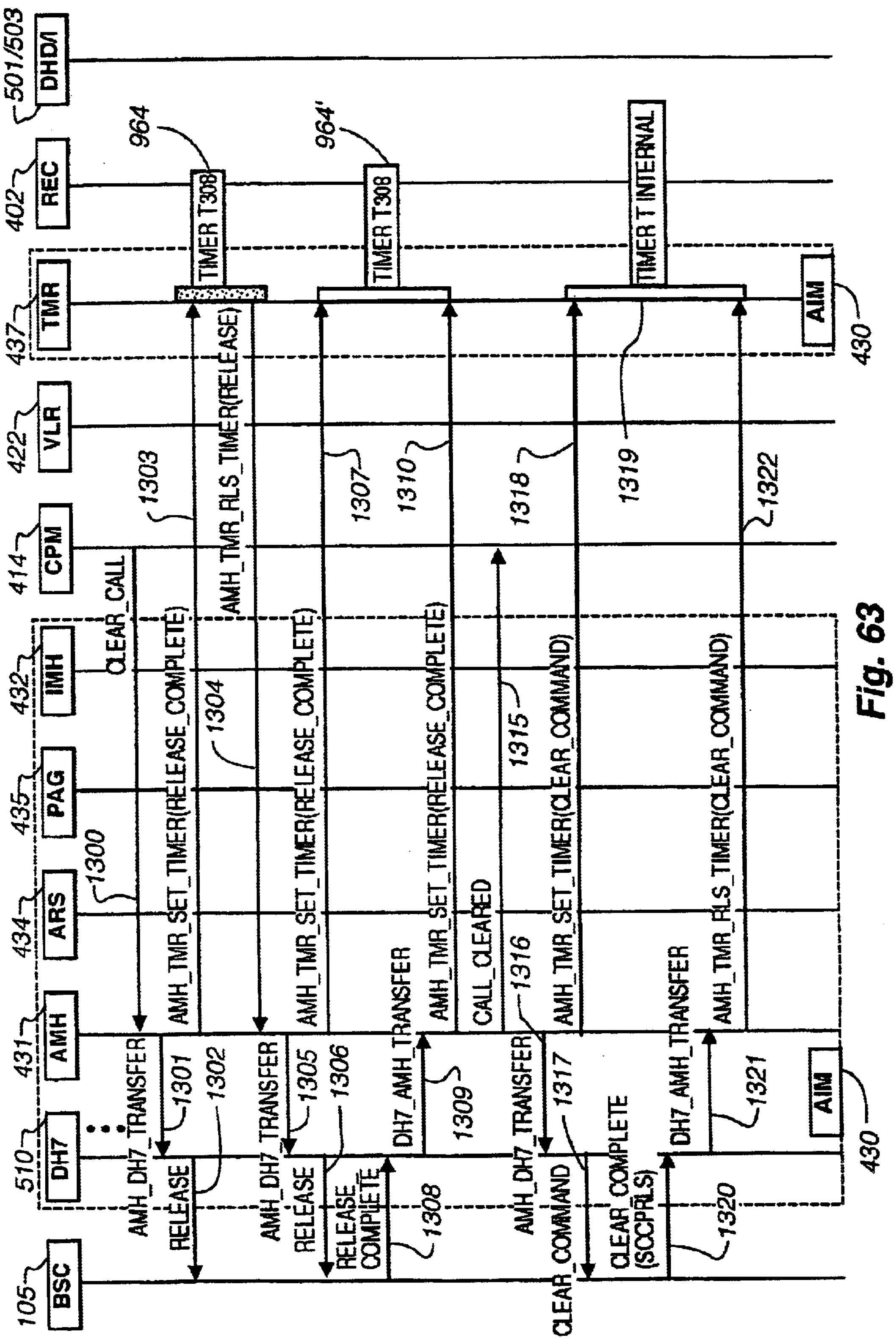

FIG. 63 applies to GSM and IS-634. FIG. 63 shows the message flows associated with a call disconnect (mobile or PSTN originated) in which the T308 (GSM) release complete timer 964 times out. Similar message flows would exist for IS-634 protocol equipment. The initial message flows are the same as shown in FIG. 51 or FIG. 52. The CPM 414 sends a CLEAR_CALL 1300 to the AMH 431, which is transferred (1301, 1302) to the BSC 105. The AMH 431 also sets (1303) a T308 release complete timer 964. As shown in FIG. 63, the BSC 105 does not return a release complete message and the T308 timer 964 times out (1304). The AMH 431 then sends (1305) a second RELEASE 1306 to the BSC 105 and sets (1307) a second T308 timer 964'. The BSC 105 returns a RELEASE_COMPLETE 1308, and the AMH 431 releases (1310) the T308 timer 964'. If the T308 timer 964' were to expire, the AMH 431 could release the transaction and send a call cleared message to the CPM 414. The MSC 210 may then go through a call clear sequence. Returning to FIG. 63, the AMH 431 next sends a CALL_CLEARED 1315 to the CPM 414, sends (1316) a CLEAR_COMMAND 1317 to the BSC 105, and sets (1318) a clear command internal timer 1319. The BSC 105 returns a CLEAR_COMPLETE 1320 to the MSC 210. The AMH 431 then releases the internal timer 1319.

Figure 64:
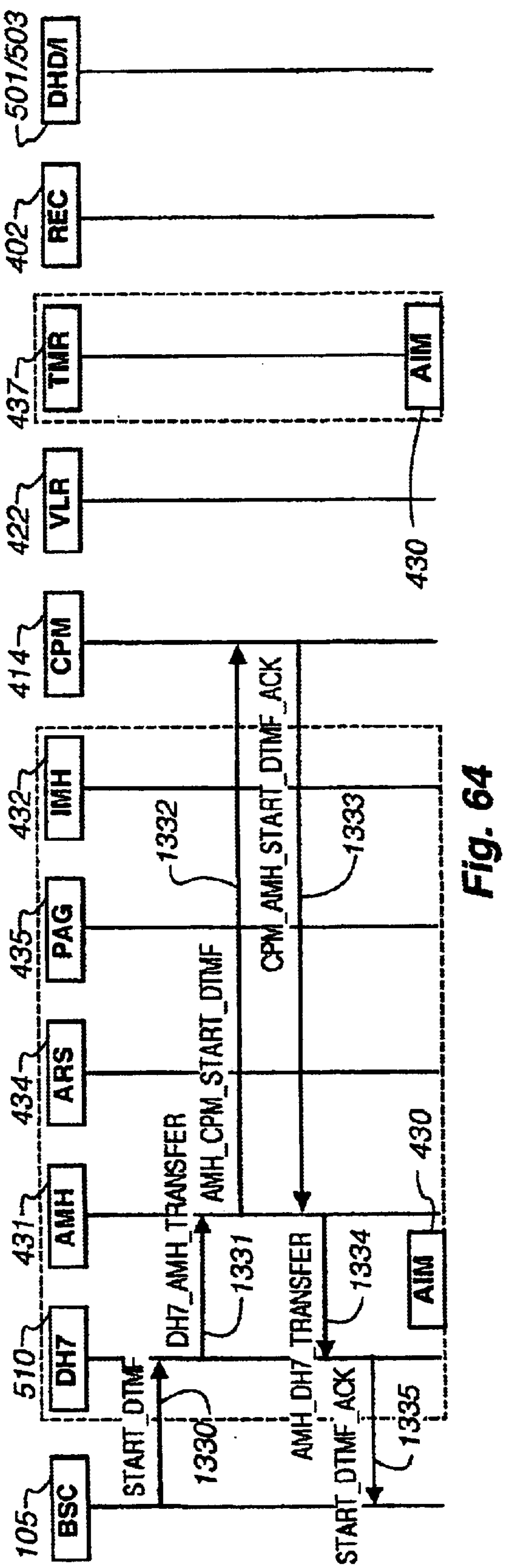
Figure 65:
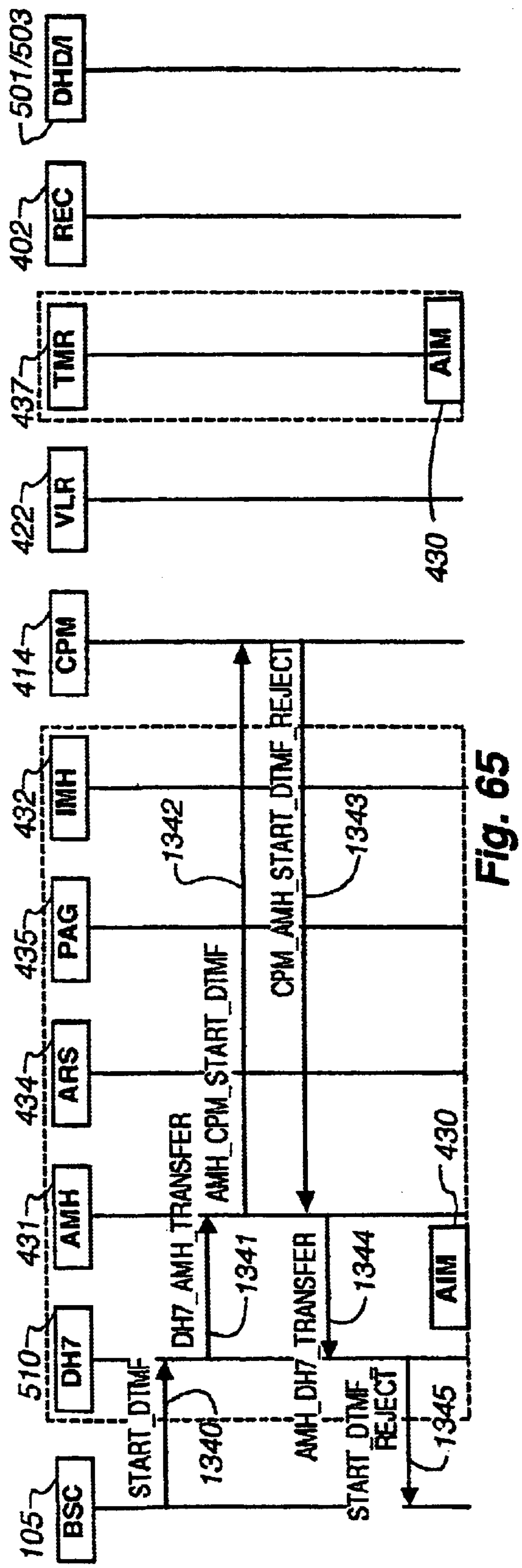
Figure 66:
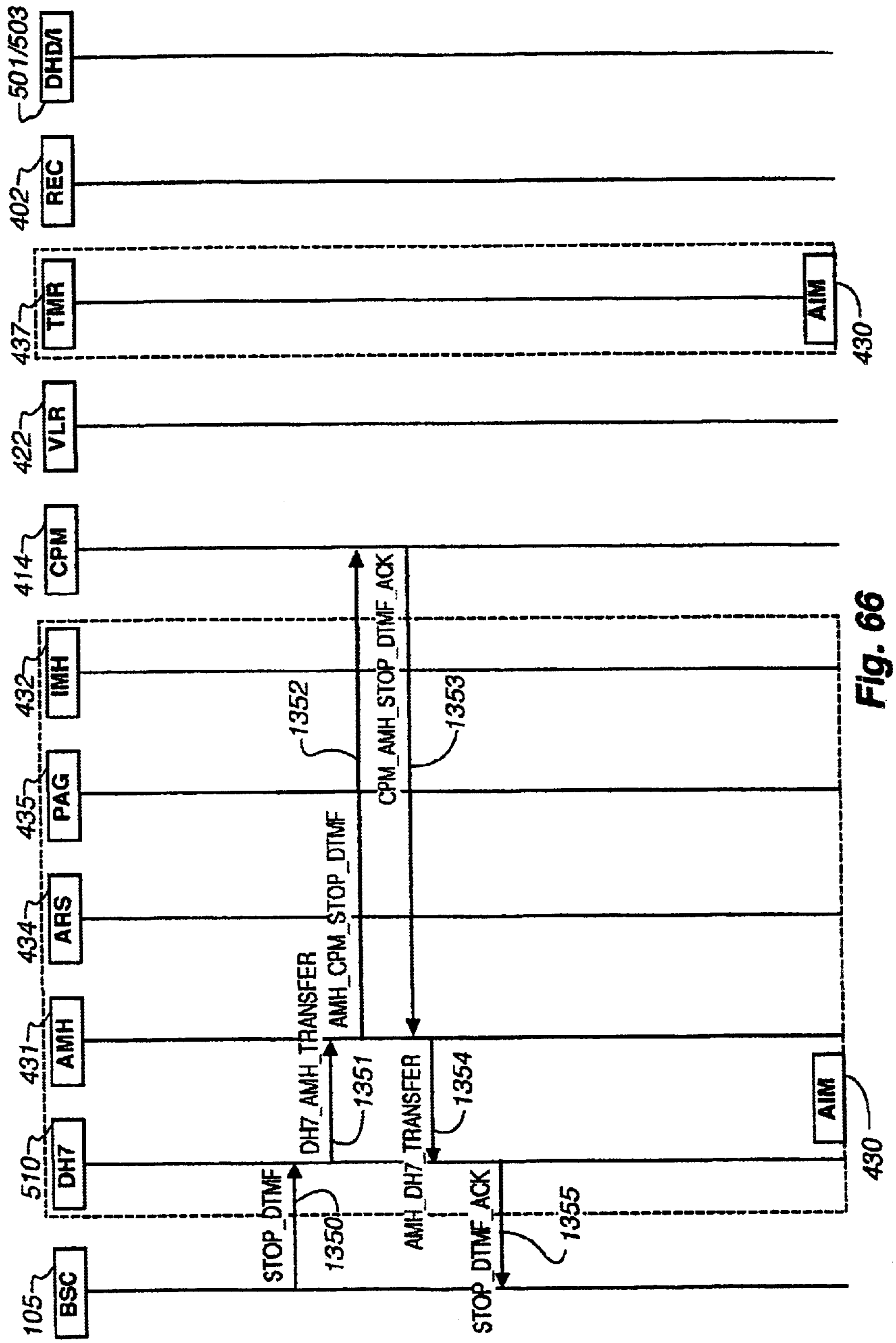

FIGS. 64–66 show the message flows associated with processing a dual tone multiple frequency (DTMF) signal. As shown in FIGS. 64–66, the BSC 105 initiates the processing by sending a START_DTMF (1330 in FIG. 64) and the CPM 414 returns a CPM_AMH_START_DTMF_ACK (1333 in FIG. 64).

FIGS. 67A–71B are flow charts showing message handling associated with call processing with an HLR (internal or external).

Figure 67A:
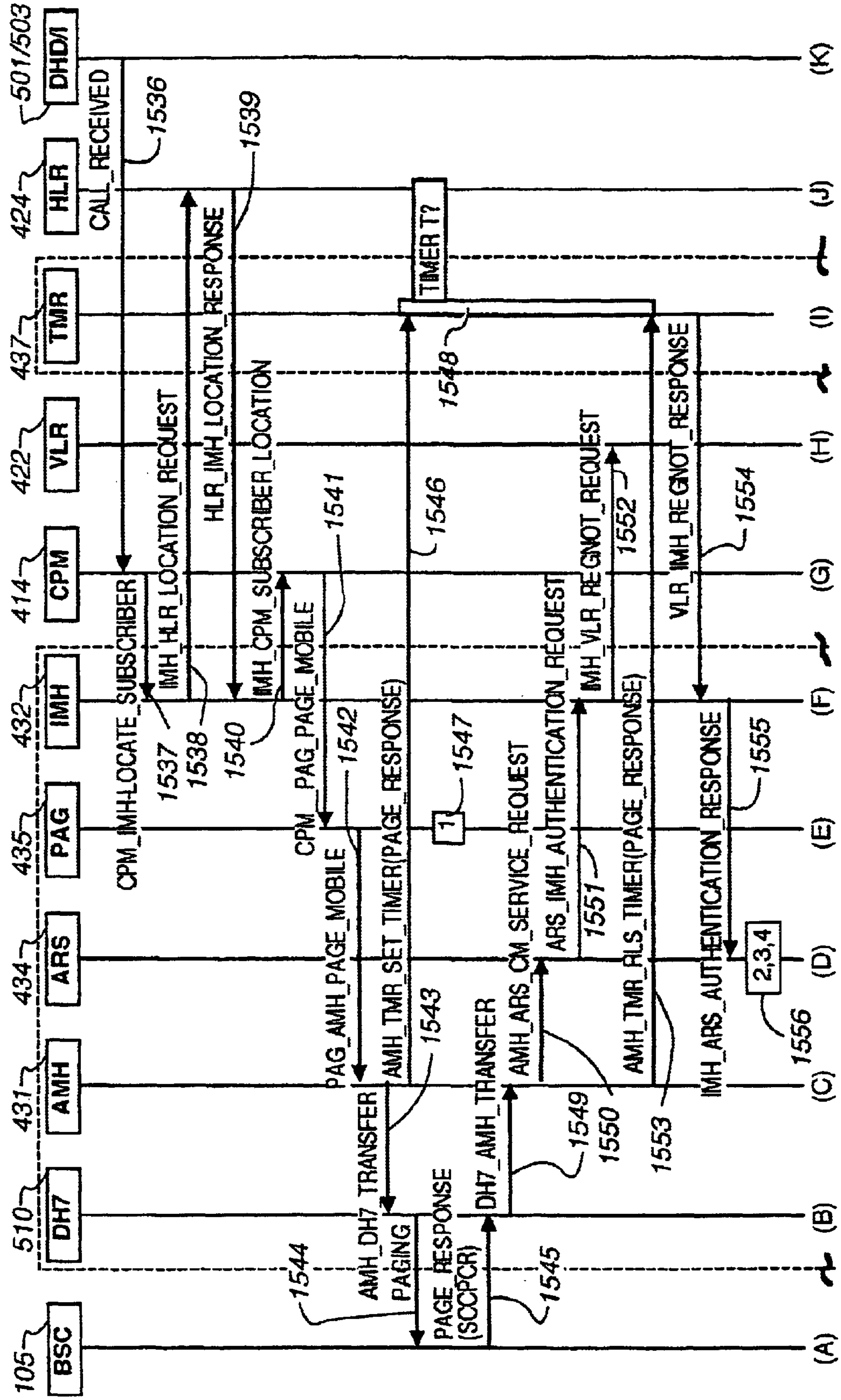
FIGS. 67A–71B are flow charts showing message signaling associated with call processing with an external HLR.
Figure 67B:
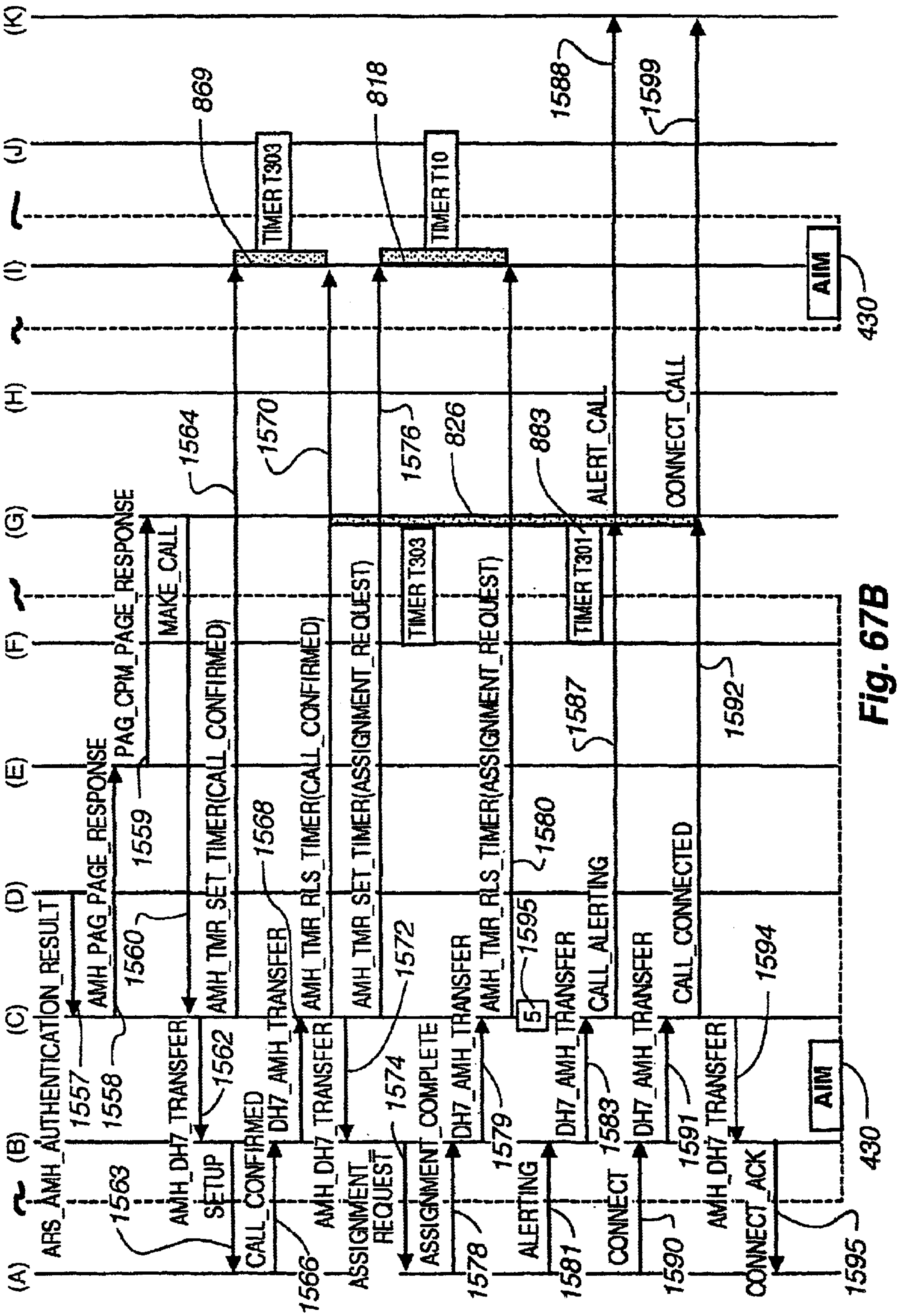

FIGS. 67A–B shows the message flows when an incoming call is received at the MSC 210, a location request is sent to the HLR 424, and the HLR 424 indicates that the mobile unit 112 is operating locally. The DHI 501 sends a CALL_RECEIVED 1536 to the CPM 414. The CPM 414 sends a CPM_IMH_LOCATE_SUBSCRIBER 1537 to the IMH 432. The IMH 432 then sends an IMH_HLR_LOCATION_REQUEST 1538 to the HLR 424. The HLR 424 returns a response (1539) indicating that the mobile unit 112 is homed on the local system and is operating locally. The IMH 432 then provides an IMH_CPM_SUBSCRIBER_LOCATION 1540 to the CPM 414 indicating that the mobile unit 112 is operating locally. The remaining message flows 1541–1595 are similar to those shown in FIG. 49.

Figure 68A:
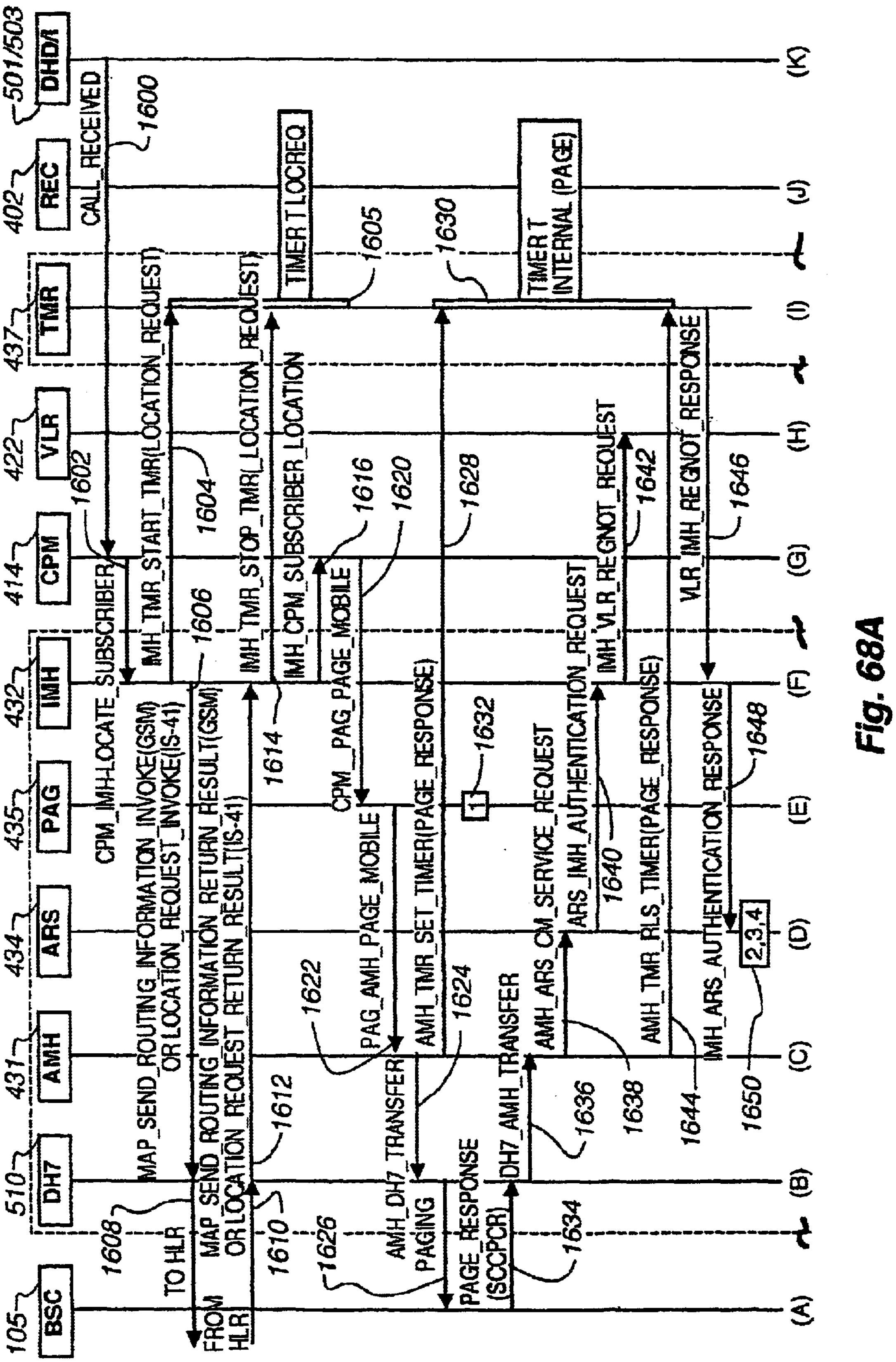
Figure 68B:
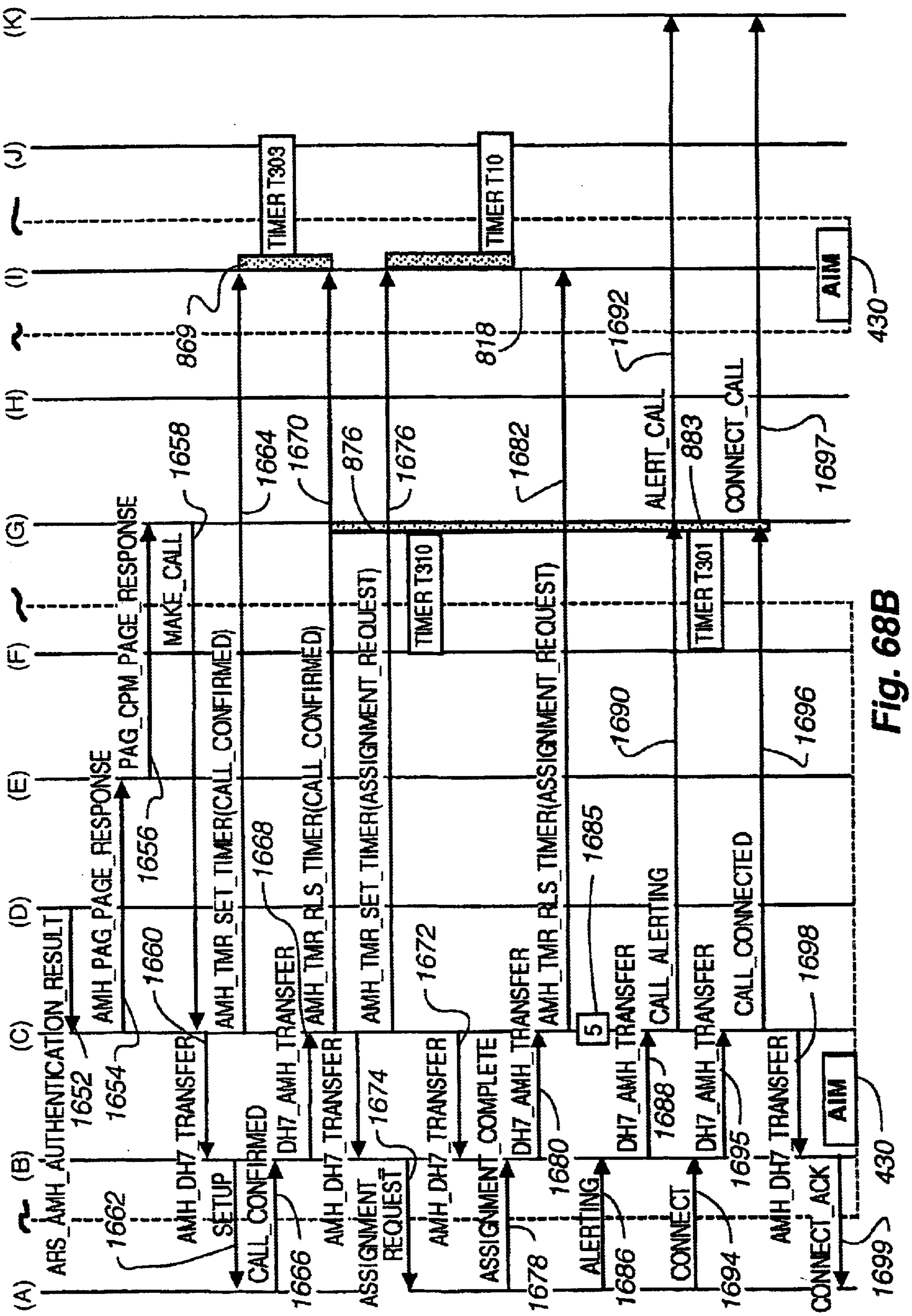

FIG. 68 shows the message flows associated with an incoming call to a mobile unit 112 that is operating locally but is homed on an external HLR. The DHI 503 sends a CALL_RECEIVED 1600 to the CPM 414, which sends a CPM_IMH_LOCATE_SUBSCRIBER 1602 to the IMH 432. Because the mobile unit 112 is not homed locally, the IMH 432 sends a location request 1600/1608 to the external HLR and sets (1604) a LOCREQ timer 1605. The IMH 432 then receives a return 1610/1612 from the external HLR and releases (1614) the LOCREQ timer 1605. Then the IMH 432 sends an IMH_CPM_SUBSCRIBER_LOCATION 1616 to the CPM 414 indicating the location of the mobile unit's 112 HLR. The remaining message flows 1620–1699 are similar to those in FIG. 49.

Figure 69:
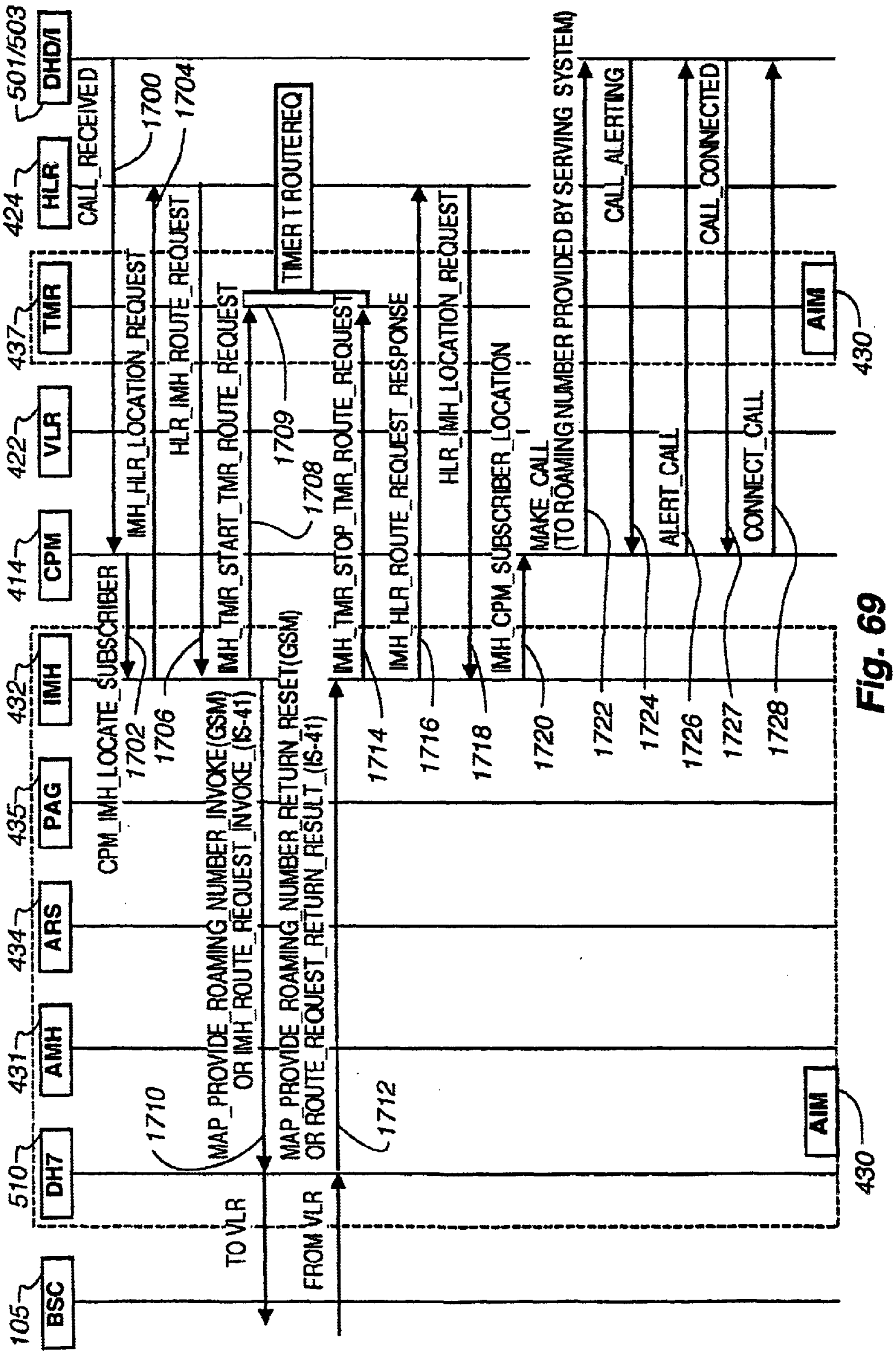

FIG. 69 shows the message flows associated with call processing for a mobile termination in which the mobile unit 112 is homed on the HLR 424 but is operating externally to the wireless network controlled by the aircore platform 200. In this case, the mobile unit 112 will be registered on an external VLR. The CPM 414 receives a CALL_RECEIVED 1700 and sends a location request 1702 to the NH 432. The IMH 432 sends a location request 1704 to the HLR 424. Because the mobile unit 112 is registered on another wireless network, the HLR 424 sends a route request 1706 to the IMH 432, which sends an invoke 1710 to the external VLR and sets a ROUTEREQ timer 1709. The external VLR returns the results 1712 to the IMM 432, and the IMH 432 releases the ROUTEREQ timer 1709. The IMH 432 also sends an NH_HLR_ROUTE_REQUEST_RESPONSE 1716 to the HLR 424 and the HLR 424 returns a location response 1718. The IMH 432 then sends (1720) the location of the mobile unit 112 to the CPM 414, which issues a MAKE_CALL 1722 to the roaming number provided by the external wireless network serving the mobile unit 112. The process then proceeds through call alerting and call connection.

Figure 70:
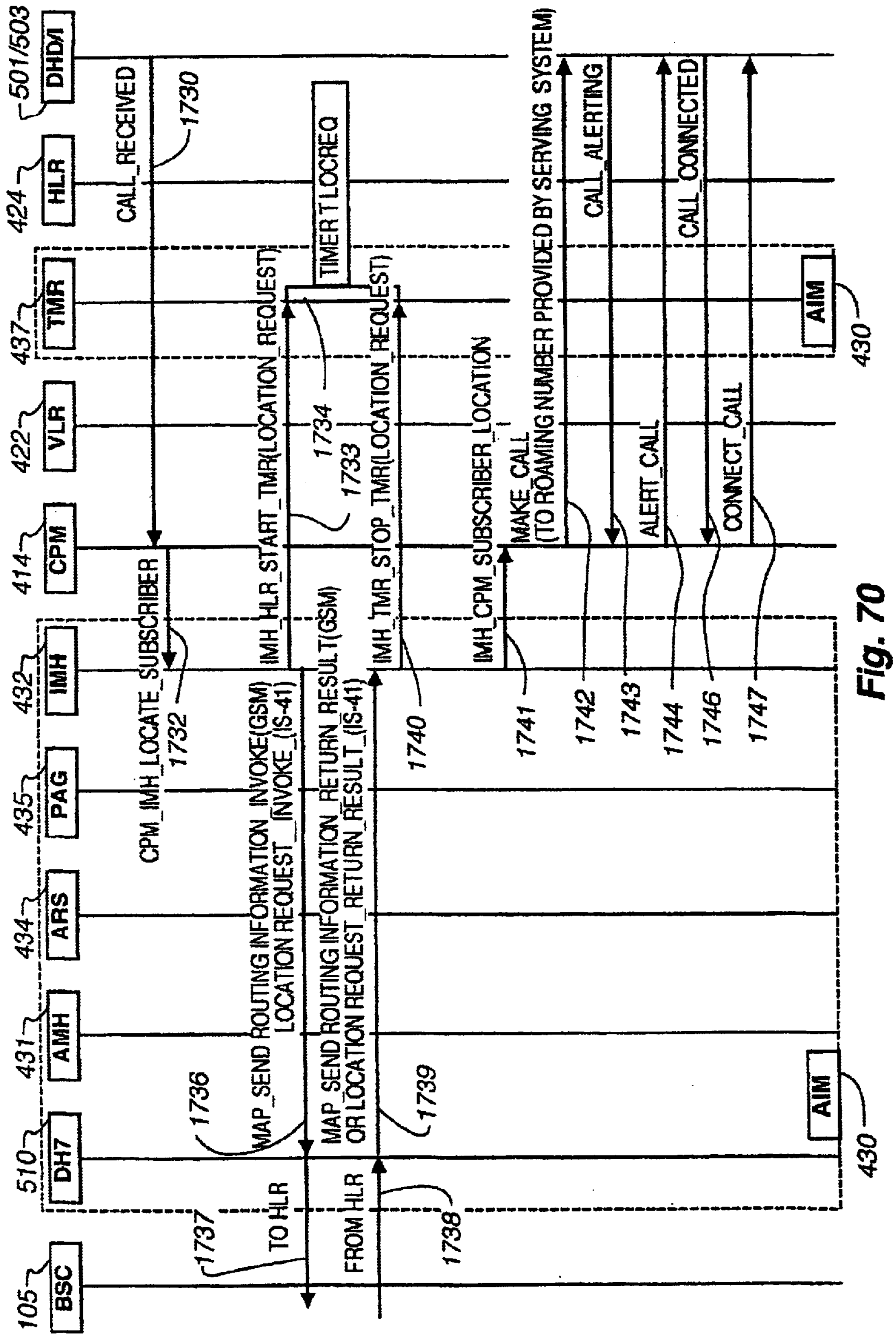

FIG. 70 shows the message flows for call processing for a mobile terminated call when the mobile unit 112 is homed on an external HLR and is operating externally to the wireless network controlled by the aircore platform 200. The CPM 414 receives a CALL_REQUESTED 1730 from the DHD 501. The CPM 414 then sends a CPM_IMH_LOCATE_SUBSCRIBER 1732 to the IMH 432. The IMH 432 sets a timer 1734 and sends an invoke message 1736 to the DH-7 510. The DH-7 510 sends 1736 the invoke message to the external HLR and receives (1738) a response. The DH-7 510 then sends a results message 1739 to the IMH 432. The remaining message flows are similar to those shown in FIG. 69.

Figure 71A:
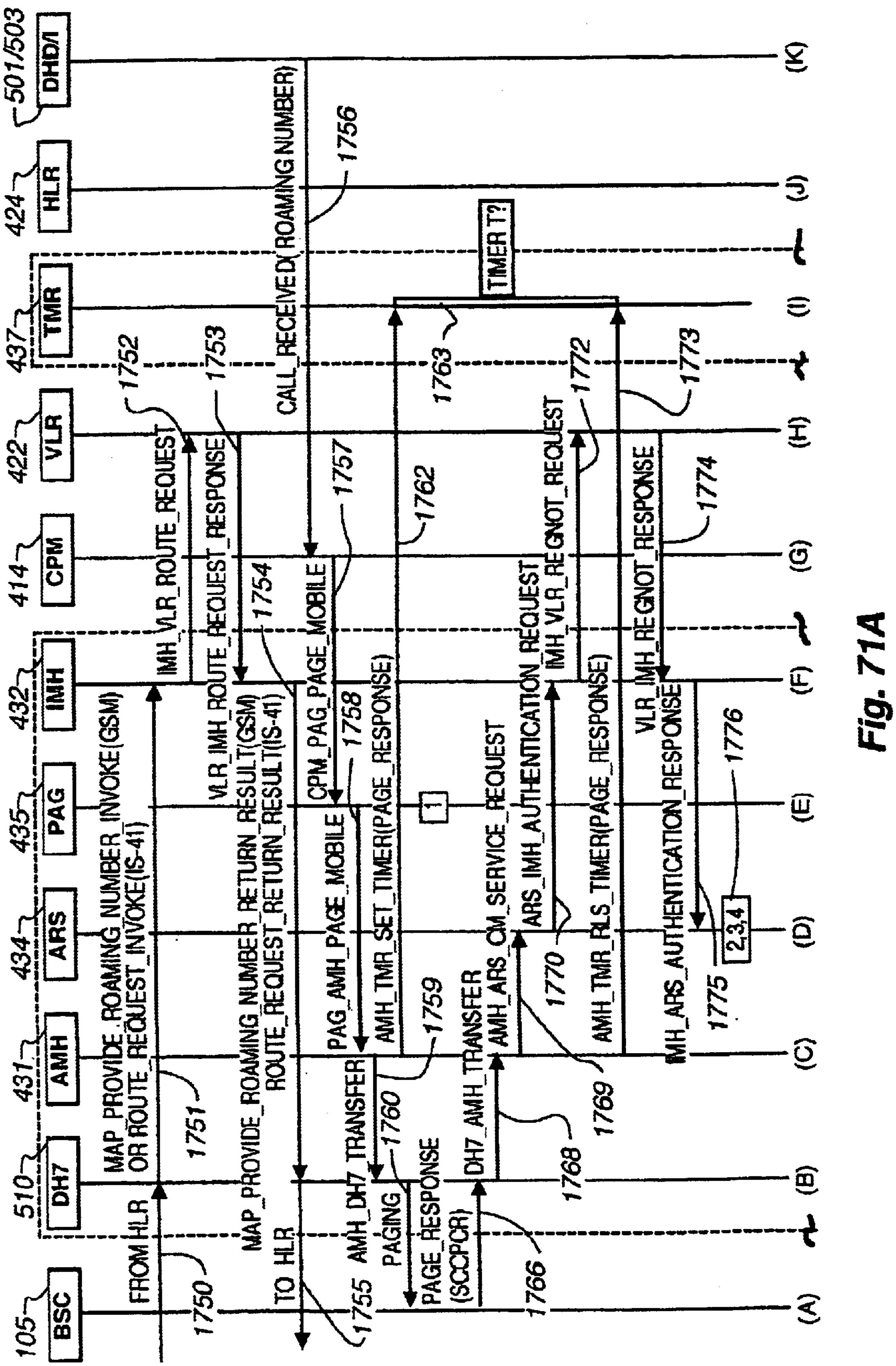
Figure 71B:
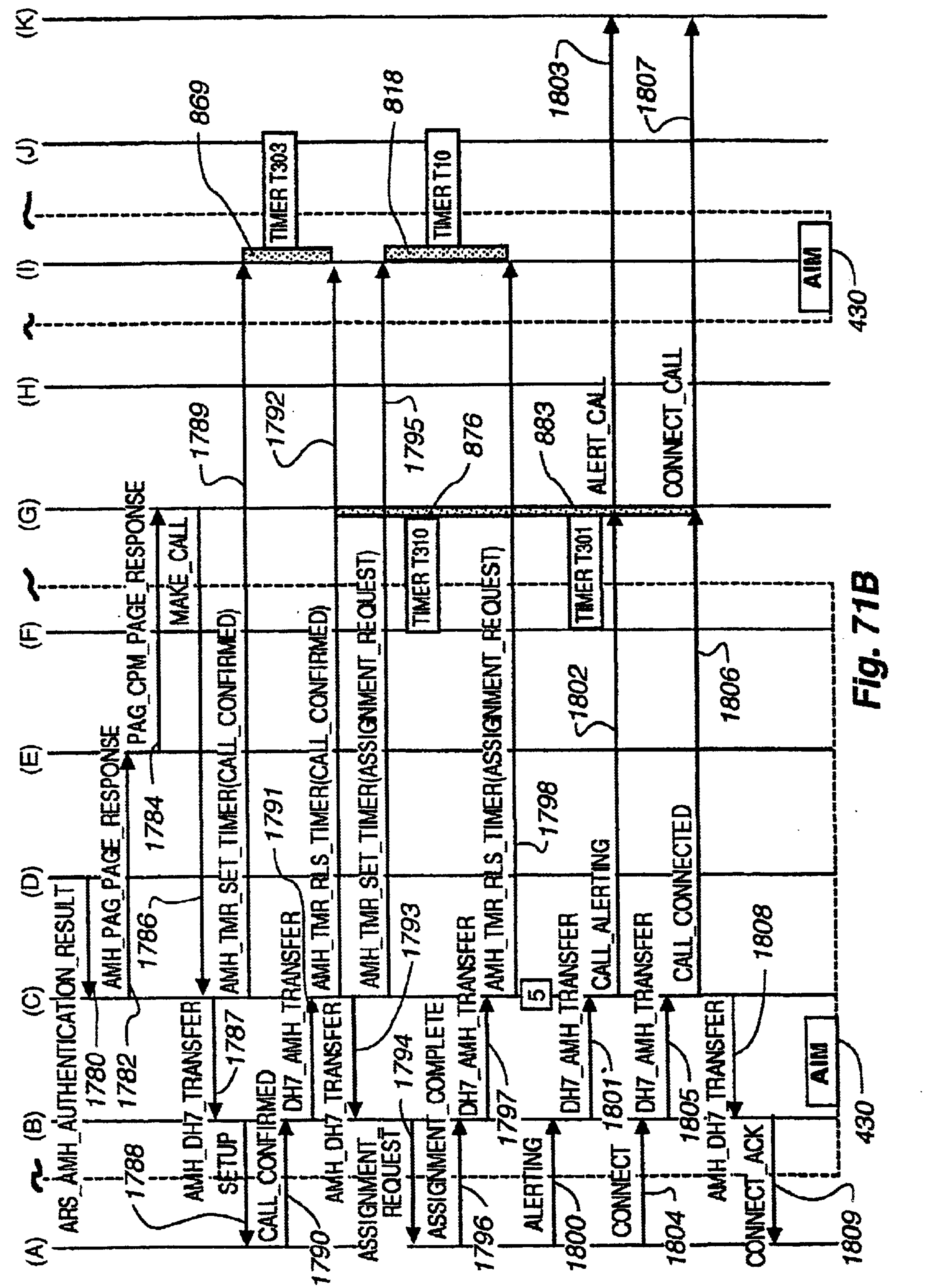

FIGS. 71A–B shows the message flows associated with call processing for a mobile unit 112 homed on an external HLR but operating within the wireless network controlled by the aircore platform 200. In this scenario, the mobile unit 112 receives a call that goes initially to the MSC of the external wireless network. The call is then routed to the wireless network controlled by the aircore platform 200. The MSC 210 receives an invoke message 1751 from the external HLR. The IMH 432 then sends a route request 1752 to the VLR 422. Because the mobile unit 112 is roaming, it will be registered on the VLR 422. The VLR 422 returns a route request response 1753 to the IMH 432, which sends a roaming number 1754 to the external HLR indicating the location of the HLR 424. The remaining message flows are similar to those in FIG. 49 with the exception that the IMH 432 does not have to locate the mobile unit.

Figure 72:
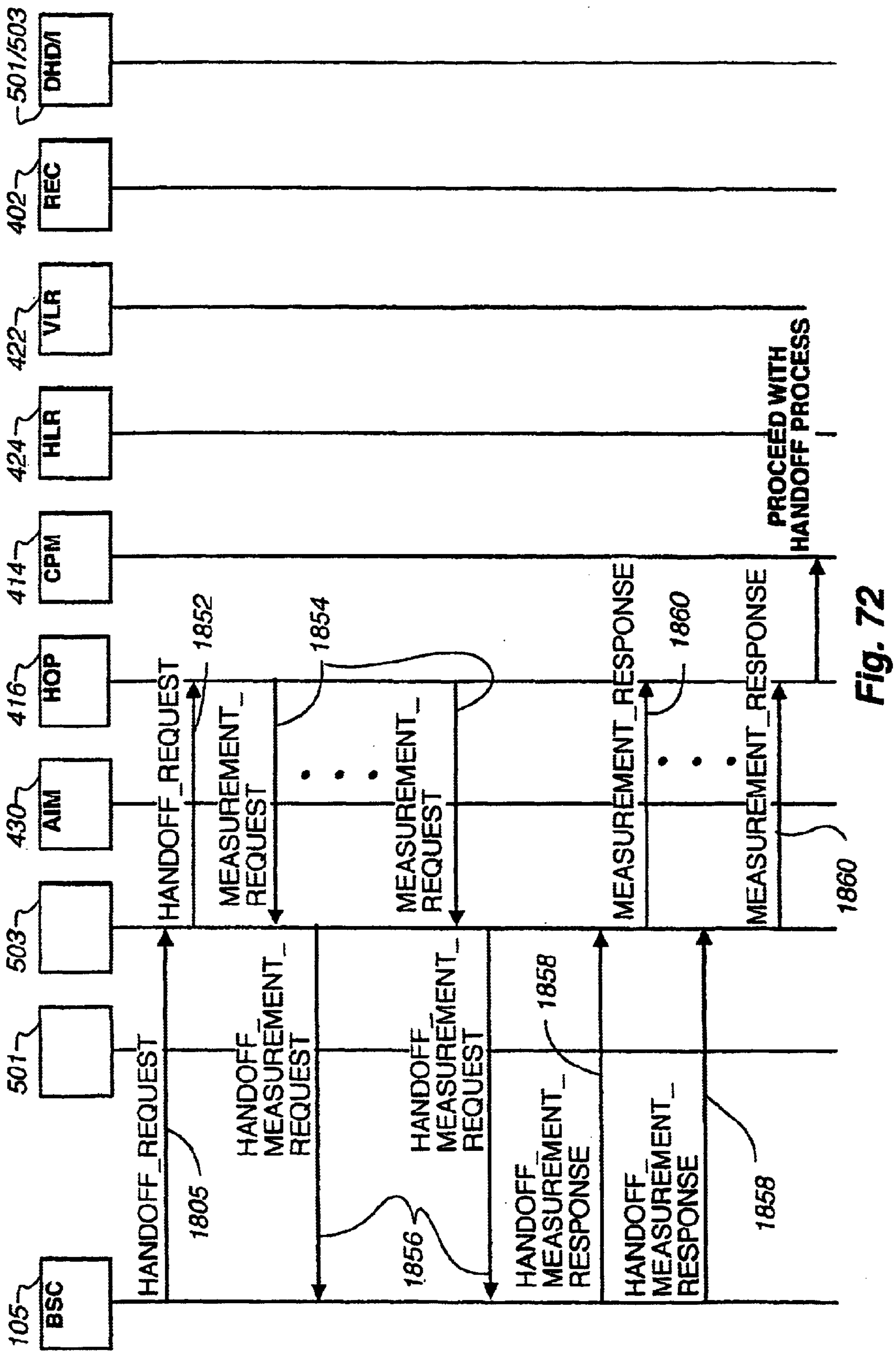
FIG. 72 is a flow chart showing message signaling associated with hand off pre-processing.

FIG. 72 shows the message flows associated with hand off pre-processing for an ISDN PRI+protocol. The BSC 105 sends a HANDOFF_REQUEST 1850 to the DHI 503, which sends a HANDOFF_REQUEST 1852 to the HOP 416. The HOP 416 returns a MEASUREMENT_REQUEST 1854 to the DHI 503, which sends a HANDOFF_MEASUREMENT_REQUEST 1856 to the BSC 105. The HOP 416 also sends measurement requests (1854'/1856') to all base stations capable of handling the message traffic from the mobile unit for which the hand off is requested. The BSC 105 returns a HANDOFF_MEASUREMENT_RESPONSE 1858 to the MSC 210, and a MEASUREMENT_RESPONSE 1860 is sent to the HOP 416. Other base stations likewise return measurement responses (1858', 1860') to the MSC 210. The HOP 416 then proceeds with the handoff process. FIG. 72 shows the initial message responses for the ISDN PRI+protocol. Other protocols use similar initial measurement flows to establish a target base station for hand off.

Wireless customers can pay for their services in a variety of ways including an annual subscription and on a monthly basis, for example. In both these cases, the customer pays for the call actually made (air time) plus a periodic base fee.

Figure 73:
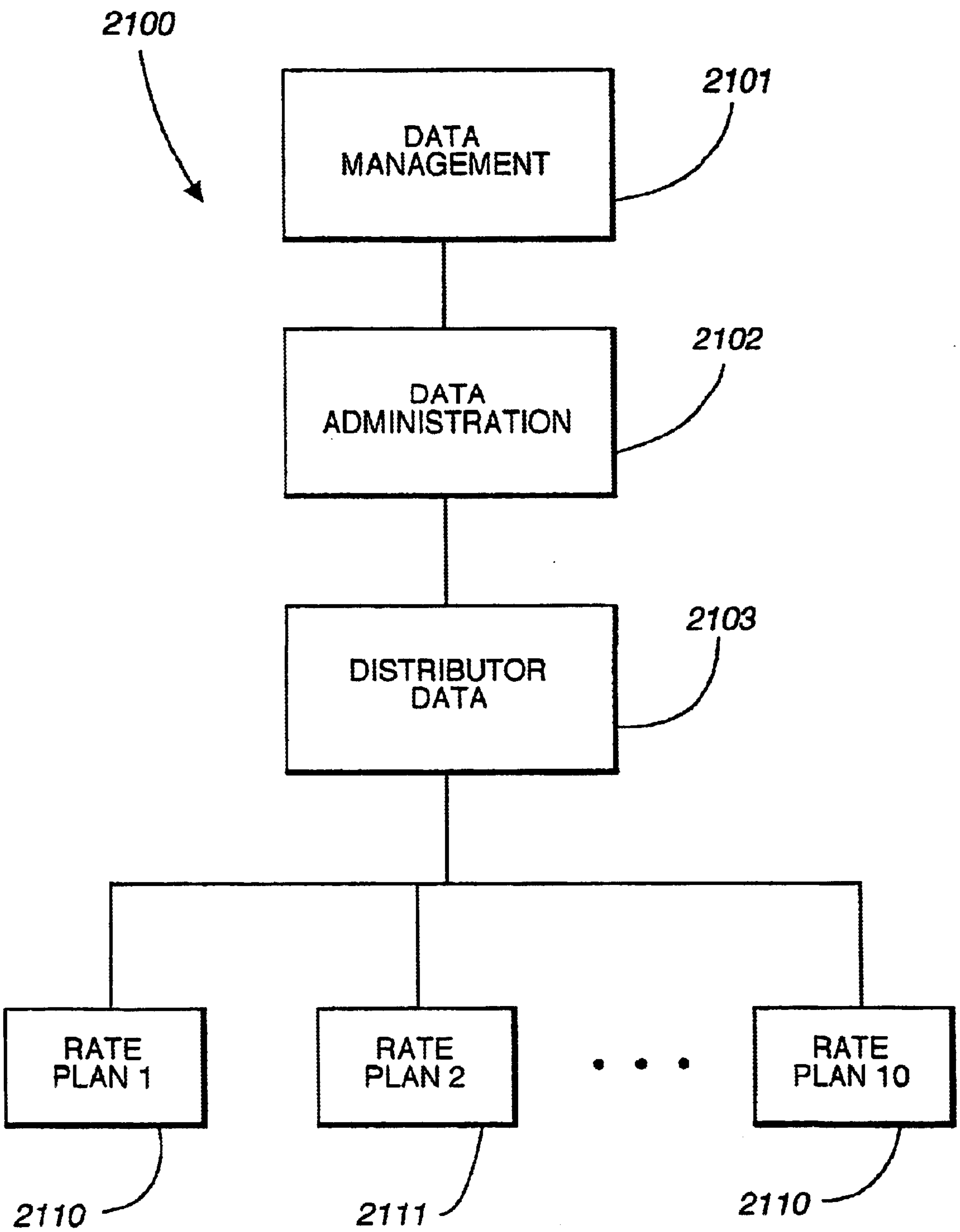
FIG. 73 is a logical diagram of a prepaid rating system.

Customers can also pay for wireless services in advance through a prepaid system. FIG. 73 is a logical diagram of an aircore prepaid rating system 2100. The aircore prepaid rating system 2100 includes a data management module 2101, a rating administration module 2102, a distributor data module 2103, and distributor rate plans 2110 through 2119. Thus, a distributor can have up to ten different rate plans. Each customer can select one of the ten different rate plans for each distributor in the aircore prepaid rating system 2100.

The distributor can be viewed much like a class of service is viewed in routing. The distributor is a classification of rating service that is assigned to certain groups of subscribers in the aircore system. A distributor could be a point of sale, a corporate customer, or an operator classification for a group of customers. Within each distributor, there can be up to ten different rate plans configured. A rate plan establishes the air time rates for the plan. The combination of distributor and rate plan provide a comprehensive rating schedule for a variety of combinations within the system.

Within each customer profile 460 (see FIG. 20) in the aircore HLR 424, the parameter for prepaid service is configured as prepaid or not. The prepaid configuration of the customer is controlled via a prepaid check box and associated prepaid window and a graphical user interface (see FIG. 89). The window is used to define the distributor and rate plan that the customer uses for the prepaid service. Also, the credited amount for the account is input with the prepaid data. This field tracks the amount of service that a customer is allowed on the system. The amount is updated in real-time to track the usage of the system by the customer.

A third part of the prepaid system is bill generation that is integrated as part of a call record management subsystem. The set of functions available allows the operator the ability to create a range of reports based on operator defined billing cycles.

In operation, when a customer who has elected a prepaid plan uses the aircore prepaid rating system 2100, the customer profile 460 is pulled from the HLR 424 to determine the applicable distributor rate plan. The information from the customer profile 460 is passed to the CPM 414. The CPM 414 determines if the customer has an account balance sufficient to pay for the call. The CPM 414 also determines the least cost route for the call, including defining the land charge and the air time charge associated with the destination and time of day of the call to come up with the per minute charge. This value is then used to set a timer that will indicate when the customer's account reaches a balance that corresponds to two minutes left on a call.

Once the prepaid call has begun, the timer begins a time out process and when the two minute position is reached, a tone warning is provided to the customer indicating that the customer is running out of money. No further warnings are provided, and once the next two minutes have expired, the TMR 437 sends a message to the CPM 414 indicating that the time has expired. The CPM 414 then initiates a call cutoff, terminating the prepaid call. In this way, the customer cannot overrun the prepaid account balance.

At the completion of the call, the billing system 260 calculates how much the call actually cost for the customer and updates the amount in the HLR 424. A call detail record (CDR) is prepared that provides the detailed information regarding the call so that the billing system 260 can determine the remaining account balance. The bill generated by the billing system 260 is then used to update the customer profile 460.

In the wireless environment shown in FIG. 1*a*–1*d*, there may be a need to locate customers who place distress, or emergency (911), calls. These 911 calls are used to gain rapid access to local authorities and emergency service centers, if a customer places a 911 call from a wired device, locating that customer is easy using call tracing procedures. Customers using wireless devices are more difficult to locate.

The air core platform 200 solves the problem of wireless customer location by creating an identification number based on the current position of the customer in the wireless environment. The aircore platform 200 uses the identification number as the dialed number to route the call to an emergency service center. The identification number includes the position data available from the BSS where the call origination is received. The location information received from the BSS is coded in hexadecimal.

The aircore platform 200 converts the hexadecimal number to binary coded decimal (BCD) and uses this number as an indication of the customer's location.

Following is an example of the data conversion used by the aircore platform 200 to convert the location data received from the BSS 110 to a dialed number for emergency callers. The data received could be as shown in the following table in which the BSS 110 receives the location of a customer with cell ID granularity. The MSC 210 converts the data as shown in the table.

| FIELD | RESULTING NUMBER OF DIGITS |
|---|---|
| Mobile Country Code | Up to 3 |
| Mobile Network Code | Up to 3 |
| Location Area ID | Up to 3 |
| Cell ID | Up to 3 |

The numbers produced from the conversion yields a unique 12 digit number identifying that cell in the system.

The aircore platform 200 may incorporate the concept of customer groups to define the routing translations (classes of service) for the wireless network. A customer group is a table of number ranges that is used to determine if a call is allowable. The aircore platform 200 searches the list of entries in the table. If a match is found, the call is allowed to proceed. If a match is not found, the call is not allowed to proceed in the wireless network.

The aircore platform 200 allows for the definition of up to 256 different customer groups. Each customer in the system, and each trunk, is associated with a customer group when a customer group is initially configured. The customer group that is used for a particular call is determined based on: 1) the customer placing the call; and 2) the trunk that received the call.

For emergency calls, a specific customer group is used to provide the routing translations. For emergency calling, the aircore platform 200 uses emergency translations.

Figure 74:
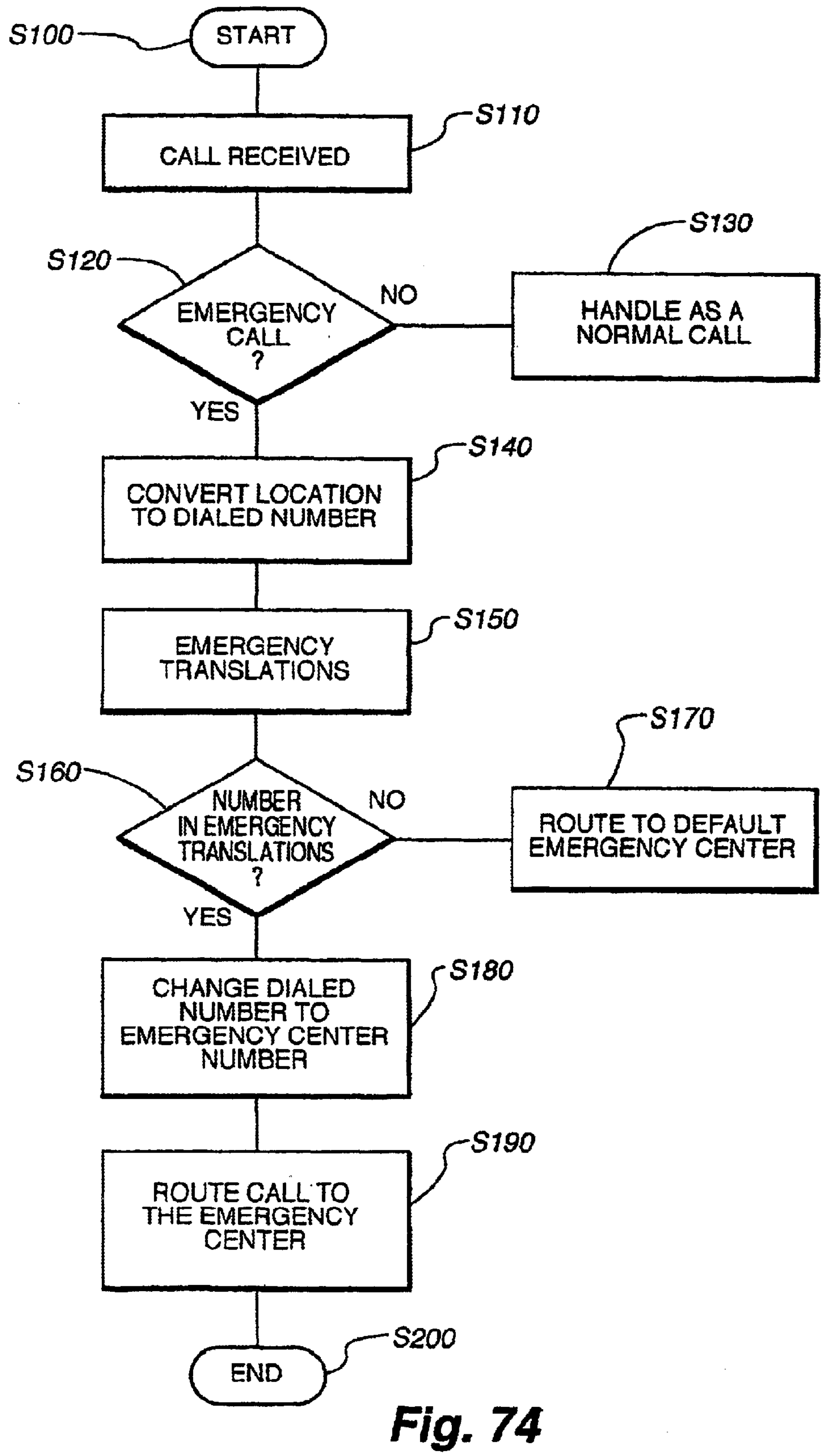
FIG. 74 is a flow diagram illustrating emergency call processing.

FIG. 74 is a flow diagram illustrating emergency call processing using the aircore platform 200. The processing starts as step S100. Instep S110, the call is received at the aircore platform 200. The process then moves to step S120. In step S120, the aircore platform 200 determines if the call is an emergency call. If the call is not an emergency call, the process proceeds to step S1130 and the call is handled as a normal call. In step S120, if the call is an emergency call, the process moves to step S140. In step S140, the aircore platform 200 converts the location of the mobile, unit to a dial-up number. The process then moves to step S150.

In step S150, the aircore platform 200 checks the portion of the customer group associated with emergency calls. The process then moves to step S160. In step S160, the aircore platform 200 determines if the dial-up number from step S140 is in the customer group. If the dial-up number is not in the customer group, the process proceeds to step S170, and the call is routed to a default emergency center. If the dial-up number is the customer group, the process moves to step S180. In step S180, the aircore platform 200 changes the dial-up number to an emergency center number. The process then moves to step S190. In step S190, the call is routed to the emergency center. The process then moves to step S200 and ends.

The aircore platform 200 can also support other communication features. For example, the aircore platform 200 may be used with a long-distance resale system.

The aircore platform 200 can also be used to provide microcellular wireless networks in combination with landline local networks or private branch exchanges (PBX). There are several standards including computer supported telecommunications applications (ClSA), windows telephony application programming interface (TAPI), and telephony services application programming interface (TSAPI), for example, that allow a PBX to incorporate equipment and features from outside vendors. These protocols also allow for call control and routing decisions to be made by a system that is external to the PBX. The external system can be used to allow for connectivity, feature processing, and seamless number management that allows customers to use both the PBX infrastructure and a separate wireless system using one telephone number and one customer feature profile.

Figure 75:
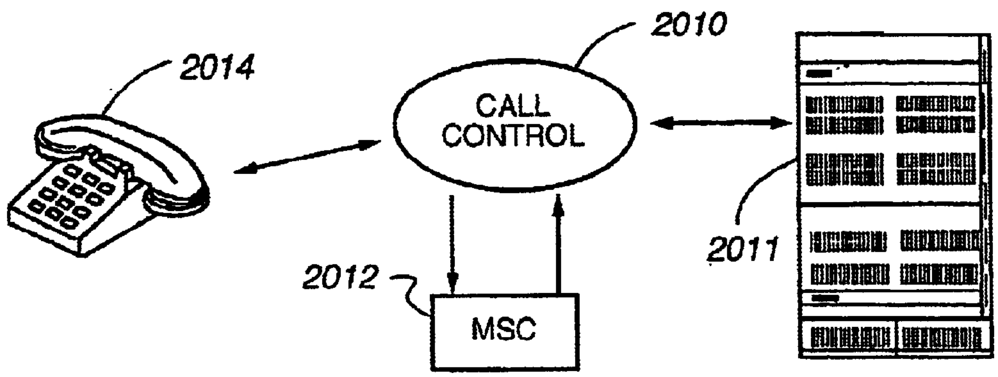
FIG. 75 is a block diagram illustrating first party call control.

The aircore platform 200 provides an external control function to integrate a wireless system, or microcell, and a PBX using the technique of third party call control. FIG. 75 is a diagram illustrating first party call control. In FIG. 75, an application 2010 controls a call from a PBX 2011 to a telephone 2014. The control of the call is related to each of the signals and messages passed between the telephone 2014 and the PBX 2011. First party call control is often used as a call control feature in private branch exchanges.

Figure 76:
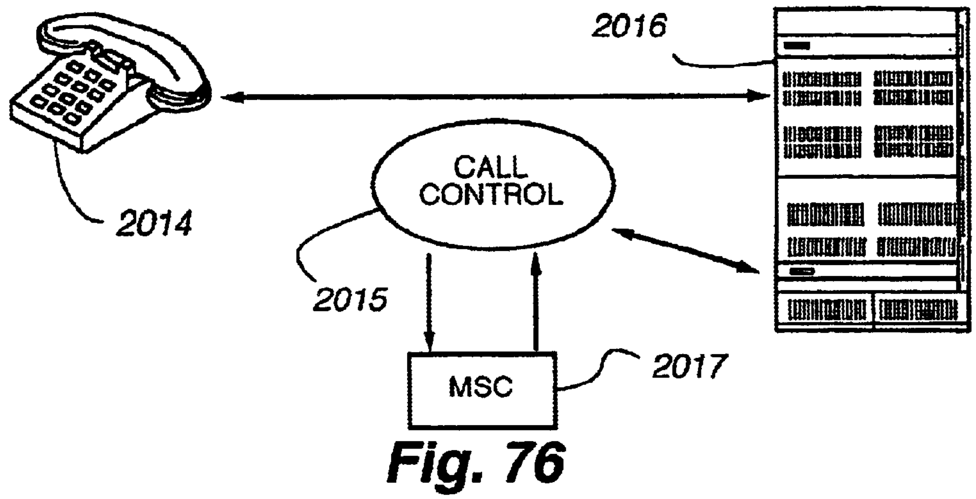
FIG. 76 is a block diagram illustrating third party call control.

FIG. 76 illustrates third party call control. In FIG. 76, a call control application 2015 provides direct control over termination of a call to the resource such as the telephone 2014. Calls into a PBX 2016 are routed under the control of the call control application 2015. The aircore platform 200 can incorporate the concept of third party call control to add on to the functionality of a PBX. In particular, the aircore platform 200 may be used with a PBX to add in-building wireless communication capabilities to an existing wired private branch exchange.

A standard PBX interface control element (SPICE) may be added to the aircore platform 200 to provide an interface to a PBX. The SPICE includes software that can operate with the control protocols of different PBXs. The SPICE interfaces internally with the HLR 424 and the SCR 314 (see FIG. 10). A system operator may interface with the SPICE using a graphical user interface (GUI).

The SPICE provides third party call control messaging needed to provide the notice of an incoming call, decide how to handle the incoming call and send the appropriate commands to route the incoming call to the correct destination. The SPICE may be co-located with the HLR 424, and requires the basic retrieval capabilities of the HLR 424. The customer profile information in the HLR 424 allows the SPICE to determine how to handle a call. For example, the customer profile may indicate the operational modes for the customer's wired and wireless telephone handsets.

Customers whose PBX incorporates wireless features, including the SPICE, noted above, may designate one or more operational modes for their telephone handsets. Customers may elect to have incoming call terminate at their desktop telephone first. If the desktop telephone is not available, the call may be routed, via a MSRN, to the customer's mobile unit. Second, the call may be first routed to the mobile unit. If the mobile unit is not available, the call may be routed to the desktop telephone. Third, the call may be routed to the customer's mobile unit only. Fourth, the call may be routed to the customer's desktop telephone only. Fifth, the call may be routed to the mobile unit only when operating in the mobile unit's 112 home area.

One advantage of this arrangement is that the HLR 424 may house the full suite of call forwarding features, voice mail and announcements. The customer's profile determines how the call is handled.

If the customer profile indicates that incoming calls are first routed to a mobile unit, the HLR 424 will locate the customer in the telecommunications network and then have an MSRN allocated to deliver the call to the switch where the customer's mobile unit is residing.

If the customer profile lists the desktop telephone as the first call delivery option, the SPICE determines that the call should be terminated to the desktop telephone. If the customer answers the desktop telephone, SPICE's involvement in the call ends. However, if the customer does not answer at the desktop telephone, SPICE processing can determine the appropriate handling for the call. The call could be routed to the mobile unit, voice mail, or an announcement, for example.

Figure 77:
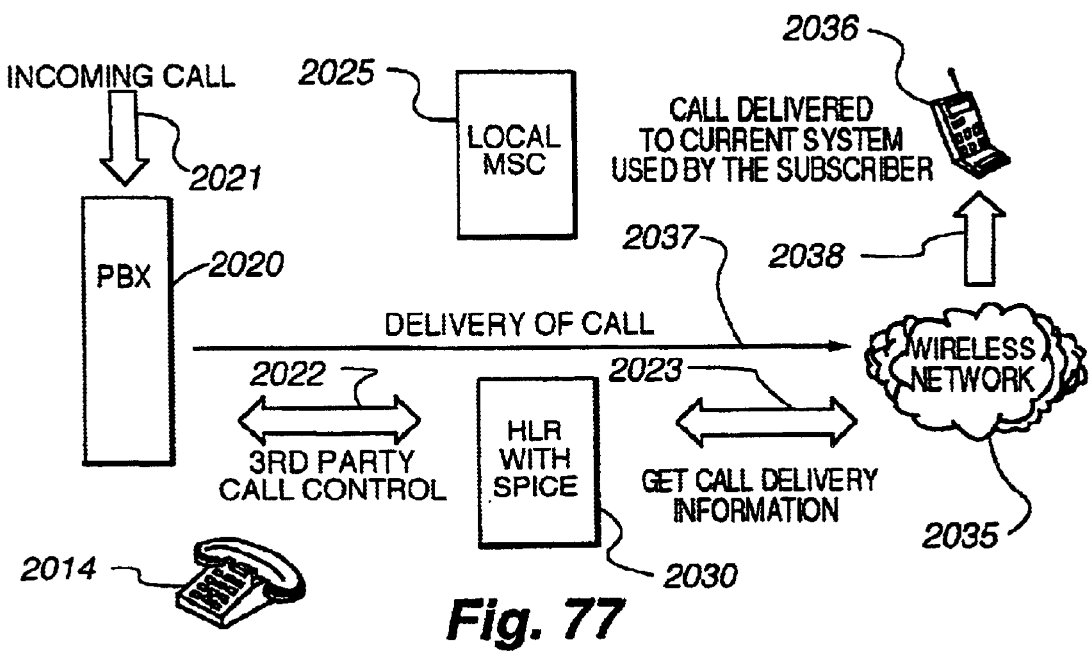
FIGS. 77–79 are block diagrams of call delivery methods using third party call control.
Figure 78:
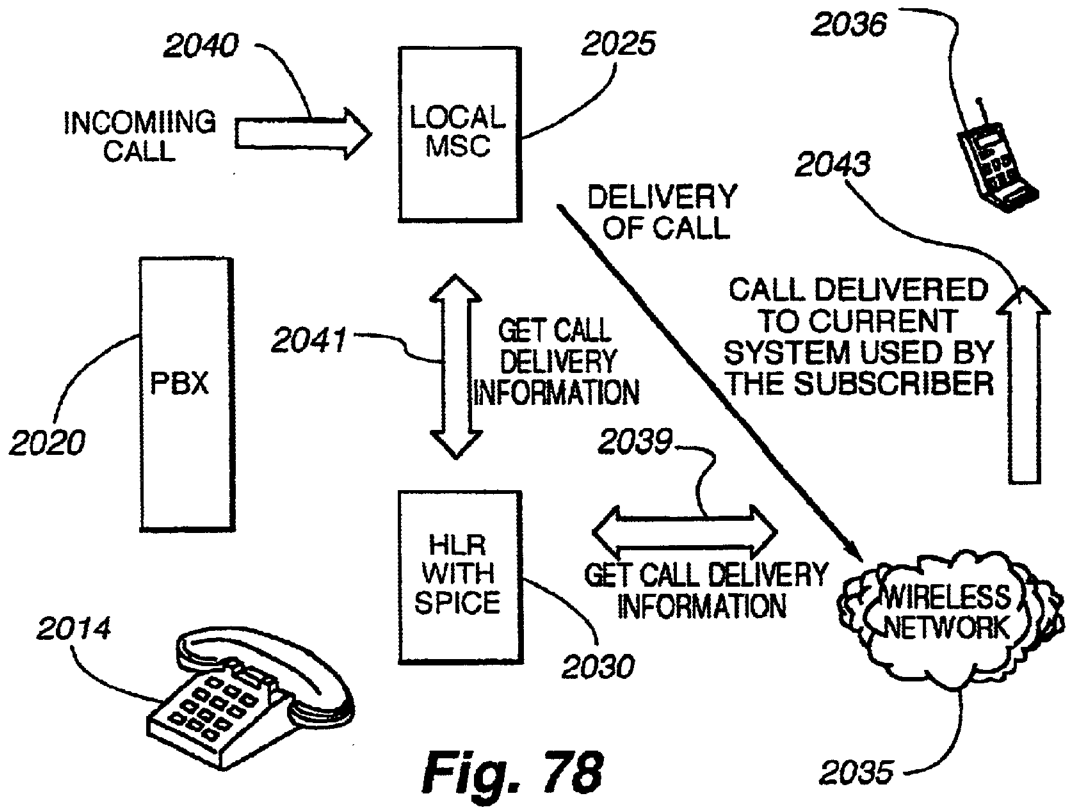
Figure 79:
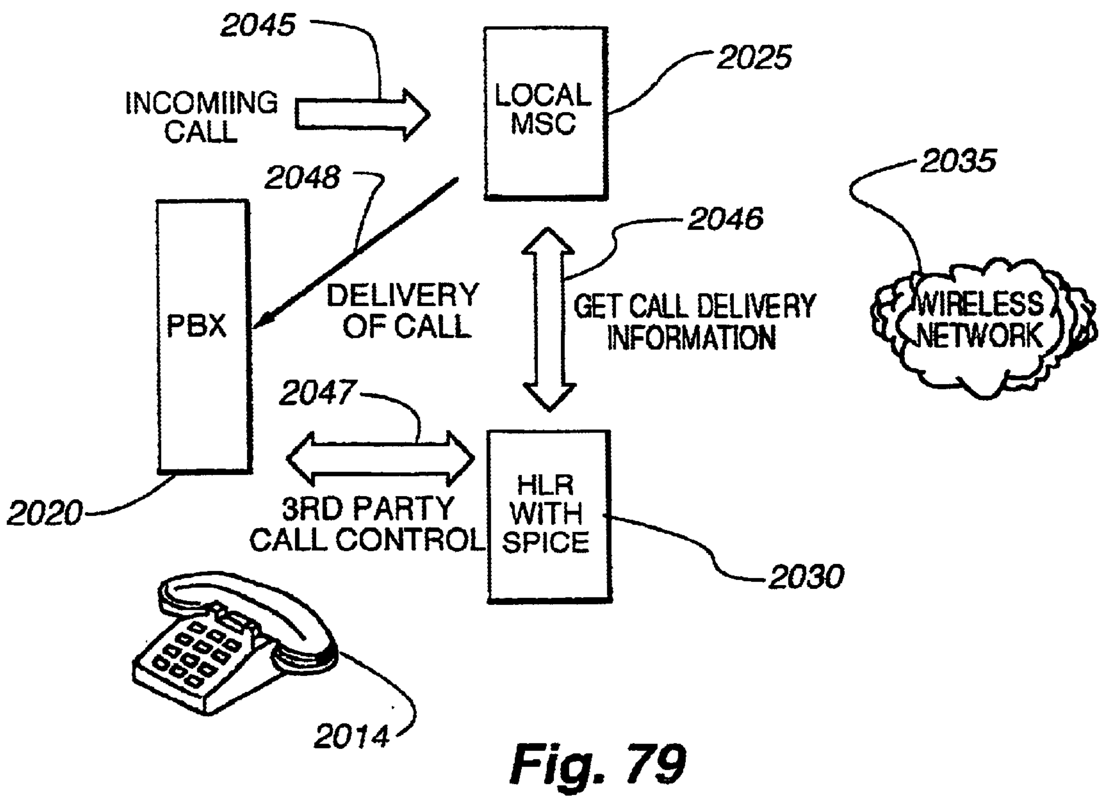

FIGS. 77–79 illustrate call routing for various call entry points. In FIG. 77, a PBX 2020 receives an incoming call from a PSTN (not shown). The PBX 2020 uses third party call control over a CSTA interface (not shown) to notify (2022) a HLR 2030 that a customer has received an incoming call 2021. The HLR 2030 determines that the customer is currently roaming on another wireless telephone system, and that the call needs to be delivered to the customer. Using standard mobile application messaging, the appropriate number for the delivery is allocated and sent (2023) to the PBX 2020. Via the CSTA interface, the PBX 2020 is commanded to send the call over the PSTN with the delivery number as the destination. The call arrives at a local MSC 2025 and is delivered (2037, 2038) via a wireless network 2035 to a mobile unit 2036.

FIG. 78 shows a scenario for call delivery to the mobile unit 2036 when the local MSC 2025 is the point of entry for the call from the PSTN (not shown). An incoming call 2040 is received from the PSTN at the local MSC 2025. The MSC 2025 communicates (2041) with the HLR 2030 for call delivery information. The HLR 2030 determines that the customer is roaming on another wireless network 2035 and that the call should be delivered to the wireless network 2035. The appropriate number for delivery is allocated and sent (2039) to the MSC 2025. The MSC 2025 then delivers (2042, 2043) the call to the mobile unit 2036.

FIG. 79 shows a scenario for call termination to a desktop telephone. In FIG. 79, the local MSC 2025 receives an incoming call 2045 from the PSTN (not shown). The MSC 2025 communicates with the HLR 2030 for call delivery information. The HLR 2030 determines that the customer is not registered in the wireless network 2035 and determines that the call should be terminated to the PBX 2020. The HLR 2030 allocates (2047) a delivery number for the PBX 2020. Using standard procedures, the HLR 2030 sends the delivery number to the MSC 2025. The MSC 2025 then delivers (2048) the call 2045 to the PBX 2020. Using third party call control, the HLR 424 associates the call 2045 with a customer and the call 2045 is terminated to the desktop telephone 2014.

Figure 80:
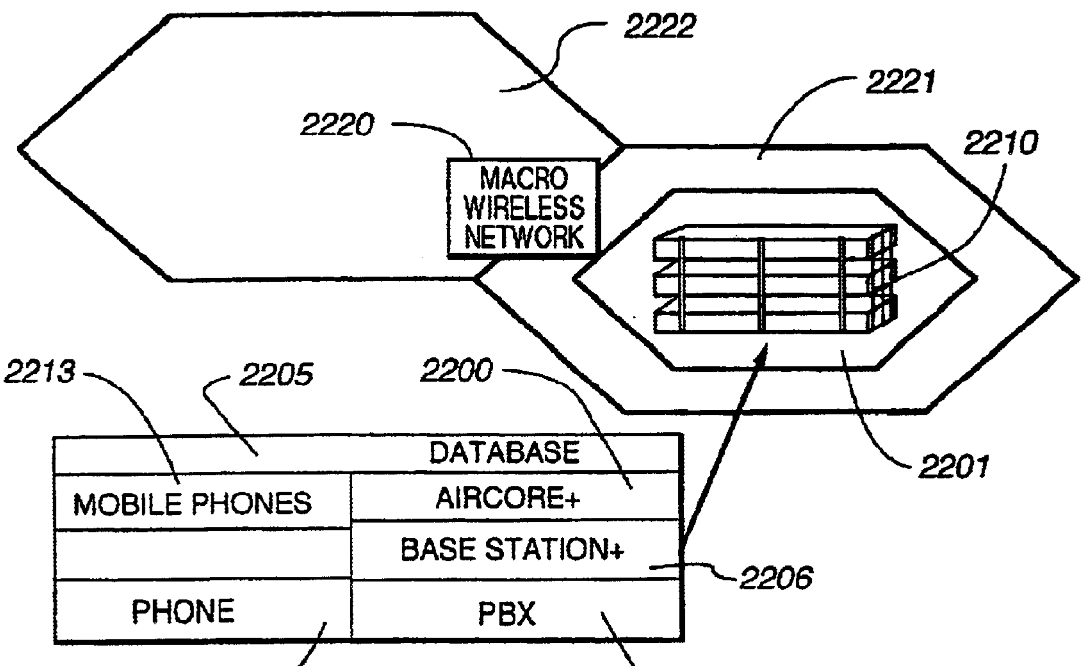
FIG. 80 is a block diagram of an in-building wireless communications network.

FIG. 80 shows an aircore platform 2200 that is used to provide an in-building wireless and wired telephone system with third party call control. A building 2210 includes a PBX 2211. The PBX 2211 connects to wired telephones 2212. The building 2210 also includes a microcellular wireless network 2201 serving mobile units 2213. The PBX 2211 connects to the aircore platform 2200 via wired a connection and a suitable interface such as a RS-232 interface. The aircore platform 2200 includes a base station controller 2206 and a suitable interface to provide wireless communication to the microcellular network 2201. The BSC 2206 may be incorporated as a component on a card in the aircore platform 2200. A separate database 2205, containing information related to customers of the building 2210 may be provided with the aircore platform 2200. Alternately, the data may be included in a home location register in the aircore platform 2200. Finally, macro cellular systems, such as the extended wireless network 2220 with cells 2221 and 2222 may exist external to the microcell 2201.

In operation a customer using both a wired telephone 2212 and a mobile unit 2213 may specify, by entry in the database 2205, for example, which of the wired telephone 2211 and mobile unit 2213 should receive a call. Thus, when a call comes in to a particular customer, the aircore platform 2200 will determine which of the wired telephone 2212 and the mobile unit 2213 to connect to first. The aircore platform 2200 can be further instructed that when the mobile unit 2213 is active, or in a power-on state, all calls should first be routed to the mobile unit 2213. If the mobile unit 2213 does not respond after a certain number of rings, the incoming call can then be routed to the wired telephone 2212. The microcellular network 2201 may also be used for visitors to the building 2210. In this case, a visitor having a mobile unit may have that mobile unit initiate a registration notification when the mobile unit enters the microcellular network 2201. Then, any incoming calls to the visitor's mobile unit will be routed through the aircore platform 2200 to the microcellular network 2201.

When a customer of the building 2210 transits from the microcellular network 2201 to the external wireless network 2220, a location update is performed that deletes the customer's location in a VLR of the microcellular network 2201, and initiates a registration notification with the mobile switching center of the external wireless network 2220. In this way, the exact location of the mobile unit 2213 may be maintained so that calls to a particular customer may be routed in accordance with the customer's routing plan contained in a VLR/HLR or the database 2205.

In the arrangement described above, a particular mobile unit 2213 and wired telephone 2212 may share a common telephone number. In an alternate arrangement, the wired telephone 2212 and mobile unit 2213 may have different telephone numbers.

A microcellular network, such as the microcellular network 2201, may also be adapted for use in large buildings, such as indoor stadiums and convention centers. A mobile switching center such as the aircore platform 2200 may incorporate multi-protocol processing and base stations so that visitors to the convention center may use mobile units inside the convention center regardless of the protocol established for the mobile unit. The aircore platform 2200 may be configured to charge different rates for different visitors to the convention center. People who work in the convention center may be charged yet another rate for using mobile units in the convention center.

Figure 81:
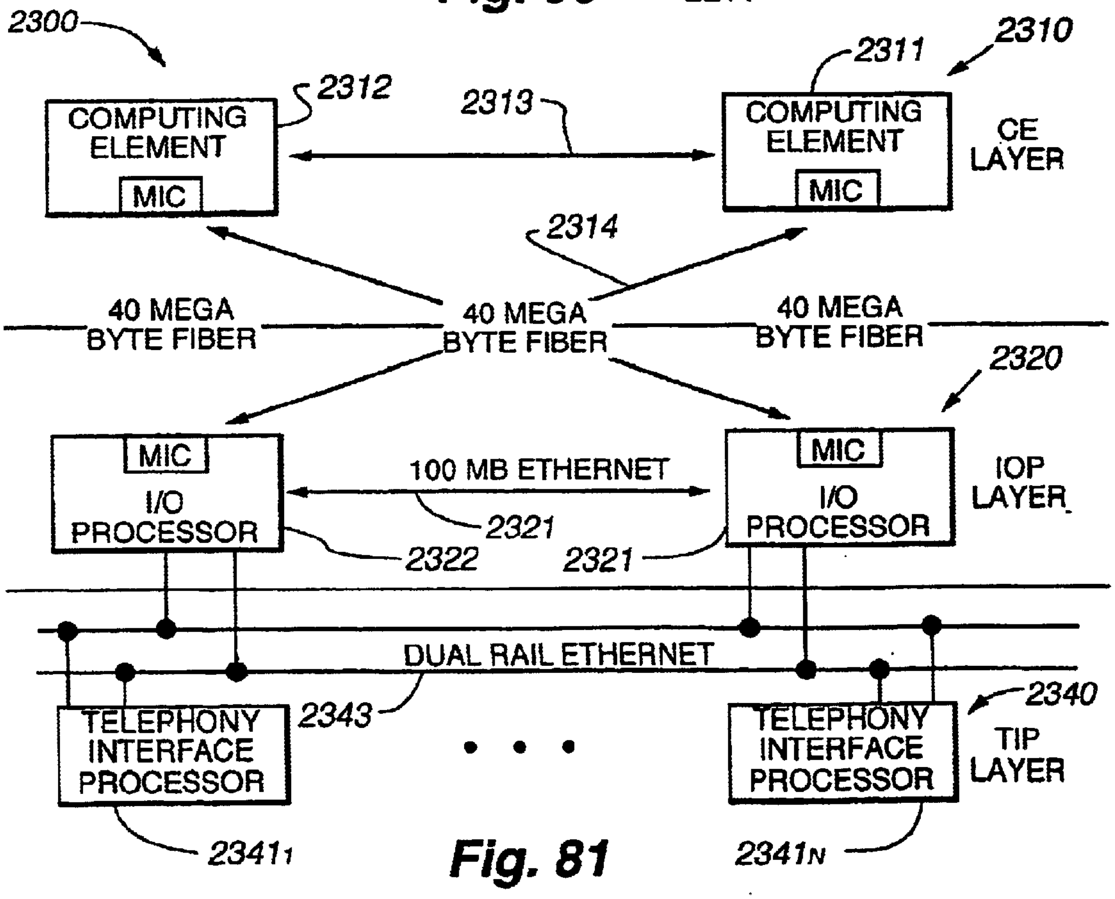
FIGS. 81–84 are block diagrams of an embodiment of the aircore platform hardware architecture.

The aircore platform 200 may incorporate fault resilient features, which may be particularly desirable for distributed wireless systems. The fault resilient hardware architecture of the aircore platform 200 may be logically split into three layers as shown in FIG. 81. A hardware architecture 2300 includes a computing element layer 2310. The computing element layer 2310 includes computing elements 2311 and 2312. The computing elements 2311 and 2312 are connected by an appropriate communications medium such as an ethernet 2313. The ethernet 2313 may have a capacity of 100 Mb or more, for example.

An input/output (I/O) processor layer 2320 includes I/O processors 2321 and 2322. The I/O processors 2321 and 2322 are connected by an appropriate communications medium such as a 100 Mb ethernet 2323. The I/O processors 2321 and 2322 are both connected to each of the computing elements 2311 and 2322 by an appropriate communications medium such as a 40 Mb fiber optic cable 2314.

A telephony interface processor (TIP) layer 2340 includes a plurality of telephony interface processors (TEPs) $\mathbf{2341}_1$–$\mathbf{2341}_n$. The TEPs $\mathbf{2341}_1$–$\mathbf{2341}_n$ are connected by a dual rail ethernet 2343. The ethernet 2343 is also used to connect the TIPs $\mathbf{2341}_1$–$\mathbf{2341}_n$ with the I/O processors 2321 and 2322.

The three layers described above comprise the three main processing areas of the aircore platform 200. Communications between the three layers provides for a variety of physical layouts and geographical configurations. For example, the fiber optic connection between the computing element layer 2310 and the I/O processor layer 2320 can be geographically separated by 1.5 kilometers or more. The TIPs $\mathbf{2341}_1$–$\mathbf{2341}_n$ can be spread geographically and remotely controlled via a centralized computing element layer and I/O processor layer set. Thus, the aircore platform architecture 2300 can be adapted to provide a large distributed wireless network with centralized control or the layers can be co-located.

Figure 82:
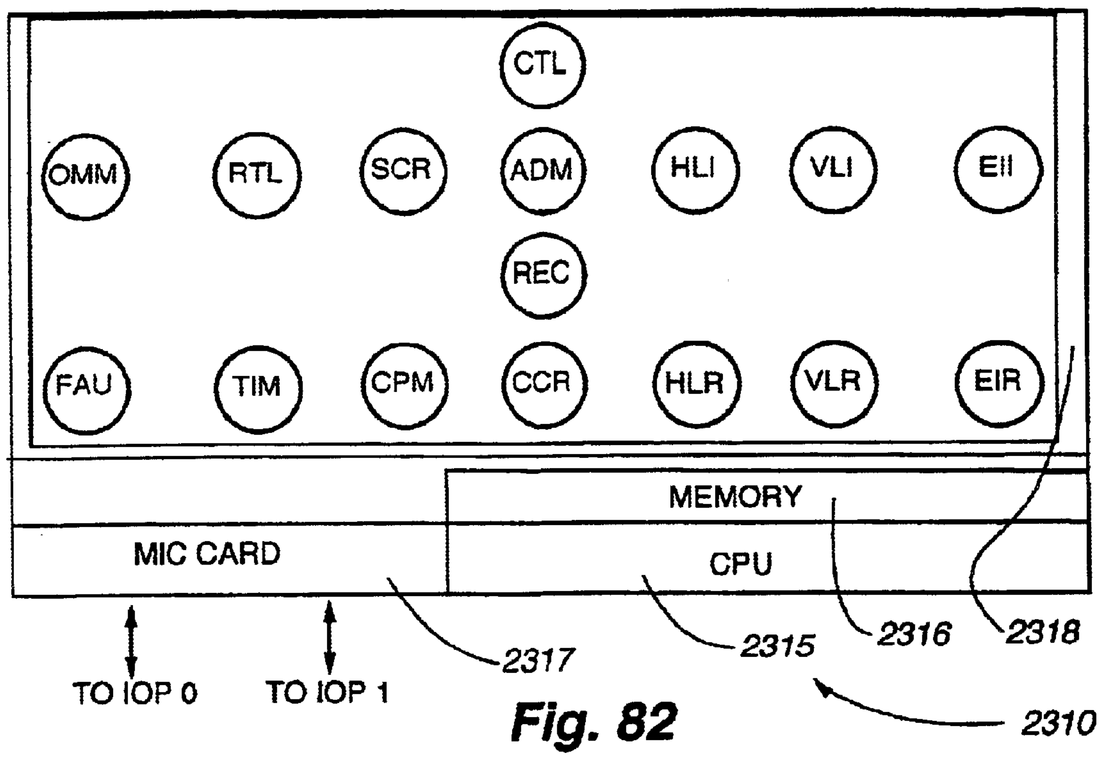

FIG. 82 shows the logical construction of the computing element 2311 in more detail. The computing element 2312 is identical to the computing element 2311 and therefore, only the computing element 2311 will be described. The computing element 2311 includes a central processor 2315, a memory 2316 and a PCI-based connector 2317 that couples the computing element 2311 to the I/O processors 2321 and 2322. Also shown is a memory 2318 that stores the software applications that operate in the computing element 2311. The software applications are described with reference to FIG. 10. The memory 2316 may be a random access memory (RAM), for example. The memory 2318 may be a read only memory (ROM), for example.

Figure 83:
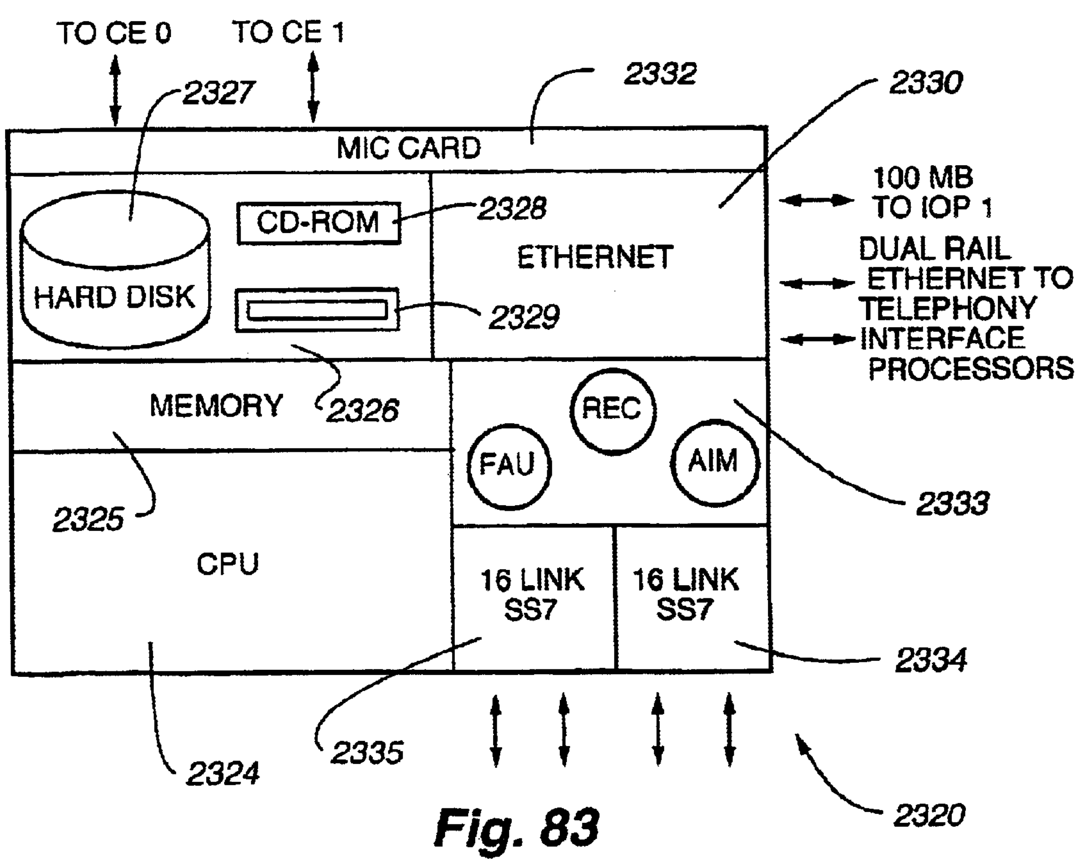

FIG. 83 shows the logical construction of the I/O processor 2321 in more detail. The I/O processor 2322 is identical to the I/O processor 2322 and therefore only the I/O processor 2321 will be described. A PCI interface 2332 connects the I/O processor 2321 to the ethernet 2314. A memory module 2326 includes a hard disk 2327, an interface slot 2328 for a CD-ROM, and an interface 2329 for a floppy disk. A memory 2325 includes the programming to operate the I/O processor 2325. A central processor 2324 controls operation of the I/O processor 2325. An ethernet interface 2330 provides connections to the ethernet 2323 and to the dual rail ethernet 2343. A memory 2333 stores application programs executed by the I/O processor 2321. Finally, SS-7 interface modules 2334 and 2335 provide connections to systems external to the aircore platform 200.

Figure 84:
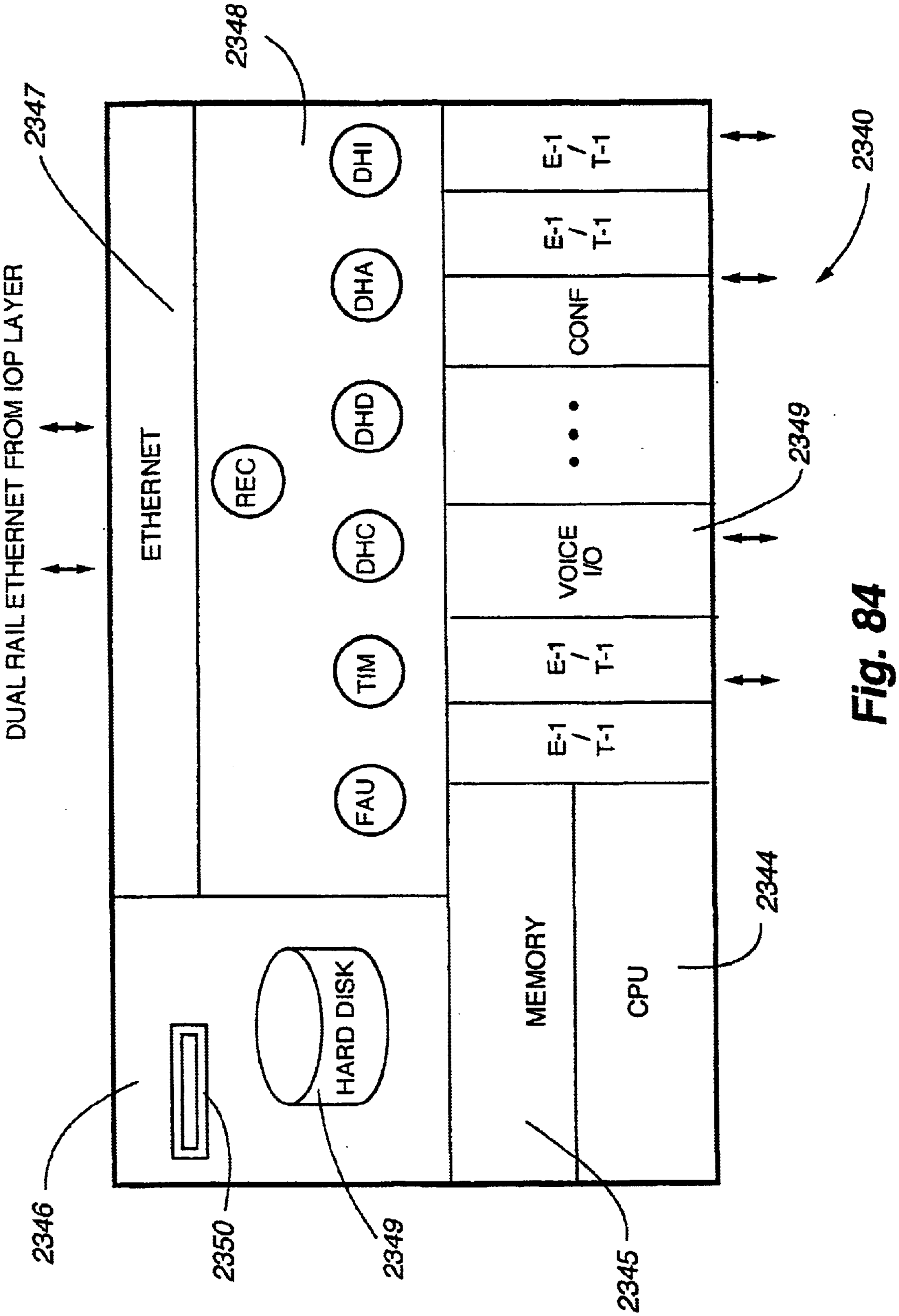

FIG. 84 shows the logical construction of the TIP 2341$_1$. The other TIPs are the same as the TIP 2341$_1$. A central processor 2344 controls operation of the TIP 2341$_1$. A memory 2345 includes the operating programs for the TIP 2341$_1$. A memory 2348 includes the application programs under control of the TIP 2341$_1$. The application programs are described with reference to FIG. 10. An interface 2347 connects the TIP 2341, to the dual rail ethernet 2343. A memory module 2346 includes a hard drive 2349 and a floppy disk interface 2350. An external interface module 2349 connects the TIP 2341$_1$ to systems external to the aircore platform 200.

Figure 85:
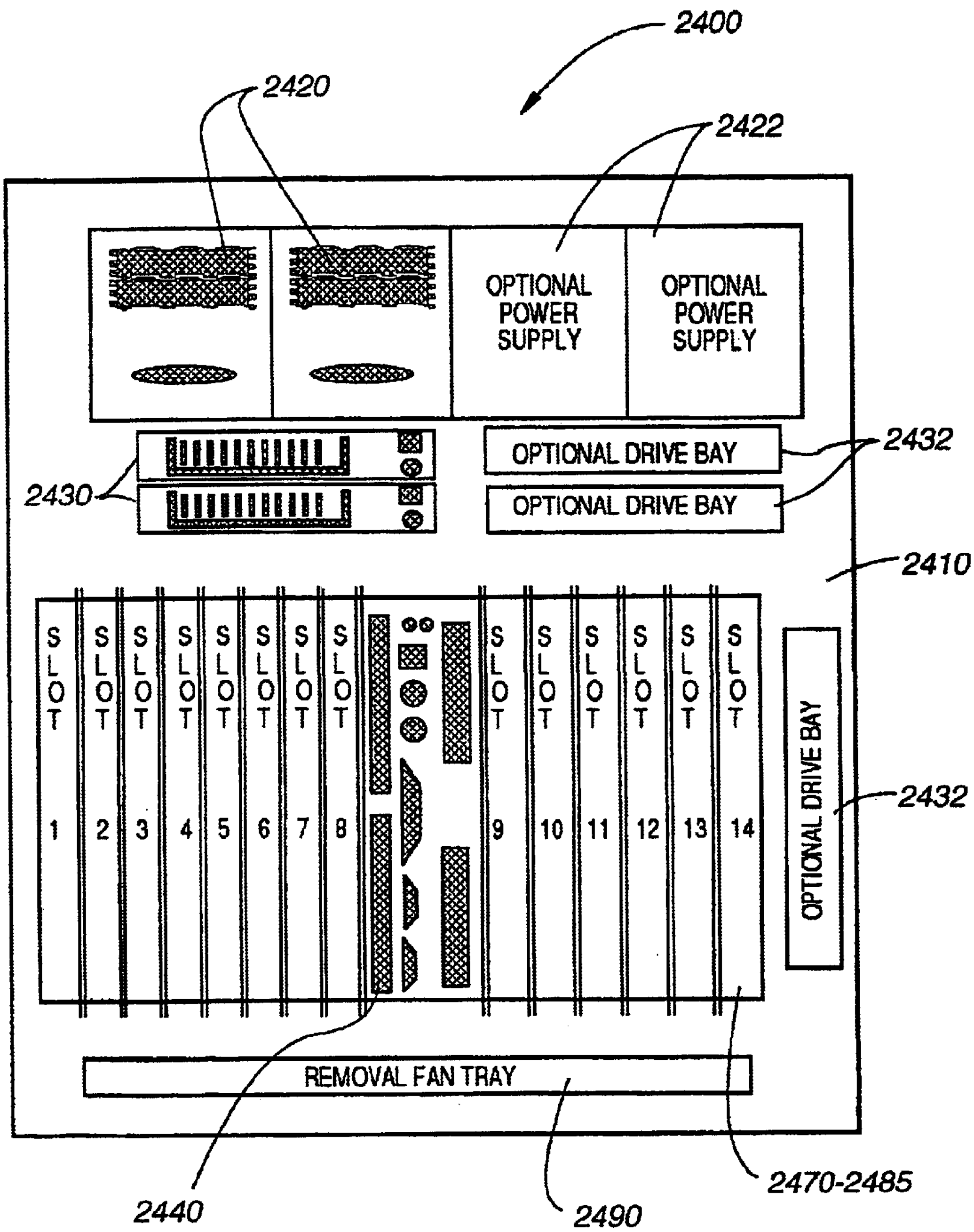
FIGS. 85–86 are block diagrams of another embodiment of the aircore platform hardware architecture.

FIG. 85 shows another hardware embodiment of the aircore platform 2400. In this embodiment, the aircore platform 2400 includes a 19-inch rack-mountable chassis 2410. The aircore platform 2400 includes dual loadsharing power supplies 2420 and optional power supplies 2422. The chassis also includes dual mirrored SCSI disk drives 2430 and optional drive bays 2432. An I/O processor board 2440 connects to telephony boards slots 1–14 for telephony boards 2470–2485. Finally, the aircore platform 2400 includes a removable fan tray 2490.

Figure 86:
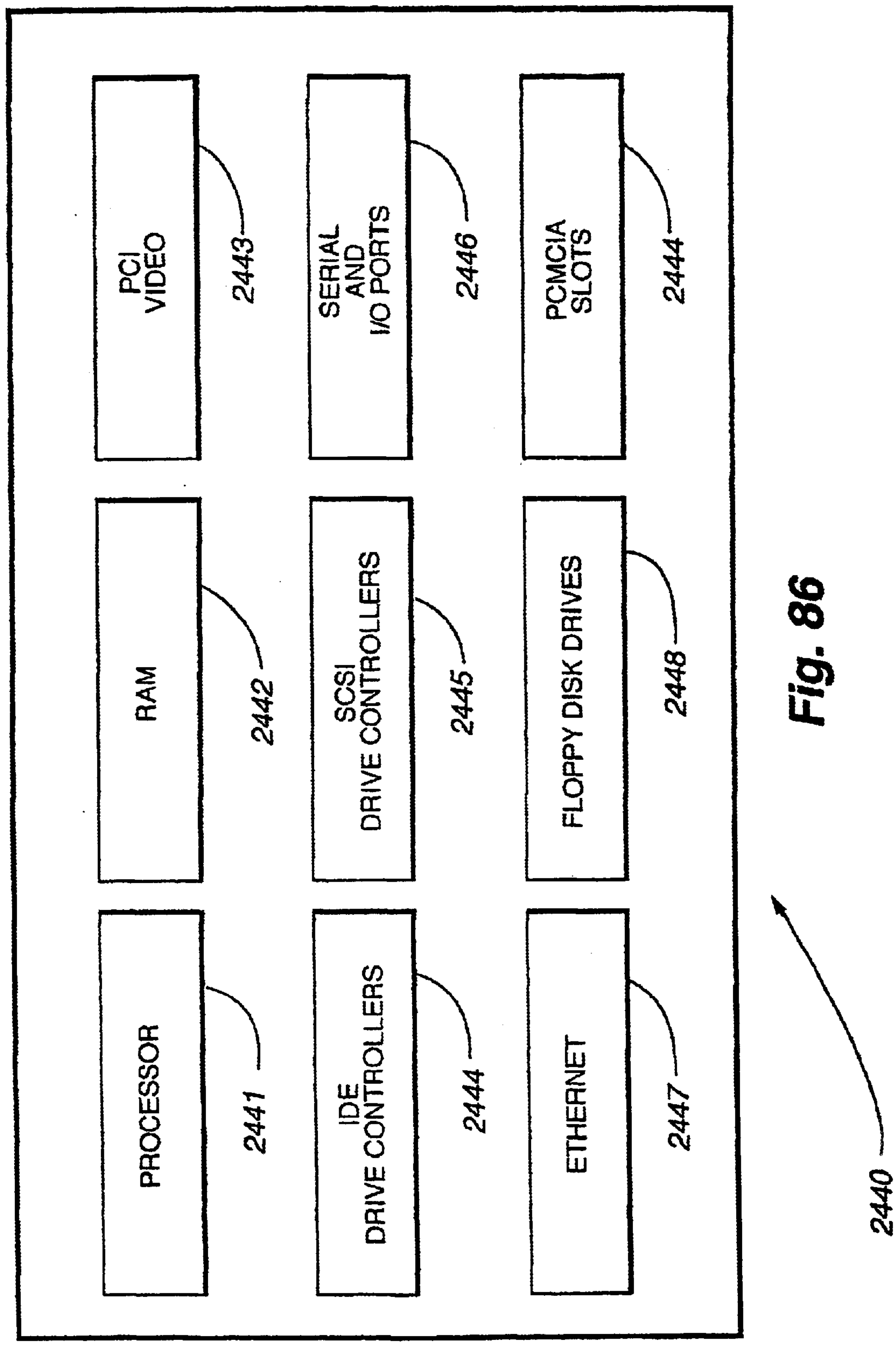

FIG. 86 shows the I/O processor in more detail. The I/O processor board 2440 includes a processor 2441 that provides bus control for the telephony boards 2470–2485. The processor 2441 can be an advanced processor such as an Intel Pentium™ family processor or other processor. The I/O board 2440 also includes a scalable random access memory 2442. The I/O processor board 2440 provides on-board PCI video 2443, IDE 2444 and SCSI drive controllers 2445, and multiple serial I/O ports 2446. Also included are Ethernet connections 2447, floppy disk drives 2448, and PCMCIA slots 2449. The I/O processor board 2440 provides front and rear access to the I/O devices. The SCSI drives 2445 may be dual mirrored 1.5 Gb hard drives. The SCSI drives 2445 may be configured in a RAID-1 format. The SCSI drives 2445 are hot swapable and can be resynchronized in case of failure.

The aircore platform 2400 may provide for local network connectivity and dial-out access using a standard 10base-T or 100base-T Ethernet connection for LAN connecting options and a 56k dial-up modem for remote access dial-in capability. Other advanced telecommunications connection devices may also be used with the aircore platform 2400. Standard telephony boards may be used with the aircore platform 2400 for T-1/E-1 and ATM communications. For example, the telephony boards 2470–2485 include TH-B 1240 OCTAL T-1/E-1 interface boards for common channel signaling based T-1s. TH-BD96 quad T-1 interfaces are provided for channel associated signaling using T-1s. TH-BD120 quad E-1 interface devises are used for channel associated signaling using E-1s. TH-BV30 voice I/O provides 30 ports of I/O and signal processing. TH-BC64 provides conferencing capabilities. A TH-BSS7 board provides both DS0 and V.35 connections. Each of the telephony boards 2470–2485 provides 4–6 trunk links. Also connected to the aircore platform 2400 are operator interface devices including a monitor 2491, a keyboard 2492, and a mouse 2493.

The switching architecture of the aircore platform 2300 or 2400 may be the H.110/H.100 based standard, for example. The H.110 and the H.100 switching matrix is a standard Application Specific Integrated Circuit (ASIC) that resides on each board in the system. This means that rather than shipping all interface channels to a single point in the system to make and break the connections for switching, each board controls its own switching. The H. 110 switching matrix uses a J4 connector or connects to the other components of the aircore platform 2400 using a J4 connector on a back plane of the chassis 2410. There may be a total of 32 streams running at speeds of 8 MH$_z$. Each stream provides 128 channels of 64 kbps. Total bus capacity ranges from 512 to 4096 channels.

The H. 100 switching matrix uses a ribbon cable to connect to boards together to provide the actual streams of digitized channels. There are a total of 32 streams running at speeds of 2 MH$_z$ to 8 MH$_z$. Each stream provides from 32 to 129 channels of 64 kbps. The total bus capacity ranges from 512 to 4096 channels.

Other switching matrices may also be used with the aircore platform 2400.

The capacity of the aircore platform 2400 may be extended. Multi-chassis configurations can be provided to claim the switch matrices together. This may be accomplished using several standard multi-chassis interconnection interfaces or by connecting the chassis via E-1or T-1 connections. The addition of ATM allows for a standard extension mechanism to the switch matrix between chassis.

Other hardware configurations besides the two embodiments described above are available with the aircore platform 200.

The aircore platform 200 incorporates graphical user interfaces (GUIs) to aid operator manipulation of system data. FIGS. 87–119 show the hierarchy of windows used with the GUIs and also show examples of GUI screens used with the aircore platform 200.

Figure 87:
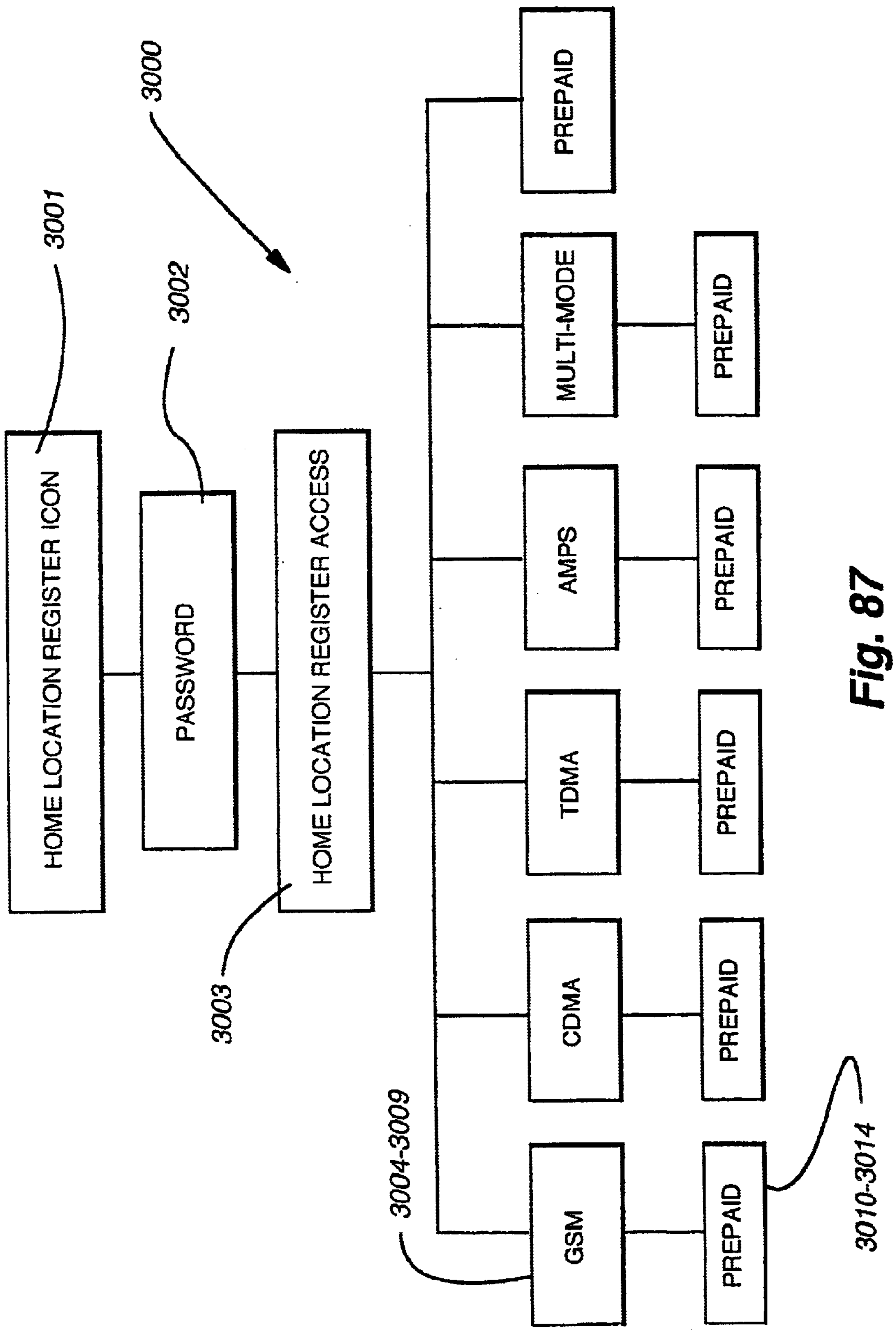
FIGS. 87–123 illustrate graphic user interface screens for use with the aircore platform.

FIG. 87 shows the hierarchy of windows used with the aircore HLR 424. A hierarchy 3000 includes a home location register icon screen 3001 which is initially displayed. Upon entry of a password in a password screen 3002, a home location register access screen 3003 is displayed. Using the home location register access screen 3003, an operator can choose one of the screens 3004–3009 for GSM, CDMA, TDMA, AMPS, multi-mode protocols, or for prepaid services. Finally, corresponding to each of the wireless protocols is a separate prepaid screen 3010–3014.

GSM subscriber profiles are configured as per the GSM feature set. CDMA subscriber profiles are configured as per the CDMA (IS-664) feature set. Multi-mode subscriber profiles may be configured for multiple air interfaces. Multi-mode subscribers use the common feature set between the GSM, CDMA, TDMA and AMPS protocols. All of the above subscriber profiles can incorporate prepaid feature functionality.

Prepaid subscriber profiles are configured as strictly prepaid in the aircore system. Prepaid subscribers may use wireless or wireless prepaid features.

Figure 88:
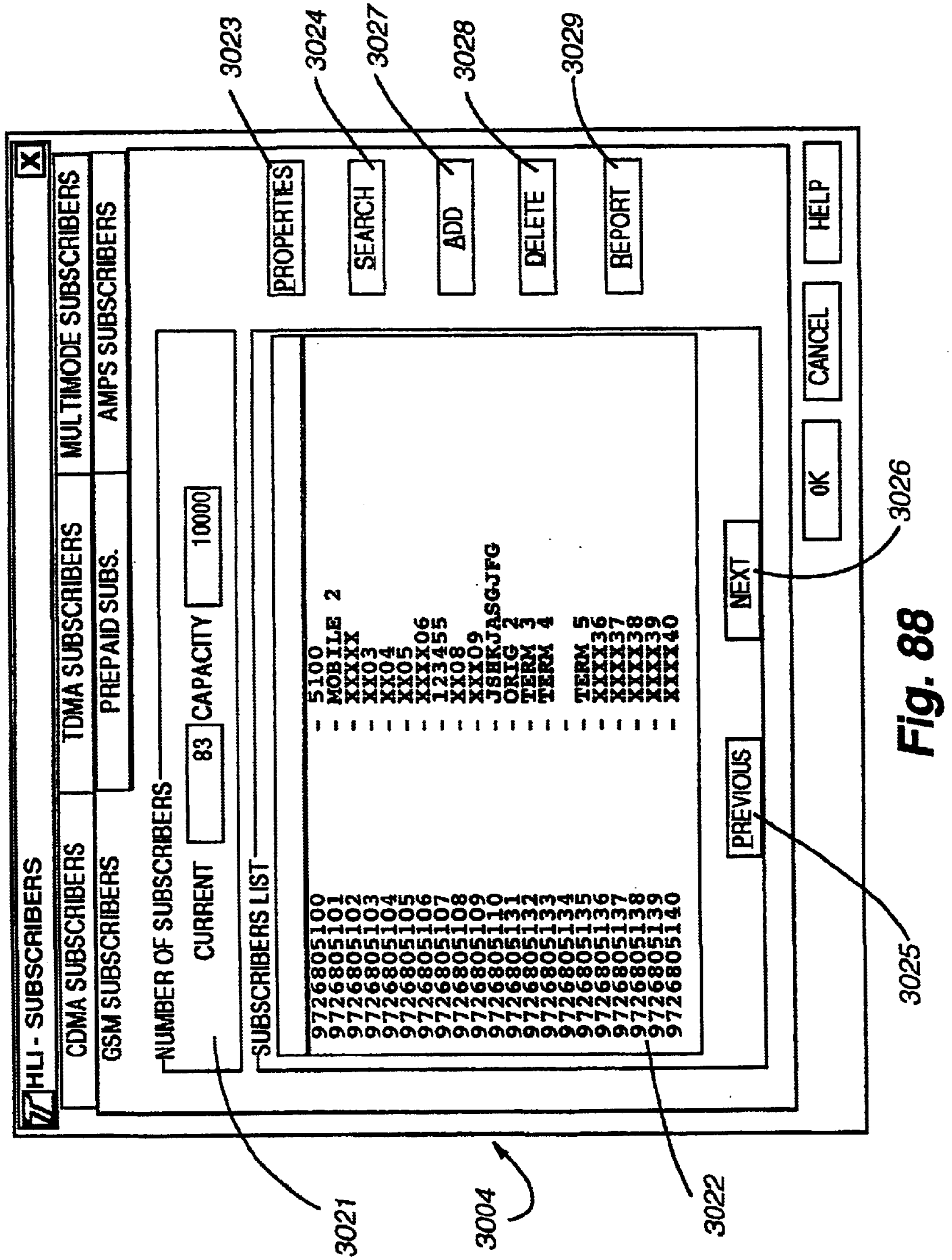

FIG. 88 shows the GSM subscriber window 3004 in more detail. A number of subscribers block 3021 lists the current number of subscribers in the HLR 424 as well as the capacity of the HLR 424. The subscriber list 3022 individually lists the subscribers to the aircore systems. A previous button 3025 and a next button 3026 loads the previous or next group of subscribers into the subscriber list scroll box 3022. A properties button 3023 allows modification of data for the selected subscriber. A search button 3024 allows for search of the HLR 424 when a subscriber MSISDN number is input at the search line. An add button 3027 and a delete button 3028 allow the addition or deletion of a subscriber profiled in the HLR 424. A report button 3029 allows an operator to view a change report file created for HLR 424 modifications.

Figure 89:
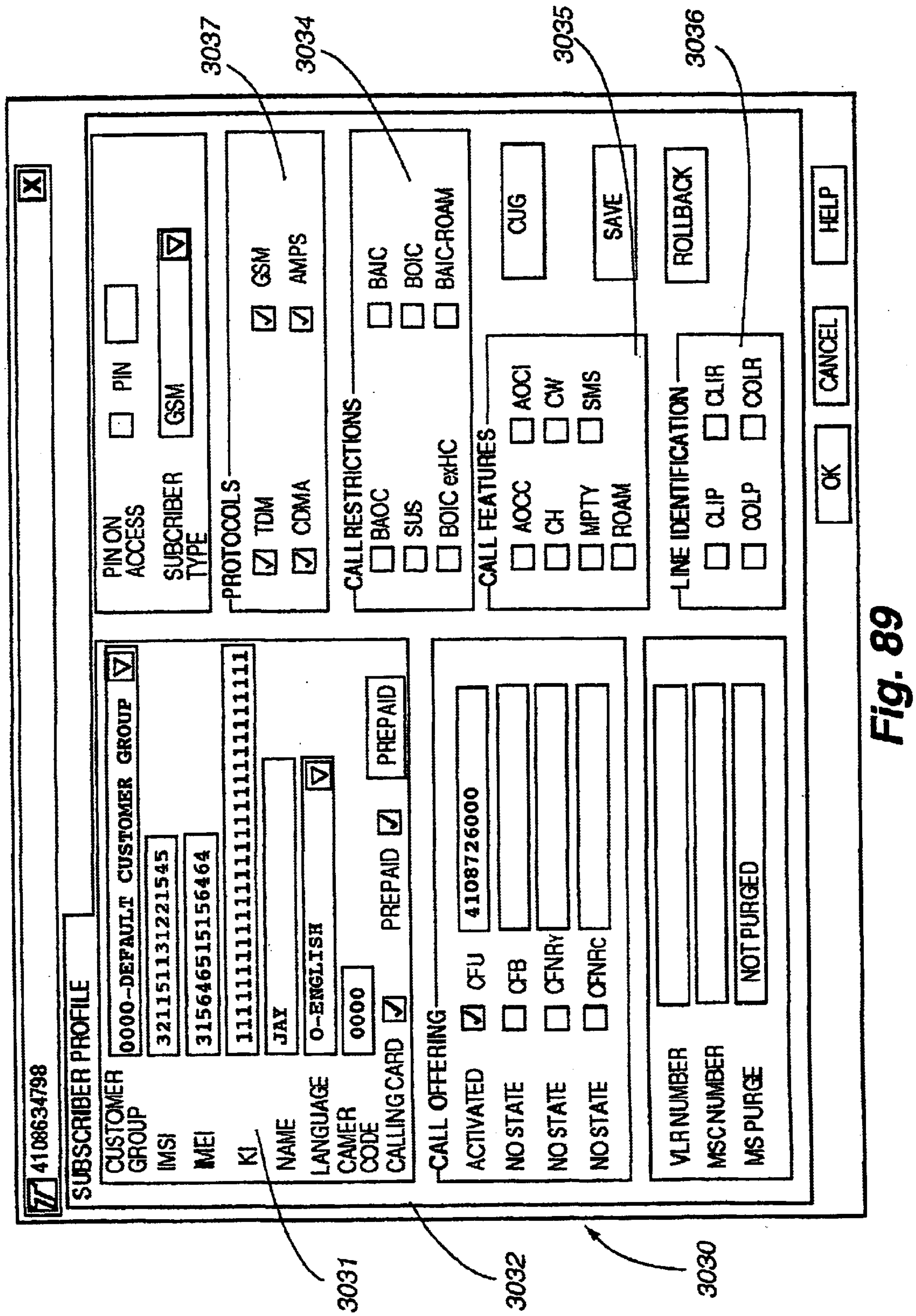

FIG. 89 is an example of an individual subscriber profile for a GSM subscriber. The subscriber profile 3030 includes a customer and mobile unit identification block 3031, call offering block 3032, call restriction block 3033, and call restrictions block 3034. Also included is a call features block 3035, and line identification block 3036.

Subscriber profiles for other wireless protocols are similar to that described above for a GSM subscriber.

Figure 90:
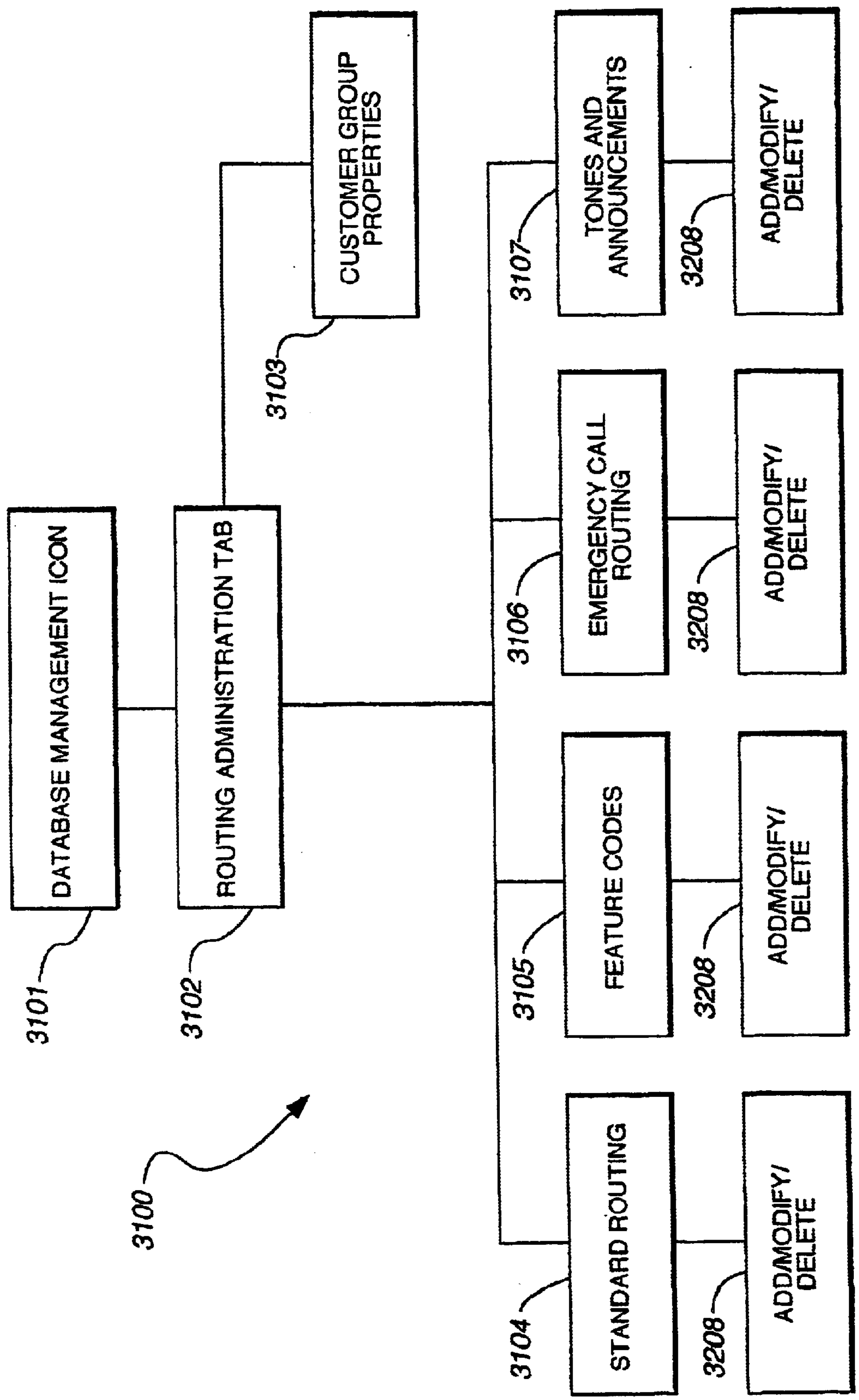

FIG. 90 shows a routing administration windows hierarchy 3110 associated with establishing routing translations in the aircore systems. The initial screen is a database management icon screen 3101. Next, a routing administration tab 3102 is display. Linked to the routing administration tab 3102 is a customer group properties screen 3103. Also linked to the routing administration tab 3102 is a standard routing screen 3104, a feature codes screen 3105, an emergency call routing screens 3106 and a tones and announcement screen 3107. The data displayed in the screens 3104–3107 may be modified by displaying an add/modified/delete screen 3108.

Figure 91:
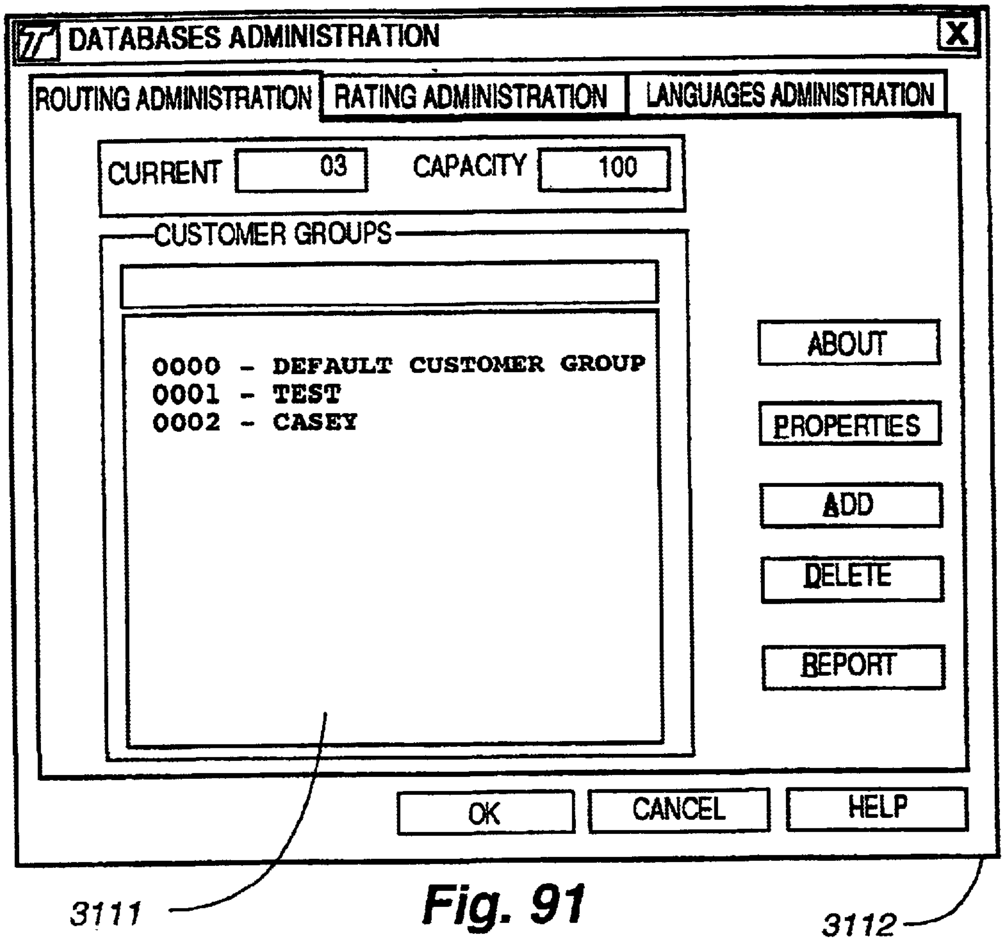

FIG. 91 shows the routing administration tab 3102. A customer group scroll box 3111 shows the customer groups that are currently active in the aircore system. The customer group is a required piece of data that is assigned to both customers and trunk groups. The number assigned is used as an index into the appropriate routing table for processing an incoming call. The routing translations determine the allowable calls, the type of call, and the appropriate system routing for the call. Each customer group can accommodate hundreds of individual from-to routing translation entries. The translations can provide support for any dialing plan between 1 and 32 digits. Dialing plans of varying lengths maybe configured within the same customer group. Each line of translations within each customer group provides a primary and alternate route based on the trunk group. In addition, each route is provided its own digit manipulation parameters (strip and prefix digits). The aircore system can accommodate up to 100 customer groups.

Figure 92:
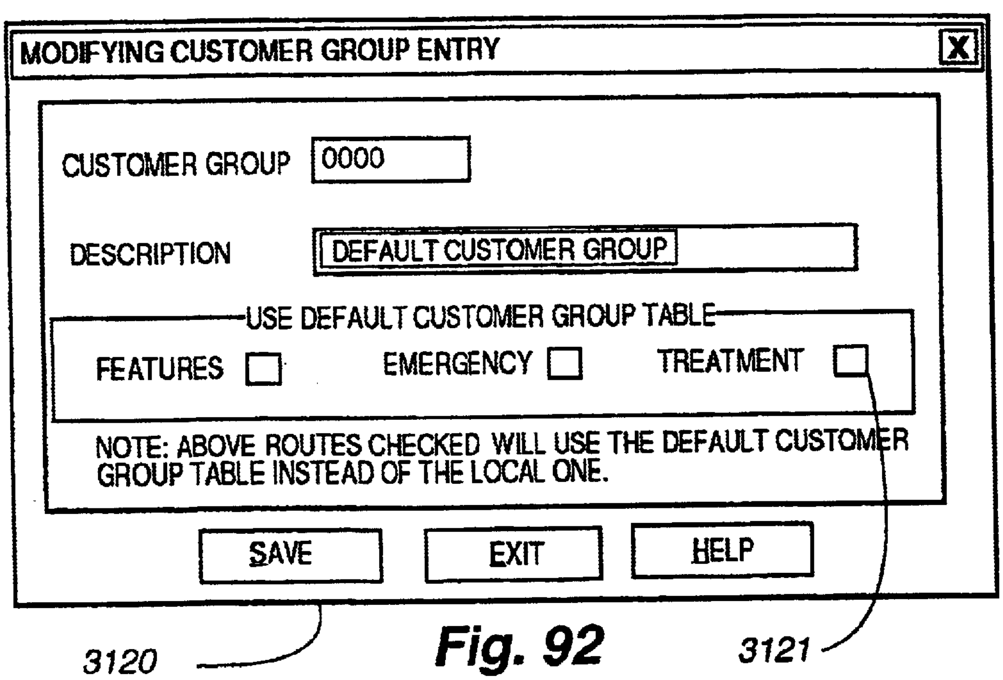

FIG. 92 shows a customer group modification window 3120. The customer group modification window 3120 defines the overall properties associated with a particular customer group. Check boxes 3121 allow for the configuration of three alternate types of translations.

Figure 93:
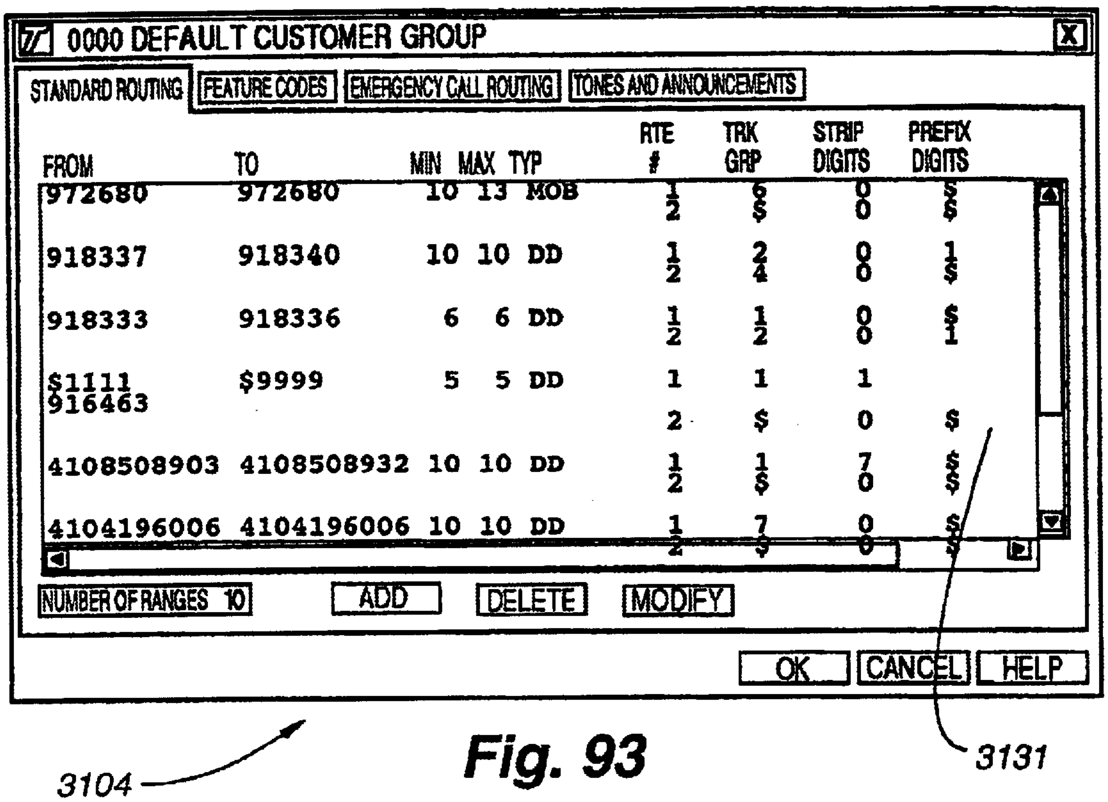

FIG. 93 shows the standard routing translation window 3104. A scroll box 3131 is used to display portions of the information. The information displayed in the scroll box 3131 includes "from" data, which is the number the range starts from; "to" data, which is the number the range ends at; min, which is the minimum length of the digit string; max, which is the maximum length of the digit string; and type, which is the type of call the number range indicates. Also shown is the route number of the trunk and the numeric trunk group number.

Figure 94:
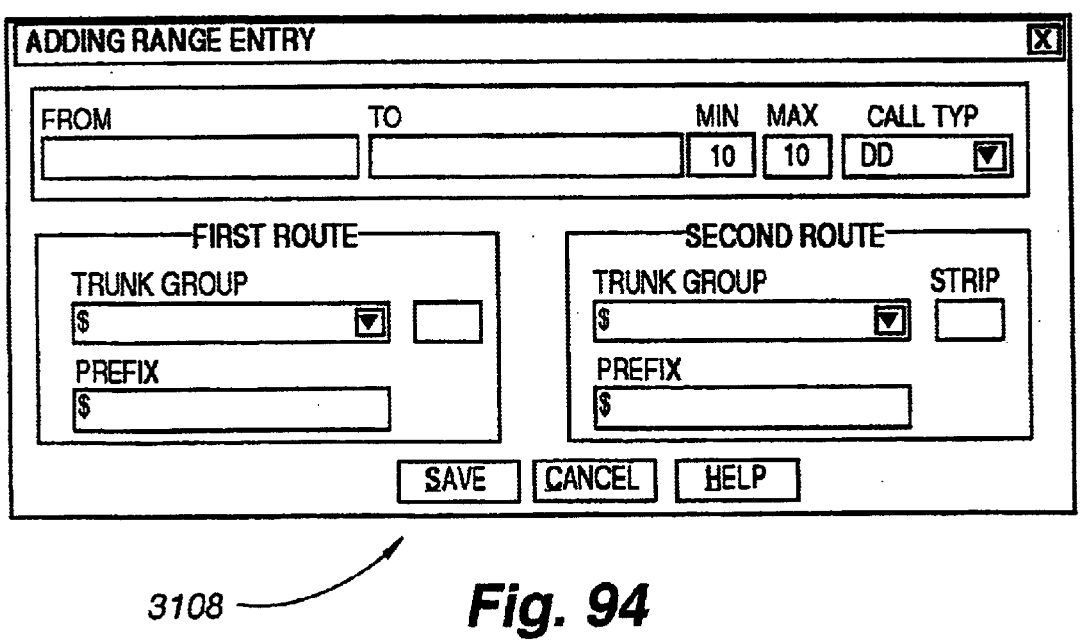

FIG. 94 shows the standard routing translations modifications window 3108. The standard routing translations modifications window 3108 provides the operator access to modify the selected number range. The window is used for adding or modifying ranges in the standard routing translations window 3104.

Figure 95:
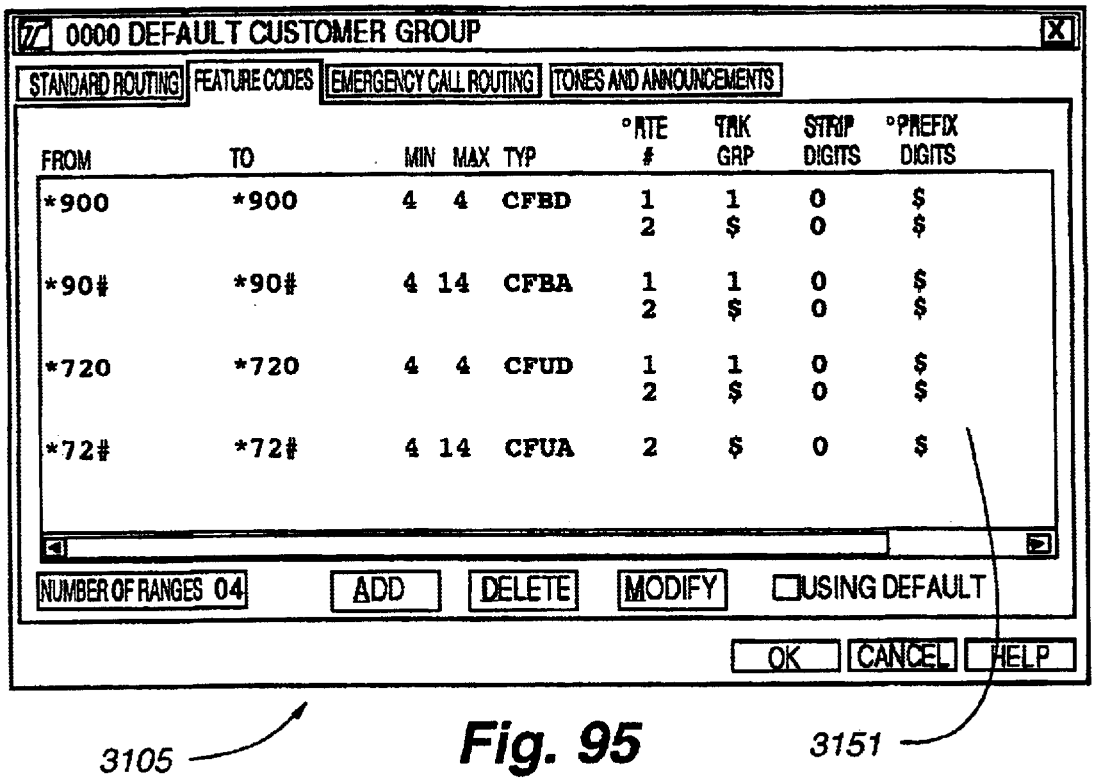

FIG. 95 shows the feature code routing translation window 3105. The feature code routing translation window 3105 includes a scroll box 3151 that displays a portion of the information selected by the operator. The feature code routing translation window 3105 contains the information related to routing feature manipulation calls for the aircore system. The parameters supplied in the feature code routing translation window 3105 are used to determined the type of feature manipulation and the appropriate system action.

Figure 96:
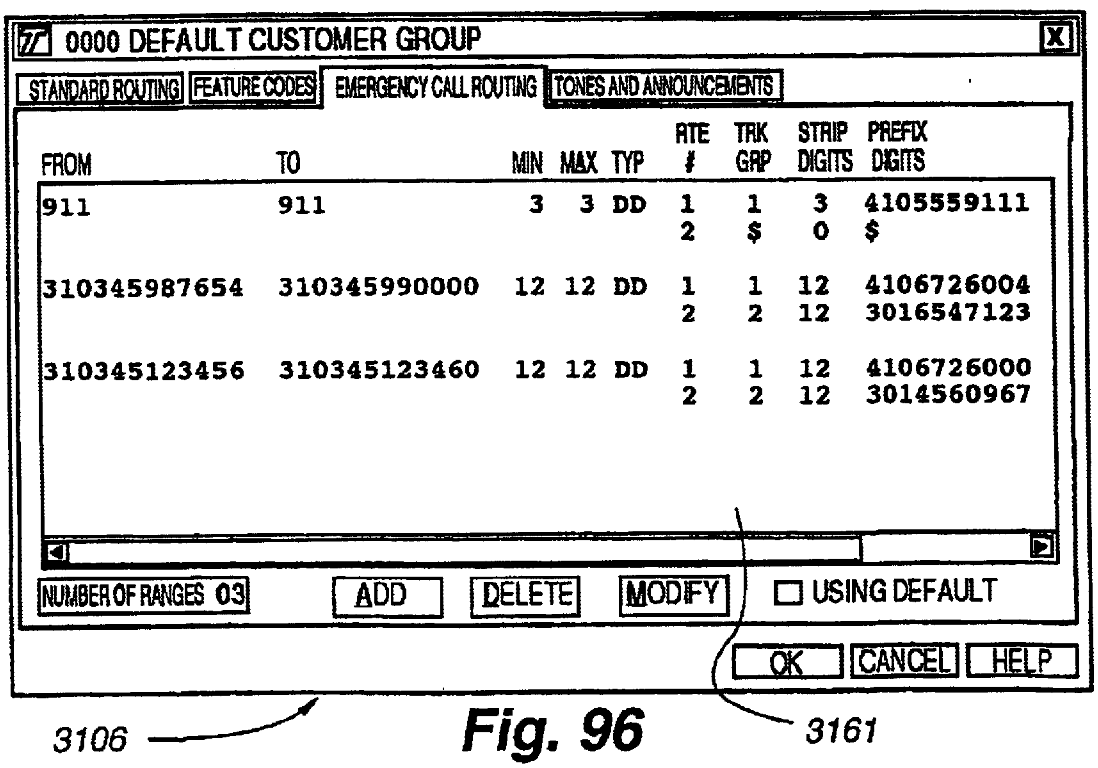

FIG. 96 shows the emergency call routing translations window 3106. A scroll box 3161 displays currently selected information. The information includes "from" data which is the number the digit range starts from. The "from" data can be indicated by a code such as 911 or can be represented as a cell site. The aircore system operator can use the emergency call routing translations window 3106 to route all emergency calls to a specific number or to establish a trunk group used exclusively for emergency call routing.

Figure 97:
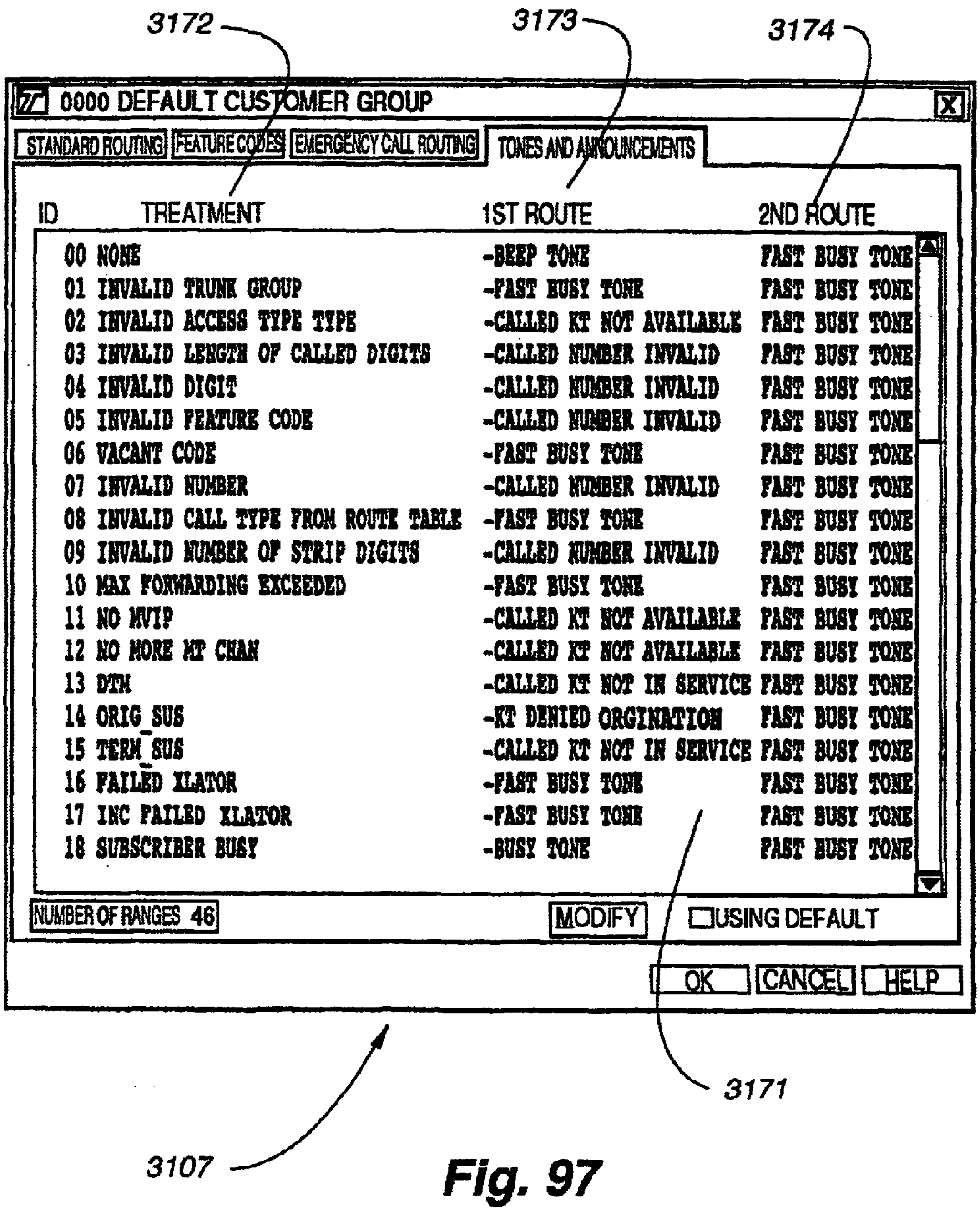

FIG. 97 shows the treatment routing translations window 3107. The treatment routing translation window 3107 contains information relate to routed calls, which are to be treated to an appropriate treatment option, which may be a tone or announcement. In FIG. 97, a scroll box 3171 includes an ID, which is the number of the treatment in the aircore system, a description 3172, which is the alphanumeric description of the treatment, a first option (1' Route) 3173, which is the first option for treating the call (typically configured to an announcement or tone) and a second option 3174, which is the second option to use if the first option 3173 is not available (typically set to a standard tone). Failure to use the first option 3173 indicates that all of the announcement resources are currently in use.

Figure 98:
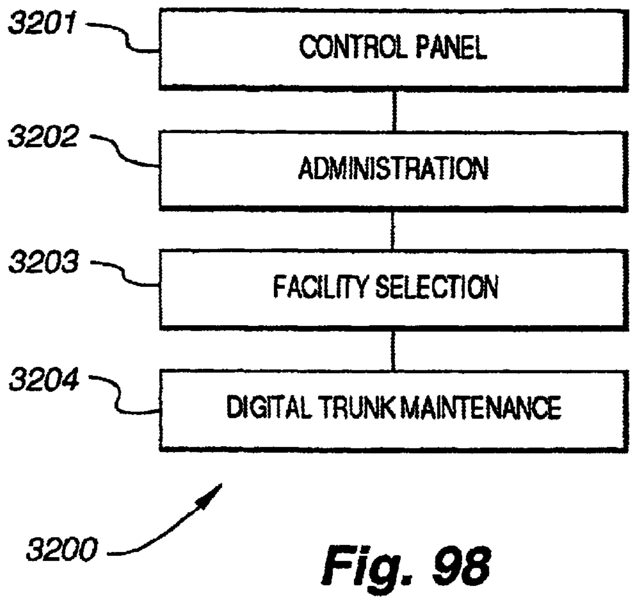

The aircore system includes graphical user interfaces that allow the operator to perform maintenance actions on individual trunks in the system. When this option is chosen in an administration pull down menu (not shown), the operator first selects the appropriate span and channels, then executes maintenance commands as required. FIG. 98 shows the hierarchy of windows used for trunk maintenance. In FIG. 98, the hierarchy 3200 includes a control panel window 3201, an administration window 3202, a facilities selection window 3203, and a digital trunk maintenance window 3204.

Figure 99:
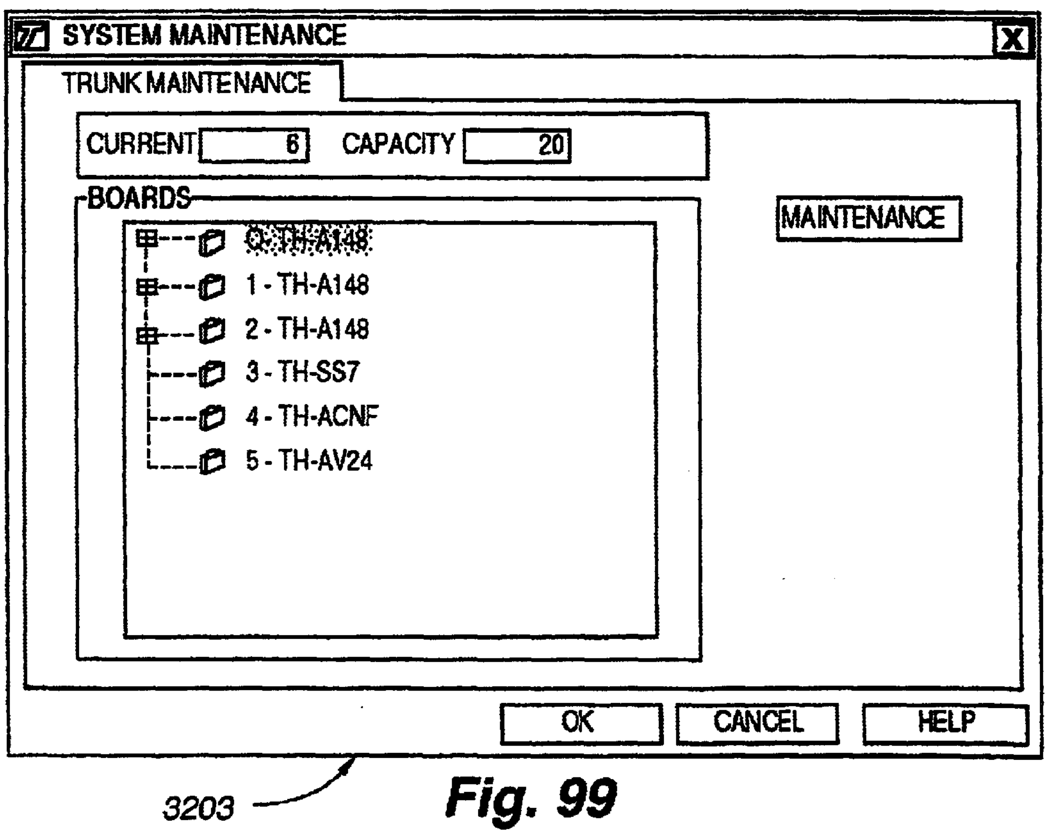

FIG. 99 shows the facilities selection window 3203. The window 3202 allows an operator to select the appropriate facilities in the aircore system to be viewed for maintenance actions.

Figure 100:
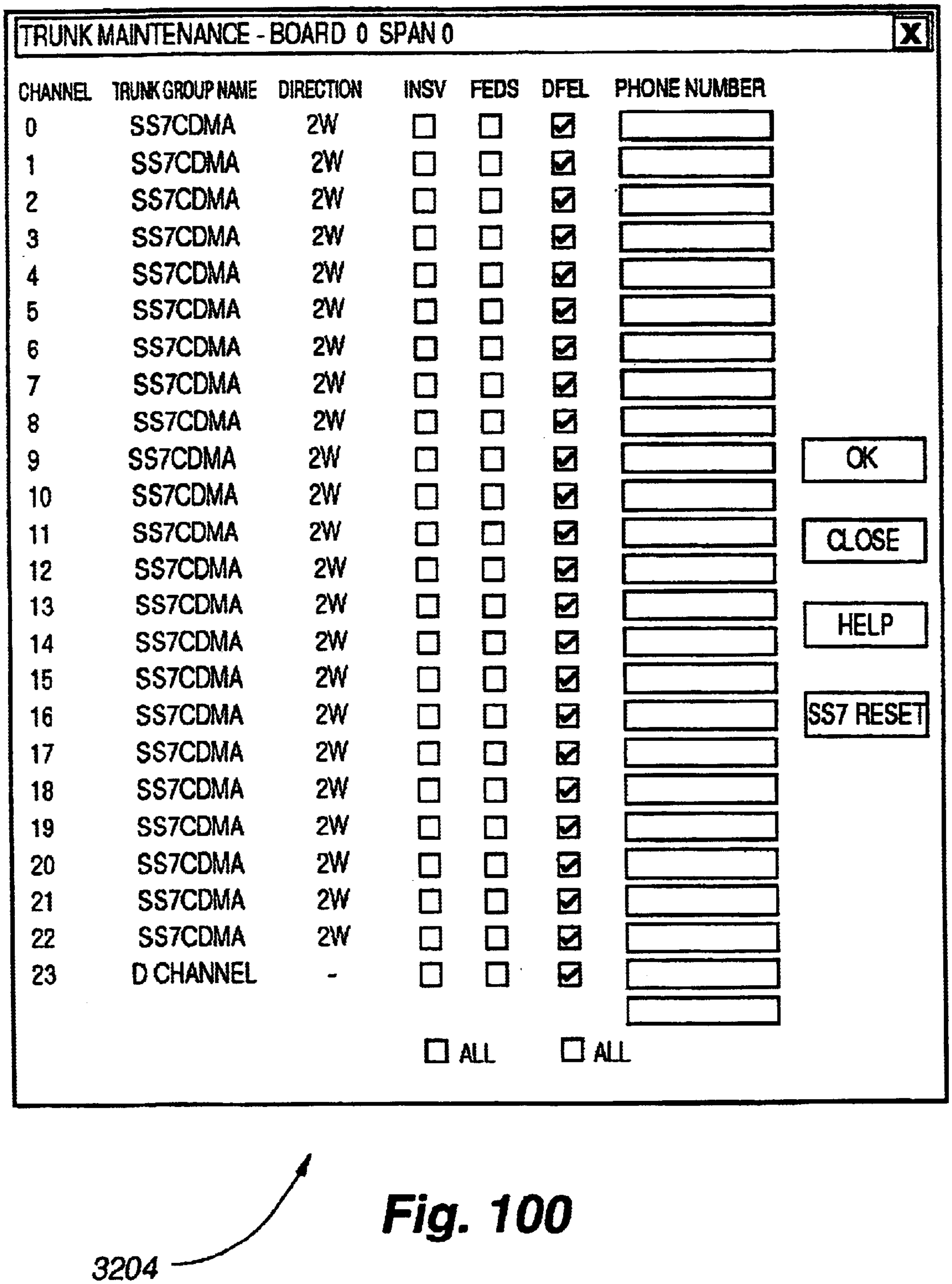

FIG. 100 shows the digital trunk maintenance window 3204. The digital trunk maintenance window 3204 allows the operator to view the trunk configuration of a particular span and to change the state of the channels on that span. In the window 3204, data that is grayed out represents non-configured channels. Channels can be configured via a system configuration option on the administration pull-down menu. FIG. 100 shows the digital trunk maintenance window for T-1 trunk maintenance. A similar window is available for E-1 trunk maintenance.

Figure 101:
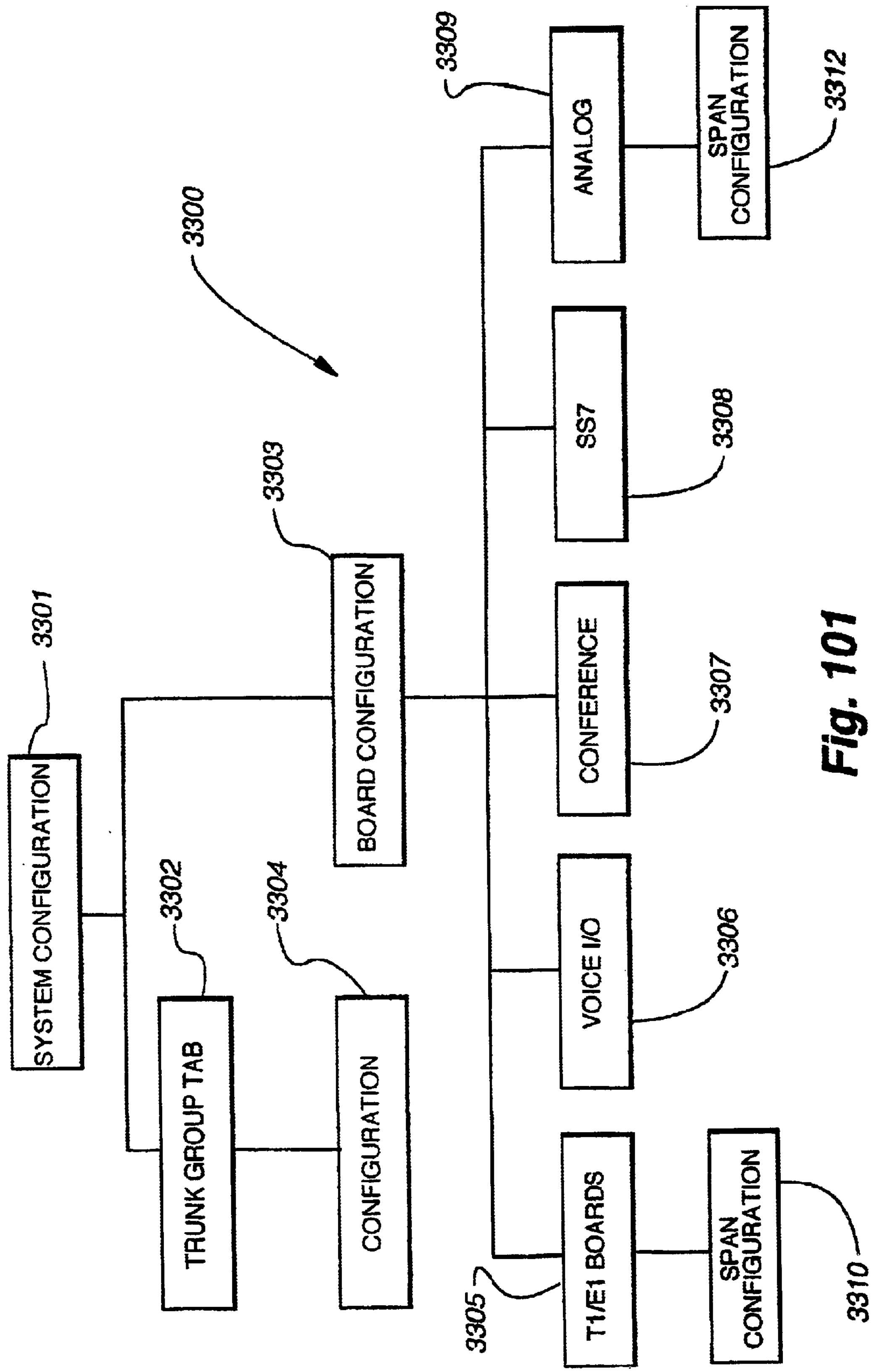

FIG. 101 shows the aircore configuration windows hierarchy 3300. The system configuration 3301 is accessed from a control panel graphical user interface (not shown). This allows the operator to access setup and configuration files. The operator has access to the configuration of both hardware and software parameters associated with system operation. Subordinate windows in the system configuration hierarchy 3300 include a trunk group window 3302 and a board configuration window 3303. Associated with the trunk group window 3302 is a trunk group configuration window 3304. Associated with the board configuration window 3303 is a T-1/E-1 board configuration window 3305, a voice I/O window 3306, a conference window 3307, a SS7 window 3308, and an analog window 3309 and span configuration windows 3310 and 3312.

Figure 102:
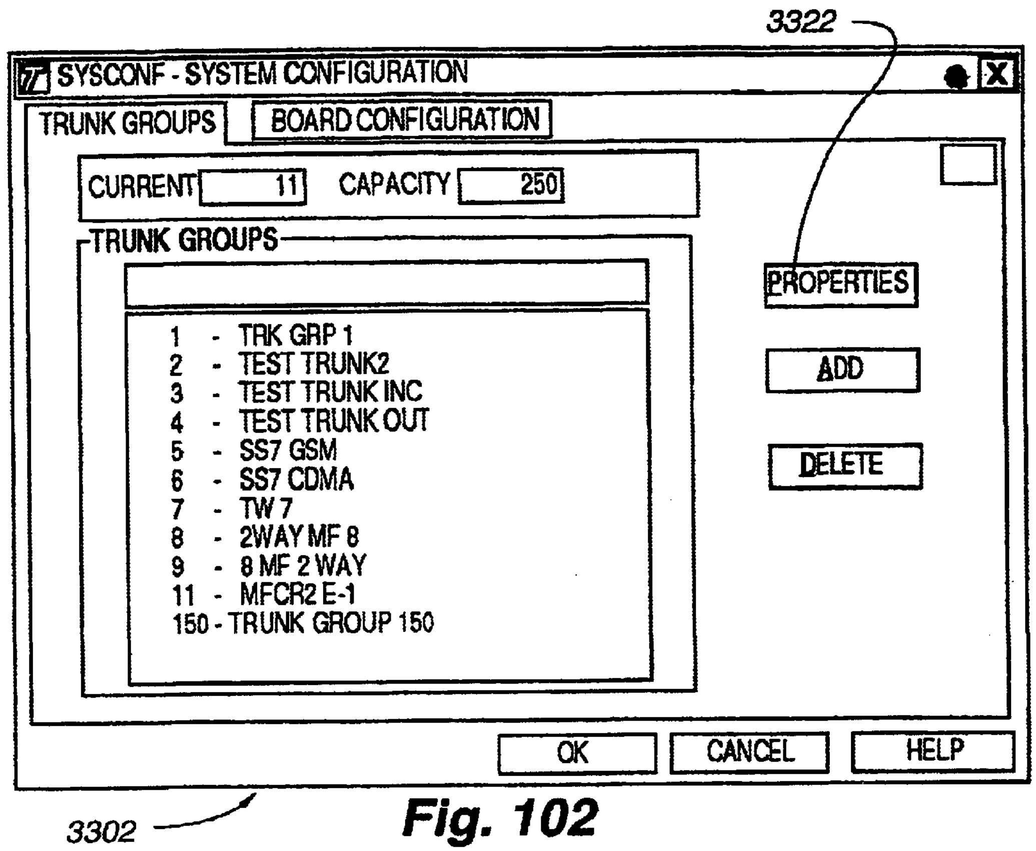

Trunk group configuration is part of the system configuration of the aircore GUI. A trunk group is a logical assignment of characteristics to physical resources in the aircore system. Trunk groups are used to inform both the low level and high level software in the aircore system of how to process a call. Trunk groups also allow the operator to partition the system for specialized use by groups or subscribers. FIG. 102 shows the trunk group selection window 3302. A properties button 3322 is used to access the trunk group configuration window 3304.

Figure 103:
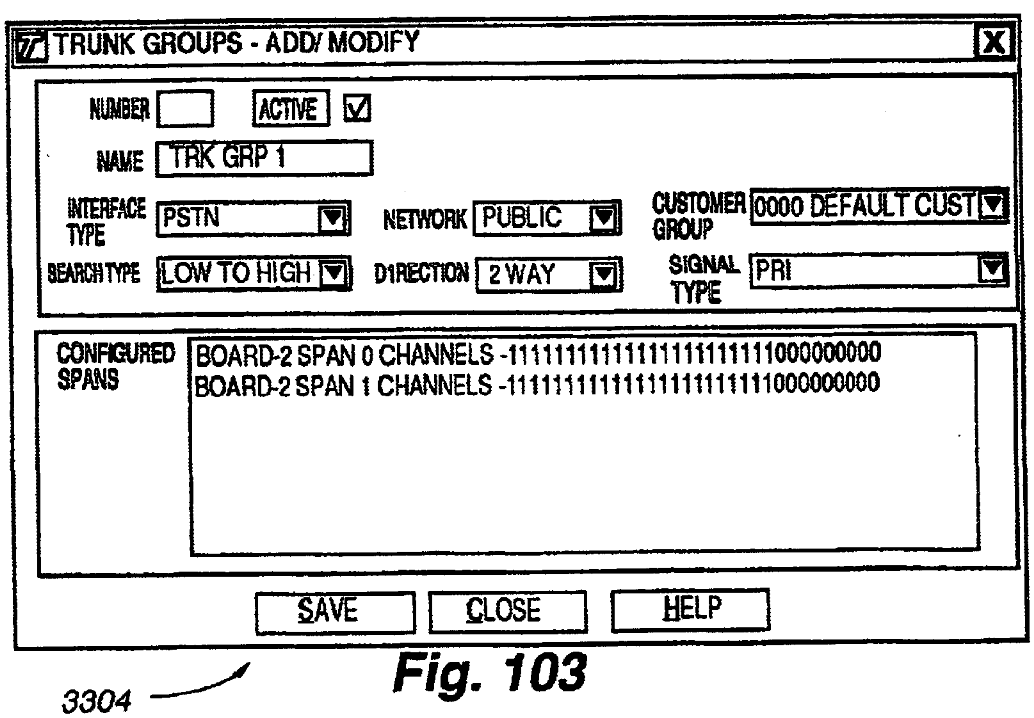

FIG. 103 shows the trunk group configuration window 3304. When a valid trunk group number is input in the selection window 3302, and the property button 3322 is pushed, the configuration window 3304 appears. The trunk group configuration window 3304 includes the sequential number assigned to the trunk group and an alpha-numeric name associated with the trunk group. The name given to the trunk group is used to identify the individual circuits configured within the trunk group.

Figure 104:
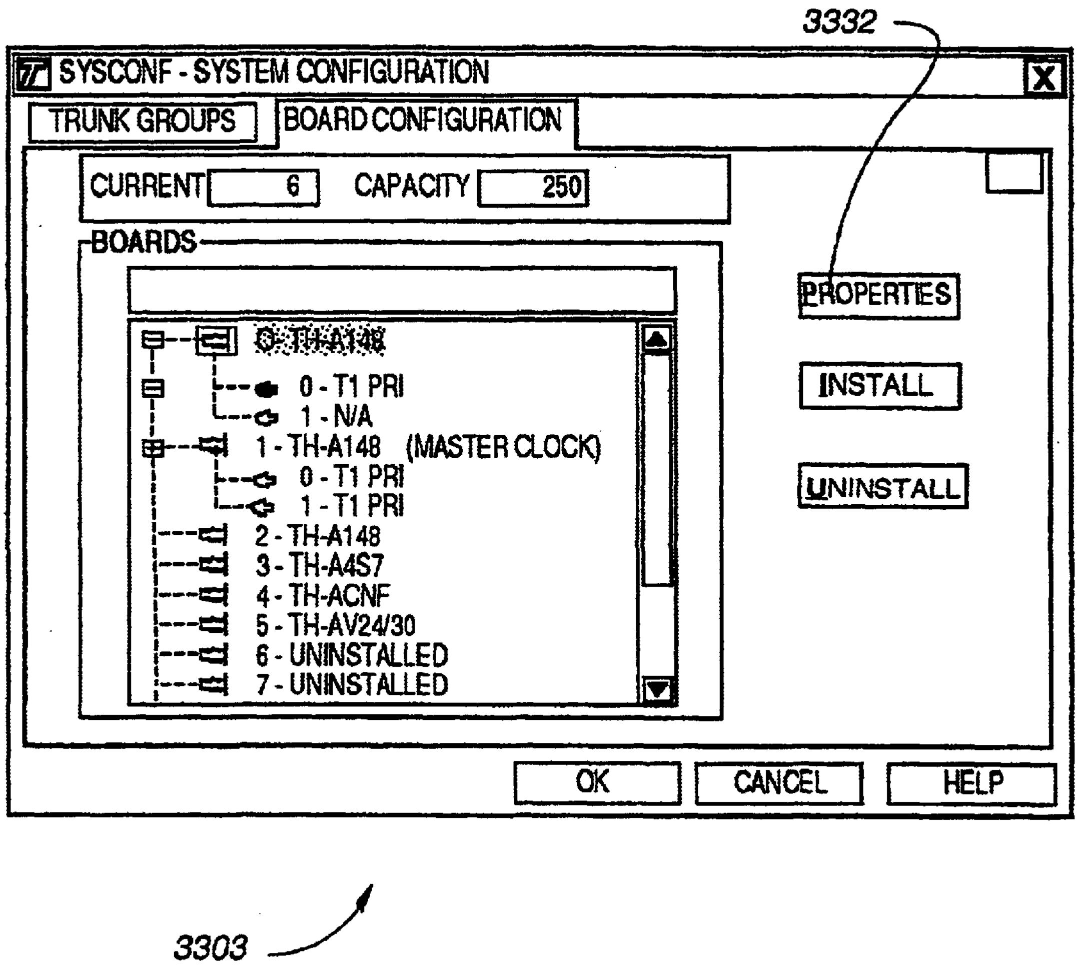

FIG. 104 shows the board configuration window 3303. The aircore board level configuration is accomplished via the board configuration window 3303 and subordinate windows. The board configuration window lists the possible board slots in the hardware component (installed or not) in a particular slot. To access the configuration of the particular board, the operator selects a desired board and operates the property button 3332.

Figure 105:
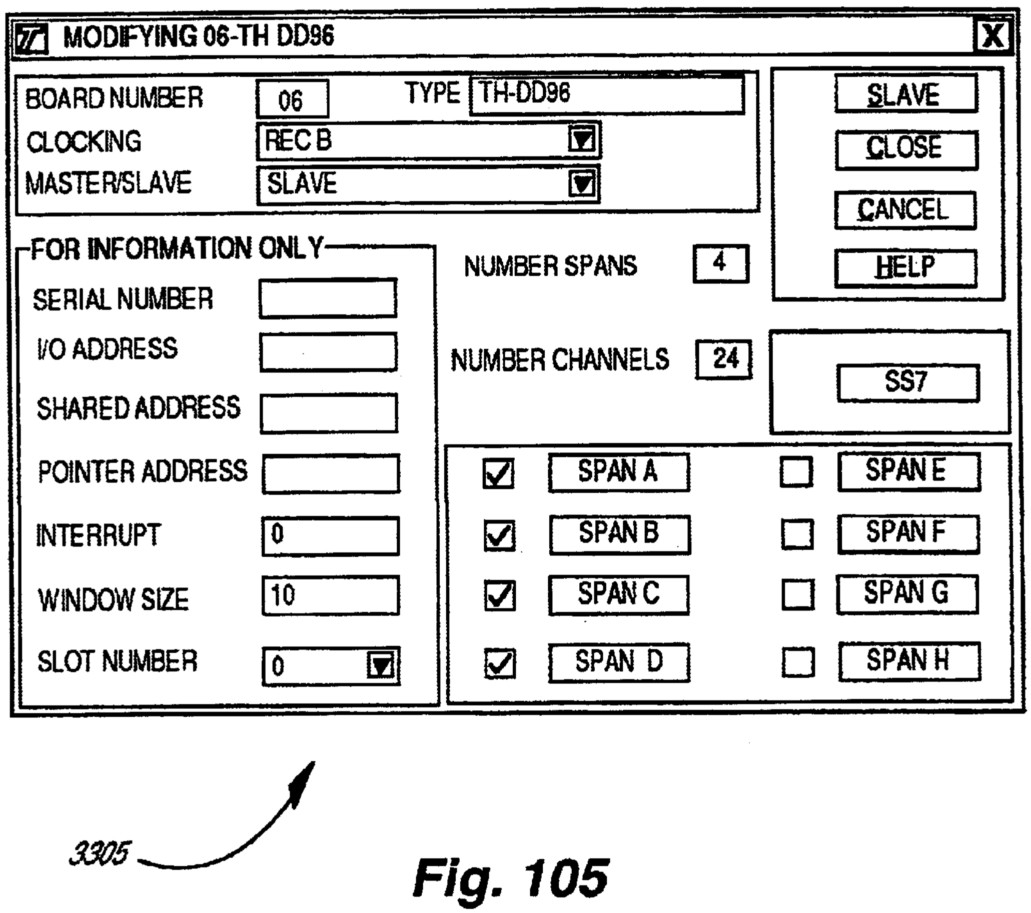

FIG. 105 shows the T-1/E-1 board configuration window 3305. A span click box section 3381 allows an operator to choose which span to configure. The window 3305 is used for configuration of the T-1 and E-1 boards in the aircore system. Based on the board type selected, the appropriate number of spans and channels are accessible to the operator for configuration. The window shown in FIG. 105 is used for configuration of the 4-span T-1 board, for the CPCI and PCI bus types. Similar windows are used for other span and channel configurations.

Figure 106:
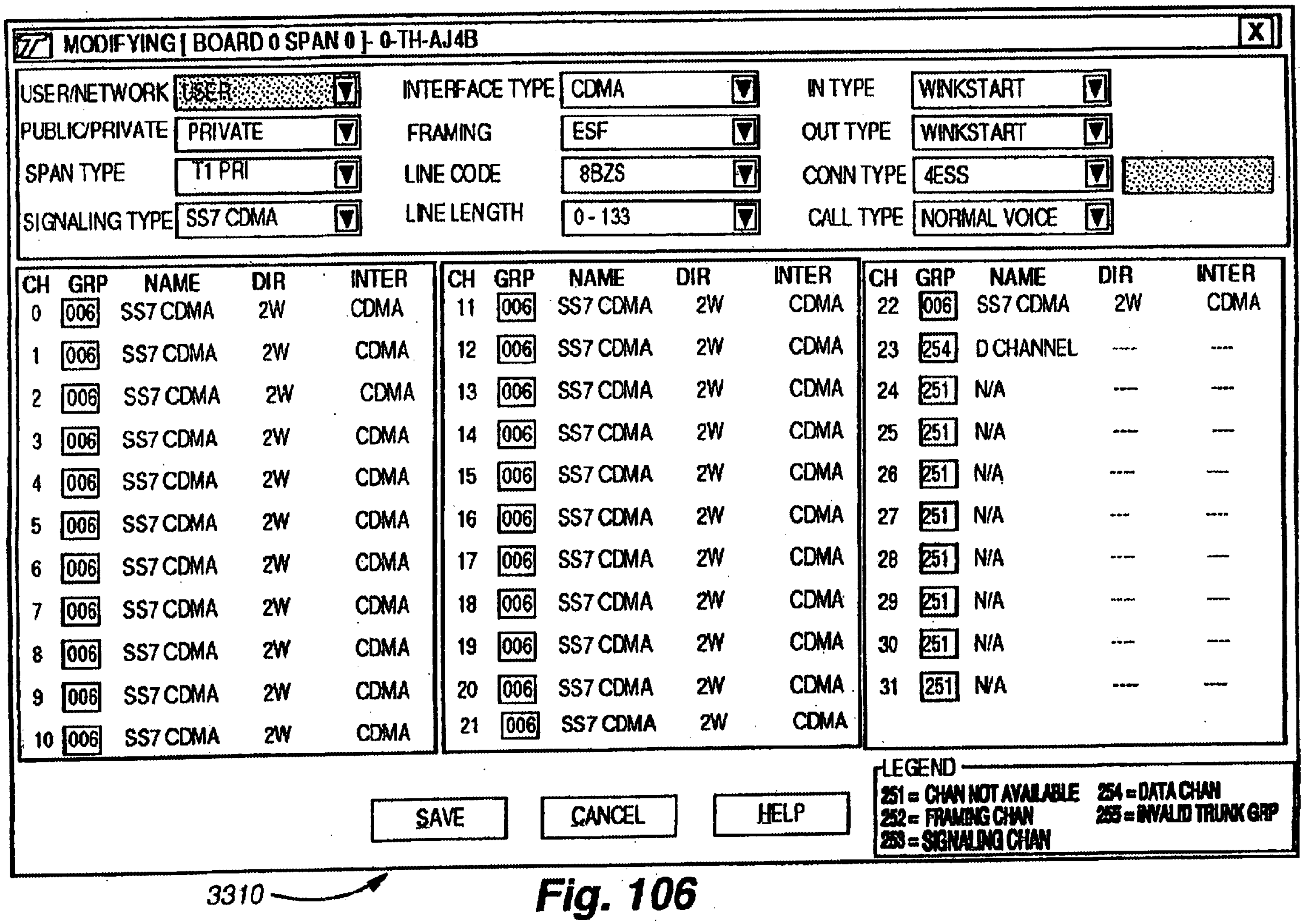

FIG. 106 shows the T-1/E-1 span configuration window 3310. The T-1/E-1 span configuration window 3310 appears when a span (A–H) is selected from click box 3381 in the T-1/E-1 board configuration window 3305 shown in FIG. 105. The window 3310 contains the data associated with a particular T-1 or E-1 span on the board. Similar windows are available for other span configurations.

Figure 107:
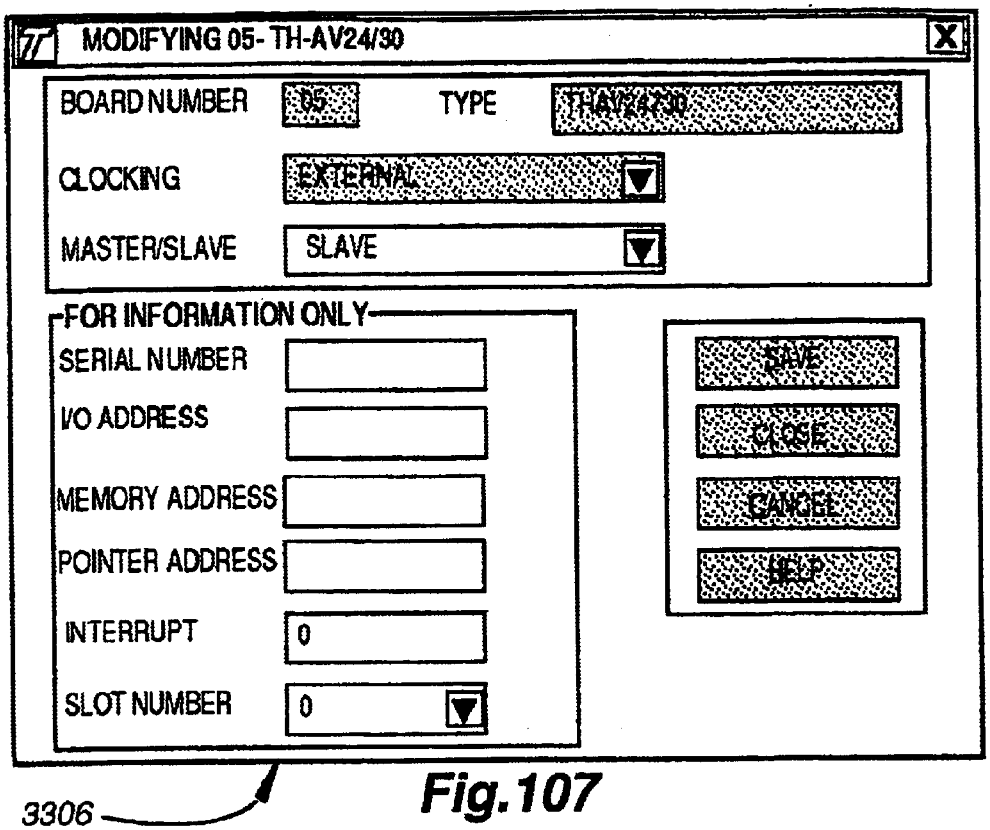
Figure 108:
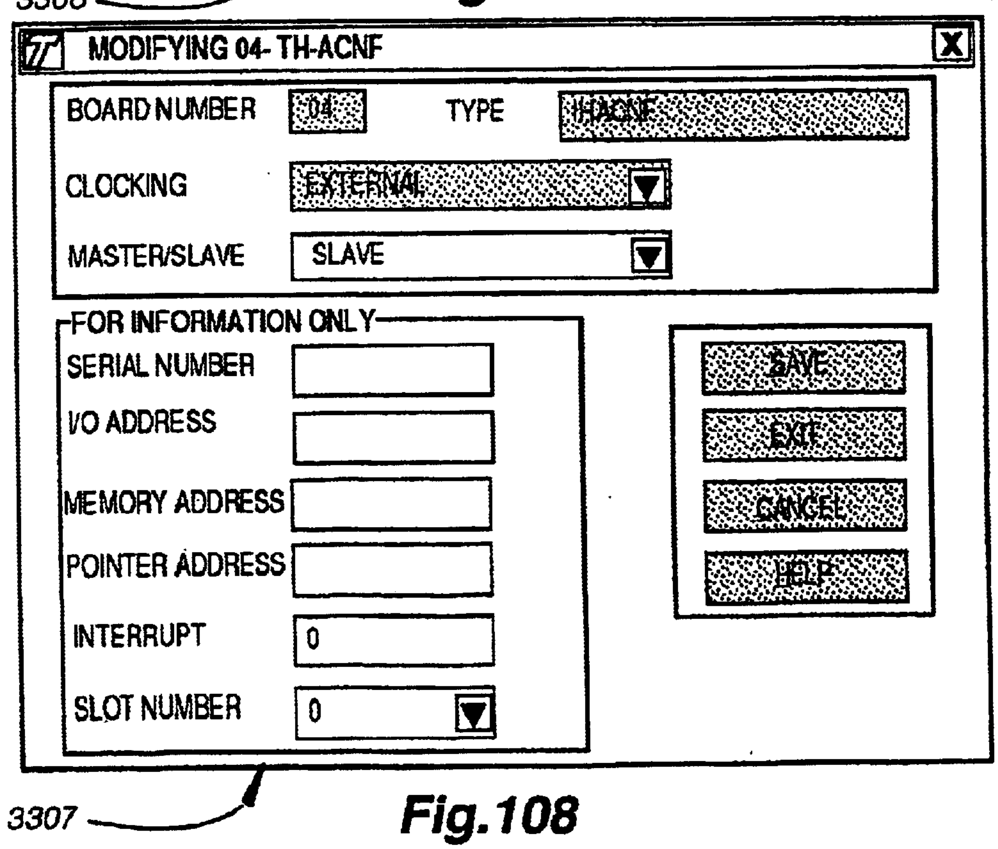
Figure 109:
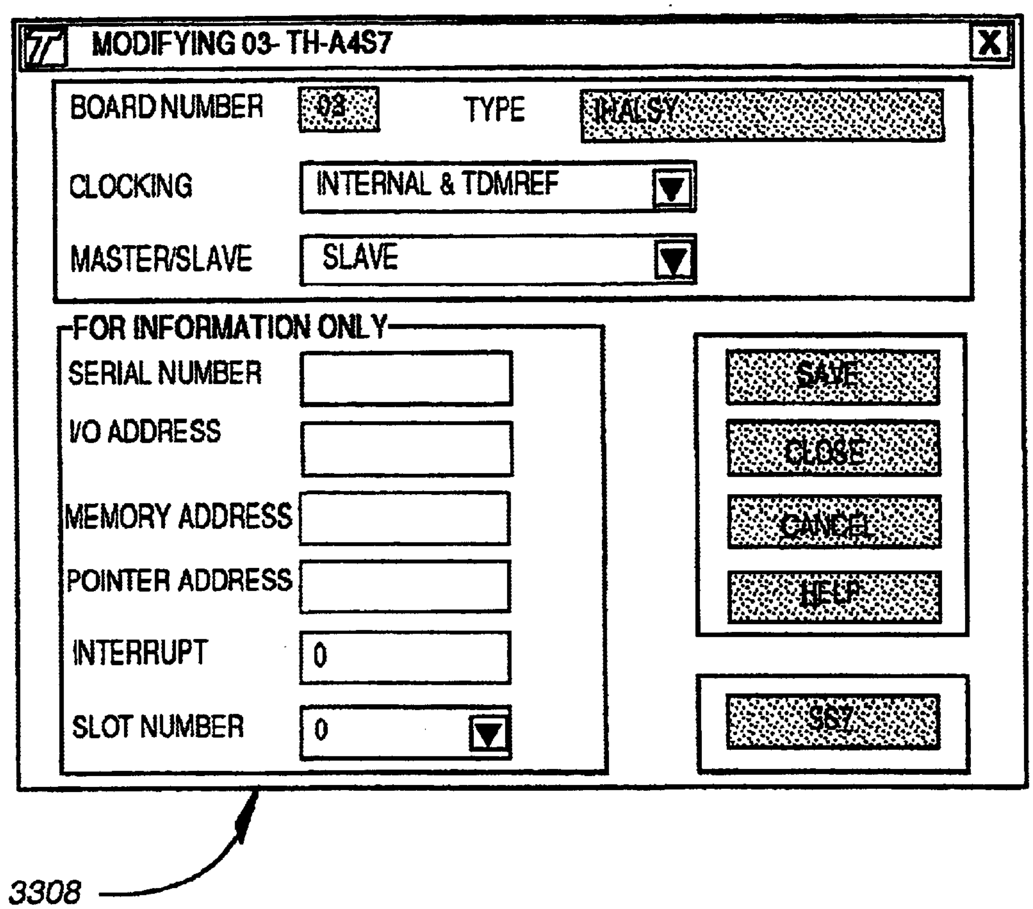

FIGS. 107–109 show the windows for the voice I/O board configuration, the conference board configuration, and the SS-7board level configuration. These windows are similar to that shown in FIG. 106.

Figure 110:
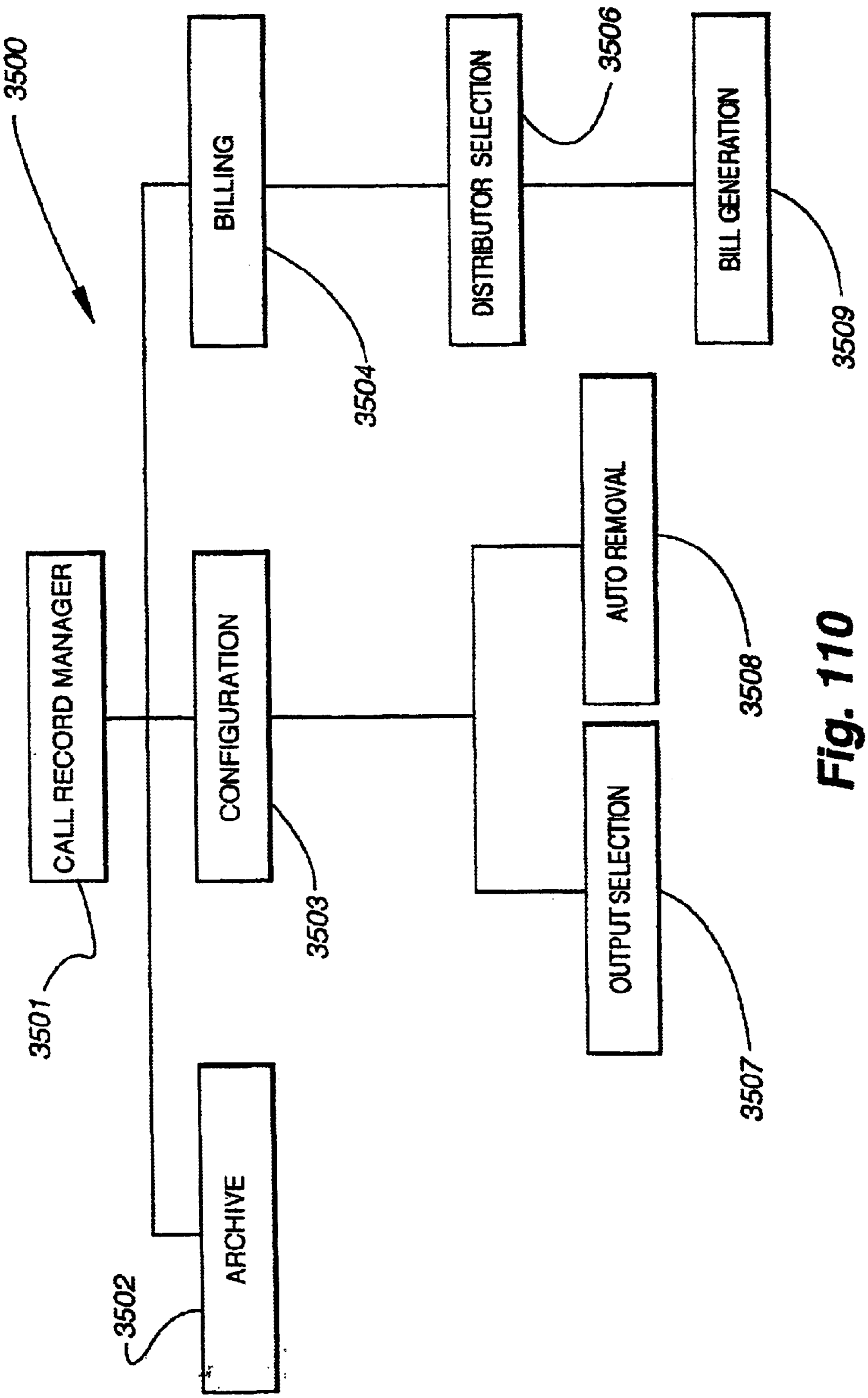

The aircore system generates call detail records (CDRs) to track system resource usage and call traffic for customers. Each CDR contains information pertaining to a particular part of a call. A CDR is a record created whenever there is call activity on the aircore system. The CDR manager is a subsystem in the aircore system responsible for generating and storing this information. The CDR manager provides the operator with a complete set of options for viewing data both real time and archive, monitoring traffic on the aircore system, and retrieving the data for off-system archival. FIG. 110 shows the hierarchy of windows used for call record management. The hierarchy 3500 includes the call record manager window 3501, archive window 3502, configuration window 3503, and billing window 3504. The billing window 3504, and associated lower level windows, are only available if the prepaid wireless package is configured. Associated with the configuration window 3503 are output selection window 3507 and auto removal window 3508. Associated with the billing window 3504 is distributor selection window 3506 and bill generation window 3509. The call record manager window 3501 provides operator access to view, process or redirect call detail record outputs on the aircore system.

Figure 111:
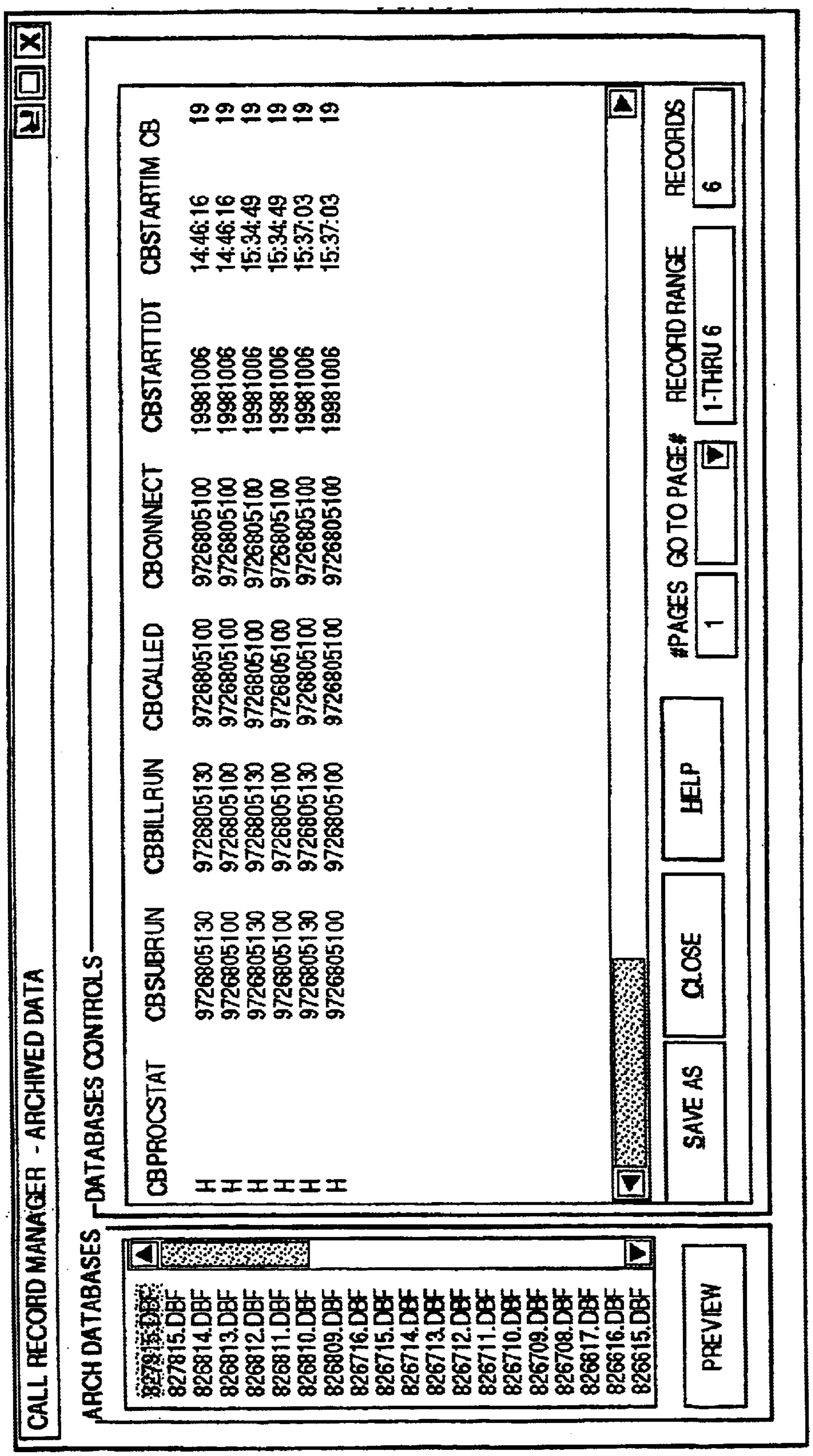

FIG. 111 shows the archive window 3502. The archive window 3502 allows the operator to view and direct archived output of call detail records that have been created on the aircore system.

Figure 112:
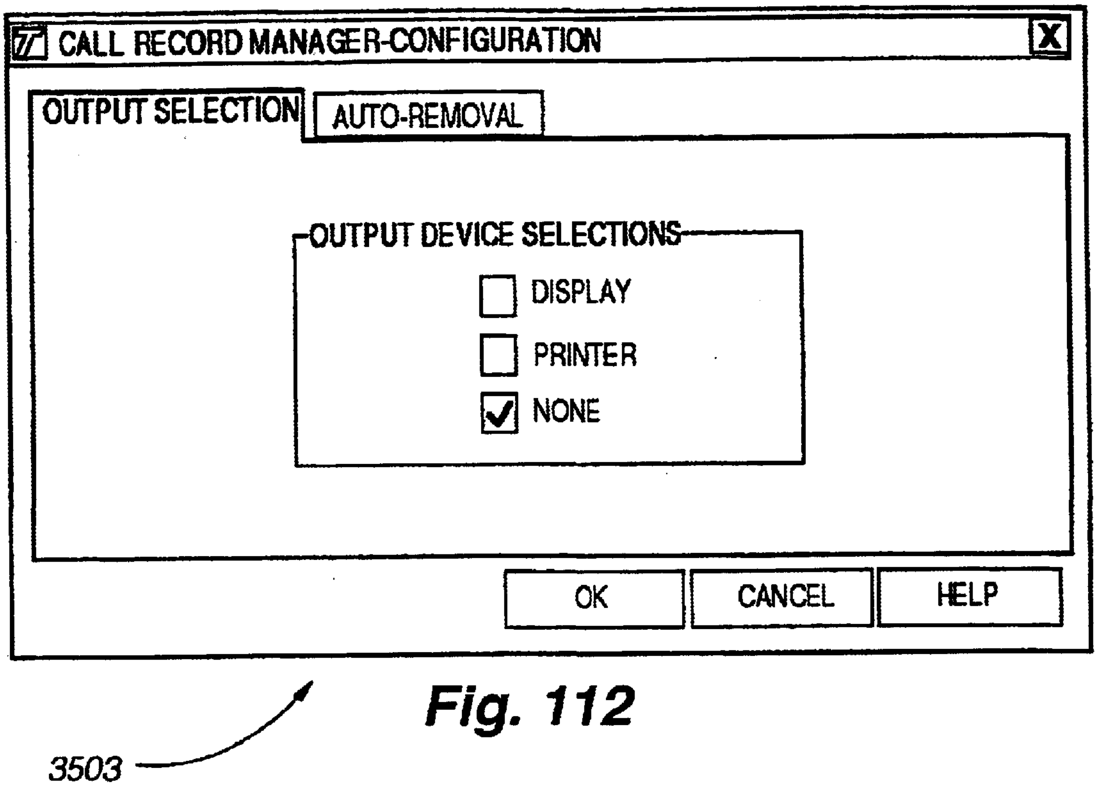

FIG. 112 shows a configuration window 3503. The configuration window 3503 allows the operator to determine the real time output destination for call detail records. Regardless of the output type selected, a file containing the call records on disk is always created. In addition, the operator has the ability to configure the auto removal period for the call detail records. Using the output selection window 3507, the operator can send an output to a display or a printer, for example.

Figure 113:
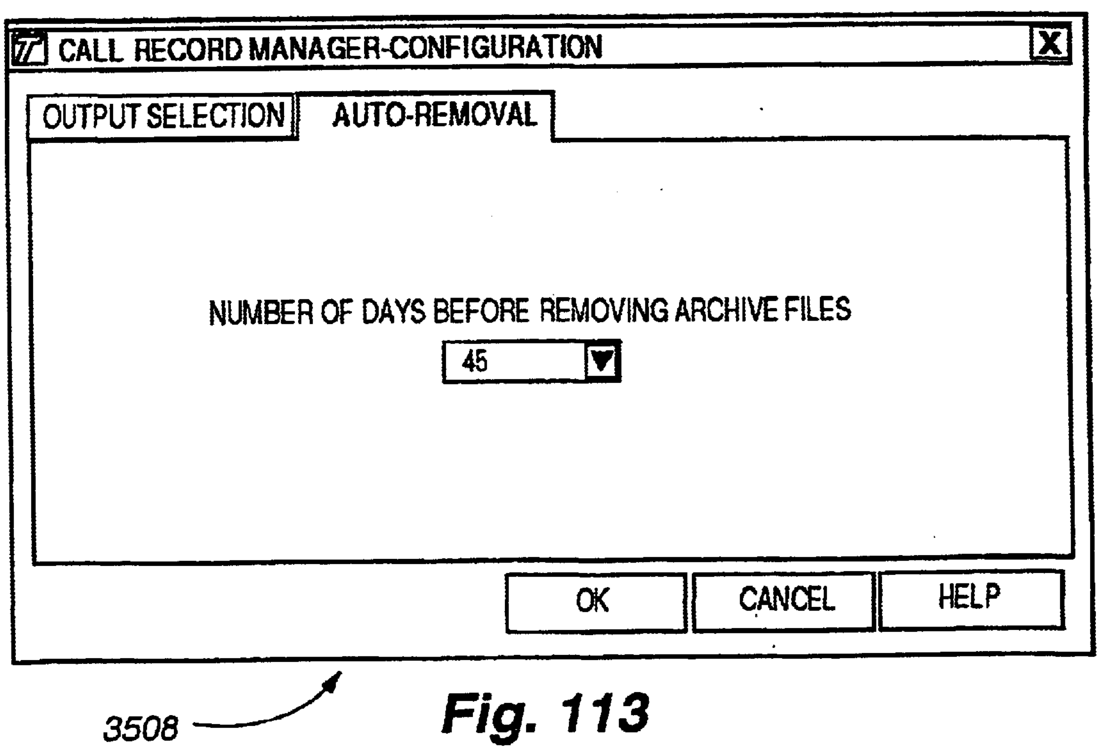

FIG. 113 shows the auto removal window 3508. Using the auto removal window 3508, the operator can set the number of days that the call detail record will be archived on the system. The number of days the call detail records are stored on the aircore system before automatic removal can be set a value between 1 and 180 in increments of one day.

Figure 114:
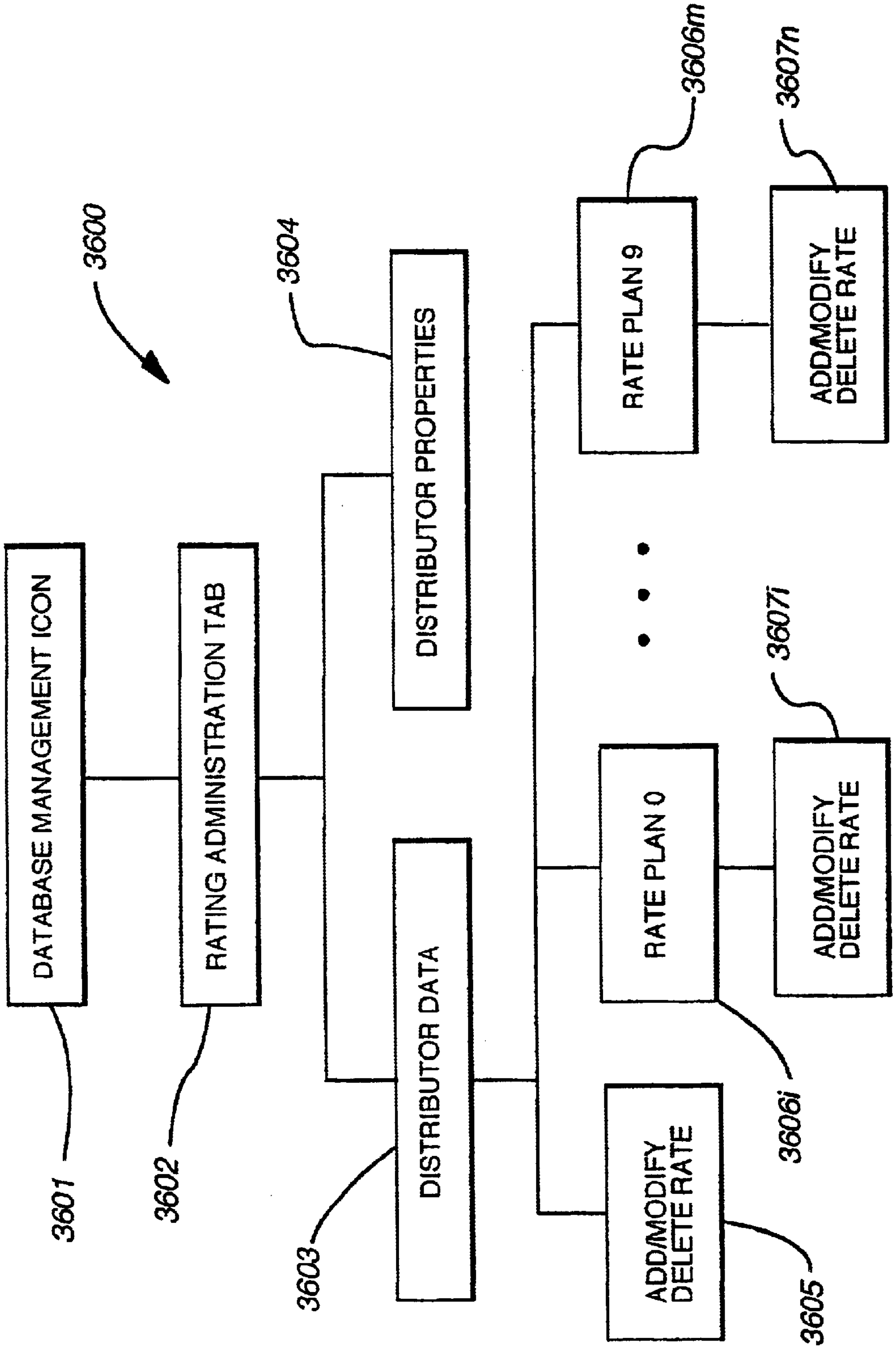

The aircore platform 200 can provide, as an option, fully integrated prepaid functionality. This functionality can span across both wireless and wireline applications providing a seamless prepaid system. Furthermore, this functionality is provided as an integrated software feature, saving the cost and maintenance of a separate off-board prepaid system. The prepaid system feature package provides full functional real time debiting for aircore customers complete with a full billing package and a comprehensive rating schedule. FIG. 114 shows the rating administration window hierarchy 3600 that is used in conjunction with the aircore prepaid system. A database management icon screen 3601 is shown initially. Next, a rating administration window 3602 is displayed. A distributor data window 3603 and a distributor properties window 3606 can be selected from the rating administration window 3602. Finally, from the distributor data window 3603, an add/modify/delete rate window 3605 can be accessed as well as individual rate plans 0–9 $360_{i-n}$ with associated add/modify delete rate windows $\mathbf{3607}_{i-n}$. The aircore prepaid system accommodates ten rate plans.

Figure 115:
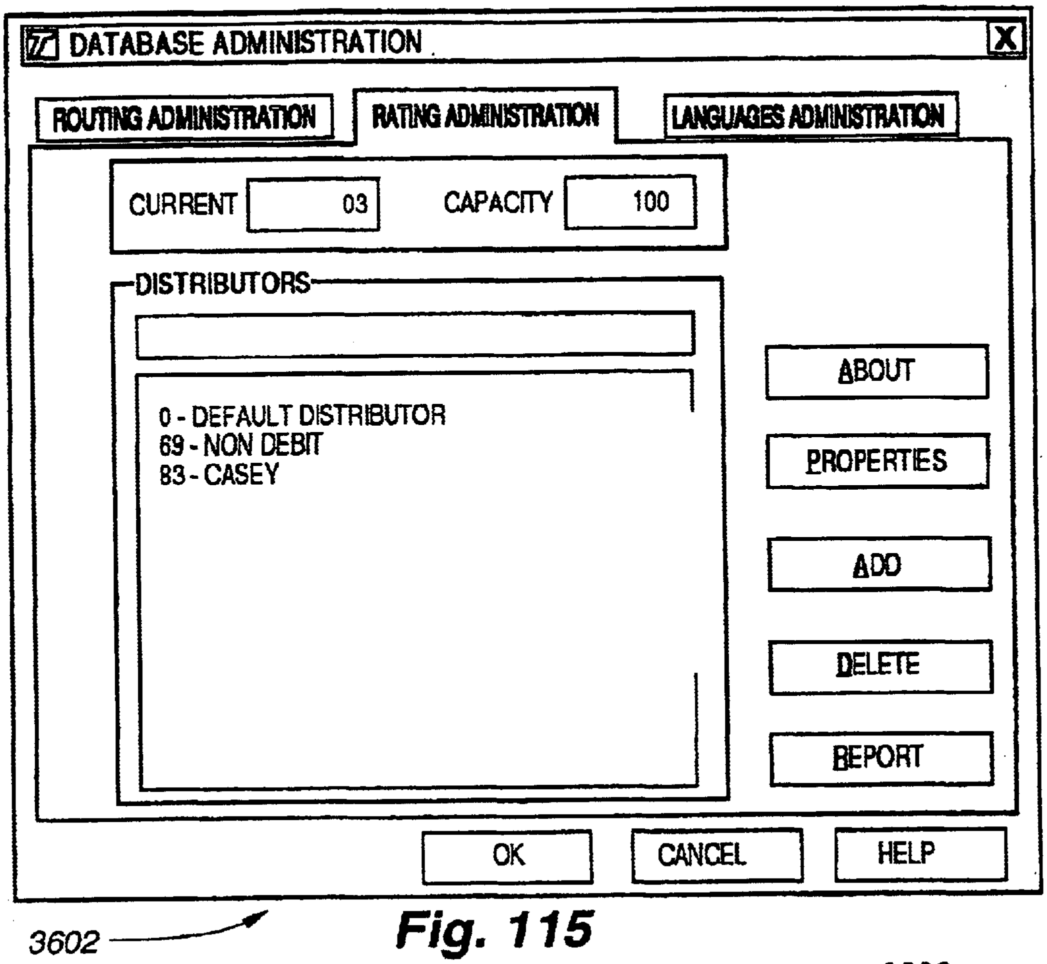

FIG. 115 shows the rating administration window 3602.

Figure 116:
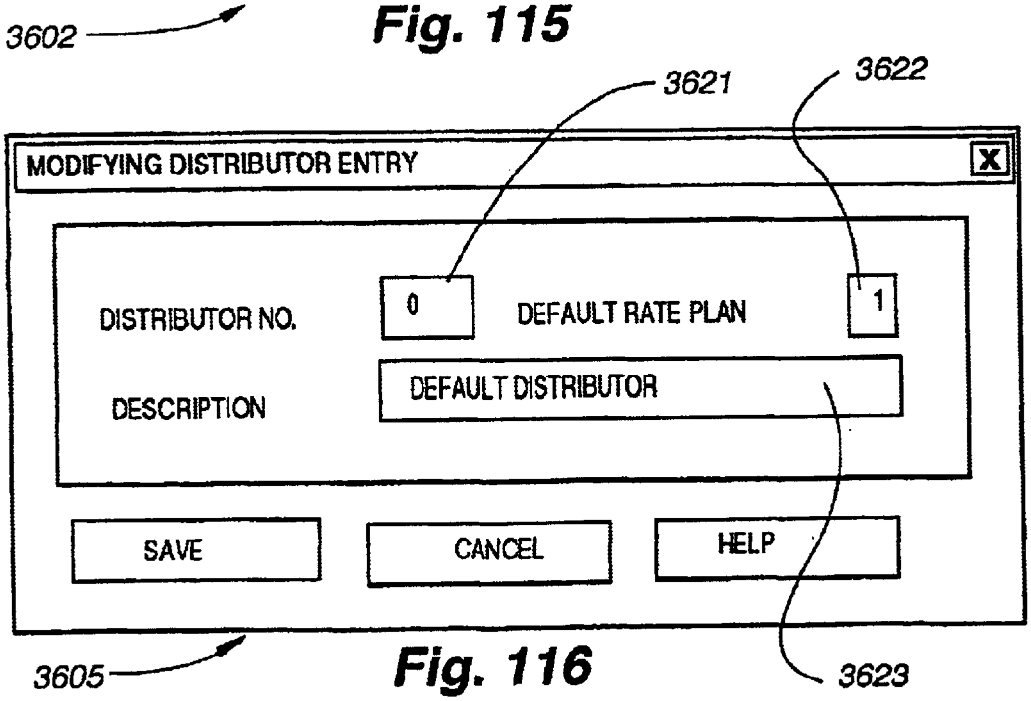

FIG. 116 shows the add/modified/delete rate window 3605. A distributor number box 3621 shows the number assigned to a distributor when added to the system. A default rate plan box 3622 shows the rate plan used as the default for subscribers added for the distribution shown in the distributor number box 3621. The default rate plan is used when a rate plan is not explicitly assigned. A description window 3623 provides the name and/or a description of the distributor shown in the distributor number box 3621.

Figure 117:
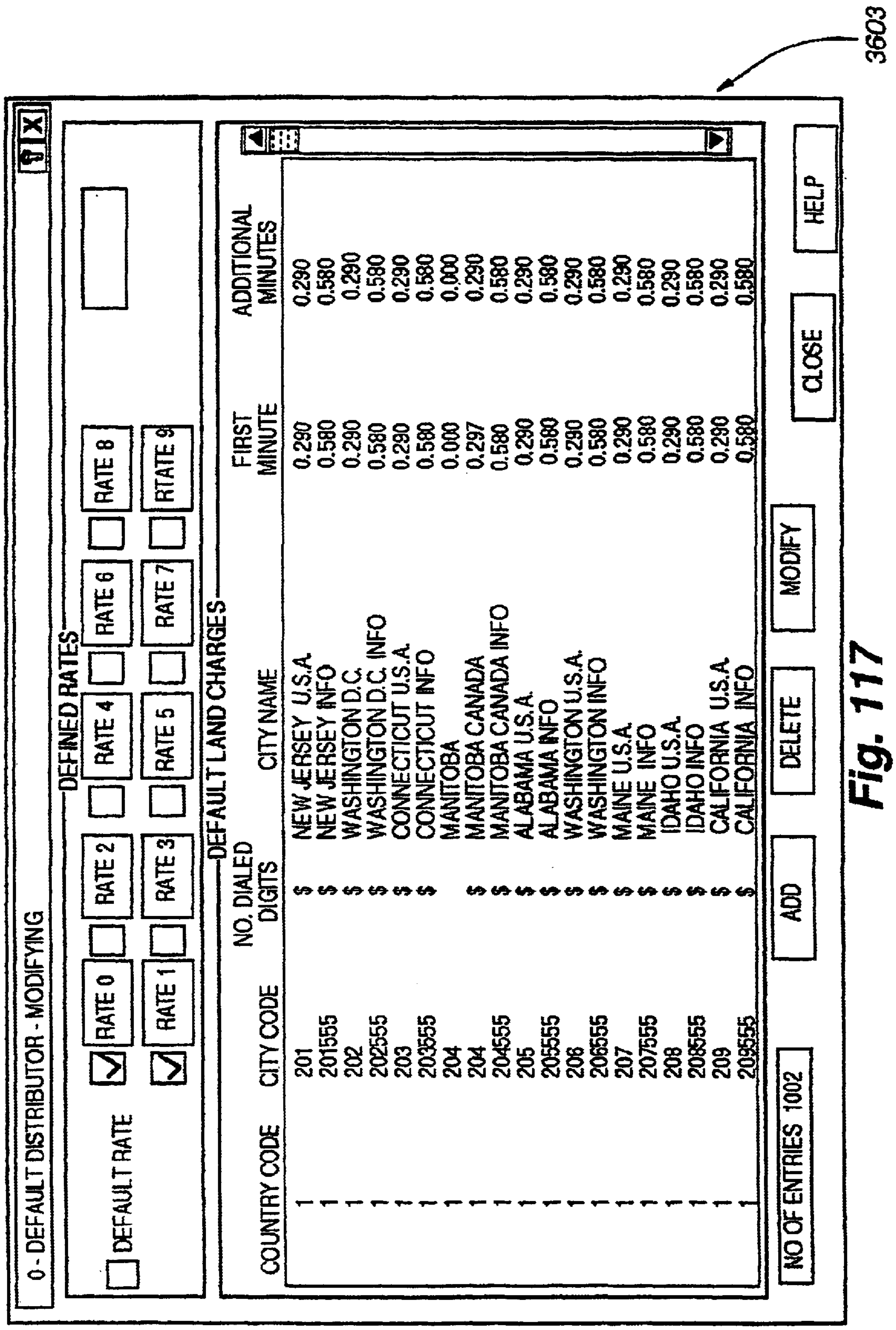

FIG. 117 shows distributor data modification window 3603. The distributor data modification window 3603 allows for the configuration of the land charges rate plans used for real time billing on the aircore system. The window 3603 is accessed on a per distributor basis. Distributor data includes access to land charges and configured access to rate plans. In addition to a default rate plan, each distributor can have up to ten different rate plans. Each rate plan specify specific air time rating structures. Land charges are specified on a per distributor basis.

Figure 118:
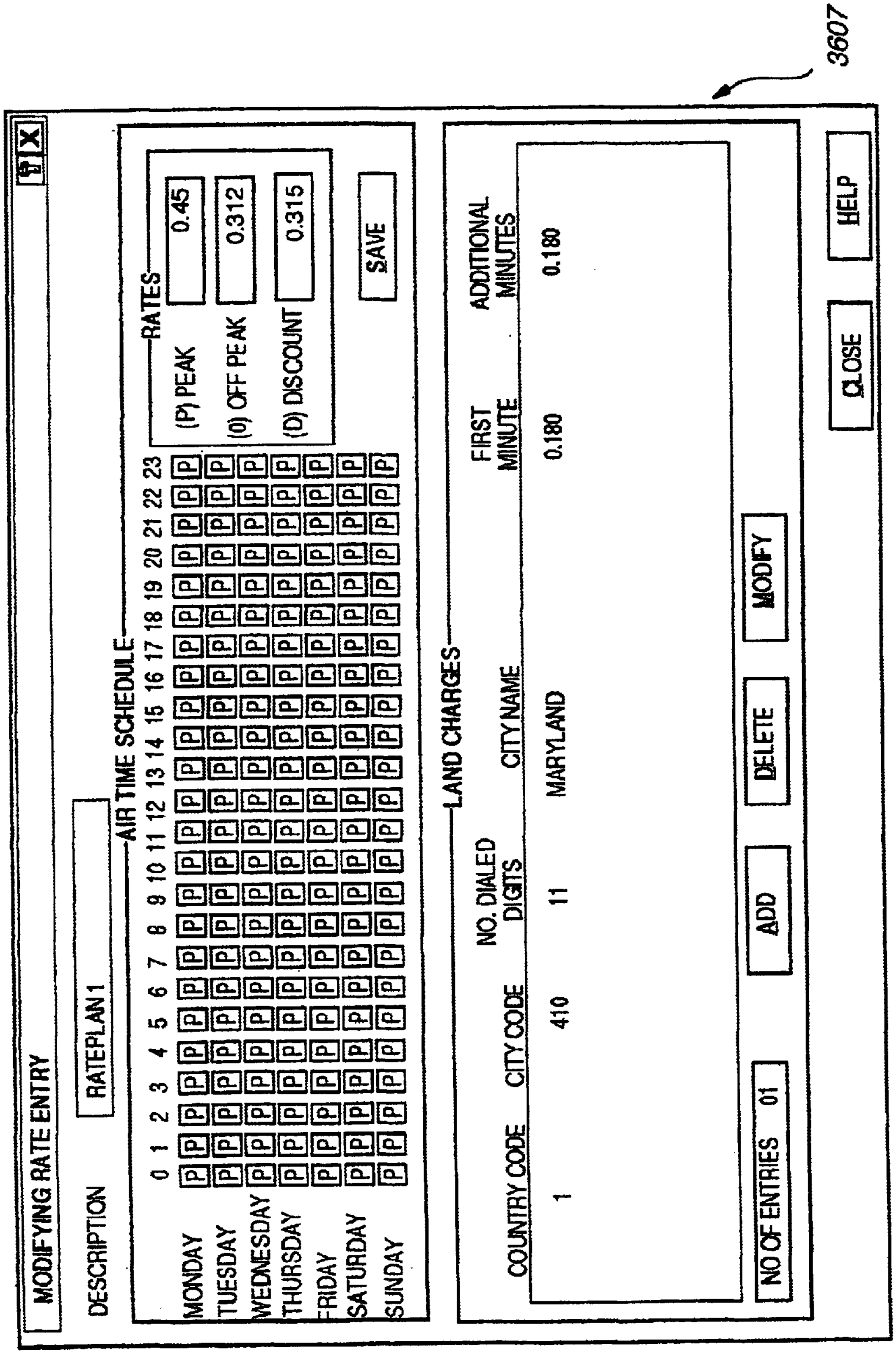

FIG. 118 shows a rate plan window 3607. From the distributor data modification window 3603 shown in FIG. 117, if an active rate plan button is selected, the rate plan window 3607 appears. The rate plan window 3607 provides the operator with the ability to configure the air time charges associated with a specific rate plan. The rate plan window 3607 also provides the ability to specify any exceptions to the main distributor land based charges. Data specified in the rate plan window 3607 overrides the date in the distributor window 3603 and allows an operator to specify unique plans for both land and air time rates without adding a new distributor each time.

Figure 119:
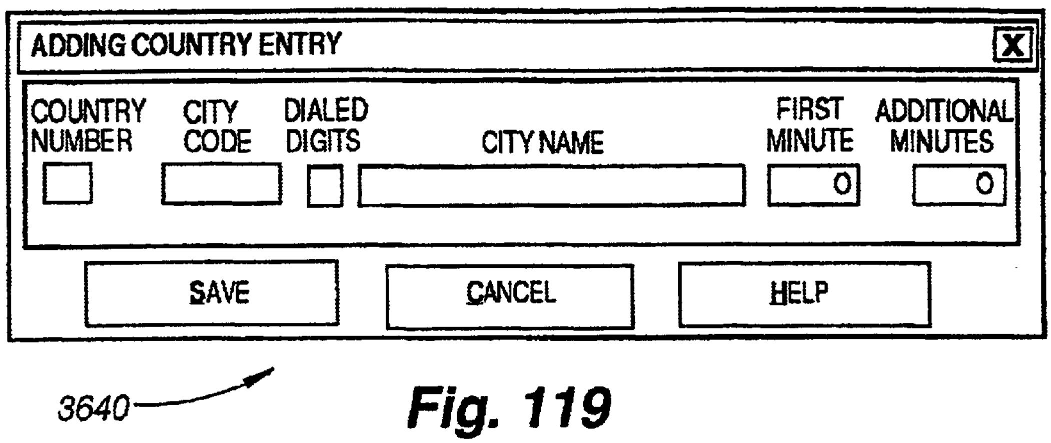

FIG. 119 shows a country entry window 3640. The country entry window 3640 allows modification of rates charges for the land portion of the call. These charges are based on a first and additional minute rate to each location around the world.

Figure 120:
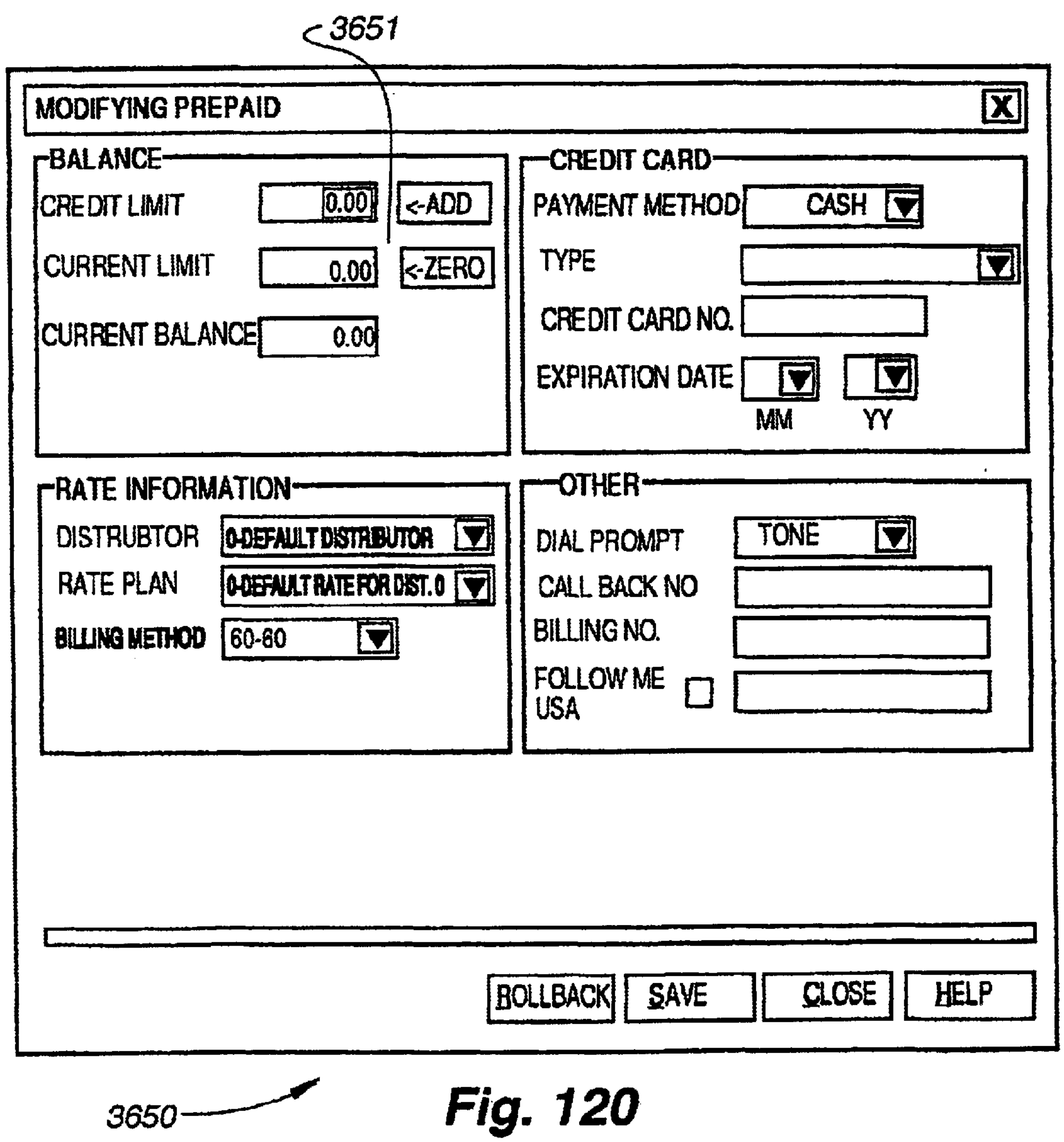
Figure 121:
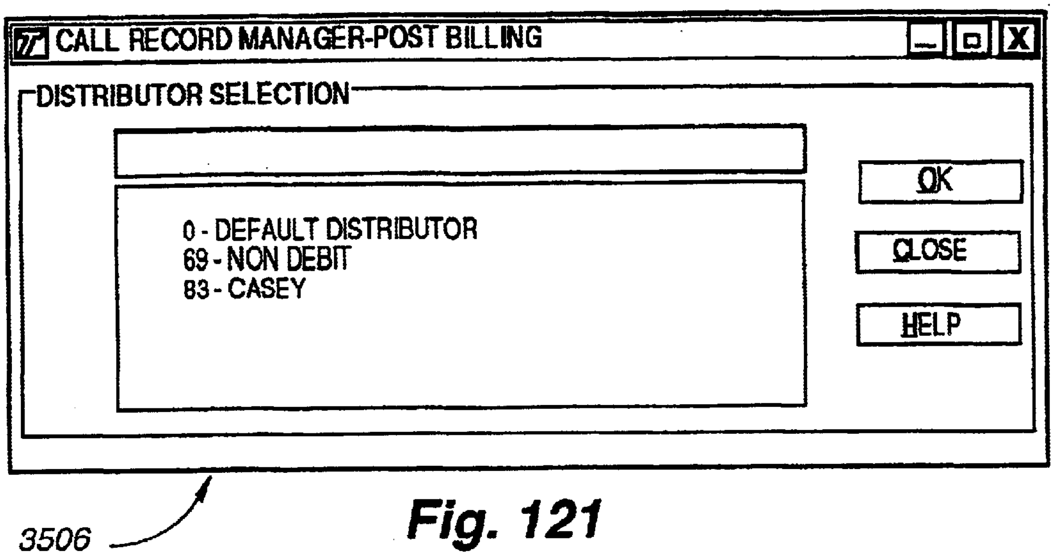

FIG. 120 shows a debit subscriber profile window 3650. The debit subscriber profile window 3650 is used to input debit specific subscriber data for accounts. The window 3650 is accessed via the debit button on a main subscriber profile window (not shown). The fields of the window 3650 specify the parameters used for real time billing and account information for the subscriber. The window 3650 opens as an overlay on the subscriber profile window and allows the subscriber number, name, customer group and serial numbers to be viewed when editing the debit subscriber profile window 3650. A balance section 3651 includes the current amount, which is the current balance in dollars for the individual subscriber account. This amount is incremented based on the subscriber usage. Subscriber access is cutoff when the current amount is equal to the credit limit. The credit limit is the maximum amount in dollars for the subscriber account. The credit limit is compared against the current amount value to determine if access to the account is allowed. If the current amount field equals the credit limit field, access to the account is not allowed. The payment method field specifies the method of payment for the account. The payment method can be cash, credit or other. If credit chosen, the credit card fields must be filled in. The debit subscriber profile window 3650 also includes a credit card section 3652. The credit card section 3652 includes the credit card number (if applicable) the type of credit card and the expiration date of the credit card. Other information provided in the debit subscriber profile window 3650 includes the distributor and rate plan and billing methods chosen for this customer.

The billing window 3504 (see FIG. 110) provides access to customer billing records. The billing window 3504 is accessed from the menu bar of the call record manager window 3501. When selected, the distributor selection window 3506 shown in FIG. 21 is displayed. The distributor selection window 3506 allows an operator to select a distributor for a billing calculation. The distributor selection window 3506 provides access to the billing generation window 3509.

Figure 123:
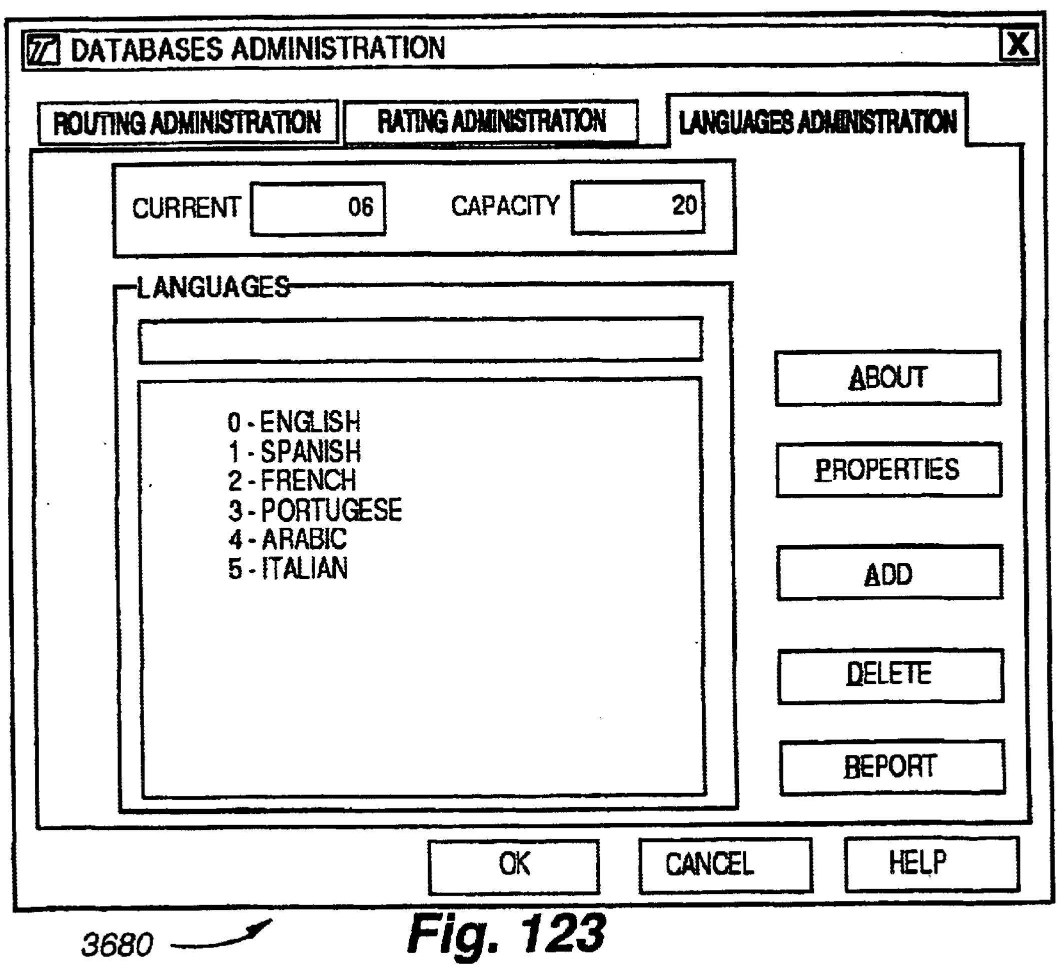

The aircore system provides for the configuration of up to twenty different language files for assignment to customers or for announcements. FIG. 123 shows a languages administration window 3680. The languages administration window 3680 provides operator access to a language configuration database in the aircore system. The language configuration window 3680 is accessed from the database management icon screen 3101 (see FIG. 90).

Figure 122:
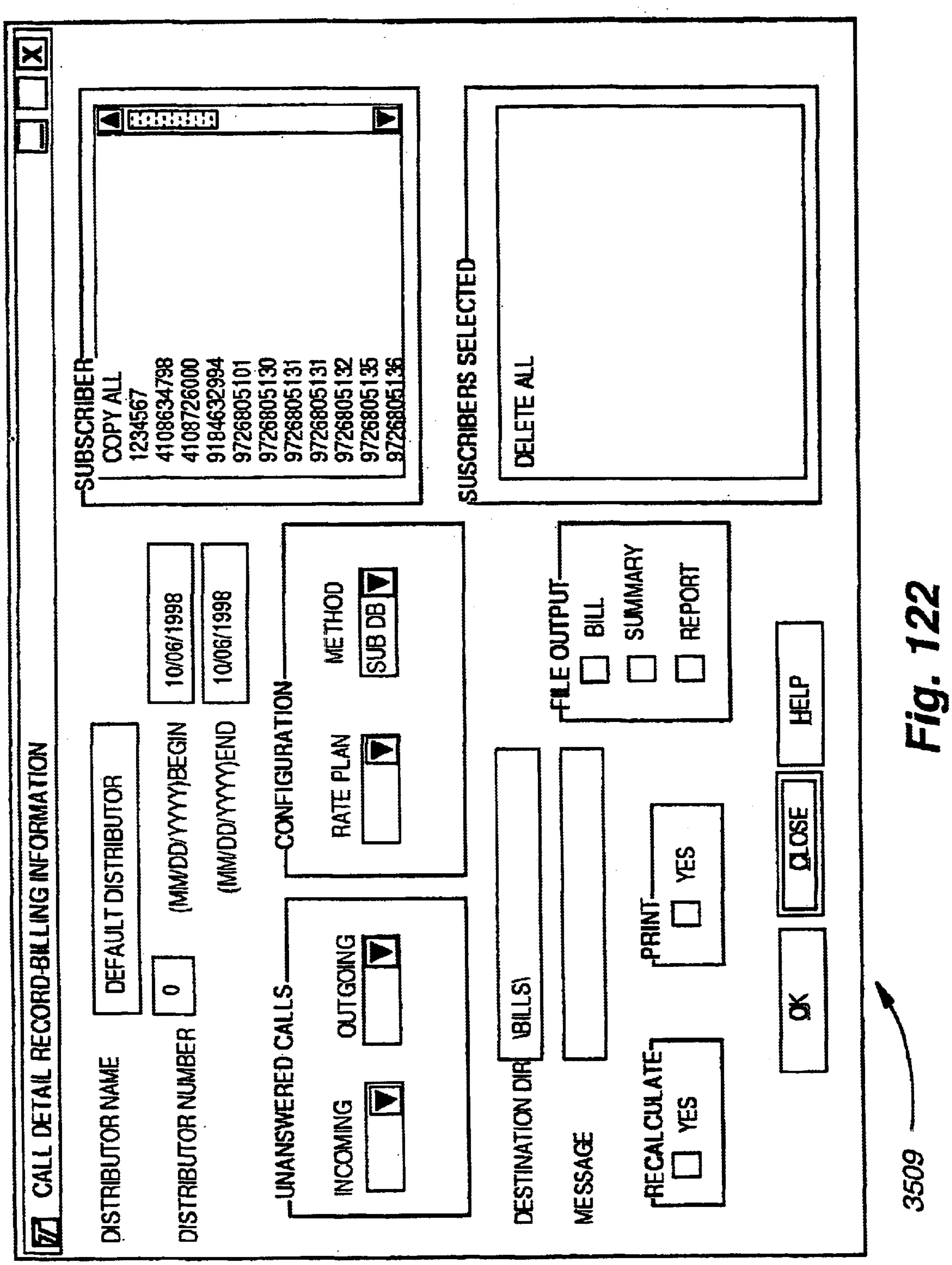

FIG. 122 shows the billing generation window 3509. The billing generation window 3509 allows access to individual subscriber bills and invoices as well as location summaries of customer usage. Billing information is accessed on the basis of the location summoned.

While this invention has been described in conjunction with the specific embodiment outlined above, it is evident that many alterations, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A switching center for a communications system that provides communications services to customers having wireless and other communications devices, comprising:

a single platform having a back plane for communication, the single platform comprising:

a first interface, the first interface receiving and sending digital messaging having a first protocol, the first interface comprising:

a first intrasystem message handler, and a first intrasystem message handler;

a second interface, the second interface receiving and sending digital messaging having a second protocol, the second interface comprising:

a second intrasystem message handler, and a second intersystem message handler; and a processor system coupled to the first and second interfaces, wherein the processor system controls operation of the first and the second interfaces and generates control messages for sending by the first and the second interfaces.

2. The switching center of claim 1, wherein the first intrasystem message handler operates according to IS-634 protocols, the second intrasystem and intersystem message handlers operate according to GSM protocols, and the first intersystem message handler operates according to IS-41 protocols.

3. The switching center of claim 2, wherein the GSM protocols include GSM A (Series 4 and 8) protocols, IS-651 and 1-STD protocols, IS-652 protocols and GSM 09.02 protocols.

4. The switching center of claim 2, wherein the IS-634 and the IS-41 protocols include time division multiple access (TDMA) protocols and code division multiple access (CDMA) protocols and AMPS protocols.

5. The switching center of claim 1, wherein the first interface further receives and sends analog messaging, the analog messaging including Advanced Mobile Telephone System (AMPS) protocols.

6. The switching center of claim 5, wherein the AMPS protocols include IS-634 protocols and ISDN PRI+protocols and propriety protocols.

7. The switching center of claim 1, further comprising a home location register coupled to the processor system; and a visitor location register coupled to the home location register and the processor system, wherein the home location register stores permanent data related to customers of the communications system that are homed on the communications system, and wherein the visitor location register stores temporary data related to customers that are active on the communications system, the home location register and the visitor location register indicating a most recent protocol used by a wireless communications device of a customer and indicating other protocols useable by the wireless communications device.

8. The switching center of claim 7, wherein the permanent data related to customers in the home location register is stored in a customer profile, the customer profile including one or more of call features, call restrictions, mobile unit protocols, line identification, personal identification number, call offering, prepaid services and customer information.

9. The switching center of claim 7, wherein the home location register includes a common data section and protocol-specific data sections, wherein the common data section stores data generic to all protocols and the protocol-specific data sections stores data unique to one or more specific protocols.

10. The switching center of claim 7, wherein the processor system determines a protocol of a wireless communications device by reference to one of the home location register and the visitor location register.

11. The switching center of claim 1, wherein the communications system includes one or more base stations, and wherein the processor system determines a protocol of a wireless communications device based on a protocol of the base station that communicates between the switching center and the wireless communications device.

12. The switching center of claim 1 wherein the communications system includes a multi-protocol base station, the multi-protocol base station sending base station control messages to the switching center, and wherein the processor system determines a protocol of a wireless communications device by interpreting protocol data contained in the base station control message.

13. The switching center of claim 1, wherein the communications system receives communications from an external wireless system having an external home location register and an external communications device registered on the external home location register, and wherein the processor system determines a protocol of the external communications device by obtaining an identification of the external home location register.

14. The switching center of claim 1, wherein the processor system generates and interprets generic command messages, the generic command messages operable to control the communications services according to at least the first and the second protocols.

15. The switching center of claim 1, wherein the processor system generates and interprets protocol-specific command messages, the protocol-specific command messages used to provide additional control of the communications services.

16. The switching center of claim 1, further comprising an asynchronous transfer mode (ATM) interface, the ATM interface providing wireless ATM communications and other packet board communications.

17. The switching center of claim 1, further comprising a public switched telephone network (PST) interface.

18. The switching center of claim 1, further comprising a private branch exchange (PBX) interface.

19. The switching center of claim 1, wherein the wireless communications devices include a fixed wireless telephone, a mobile telephone and a computer having a wireless modem.

20. The switching center of claim 1, further comprising an equipment identification register, wherein the equipment identification register includes serial number data related to the mobile communications devices that are homed on the wireless communications system; and an authentication center, wherein the authentication center provides authentication and encryption parameters for wireless communications received ax and originated from the switching center.

21. The switching center of claim 1, further comprising:

a first device handler coupled to the first interface; and a second device handler coupled to the second interface, wherein the first and the second device handlers are operable to receive and transmit multi-protocol messaging from and to devices external to the switching center and to transmit and receive generic messaging to and from the first and the second interfaces, respectively.

22. The switching center of claim 1, wherein the processing system comprises:

a central processor, the central processor controlling operation of the processor system;

an authentication and registration system, the authentication and registration system controlling registration of the wireless communications devices with the communications system and providing encryption and ciphering of voice and data communications;

a paging system, the paging system sending paging messages to the wireless communications devices and receiving page response messages from the wireless communications devices;

a timer system, the timer system setting timers in response to operations of the processing system a recovery and startup system, the recovery and startup system managing a status of communications trunks in the communications system and performing audits of the communications system; and a memory, wherein the memory stores information related to a particular call in a memory area, and wherein components of the processor system access the memos area to retrieve and store information related to the particular call.

23. The switching center of claim 22, wherein the processor system further comprises a hand off processor, the hand off processor receiving and processing hand off requests from a wireless communications device in the communications system, determining a target base station for hand off and sending a hand off command to the wireless communications device.

24. The switching center of claim 22, wherein the processor system operates to reserve a voice channel with each base station in the communications system that is capable of receiving communications from the wireless communications device, and wherein the processor system operates to release all base stations having a reserved voice channel, except the target base station upon receipt by the processor system of a call connect acknowledge message.

25. The switching center of claim 1, further comprising a graphical user interface, the graphical user interface providing an operator access to operate the switching center and to update data related to the customers, database configuration, system configuration and maintenance.

26. The switching center of claim 1, further comprising a switch management module that manages switching of the incoming signals.

27. The switching center of claim 1, wherein the first and the second interfaces module each comprises a digital interface that supports digital wireless communications.

28. The switching center of claim 1, further comprising a wired interface module that provides connections to wired land-lines.

29. The switching center of claim 25, wherein the graphical user interface is remotely located from te mobile switching center.

30. The switching center of claim 1, further comprising a prepaid module that enables prepaid communication.

31. The switching center of claim 1, further comprising a features module that supports a plurality of communication features.

32. The switching center of claim 1, further comprising a remote network management access module that is remotely located from and operably connected to the switching center.

33. An advanced intelligent message handler for use in a mobile telecommunications network having mobile communications devices and one or more base stations, the advanced intelligent message handler, comprising:

a first interface for intersystem messaging, the first interface, comprising:

a first GSM processing thread, a first TDMA processing thread, a first CDMA processing thread, and a first AMPS processing thread, a second interface for intrasystem messaging, the second interface, comprising:

a second GSM processing thread, a second TDMA processing thread, a second CDMA processing thread, and a second AMPS processing thread, a processor system coupled to the first and the second interfaces, the processor system controlling a flow of message traffic to and from the first and the second interfaces; and a single housing containing the first and the second interfaces and the processor system.

34. A method for controlling communications in a multi-protocol wireless network, comprising:

receiving first digital communications according to a first protocol at a first interface in a common housing;

sending a first control message according to the first protocol;

receiving second digital communications according to a second protocol at a second interface in the common housing;

receiving intrasystem communications at a intrasystem message handler, receiving intersystem communications at a intersystem message handler; and sending a second control message according to the second protocol, wherein a processor in a switching center interprets the first and the second digital communications and generates the first and the second control messages, and wherein the switching center is located in the common housing.

35. The method of claim 34, wherein the intrasystem message handler operates according to IS-634 and GSM standards and the intersystem message handler operates according to IS-41 and GSM standards.

36. The method of claim 35, wherein the GSM protocols include GSM A protocols, IS-651 protocols, IS-652 protocols and GSM 09.02 protocols.

37. The method of claim 35, wherein the IS-634 and IS-41 protocols include time division multiple access (TDMA) protocols and code division multiple access (CDMA) protocols and AMP protocols.

38. The method of claim 34, wherein the first interface further receives and sends analog communications, the analog communications including Advanced Mobile Telephone System (AMPS) protocols.

39. The method of claim 38, wherein the AMPS protocols include IS-634 protocols and ISDN PRI+ protocols and proprietany protocols.

40. The method of claim 34, further comprising:

creating a home location register the home location register including a customer profile for each mobile unit in the multi-protocol wireless network, the customer profile indicating protocols available to the mobile and a most recent protocol used by the mobile unit; and creating a visitor location register, the visitor location register containing the customer profile for each mobile unit that is active in the multi-protocol wireless network.

41. The method of claim 40, wherein the customer profile further includes call features, call restriction, line identification, personal identification number, call offering and prepaid series.

42. The method of claim 40, wherein the home location register includes a common data section and a protocol-specific data section, the common data section storing data generic to all protocols and the protocol-specific data sections storing data unique to one or more protocols.

43. The method of claim 40, further comprising determining a protocol of a wireless communications device by reference to one of the home location register and the visitor location register.

44. The method of claim 34, further comprising determining a protocol of a wireless communications device by reference to a protocol of a base station that communicates with the switching center.

45. The method of claim 34, wherein the multi-protocol wireless network includes one or more multi-protocol base stations, wherein the processor determines a protocol of a wireless communications device by interpreting protocol data contained in communications from the one or more multi-protocol base stations.

46. The method of claim 34, further comprising:

receiving communications from an external communications device from a wireless network external to the multi-protocol wireless network, the external wireless network including an external home location register; and determining a protocol of the external communications device by obtaining an identification of the external home location register.

47. The method of claim 34, wherein the processor generates and interprets generic messages, the generic messages providing generic control signals to control operation of the multi-protocol wireless network.

48. The method of claim 34, wherein the processor generates and interprets protocol-specific messages the protocol-specific messages providing additional control of the communications devices.

49. The method of claim 34, further comprising providing packet based communications.

50. The method of claim 49, further comprising providing an asynchronous transfer mode (ATM) interface providing wireless ATM communications.

51. The method of claim 50, wherein the ATM interface provides PSTN connectivity and an extension of a switch matrix.

52. The method of claim 34, further comprising connecting the switching center to a public switched telephone network (PSTN).

53. The method of claim 34, further comprising connecting the switching center to a private branch exchange.

54. The method of claim 34, wherein the communications devices include a fixed wireless telephone, a mobile telephone and a computer having a wireless modem.

55. The method of claim 34, further comprising:

recording an identity of a mobile device; and encrypting and decrypting the first and the second digital communications.

56. The method of claim 34, further comprising:

receiving first communications at and sending, first communications from a first device handler coupled to the first interface; and receiving second communications at and sending second communications from a second device handler coupled to the second interface, wherein the first and the second device handlers are operable to receive and transmit multi-protocol communications.

57. The method of claim 34, further comprising sending and receiving registration notification messages to resister a mobile unit in a visitor location register;

sending and receiving paging messages to access a mobile unit in the multi-protocol wireless network;

setting a user to time out control messages;

maintaining a status of communications trunks in the multi-protocol wireless network; and storing data related to a particular call in a common memory area, the data for the particular call used by components of the multipurpose wireless network to control and access the particular call.

58. The method of claim 34, further comprising:

monitoring a signal strength of communications with a mobile communications device;

sending a hand off request when the signal strength exceed a limit;

measuring signal-strengths of each of the other base stations in the multi-protocol wireless network;

reserving a voice channel in each of the other base stations; and selecting a target base station for communication with the mobile communications device; and handing off the mobile communications based on the measurements.

59. The method of claim 34, further comprising providing a graphical user interface to the switching center, the graphical user interface allowing an operator to update information stored by the switching center.

60. The method of claim 34, further comprising;

designating a first communications trunk, the first communications trunk carrying the first control message, wherein the first communications trunk connects a first base station and the switching center; and designating a second communications trunk, the second communications trunk carrying the second control message, wherein the second communications trunk connects a second base station and the switching center.

61. The method of claim 34, wherein the switching center comprises a plurality of communications trunks, the switching center designating one or more of the plurality of the communications trunk for use in connecting wireless calls.

62. The method of claim 61, wherein the switching center tracks a state of each communications trunk of the plurality of communications trunks.

63. The method of claim 62, wherein a state of a communications trunk may be one of not configured, blocked, unblocked, unblocked pending, call processing, blocked pending and maintenance.

64. The method of claim 63, wherein the communications trunk transitions from the not configured state to the blocked state when a base station is activated in the wireless network.

65. The method of claim 63, wherein the communications trunk transitions from the blocked state to the unblocked pending state based on a recovery request.

66. The method of claim 63, wherein the communications trunk transitions from the unblocked state to the call processing state when a base station is allocated for call processing.

67. The method of claim 34, further comprising:

receiving a call from a prepaid customer;

processing the call from the prepaid customer;

determining an allowed time of call based on a prepaid account for the prepaid customer;

determining a warning time for the call, wherein the warning time is a time less than the allowed time;

connecting the call;

monitoring a time of the call;

providing a warning to the prepaid customer when the warning time occurs; and disconnecting the call when the allowed time is reached.

68. The method of claim 67, further comprising:

providing a plurality of rate plans, wherein the prepaid customer may select a desired rate plan from the plurality of rate plans.

69. The method of claim 68, wherein the desired rate plan is stored in a home location register.

70. The method of claim 67, further comprising:

determining a least cost route for the call from the prepaid customer.

71. The method of claim 67, further comprising:

at a completion of the call from the prepaid customer, computing an actual cost for the call; and updating the prepaid account based on the actual cost for the call.

72. A switching center for communication system that provides communications devices to customers having wireless and other communications devices, comprising:

a first interface, the first interface, comprising:

a first intrasystem message handler; and a first intersystem message handler, the first interface receiving and sending digital messaging having a first protocol;

a second interface, the second interface, comprising:

a second intrasystem message handler; and a second intersystem message handler, the second interface receiving and sending digital messaging having a second protocol, wherein the second interface comprises an asynchronous transfer mode (ATM) interface, the ATM interface providing wireless ATM communications and other packet communications; and a processor system coupled to the first and the second interfaces, wherein the processor system controls operation of the first and the second interfaces and generates control messages for sending by the first and the second interfaces; and a single platform having a communications back plane, the single housing enclosing the first interface, the second interface, and the processor system.

73. A mobile switching center, comprising:

a central processor that processes incoming signals wherein the incoming signals are switched in a telecommunications network; at a wireless interface module that supports two or more wireless protocols, wherein the wireless interface module comprises an asynchronous transfer mode (ATM) interface, the ATM interface providing wireless ATM communications and other packet communications, and wherein the ATM interface comprises:

a first intrasystem message handler, a first intersystem message handler, a second intrasystem message handler, and a second intersystem message handler, and a single platform having a communications back plane, the single housing enclosing the central processor and the wireless interface module.

74. A switching center for a communication system that provides communications services to customers having wireless and other communications devices, comprising:

a first interface, the first interface receiving and sending digital messaging having a first protocol, the first interface comprising a first intrasystem message handler and a first intersystem message handler;

a second interface, the second interface receiving and sending digital messaging having a second protocol, the second interface comprising a second intrasystem message handler and a second intersystem message handler; and a processor system coupled to the first and second interfaces, the processor system comprising a single operating system for communications received at the first and the second interfaces, wherein the processor system controls operation of the first and the second interfaces and generates control messages for sending by the first and the second interfaces; and a single platform having a communications back plane, the single housing enclosing the first interface, the second interface, and the processor system.

* * * * *